US008542326B2

(12) United States Patent
MacNaughton et al.

(10) Patent No.: US 8,542,326 B2
(45) Date of Patent: Sep. 24, 2013

(54) 3D SHUTTER GLASSES FOR USE WITH LCD DISPLAYS

(75) Inventors: Boyd MacNaughton, Portland, OR (US); Rodney W. Kimmell, Gaston, OR (US); David W. Allen, Beaverton, OR (US); Jure Bezgovsek, Velenje (SI)

(73) Assignee: X6D Limited, Limassol (CY)

( * ) Notice: Subject to any disclaimer, the term of this patent is extended or adjusted under 35 U.S.C. 154(b) by 222 days.

(21) Appl. No.: 13/040,916

(22) Filed: Mar. 4, 2011

(65) Prior Publication Data
US 2011/0216252 A1    Sep. 8, 2011

Related U.S. Application Data

(63) Continuation-in-part of application No. 13/038,944, filed on Mar. 2, 2011, and a continuation-in-part of application No. 13/019,896, filed on Feb. 2, 2011, and a continuation-in-part of application No. 12/963,812, filed on Dec. 9, 2010, and a continuation-in-part of application No. 12/963,373, filed on Dec. 8, 2010, and a continuation-in-part of application No. 12/947,619, filed on Nov. 16, 2010, and a continuation-in-part of application No. 12/908,371, filed on Oct. 20, 2010, now abandoned, and a continuation-in-part of application No. 12/908,430, filed on Oct. 20, 2010, now abandoned, and a continuation-in-part of application No. 12/880,920, filed on Sep. 13, 2010, and a continuation-in-part of application No. 12/748,185, filed on Mar. 26, 2010, now Pat. No. 8,233,103, and a continuation-in-part of application No. 12/619,518, filed on Nov. 16, 2009, now abandoned, and a continuation-in-part of application No. 12/619,517, filed on Nov. 16, 2009, now abandoned, and a continuation-in-part of application No. 12/619,309, filed on Nov. 16, 2009, now abandoned, and a continuation-in-part of application No. 12/619,415, filed on Nov. 16, 2009, now abandoned, and a continuation-in-part of application No. 12/619,400, filed on Nov. 16, 2009, and a continuation-in-part of application No. 12/619,431, filed on Nov. 16, 2009, now abandoned, and a continuation-in-part of application No. 12/619,163, filed on Nov. 16, 2009, now abandoned, and a continuation-in-part of application No. 12/619,456, filed on Nov. 16, 2009, now abandoned, and a continuation-in-part of application No. 12/619,102, filed on Nov. 16, 2009, now abandoned.

(60) Provisional application No. 61/310,556, filed on Mar. 4, 2010, provisional application No. 61/309,611, filed on Mar. 2, 2010, provisional application No. 61/285,071, filed on Dec. 9, 2009, provisional application No. 61/285,048, filed on Dec. 9, 2009, provisional application No. 61/261,663, filed on Nov. 16, 2009, provisional application No. 61/253,140, filed on Oct. 20, 2009, provisional application No. 61/253,150, filed on Oct. 20, 2009, provisional application No. 61/179,248, filed on May 18, 2009, provisional application No. 61/115,477, filed on Nov. 17, 2008.

(51) Int. Cl.
*G02F 1/1335* (2006.01)

(52) U.S. Cl.
USPC .......................................................... 349/15

(58) Field of Classification Search
None
See application file for complete search history.

(56) References Cited

U.S. PATENT DOCUMENTS

| | | |
|---|---|---|
| 2,646,439 A | 7/1953 | Gloyer |
| D193,028 S | 6/1962 | Petitto |

(Continued)

FOREIGN PATENT DOCUMENTS

| | | |
|---|---|---|
| AU | 332282 | 6/2010 |
| AU | 2010201529 A1 | 12/2010 |

(Continued)

OTHER PUBLICATIONS

French Search Report from related FR Appl. No. 1056816, dated Oct. 21, 2011.

(Continued)

*Primary Examiner* — Lucy Chien
(74) *Attorney, Agent, or Firm* — X6D USA, Inc.

(57) ABSTRACT

A viewing system for viewing video displays having the appearance of a three dimensional image.

14 Claims, 68 Drawing Sheets

(56) References Cited

U.S. PATENT DOCUMENTS

| | | |
|---|---|---|
| 3,621,127 A | 11/1971 | Hope |
| 3,881,808 A | 5/1975 | Gurtler et al. |
| 3,903,358 A | 9/1975 | Roese |
| 3,992,573 A | 11/1976 | White |
| 4,021,846 A | 5/1977 | Roese |
| 4,131,342 A | 12/1978 | Dudley |
| 4,214,267 A | 7/1980 | Roese et al. |
| 4,286,286 A | 8/1981 | Jurisson et al. |
| 4,424,529 A | 1/1984 | Roese et al. |
| 4,562,463 A | 12/1985 | Lipton |
| 4,571,616 A | 2/1986 | Haisma et al. |
| 4,583,117 A | 4/1986 | Lipton et al. |
| 4,635,051 A | 1/1987 | Bos |
| 4,715,702 A | 12/1987 | Dillon |
| 4,736,246 A | 4/1988 | Nishikawa |
| 4,772,944 A | 9/1988 | Yoshimura |
| 4,786,966 A | 11/1988 | Hanson et al. |
| 4,851,901 A | 7/1989 | Iwasaki |
| 4,870,600 A | 9/1989 | Hiraoka |
| 4,907,860 A | 3/1990 | Noble |
| 4,943,852 A | 7/1990 | Femano et al. |
| 4,947,123 A | 8/1990 | Minezawa |
| 4,963,013 A | 10/1990 | Bononi |
| 4,966,454 A | 10/1990 | Toporkiewicz |
| 4,967,268 A | 10/1990 | Lipton et al. |
| 4,971,435 A | 11/1990 | Shaw et al. |
| 4,979,033 A | 12/1990 | Stephens |
| 5,002,387 A | 3/1991 | Baljet et al. |
| 5,007,715 A | 4/1991 | Verhulst |
| 5,028,994 A | 7/1991 | Miyakawa et al. |
| 5,059,017 A | 10/1991 | Bennato |
| 5,084,763 A | 1/1992 | Naradate et al. |
| D323,665 S | 2/1992 | Simioni |
| 5,117,302 A | 5/1992 | Lipton |
| 5,119,189 A | 6/1992 | Iwamoto et al. |
| 5,144,344 A | 9/1992 | Takahashi et al. |
| 5,153,569 A | 10/1992 | Kawamura et al. |
| 5,162,919 A | 11/1992 | Ono |
| 5,175,616 A | 12/1992 | Milgram et al. |
| 5,187,603 A | 2/1993 | Bos |
| 5,245,319 A | 9/1993 | Kilian |
| 5,260,773 A | 11/1993 | Dischert |
| 5,264,877 A | 11/1993 | Hussey |
| 5,293,227 A | 3/1994 | Prince |
| 5,325,192 A | 6/1994 | Allen |
| 5,327,153 A | 7/1994 | Biverot |
| D349,508 S | 8/1994 | Conway |
| 5,357,277 A | 10/1994 | Nakayoshi et al. |
| 5,371,556 A | 12/1994 | Suwa et al. |
| 5,379,369 A | 1/1995 | Komma et al. |
| D355,740 S | 2/1995 | Kirchner |
| 5,402,191 A | 3/1995 | Dean et al. |
| D358,150 S | 5/1995 | Lewis, Jr. et al. |
| 5,414,544 A | 5/1995 | Aoyagi et al. |
| 5,422,653 A | 6/1995 | Maguire, Jr. |
| D360,062 S | 7/1995 | Mosior |
| 5,452,026 A | 9/1995 | Marcy, III |
| 5,453,132 A | 9/1995 | Kowalchuk |
| 5,459,790 A | 10/1995 | Scofield et al. |
| 5,463,428 A | 10/1995 | Lipton et al. |
| 5,479,185 A | 12/1995 | Biverot |
| 5,486,841 A | 1/1996 | Hara et al. |
| 5,502,481 A | 3/1996 | Dentinger et al. |
| 5,515,268 A | 5/1996 | Yoda |
| 5,528,420 A | 6/1996 | Momochi |
| 5,539,423 A | 7/1996 | Kim et al. |
| 5,541,641 A | 7/1996 | Shimada |
| D372,726 S | 8/1996 | Simioni |
| 5,553,203 A | 9/1996 | Faris |
| 5,559,632 A | 9/1996 | Lawrence et al. |
| 5,572,235 A | 11/1996 | Mical et al. |
| 5,572,250 A | 11/1996 | Lipton et al. |
| 5,596,693 A | 1/1997 | Needle et al. |
| 5,606,363 A | 2/1997 | Songer |
| 5,619,219 A | 4/1997 | Coteus et al. |
| 5,629,984 A | 5/1997 | McManis |
| 5,644,324 A | 7/1997 | Maguire, Jr. |
| 5,654,746 A | 8/1997 | McMullan, Jr. et al. |
| 5,661,812 A | 8/1997 | Scofield et al. |
| 5,671,007 A | 9/1997 | Songer |
| 5,686,975 A | 11/1997 | Lipton |
| 5,699,133 A | 12/1997 | Furuta |
| 5,700,193 A | 12/1997 | d'Achard Van Enschut |
| D390,589 S | 2/1998 | Simioni |
| D391,596 S | 3/1998 | Simioni |
| D392,308 S | 3/1998 | Simioni |
| 5,734,421 A | 3/1998 | Maguire, Jr. |
| 5,742,331 A | 4/1998 | Uomori et al. |
| 5,751,341 A | 5/1998 | Chaleki et al. |
| 5,752,073 A | 5/1998 | Gray, III et al. |
| 5,790,184 A | 8/1998 | Sato et al. |
| 5,796,373 A | 8/1998 | Ming-Yen |
| 5,805,205 A | 9/1998 | Songer |
| 5,806,953 A | 9/1998 | Kucera et al. |
| 5,808,588 A | 9/1998 | Lin |
| 5,821,989 A | 10/1998 | Lazzaro et al. |
| 5,822,928 A | 10/1998 | Maxwell et al. |
| 5,828,427 A | 10/1998 | Faris |
| 5,838,389 A | 11/1998 | Mical et al. |
| 5,841,879 A | 11/1998 | Scofield et al. |
| 5,844,717 A | 12/1998 | Faris |
| 5,847,710 A | 12/1998 | Kroitor |
| 5,854,634 A | 12/1998 | Kroitor |
| 5,867,210 A | 2/1999 | Rod |
| 5,879,065 A | 3/1999 | Shirochi et al. |
| 5,886,771 A | 3/1999 | Osgood |
| 5,886,816 A | 3/1999 | Faris |
| 5,886,818 A | 3/1999 | Summer et al. |
| D407,737 S | 4/1999 | Hewitt |
| 5,917,539 A | 6/1999 | Sorensen et al. |
| 5,928,718 A | 7/1999 | Dillon |
| 5,929,859 A | 7/1999 | Meijers |
| 5,948,328 A | 9/1999 | Fiedler et al. |
| 5,959,663 A | 9/1999 | Oba et al. |
| 5,963,371 A | 10/1999 | Needham et al. |
| 5,990,936 A * | 11/1999 | Nakayoshi et al. ............ 348/56 |
| 6,002,518 A | 12/1999 | Faris |
| 6,005,536 A | 12/1999 | Beadles et al. |
| 6,011,581 A | 1/2000 | Swift et al. |
| D422,619 S | 4/2000 | Hsu |
| 6,078,352 A | 6/2000 | Nakaya et al. |
| 6,084,654 A | 7/2000 | Toporkiewicz et al. |
| 6,088,052 A | 7/2000 | Guralnick |
| 6,094,182 A | 7/2000 | Maguire, Jr. |
| 6,111,596 A | 8/2000 | Haskell et al. |
| 6,144,747 A | 11/2000 | Scofield et al. |
| 6,157,337 A | 12/2000 | Sato |
| 6,160,574 A | 12/2000 | Oba et al. |
| 6,181,371 B1 | 1/2001 | Maguire, Jr. |
| 6,188,442 B1 | 2/2001 | Narayanaswami |
| 6,191,772 B1 | 2/2001 | Mical et al. |
| 6,195,205 B1 | 2/2001 | Faris |
| 6,198,485 B1 | 3/2001 | Mack et al. |
| 6,201,566 B1 | 3/2001 | Harada et al. |
| 6,243,207 B1 | 6/2001 | Kawamura et al. |
| 6,252,707 B1 | 6/2001 | Kleinberger et al. |
| 6,259,426 B1 | 7/2001 | Harada et al. |
| 6,259,565 B1 | 7/2001 | Kawamura et al. |
| 6,278,501 B1 | 8/2001 | Lin |
| 6,307,589 B1 | 10/2001 | Maquire, Jr. |
| 6,312,122 B1 | 11/2001 | Brown et al. |
| 6,333,757 B1 | 12/2001 | Faris |
| 6,359,664 B1 | 3/2002 | Faris |
| 6,373,492 B1 | 4/2002 | Kroitor |
| 6,384,971 B1 | 5/2002 | Faris |
| 6,388,797 B1 | 5/2002 | Lipton et al. |
| 6,404,464 B1 | 6/2002 | Faris et al. |
| 6,411,326 B1 | 6/2002 | Tabata |
| 6,414,728 B1 | 7/2002 | Faris et al. |
| D461,489 S | 8/2002 | Dituri et al. |
| 6,456,432 B1 | 9/2002 | Lazzaro et al. |
| D464,669 S | 10/2002 | Thixton et al. |
| 6,466,255 B1 | 10/2002 | Kagita et al. |
| 6,476,820 B1 | 11/2002 | Harada et al. |

| | | |
|---|---|---|
| 6,496,183 B1 | 12/2002 | Bar-Nahum |
| 6,501,443 B1 | 12/2002 | McMahon |
| 6,507,359 B1 | 1/2003 | Muramoto et al. |
| 6,523,006 B1 | 2/2003 | Ellis et al. |
| 6,526,161 B1 | 2/2003 | Yan |
| 6,529,175 B2 | 3/2003 | Tserkovnyuk et al. |
| 6,529,209 B1 | 3/2003 | Dunn et al. |
| 6,532,008 B1 | 3/2003 | Guralnick |
| 6,535,008 B1 | 3/2003 | Casale |
| 6,556,236 B1 | 4/2003 | Swift et al. |
| 6,564,108 B1 | 5/2003 | Makar et al. |
| 6,570,566 B1 | 5/2003 | Yoshigahara |
| D475,733 S | 6/2003 | Lee |
| 6,577,315 B1 | 6/2003 | Kroitor |
| 6,580,556 B2 | 6/2003 | Kakizawa |
| 6,602,194 B2 | 8/2003 | Roundhill et al. |
| D479,851 S | 9/2003 | Mangum |
| 6,630,931 B1 | 10/2003 | Trika et al. |
| 6,650,306 B2 | 11/2003 | Yerazunis et al. |
| 6,676,259 B1 | 1/2004 | Trifilo |
| 6,687,399 B1 | 2/2004 | Chuang et al. |
| 6,697,197 B2 | 2/2004 | Sedlmayr |
| D488,499 S | 4/2004 | Mage |
| 6,721,433 B2 | 4/2004 | Sato |
| 6,724,442 B1 | 4/2004 | Zyskowski et al. |
| 6,738,114 B1 | 5/2004 | Faris |
| 6,759,998 B2 | 7/2004 | Schkolnik |
| 6,765,568 B2 | 7/2004 | Swift et al. |
| 6,791,570 B1 | 9/2004 | Schwerdtner et al. |
| 6,791,599 B1 | 9/2004 | Okada et al. |
| 6,791,752 B2 | 9/2004 | Sedlmayr |
| 6,792,144 B1 | 9/2004 | Yan et al. |
| 6,798,443 B1 | 9/2004 | Maguire, Jr. |
| 6,801,263 B2 | 10/2004 | Sato et al. |
| 6,803,928 B2 | 10/2004 | Bimber et al. |
| 6,842,175 B1 | 1/2005 | Schmalstieg et al. |
| 6,882,476 B2 | 4/2005 | Sedlmayr |
| 6,888,612 B2 | 5/2005 | Faris |
| 6,927,769 B2 | 8/2005 | Roche, Jr. |
| 6,943,852 B2 | 9/2005 | Divelbiss et al. |
| 6,943,949 B2 | 9/2005 | Sedlmayr |
| 6,956,571 B2 | 10/2005 | Sato et al. |
| 6,961,177 B2 | 11/2005 | Sato et al. |
| 6,963,356 B2 | 11/2005 | Satoh |
| 6,970,144 B1 | 11/2005 | Swift et al. |
| 6,985,168 B2 | 1/2006 | Swift et al. |
| 6,992,462 B1 | 1/2006 | Hussaini et al. |
| 7,002,619 B1 | 2/2006 | Dean et al. |
| 7,019,780 B1 | 3/2006 | Takeuchi et al. |
| 7,030,902 B2 | 4/2006 | Jacobs |
| 7,033,025 B2 | 4/2006 | Winterbotham |
| 7,046,272 B2 | 5/2006 | Schwerdtner |
| D523,602 S | 6/2006 | Memari et al. |
| D523,603 S | 6/2006 | Memari et al. |
| 7,068,241 B2 | 6/2006 | Sato et al. |
| 7,081,997 B2 | 7/2006 | Sedlmayr |
| 7,085,410 B2 | 8/2006 | Redert |
| 7,102,822 B2 | 9/2006 | Sedlmayr |
| 7,146,095 B2 | 12/2006 | Asami |
| 7,154,468 B2 | 12/2006 | Linzmeier et al. |
| 7,154,671 B2 | 12/2006 | Sedlmayr |
| D534,569 S | 1/2007 | Teng |
| 7,164,779 B2 | 1/2007 | Yerazunis et al. |
| 7,167,188 B2 | 1/2007 | Redert |
| 7,180,554 B2 | 2/2007 | Divelbiss et al. |
| 7,190,518 B1 | 3/2007 | Kleinberger et al. |
| D539,830 S | 4/2007 | Saderholm et al. |
| 7,215,356 B2 | 5/2007 | Lin et al. |
| 7,215,357 B1 | 5/2007 | Swift et al. |
| 7,215,809 B2 | 5/2007 | Sato et al. |
| 7,224,411 B2 | 5/2007 | Gibbon et al. |
| 7,233,335 B2 | 6/2007 | Moreton et al. |
| D545,873 S | 7/2007 | Sheldon |
| D549,270 S | 8/2007 | Daems et al. |
| D552,154 S | 10/2007 | Arnette |
| D552,155 S | 10/2007 | Markovitz |
| 7,280,110 B2 | 10/2007 | Sato et al. |
| 7,289,539 B1 | 10/2007 | Mimberg |
| D554,687 S | 11/2007 | Arnette |
| D556,246 S | 11/2007 | Yee |
| D556,411 S | 11/2007 | Weiss |
| 7,295,371 B1 | 11/2007 | Sedlmayr |
| D557,730 S | 12/2007 | Mage |
| D558,816 S | 1/2008 | Yee |
| 7,315,408 B2 | 1/2008 | Schwerdtner |
| D561,810 S | 2/2008 | Fox et al. |
| D561,812 S | 2/2008 | Fox et al. |
| D565,085 S | 3/2008 | Mage |
| 7,349,006 B2 | 3/2008 | Sato et al. |
| D567,842 S | 4/2008 | Miklitarian |
| 7,362,962 B2 | 4/2008 | Urata |
| 7,375,885 B2 | 5/2008 | Ijzerman et al. |
| 7,388,583 B2 | 6/2008 | Redert |
| 7,394,506 B2 | 7/2008 | Cirkel et al. |
| 7,400,431 B2 | 7/2008 | Schwerdtner et al. |
| 7,405,801 B2 | 7/2008 | Jacobs |
| 7,414,782 B2 | 8/2008 | Jung |
| D576,662 S | 9/2008 | Lane et al. |
| 7,423,796 B2 | 9/2008 | Woodgate et al. |
| 7,425,069 B2 | 9/2008 | Schwerdtner et al. |
| 7,426,068 B2 | 9/2008 | Woodgate et al. |
| 7,436,476 B2 | 10/2008 | Sharp et al. |
| 7,439,940 B1 | 10/2008 | Maguire, Jr. |
| 7,450,188 B2 | 11/2008 | Schwerdtner |
| D584,019 S | 12/2008 | Yang et al. |
| 7,463,305 B2 | 12/2008 | Wada |
| 7,471,352 B2 | 12/2008 | Woodgate et al. |
| D585,618 S | 1/2009 | Yang et al. |
| 7,477,206 B2 | 1/2009 | Cowan et al. |
| 7,477,331 B2 | 1/2009 | Lin et al. |
| 7,489,311 B2 | 2/2009 | Lee |
| 7,489,445 B2 | 2/2009 | McKee, Jr. |
| D587,741 S | 3/2009 | Chen |
| 7,502,003 B2 | 3/2009 | Lipton et al. |
| 7,502,010 B2 | 3/2009 | Kirk |
| 7,505,108 B2 | 3/2009 | Mochizuki |
| 7,508,589 B2 | 3/2009 | Robinson et al. |
| 7,510,280 B2 | 3/2009 | Sharp |
| 7,511,787 B2 | 3/2009 | Sharp |
| 7,517,081 B2 | 4/2009 | Lipton et al. |
| 7,518,662 B2 | 4/2009 | Chen et al. |
| 7,524,053 B2 | 4/2009 | Lipton |
| 7,525,565 B2 | 4/2009 | Van Geest |
| 7,528,830 B2 | 5/2009 | Redert |
| 7,528,906 B2 | 5/2009 | Robinson et al. |
| 7,532,272 B2 | 5/2009 | Woodgate et al. |
| 7,535,607 B2 | 5/2009 | Schwerdtner et al. |
| D595,333 S | 6/2009 | Markovitz et al. |
| 7,542,206 B2 | 6/2009 | Schuck et al. |
| 7,545,469 B2 | 6/2009 | Robinson et al. |
| 7,548,273 B2 | 6/2009 | Wada et al. |
| D596,659 S | 7/2009 | Kucera et al. |
| 7,570,260 B2 | 8/2009 | Akka et al. |
| 7,573,457 B2 | 8/2009 | Daly |
| D600,738 S | 9/2009 | Su et al. |
| 7,583,437 B2 | 9/2009 | Lipton et al. |
| 7,595,852 B2 | 9/2009 | Shibasaki et al. |
| D603,445 S | 11/2009 | Carlow et al. |
| D613,328 S | 4/2010 | Carlow et al. |
| D616,486 S | 5/2010 | Carlow et al. |
| 7,773,178 B2 | 8/2010 | Nakagawa |
| D624,952 S | 10/2010 | Carlow et al. |
| 2001/0028413 A1 | 10/2001 | Tropper |
| 2001/0038491 A1 | 11/2001 | Fergason |
| 2001/0043266 A1 | 11/2001 | Robinson et al. |
| 2001/0050754 A1 | 12/2001 | Hay et al. |
| 2002/0085151 A1 | 7/2002 | Faris et al. |
| 2002/0105483 A1 | 8/2002 | Yamazaki et al. |
| 2002/0105486 A1 | 8/2002 | Hayashi |
| 2002/0118277 A1 | 8/2002 | Divelbiss et al. |
| 2002/0122585 A1 | 9/2002 | Swift et al. |
| 2002/0171617 A1 | 11/2002 | Fuller |
| 2003/0014212 A1 | 1/2003 | Ralston et al. |
| 2003/0112507 A1 | 6/2003 | Divelbiss et al. |
| 2003/0133569 A1 | 7/2003 | Stern et al. |
| 2003/0199316 A1 | 10/2003 | Miyamoto et al. |
| 2004/0027267 A1 | 2/2004 | Rousso |
| 2004/0056948 A1 | 3/2004 | Gibson |

| | | |
|---|---|---|
| 2004/0125447 A1 | 7/2004 | Sato et al. |
| 2004/0196428 A1 | 10/2004 | Mochizuki et al. |
| 2005/0046941 A1 | 3/2005 | Satoh et al. |
| 2005/0170889 A1 | 8/2005 | Lum et al. |
| 2005/0179782 A1 | 8/2005 | Endo |
| 2005/0207486 A1 | 9/2005 | Lee et al. |
| 2005/0213759 A1 | 9/2005 | Tsuchida |
| 2005/0248722 A1 | 11/2005 | Nelis |
| 2005/0264904 A1 | 12/2005 | Sato et al. |
| 2005/0284845 A1 | 12/2005 | Satoh et al. |
| 2006/0020823 A1 | 1/2006 | Morino |
| 2006/0044508 A1 | 3/2006 | Mochizuki |
| 2006/0055994 A1 | 3/2006 | Schwerdtner |
| 2006/0119539 A1 | 6/2006 | Kato et al. |
| 2006/0139710 A1 | 6/2006 | Schwerdtner |
| 2006/0139711 A1 | 6/2006 | Leister et al. |
| 2006/0203339 A1 | 9/2006 | Kleinberger et al. |
| 2006/0214875 A1 | 9/2006 | Sonehara |
| 2006/0238700 A1 | 10/2006 | Del Vecchio |
| 2006/0238836 A1 | 10/2006 | Schwerdtner |
| 2006/0238837 A1 | 10/2006 | Schwerdtner |
| 2006/0238838 A1 | 10/2006 | Schwerdtner |
| 2006/0238839 A1 | 10/2006 | Schwerdtner |
| 2006/0238840 A1 | 10/2006 | Schwerdtner |
| 2006/0238843 A1 | 10/2006 | Schwerdtner |
| 2006/0238844 A1 | 10/2006 | Schwerdtner |
| 2006/0250671 A1 | 11/2006 | Schwerdtner et al. |
| 2006/0256287 A1 | 11/2006 | Jacobs |
| 2006/0268104 A1 | 11/2006 | Cowan et al. |
| 2006/0268105 A1 | 11/2006 | Jacobs et al. |
| 2006/0279567 A1 | 12/2006 | Schwerdtner et al. |
| 2006/0291049 A1 | 12/2006 | Juenger et al. |
| 2007/0002267 A1 | 1/2007 | Mochizuki |
| 2007/0003709 A1 | 1/2007 | Mochizuki et al. |
| 2007/0033531 A1 | 2/2007 | Marsh |
| 2007/0035492 A1 | 2/2007 | Chang |
| 2007/0035493 A1 | 2/2007 | Chang |
| 2007/0070476 A1 | 3/2007 | Yamada et al. |
| 2007/0109401 A1 | 5/2007 | Lipton et al. |
| 2007/0117485 A1 | 5/2007 | Sakata et al. |
| 2007/0126904 A1 | 6/2007 | Kimura |
| 2007/0133089 A1 | 6/2007 | Lipton et al. |
| 2007/0145245 A1 | 6/2007 | Smith et al. |
| 2007/0177007 A1 | 8/2007 | Lipton et al. |
| 2007/0183033 A1 | 8/2007 | Schwerdtner |
| 2007/0188667 A1 | 8/2007 | Schwerdtner |
| 2007/0206155 A1 | 9/2007 | Lipton |
| 2007/0236560 A1 | 10/2007 | Lipton et al. |
| 2007/0247590 A1 | 10/2007 | Schwerdtner |
| 2007/0257902 A1 | 11/2007 | Satoh et al. |
| 2007/0263003 A1 | 11/2007 | Ko et al. |
| 2007/0268590 A1 | 11/2007 | Schwerdtner |
| 2007/0279541 A1 | 12/2007 | Mochizuki et al. |
| 2007/0285509 A1 | 12/2007 | Lee |
| 2008/0036696 A1 | 2/2008 | Slavenburg et al. |
| 2008/0043209 A1 | 2/2008 | Widdowson et al. |
| 2008/0049100 A1 | 2/2008 | Lipton et al. |
| 2008/0062259 A1 | 3/2008 | Lipton et al. |
| 2008/0062297 A1 | 3/2008 | Sako et al. |
| 2008/0079880 A1 | 4/2008 | Mochizuki et al. |
| 2008/0094528 A1 | 4/2008 | Robinson et al. |
| 2008/0117491 A1 | 5/2008 | Robinson |
| 2008/0122996 A1 | 5/2008 | Mochizuki |
| 2008/0129899 A1 | 6/2008 | Sharp |
| 2008/0136901 A1 | 6/2008 | Schwerdtner |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151112 A1 | 6/2008 | Basile et al. |
| 2008/0151370 A1 | 6/2008 | Cook et al. |
| 2008/0186573 A1 | 8/2008 | Lipton |
| 2008/0186574 A1 | 8/2008 | Robinson et al. |
| 2008/0192152 A1 | 8/2008 | Facius et al. |
| 2008/0198430 A1 | 8/2008 | Schwerdtner et al. |
| 2008/0198431 A1 | 8/2008 | Schwerdtner |
| 2008/0212153 A1 | 9/2008 | Haussler et al. |
| 2008/0226281 A1 | 9/2008 | Lipton |
| 2008/0231767 A1 | 9/2008 | Lee |
| 2008/0231805 A1 | 9/2008 | Schwerdtner |
| 2008/0239067 A1 | 10/2008 | Lipton |
| 2008/0239068 A1 | 10/2008 | Lipton |
| 2008/0246753 A1 | 10/2008 | Amroun et al. |
| 2008/0247042 A1 | 10/2008 | Scwerdtner |
| 2008/0252950 A1 | 10/2008 | Schwerdtner |
| 2008/0278805 A1 | 11/2008 | Schwerdtner |
| 2008/0303895 A1 | 12/2008 | Akka et al. |
| 2008/0303896 A1 | 12/2008 | Lipton et al. |
| 2008/0315442 A1 | 12/2008 | Schwerdtner |
| 2008/0316375 A1 | 12/2008 | Lipton et al. |
| 2009/0015918 A1 | 1/2009 | Morozumi et al. |
| 2009/0027772 A1 | 1/2009 | Robinson |
| 2009/0040402 A1 | 2/2009 | Tomita et al. |
| 2009/0046348 A1 | 2/2009 | Sahm et al. |
| 2009/0051759 A1 | 2/2009 | Adkins et al. |
| 2009/0066863 A1 | 3/2009 | Chen |
| 2009/0079747 A1 | 3/2009 | Johnson et al. |
| 2009/0085928 A1 | 4/2009 | Riach et al. |
| 2009/0086296 A1 | 4/2009 | Renaud-Goud |
| 2009/0097117 A1 | 4/2009 | Coleman |
| 2009/0109281 A1 | 4/2009 | Mashitani et al. |
| 2009/0109282 A1 | 4/2009 | Schnebly et al. |
| 2009/0109395 A1 | 4/2009 | Fuziak, Jr. |
| 2009/0128780 A1 | 5/2009 | Schuck et al. |
| 2009/0158220 A1 | 6/2009 | Zalewski et al. |
| 2009/0160757 A1 | 6/2009 | Robinson |
| 2009/0190210 A1 | 7/2009 | Coleman et al. |
| 2009/0215475 A1 | 8/2009 | Sangberg |
| 2009/0219595 A1 | 9/2009 | Olaya et al. |
| 2009/0225380 A1 | 9/2009 | Schwerdtner et al. |
| 2009/0225381 A1 | 9/2009 | Olaya et al. |
| 2009/0251531 A1 | 10/2009 | Marshall et al. |
| 2009/0290450 A1 | 11/2009 | Rioux et al. |
| 2010/0066976 A1 | 3/2010 | Richards et al. |
| 2010/0086285 A1 | 4/2010 | Sasaki et al. |
| 2010/0117592 A1 | 5/2010 | Lim et al. |
| 2010/0149320 A1 | 6/2010 | MacNaughton et al. |
| 2010/0149636 A1 | 6/2010 | MacNaughton et al. |
| 2010/0157028 A1 | 6/2010 | MacNaughton et al. |
| 2010/0157029 A1 | 6/2010 | MacNaughton et al. |
| 2010/0157031 A1 | 6/2010 | MacNaughton et al. |
| 2010/0157178 A1 | 6/2010 | MacNaughton et al. |
| 2010/0177172 A1 | 7/2010 | Ko et al. |
| 2010/0177174 A1 | 7/2010 | Ko et al. |
| 2010/0177254 A1 | 7/2010 | MacNaughton et al. |
| 2010/0182407 A1 | 7/2010 | Ko et al. |
| 2010/0191087 A1 | 7/2010 | Talbot et al. |
| 2010/0194857 A1 | 8/2010 | Mentz et al. |
| 2010/0201788 A1 | 8/2010 | Ho et al. |
| 2010/0225751 A1 | 9/2010 | Nemeth |
| 2010/0245693 A1 | 9/2010 | MacNaughton et al. |
| 2010/0277485 A1 | 11/2010 | Zalewski |
| 2010/0309535 A1 | 12/2010 | Landowski et al. |
| 2011/0001808 A1 | 1/2011 | Mentz et al. |
| 2011/0012896 A1 | 1/2011 | Ji |
| 2011/0122238 A1 | 5/2011 | Hulvey et al. |
| 2011/0134231 A1 | 6/2011 | Hulvey et al. |

FOREIGN PATENT DOCUMENTS

| | | |
|---|---|---|
| CA | 2 646 439 A1 | 11/2007 |
| CA | 2684513 | 5/2010 |
| CN | 200930311475.2 | 8/2009 |
| CN | 200930320008.6 | 10/2009 |
| CN | 201030112066.2 | 2/2010 |
| CN | 201030112074.7 | 2/2010 |
| CN | 201030112081.7 | 2/2010 |
| CN | 201030156835.9 | 5/2010 |
| CN | 301263913 | 6/2010 |
| CN | 201030261366.7 | 8/2010 |
| CN | 101825772 | 9/2010 |
| DE | 102006011773 | 9/2007 |
| EM | 001610635-0001 | 4/2009 |
| EM | 1123913 | 7/2009 |
| EM | 1573312 | 7/2009 |
| EM | 001573312 | 9/2009 |
| EM | 00635335.0001 | 2/2010 |
| EM | 001635418-0001 | 2/2010 |
| EM | 001635418-0002 | 2/2010 |
| EM | 001624552-0001 | 3/2010 |

| | | |
|---|---|---|
| EM | 001624552-0002 | 3/2010 |
| EM | 001728015-0001 | 8/2010 |
| EM | 001728015-0002 | 8/2010 |
| EP | 0 730 371 A2 | 9/1996 |
| EP | 1761075 A2 | 3/2007 |
| EP | 2056155 A2 | 5/2009 |
| EP | 2315449 A2 | 4/2011 |
| EP | 2323686 A1 | 5/2011 |
| FR | 2684770 A1 | 5/1991 |
| FR | 2 814 965 A1 | 4/2002 |
| FR | 2938664 | 5/2010 |
| JP | 9005674 | 1/1997 |
| JP | 09329771 | 12/1997 |
| JP | 11098538 A | 4/1999 |
| JP | 1374986 | 10/2009 |
| JP | 1375009 | 10/2009 |
| JP | 1388190 | 5/2010 |
| JP | 1388191 | 5/2010 |
| JP | 1388720 | 5/2010 |
| JP | 2010124466 | 6/2010 |
| JP | 1391842 | 7/2010 |
| JP | 1390943 | 8/2010 |
| RU | 74845 | 5/2010 |
| RU | 75314 | 6/2010 |
| RU | 2413266 C1 | 2/2011 |
| WO | 9743681 | 11/1997 |
| WO | 9743681 A1 | 11/1997 |
| WO | 9852091 | 11/1998 |
| WO | 00/01456 A1 | 1/2000 |
| WO | 03/003750 A1 | 1/2003 |
| WO | 03003750 A1 | 1/2003 |
| WO | 2007067493 A2 | 6/2007 |
| WO | 2007104533 | 9/2007 |
| WO | 2007/117485 A2 | 10/2007 |
| WO | 2007126904 A1 | 11/2007 |
| WO | 2008/079796 A2 | 7/2008 |
| WO | 2008079796 | 7/2008 |
| WO | 2010/144478 A2 | 12/2010 |

OTHER PUBLICATIONS

French Search Report from related FR Appl. No. 1056811, dated Oct. 18, 2011.
French Search Report from related FR Appl. No. 0958073, dated Oct. 14, 2011.
Nienhuys et al., "DC-to-DC converter", Wikipedia (Nov. 13, 2008), http:/en.wikipedia.org/w/index.php?title=DC-to-DC_converter%oldid=251525008, retrieved on Jul. 4, 2011.
Chan, "Everything you need to know about Nvidia's 3D Goggle Gamble", http:/3dcinecast.blogspot.com/2008/09/everything-you-need-to-know-about.html, retreived Jul. 1, 2011.
French Search Report from related FR Appl. No. 1056813, dated Oct. 18, 2011.
French Search Report from related FR Appl. No. 1056814, dated Oct. 21, 2011.
Search Report from related EP Appl. No. 10184340.7, dated Jul. 5, 2011.
Statements made during deposition of Boyd MacNaughton on Aug. 23, 2011.
Statements made during deposition of David Allen on Aug. 26, 2011.
Statements made during deposition of Rodney Kimmell on Sep. 1, 2011.
Defendants' Notice of Motion for Summary Judgment or, in the Alternative, Partial Summary Judgment; Civil Action No. CV-10-02327; *X6D Limited et al. v. Li-Tek Corporation Company, et al*; United States District Court, Central District of California, Western Division.
Deposition of Boyd MacNaughton dated Aug. 23, 2011 (294 pages).
Deposition of David W. Allen dated Aug. 26, 2011 (290 pages).
Deposition of Rodney Kimmell dated Sep. 1, 2011 (323 pages).
Deposition of Rodney Kimmell dated Sep. 29, 2011 (234 pages).
Corrections to Deposition of David W. Allen dated Oct. 4, 2011 (3 pages).
International Search Report and Written Opinion dated May 26, 2012 issued in International Application No. PCT/US2011/059080 filed Nov. 3, 2011 (13 pages).
Correspondence dated Mar. 16, 2011 from S. Dang to M. Fowler re Plaintiffs' Identification of Trade Secrets.
Plaintiffs' First Set of Interrogatories to Defendants Li-Tek Corporation Company; and Dongguan Li Wang Electronics and Plastics Co., Ltd.
Plaintiffs' First Set of Requests for Production of Documents (Nos. 1-91) to Defendants Li-Tek Corporation Company; and Dongguan Li Wang Electronics and Plastics Co., Ltd.
Objections and Responses to Plaintiffs' First Set of Interrogatories to Defendants Li-Tek Corporation Company; and Dongguan Li Wang Electronics and Plastics Co., Ltd.
Objections and Responses to Plaintiffs' First Set of Requests for Production of Documents to Defendants Li-Tek Corporation Company; and Dongguan Li Wang Electronics and Plastics Co., Ltd.
Responses and Objections of the GDC Defendants and Counterclaimants to X6D's First Set of Interrogatories.
GDC Defendants and Counterclaimants' Responses and Objections to X6D's First Set of Requests for Production of Documents.
Defendants Li-Tek Corporation and Dongguan Li Wang Electronics and Plastics Co. Ltd's Initial Disclosures Pursuant to Federal rule of Procedure 26(a)(1).
Case No. CV10 2327 GHK PJWx—Original Complaint for Damages and Injunctive Relief, and Demand for Jury Trial, Mar. 30, 2010.
Case No. CV10 2327 GHK PJWx—First Amended Complaint for Damages and Injunctive Relief, and Demand for Jury Trial, Jul. 8, 2010.
Case No. CV10 2327 GHK PJWx—Answer to First Amended Complaint and Counterclaims, Nov. 24, 2010.
Case No. CV10 2327 GHK PJWx—Defendants Li-Tek Corporation and Dongguan Li Wang Electronics and Plastics Co. Ltd's Answer, Affirmative Defenses and Counterclaims to Plaintiff's First Amended Petition, Dec. 23, 2010.
Case No. CV10 2327 GHK PJWx—Answer, Affirmative Defenses and Counterclaims of Defendants and Counterclaimants Li-Tek Corporation Company and Dongguan Li Wang Electronics and Plastics Co. Ltd to First Amended Complaint, Jan. 3, 2011.
Case No. CV10 2327 GHK PJWx—First Amended Answer and Counterclaims to First Amended Complaint, Jan. 7, 2011.
Case No. CV10 2327 GHK PJWx—Second Amended Answer and Counterclaims to First Amended Complaint, Jan. 13, 2011.
Case No. CV10 2327 GHK PJWx—Plaintiff's Answer to GDC Defendant's Second Amended Answer and Counterclaims to First Amended Complaint, Jan. 20, 2011.
Petition to Make Special Under 37 CFR 1.102(d) on the Basis of Actual Infringement, Filed Mar. 26, 2010.
Turkish Search Report, dated Sep. 14, 2012, issued in Application No. 2011/04994 filed May 23, 2011 (3 pages).
Summary of Chinese References Cited (CN200930311475, CN200930320008, CN201030112066, CN201030112074, CN201030112081, CN201030156835 and CN201030261366).
3D-Tech, All Advanced Optics: Prices as of Mar. 28, 2011 (International Sales Office, 3D-Tech Headquarters, Big Sky Industries, Roney International, Inc., GoldenDuck Group, DCS Benelux and Moscow Cinema Production Workshop).
3D-Tech, All Advanced Optics: The Latest technology in Building Active 3D-Glasses; at least as early as Apr. 11, 2011.
AG 100 Schematic; Jan. 27, 2006.
Global Services Product Alert; Jun. 16, 2011.
Case No. CV102327 GHK PJWx—GDC Defendants and Counterclaimants' Supplemental Responses and Objections to X6D's First Set of Interrogatories; Apr. 19, 2011.
Case No. CV102327 GHK PJWx—Answer, Affirmative Defenses, and Counterclaims of Defendants and Counterclaimants Li-Tek Corp and Dongguan Li Wang Electronics and Plastics Co. Ltd. to Plaintiff's Second Amended Complaint; Apr. 25, 2011.
Case No. CV102327 GHK PJWx—GDC Defendants and Counterclaimants Answer and Counterclaims to Second Amended Complaint; Apr. 25, 2011.
Case No. CV102327 GHK PJWx—Plaintiff's Objections and Responses to GDC Technology (USA) LLC's First Requests for Production of Documents and Things; Mar. 30, 2011.

Case No. CV102327 GHK PJWx—Plaintiff's Amended Objections and Answers to Li-Tek Corp. Company's First Set of Interrogatories; Apr. 12, 2011.
Case No. CV102327 GHK PJWx—Plaintiff's Supplemental Objections and Answers to GDC Technology Ltd.'s Interrogatory No. 5; Jun. 3, 2011.
Case No. CV102327 GHK PJWx—Plaintiff's Supplemental Objections and Answers to GDC Technology Ltd.'s Interrogatory No. 4; Jun. 3, 2011.
VOYAD 3D Product List for Home Use; Apr. 2011.
VOYAD Cinematic 3D Glasses Product List; Apr. 2011.
www.future3dcinema.com; Jun. 16, 2011.
www.hishock.com; Jun. 16, 2011.
www.li-tek.com; Jun. 16, 2011.
www.madeinchina.com; Jun. 16, 2011.
www.sk13glasses.com; Jun. 16, 2011.
www.voyad.en.alibaba.com; Jun. 16, 2011.
XpanD 3D Cinema System—The Definitive Guide; 3D Cinema Glasses AGX101 User Instructions; XpanD 3D Cinema IR Emitter System; General Health and Safety Warning, Updated Dec. 2010.
XpanD 3D Universal 3D Glasses; Quick-Install User Guide; Sep. 30, 2010.
International Search Report and Written Opinion dated Aug. 29, 2012, issued in International Application No. PCT/US12/44298 filed Jun. 27, 2012 (6 pages).
Extended European Search Report dated Sep. 12, 2012, issued in EP Application No. 11172351.6 filed Jul. 1, 2011 (8 pages).
Extended European Search Report dated Nov. 22, 2012, issued in EP Application No. 10188205.8 filed Oct. 20, 2010 (10 pages).
Supplementary European Search Report dated Oct. 19, 2012 issued in EP Application No. 04799317 filed Nov. 3, 2004 (4 pages).
International Search Report and Written Opinion dated Dec. 4, 2012 issued in International Application No. PCT/US12/57260 filed Sep. 26, 2012 (9 pages).
Bos, P. and Haven, T., Field-Sequential Stereoscopic Viewing Systems Using Passive Glasses, Tektronix, Inc., Beaverton, OR, 1989, pp. 39-43, vol. 30/1.
USPTO Office Communication dated Dec. 19, 2006 re U.S. Appl. No. 10/252,215, filed Sep. 23, 2002.
Li-Tek Schematic: for "3D cinema systems", copyright registration dated Jul. 8, 2011 (VA1-784-087).
Li-Tek Schematic: for "3D cinema systems", copyright registration dated Jul. 8, 2011 (VA1-784-089).
Li-Tek Schematic: for "3D cinema systems", copyright registration dated Jul. 8, 2011 (VA1-784-082).
Li-Tek Schematic: for "3D cinema systems", copyright registration dated Jul. 8, 2011 (VA1-784-088).
Li-Tek Schematic: for "3D TV Glass", copyright registration dated Jul. 8, 2011 (VA1-784-081).
Li-Tek Schematic: for "3D TV Glass", copyright registration dated Jul. 8, 2011 (VA1-784-086).
Li-Tek Schematic: for "3D TV System", copyright registration dated Jul. 8, 2011 (VA1-784-083).
Li-Tek Schematic: for "3D TV System", copyright registration dated Jul. 8, 2011 (VA1-784-091).
Li-Tek Schematic: for "3D TV System", copyright registration dated Jul. 8, 2011 (VA1-784-103).
Li-Tek Schematic: for "3D cinema systems", copyright registration dated Apr. 20, 2011 (VA1-784-195).
Li-Tek Schematic: for "3D DT_Main", copyright registration dated Apr. 20, 2011 (VA1-784-186).
Bill of Materials for Emitter ECB, which is submitted only as evidence of the nature of a product first sold on or about Feb. 2006.
Bill of Materials for Microcontrol Unit ECB, which is submitted only as evidence of the nature of a product first sold on or about Jan. 2005.
Bill of Materials for IR Amplifier ECB, which is submitted only as evidence of the nature of a product first sold on or about Jan. 2005.
Schematic: 60GX-T1 Emitter Module IR Emitter, which is submitted only as evidence of the nature of a product first sold on or about Mar. 1998.
Schematic: 60GX-C1 IR Glasses Amplifier Board, which is submitted only as evidence of the nature of a product first sold on or about Jul. 1998.
Schematic: 60GX-C1 IR Glasses CPU Board, which is submitted only as evidence of the nature of a product first sold on or about Apr. 2000.
Schematic: 61_62_60GX-T50, which is submitted only as evidence of the nature of a product first sold on or about Feb. 2008.
Correspondence from S. Dang to M. Fowler re Plaintiffs' Identification of Trade Secrets, which is submitted as evidence of allegations of opposing counsel on or around May 11, 2011.
Schematic: AP388pcb Prototype, which is submitted only as evidence of the nature of a product prototype on or about Aug. 31, 2005.
Schematic: Li-Tek 07874—3D Cinema Systems, which was registered with the copyright office on Apr. 20, 2011.
Schematic: Li-Tek 07875—3D DT Main, which was registered with the copyright office on Apr. 20, 2011.
Schematic: XpanD 3D Cinema Sync Distribution Module, which is submitted only as evidence of the nature of a product prototype created on or about Feb. 6, 2009.
Defendant Li-Tek Corporation Company's First Set of Interrogatories to Plaintiffs X6D Limited, X6D USA Inc., and XPand, Inc.
Defendant Li-Tek Corporation Company's First Set of Requests for Production of Documents and Things to Plaintiffs X6D Limited, X6D USA Inc., and XPand, Inc.
GDC Technology Limited's First Set of Interrogatories to X6D.
GDC Technology USA LLC's First Set of Interrogatories to X6D.
GDC Technology (USA) LLC's First Set of Requests for Prodcution of Documents and Things to X6D.
Initial Disclosures of the GDC Defendants and Counerclaimants Pursuant to Rule 26 of the Federal Rules of Civil Procedure.
Plaintiffs' First Set of Interrogatories to the GDC Defendants.
Plaintiffs' First Set of Requests for Production of Documents (Nos. 1-80) to the GDC Defendants.
Plaintiffs' Initial Disclosures Pursuant to Fed. R. Civ. P. 26(a)(1).
Turkish Search Report issued in Application No. 2011/02852 filed Mar. 25, 2011 (2 pages).
Turkish Search Report issued in Application No. 2011/00989 filed Feb. 2, 2011 (3 pages).
European Search Report, dated Nov. 14, 2012, issued in EP Application No. 10188205.8 filed Oct. 20, 2010, (3 pages).
European Search Report, dated Nov. 16, 2012, issued in EP Application No. 10191150.1 filed Nov. 15, 2010, (3 pages).

* cited by examiner

WARM UP MODE

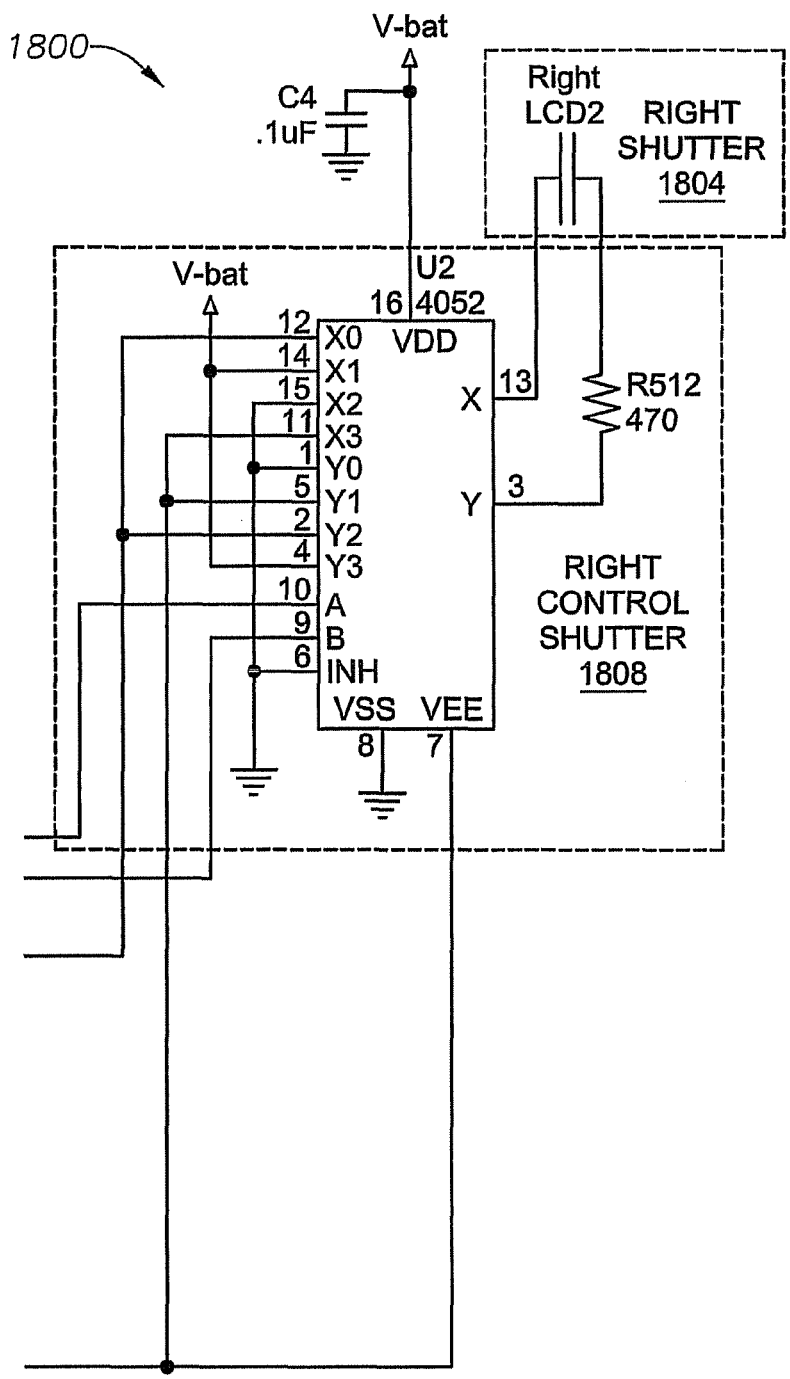
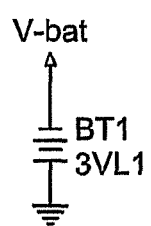
Fig. 18d

Fig. 24 Warm Up Mode

Fig. 36 Signals for New Expand Glasses (Warmup Mode)

Fig. 41  Signals for New Expand Glasses

6000

```
┌─────────────────────────────────┐
│      3D SHUTTER GLASSES         │
│            6004                 │
└─────────────────────────────────┘
```

```
┌───────────────────────────────────────┐
│ ┌───────────────────────────────────┐ │
│ │     LIQUID CRYSTAL DISPLAY        │ │
│ │             6002a                 │ │
│ └───────────────────────────────────┘ │
│ ┌───────────────────────────────────┐ │
│ │ BACK LIGHT FOR LIQUID CRYSTAL DISPLAY │
│ │             6002b                 │ │
│ └───────────────────────────────────┘ │
│                                       │
│           DISPLAY DEVICE              │
│               6002                    │
└───────────────────────────────────────┘
```

Fig. 60

3D SHUTTER GLASSES FOR USE WITH LCD DISPLAYS

CROSS-REFERENCE TO RELATED APPLICATIONS

This application claims priority to U.S. Provisional Patent Application Ser. No. 61/310,556, filed Mar. 4, 2010, the disclosure of which is incorporated herein by reference.

This application is a continuation in part of U.S. utility patent application Ser. No. 13/038,944, filed Mar. 2, 2011, and claims the benefit of the filing dates of U.S. provisional patent application No. 61/309,611, filed Mar. 2, 2010, the disclosures of which are all incorporated herein by reference.

This application is a continuation in part of U.S. utility patent application Ser. No. 12/619,518, filed Nov. 16, 2009, and claims the benefit of the filing dates of U.S. provisional patent application No. 61/179,248, filed May 18, 2009, and U.S. provisional patent application No. 61/115,477, filed Nov. 17, 2008, the disclosures of which are all incorporated herein by reference.

This application is a continuation in part of U.S. utility patent application Ser. No. 12/619,517, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 12/619,309, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 12/619,415, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 12/619,400, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 12/619,431, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 12/619,163, filed on Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 12/619,456, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, he disclosures of which are incorporated herein by reference.

This application is a continuation in part of Ser. No. 12/619,102, filed Nov. 16, 2009, which claims the benefit of the filing date of U.S. provisional patent application No. 61/115,477, filed Nov. 17, 2008, and the filing date of U.S. provisional patent application No. 61/179,248, filed May 18, 2009, the disclosures of which are incorporated herein by reference.

This application is a continuation in part of U.S. utility patent application Ser. No. 13/019,896, filed Feb. 2, 2011, which claims the benefit of the filing date of U.S. provisional patent application No. 61/285,071, filed Dec. 9, 2009, incorporated herein by reference.

This application is a continuation in part of U.S. utility patent application Ser. No. 12/748,185, filed Mar. 26, 2010, and U.S. utility patent application Ser. No. 12/880,920, filed Sep. 13, 2010, which claims the benefit of the filing date of U.S. utility patent application Ser. No. 12/619,518, filed Nov. 16, 2009, and claims the benefit of the filing dates of U.S. provisional patent application No. 61/179,248, filed May 18, 2009, and U.S. provisional patent application No. 61/115,477, filed Nov. 17, 2008, the disclosures of which are all incorporated herein by reference.

This application is a continuation in part of U.S. utility patent application Ser. No. 12/908,430, filed Oct. 20, 2010, which claims the benefit of the filing date of U.S. provisional patent application No. 61/253,150, filed Oct. 20, 2009, the disclosures of which are incorporated herein by reference.

This application is a continuation in part of U.S. utility patent application Ser. No. 12/908,371, filed on Oct. 20, 2010, now abandoned, which claims the benefit of the filing date of U.S. provisional patent application No. 61/253,140, filed Oct. 20, 2009, the disclosures of which are incorporated herein by reference.

This application is a continuation in part of U.S. utility patent application Ser. No. 12/947,619, filed Nov. 16, 2010, which claims the benefit of the filing date of U.S. provisional patent application No. 61/261,663, filed Nov. 16, 2009, the disclosures of which are incorporated herein by reference.

This application is a continuation in part of U.S. utility patent application Ser. No. 12/963,812, filed Dec. 9, 2010, which claims the benefit of the filing date of U.S. provisional patent application No. 61/285,048, filed on Dec. 9, 2009, the disclosures of which are incorporated herein by reference.

This application is a continuation in part of U.S. utility patent application Ser. No. 12/963,373, filed on Dec. 8, 2010, which claims the benefit of the filing date of U.S. provisional patent application No. 61/285,071, filed on Dec. 9, 2009, the disclosures of which are incorporated herein by reference.

BACKGROUND

This disclosure relates to image processing systems for the presentation of a video image that appears three dimensional to the viewer.

BRIEF DESCRIPTION OF THE DRAWINGS

FIGS. 18, 18a, 18b, 18c and 18d is a schematic illustration of an exemplary embodiment of 3D glasses.

FIG. 60 is a schematic illustration of an exemplary system for viewing 3D images.

DETAILED DESCRIPTION

Figure 1:
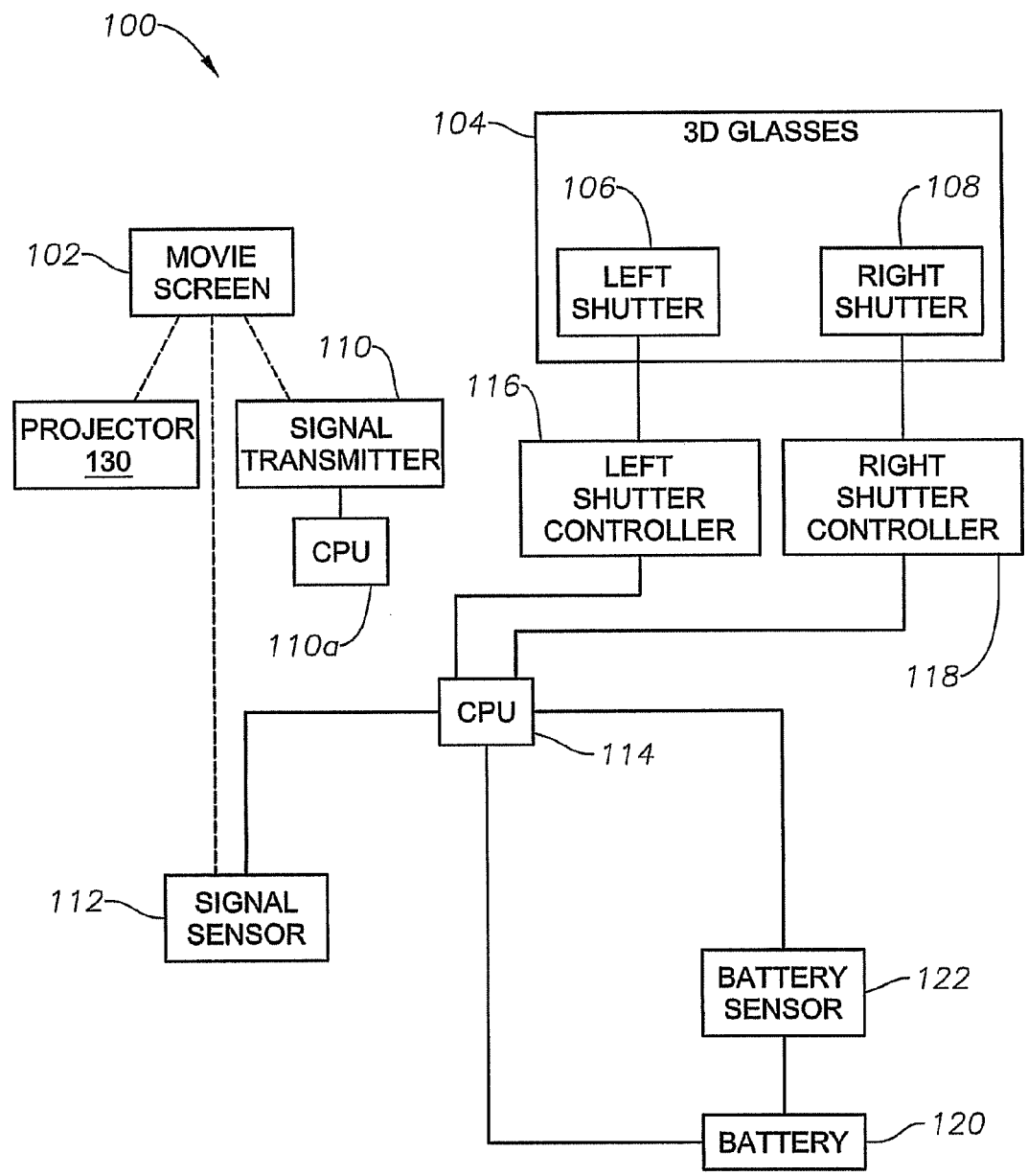
FIG. 1 is an illustration of an exemplary embodiment of a system for providing three dimensional images.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, a system 100 for viewing a three dimensional ("3D") movie on a movie screen 102 includes a pair of 3D glasses 104 having a left shutter 106 and a right shutter 108. In an exemplary embodiment, the 3D glasses 104 include a frame and the shutters, 106 and 108, are provided as left and right viewing lenses mounted and supported within the frame.

In an exemplary embodiment, the shutters, 106 and 108, are liquid crystal cells that open when the cell goes from opaque to clear, and the cell closes when the cell goes from clear back to opaque. Clear, in this case, is defined as transmitting enough light for a user of the 3D glasses 104 to see an image projected on the movie screen 102. In an exemplary embodiment, the user of the 3D glasses 104 may be able to see the image projected on the movie screen 102 when the liquid crystal cells of the shutters, 106 and/or 108, of the 3D glasses 104 become 25-30 percent transmissive. Thus, the liquid crystal cells of a shutter, 106 and/or 108, is considered to be open when the liquid crystal cell becomes 25-30 percent transmissive. The liquid crystal cells of a shutter, 106 and/or 108, may also transmit more than 25-30 percent of light when the liquid crystal cell is open.

In an exemplary embodiment, the shutters, 106 and 108, of the 3D glasses 104 include liquid crystal cells having a PI-cell configuration utilizing a low viscosity, high index of refraction liquid crystal material such as, for example, Merck MLC6080. In an exemplary embodiment, the PI-cell thickness is adjusted so that in its relaxed state it forms a ½-wave retarder. In an exemplary embodiment, the PI-cell is made thicker so that the ½-wave state is achieved at less than full relaxation. One of the suitable liquid crystal materials is MLC6080 made by Merck, but any liquid crystal with a sufficiently high optical anisotropy, low rotational viscosity and/or birefringence may be used. The shutters, 106 and 108, of the 3D glasses 104 may also use a small cell gap, including, for example, a gap of 4 microns. Furthermore, a liquid crystal with a sufficiently high index of refraction and low viscosity may also be suitable for use in the shutters, 106 and 108, of the 3D glasses 104.

In an exemplary embodiment, the Pi-cells of the shutters, 106 and 108, of the 3D glasses 104 work on an electrically controlled birefringence ("ECB") principle. Birefringence means that the Pi-cell has different refractive indices, when no voltage or a small catching voltage is applied, for light with polarization parallel to the long dimension of the Pi-cell molecules and for light with polarization perpendicular to long dimension, no and ne. The difference no−ne=Δn is optical anisotropy. Δn×d, where d is thickness of the cell, is optical thickness. When Δn×d=½λ the Pi-cell is acting as a ½ wave retarder when cell is placed at 45° to the axis of the polarizer. So optical thickness is important not just thickness. In an exemplary embodiment, the Pi-cells of the shutters, 106 and 108, of the 3D glasses 104 are made optically too thick, meaning that Δn×d>½λ. The higher optical anisotropy means thinner cell—faster cell relaxation. In an exemplary embodiment, when voltage is applied the molecules' of the Pi-cells of the shutters, 106 and 108, of the 3D glasses 104 long axes are perpendicular to substrates—homeotropic alignment, so there is no birefringence in that state, and, because the polarizers have transmitting axes crossed, no light is transmitted. In an exemplary embodiment, Pi-cells with polarizers crossed are said to work in normally white mode and transmit light when no voltage is applied. Pi-cells with polarizers' transmitting axes oriented parallel to each other work in a normally black mode, i.e., they transmit light when a voltage is applied.

In an exemplary embodiment, when high voltage is removed from the Pi-cells, the opening of the shutters, 106 and/or 108, start. This is a relaxation process, meaning that liquid crystal ("LC") molecules in the Pi-cell go back to the equilibrium state, i.e. molecules align with the alignment layer, i.e. the rubbing direction of the substrates. The Pi-cell's relaxation time depends on the cell thickness and rotational viscosity of the fluid.

In general, the thinner the Pi-cell, the faster the relaxation. In an exemplary embodiment, the important parameter is not the Pi-cell gap, d, itself, but rather the product Δnd, where Δn is the birefringence of the LC fluid. In an exemplary embodiment, in order to provide the maximum light transmission in its open state, the head-on optical retardation of the Pi-cell, Δnd, should be λ/2. Higher birefringence allows for thinner cell and so faster cell relaxation. In order to provide the fastest possible switching fluids with low rotational viscosity and higher birefringence—Δn (such as MLC 6080 by EM industries) are used.

In an exemplary embodiment, in addition to using switching fluids with low rotational viscosity and higher birefringence in the Pi-cells, to achieve faster switching from opaque to clear state, the Pi-cells are made optically too thick so that the ½-wave state is achieved at less than full relaxation. Normally, the Pi-cell thickness is adjusted so that in its relaxed state it forms a ½-wave retarder. However, making the Pi-cells optically too thick so that the ½-wave state is achieved at less than full relaxation results in faster switching from opaque to clear state. In this manner, the shutters 106 and 108 of the exemplary embodiments provide enhanced speed in opening versus prior art LC shutter devices that, in an exemplary experimental embodiment, provided unexpected results.

In an exemplary embodiment, a catch voltage may then be used to stop the rotation of the LC molecules in the Pi-cell before they rotate too far. By stopping the rotation of the LC molecules in the Pi-cell in this manner, the light transmission is held at or near its peak value.

In an exemplary embodiment, the system 100 further includes a signal transmitter 110, having a central processing unit ("CPU") 110a, that transmits a signal toward the movie screen 102. In an exemplary embodiment, the transmitted signal is reflected off of the movie screen 102 towards a signal sensor 112. The transmitted signal could be, for example, one or more of an infrared ("IR") signal, a visible light signal, multiple colored signal, or white light. In some embodiments, the transmitted signal is transmitted directly toward the signal sensor 112 and thus, may not reflect off of the movie screen 102. In some embodiments, the transmitted signal could be, for example, a radio frequency ("RF") signal that is not reflected off of the movie screen 102.

The signal sensor 112 is operably coupled to a CPU 114. In an exemplary embodiment, the signal sensor 112 detects the transmitted signal and communicates the presence of the signal to the CPU 114. The CPU 110a and the CPU 114 may, for example, each include a general purpose programmable controller, an application specific intergrated circuit ("ASIC"), an analog controller, a localized controller, a distributed controller, a programmable state controller, and/or one or more combinations of the aforementioned devices.

The CPU 114 is operably coupled to a left shutter controller 116 and a right shutter controller 118 for monitoring and controlling the operation of the shutter controllers. In an exemplary embodiment, the left and right shutter controllers, 116 and 118, are in turn operably coupled to the left and right shutters, 106 and 108, of the 3D glasses 104 for monitoring and controlling the operation of the left and right shutters. The shutter controllers, 116 and 118, may, for example, include a general purpose programmable controller, an ASIC, an analog controller, an analog or digital switch, a localized controller, a distributed controller, a programmable state controller, and/or one or more combinations of the aforementioned devices.

A battery 120 is operably coupled to at least the CPU 114 and provides power for operating one or more of the CPU, the signal sensor 112, and the shutter controllers, 116 and 118, of the 3D glasses 104. A battery sensor 122 is operably coupled to the CPU 114 and the batter 120 for monitoring the amount of power remaining in the battery.

In an exemplary embodiment, the CPU 114 may monitor and/or control the operation of one or more of the signal sensor 112, the shutter controllers, 116 and 118, and the battery sensor 122. Alternatively, or in addition, one or more of the signal sensor 112, the shutter controllers, 116 and 118, and the battery sensor 122 may include a separate dedicated controller and/or a plurality of controllers, which may or may not also monitor and/or control one or more of signal sensor 112, the shutter controllers, 116 and 118, and the battery sensor 122. Alternatively, or in addition, the operation of the CPU 114 may at least be partially distributed among one or more of the other elements of the 3D glasses 104.

In an exemplary embodiment, the signal sensor 112, the CPU 114, the shutter controllers, 116 and 118, the battery 120, and the battery sensor 122 are mounted and supported within the frame of the 3D glasses 104. If the movie screen 102 is positioned within a movie theater, then a projector 130 may be provided for projecting one or more video images on the movie screen. In an exemplary embodiment, the signal transmitter 110 may be positioned proximate, or be included within, the projector 130. In an exemplary embodiment, the projector 130 may include, for example, one or more of an electronic projector device, an electromechanical projector device, a film projector, a digital video projector, or a computer display for displaying one or more video images on the movie screen 102. Alternatively, or in addition to the movie screen 102, a television ("TV") or other video display device may also be used such as, for example, a flat screen TV, a plasma TV, an LCD TV, or other display device for displaying images for viewing by a user of the 3D glasses that may, for example, include the signal transmitter 110, or an additional signal transmitter for signaling to the 3D glasses 104, that may be positioned proximate and/or within the display surface of the display device.

In an exemplary embodiment, during operation of the system 100, the CPU 114 controls the operation of the shutters, 106 and 108, of the 3D glasses 104 as a function of the signals received by the signal sensor 112 from the signal transmitter 110 and/or as a function of signals received by the CPU from the battery sensor 122. In an exemplary embodiment, the CPU 114 may direct the left shutter controller 116 to open the left shutter 106 and/or direct the right shutter controller 118 to open the right shutter 108.

In an exemplary embodiment, the shutter controllers, 116 and 118, control the operation of the shutters, 106 and 108, respectively, by applying a voltage across the liquid crystal cells of the shutter. In an exemplary embodiment, the voltage applied across the liquid crystal cells of the shutters, 106 and 108, alternates between negative and positive. In an exemplary embodiment, the liquid crystal cells of the shutters, 106 and 108, open and close the same way regardless of whether the applied voltage is positive or negative. Alternating the applied voltage prevents the material of the liquid crystal cells of the shutters, 106 and 108, from plating out on the surfaces of the cells.

Figure 2:
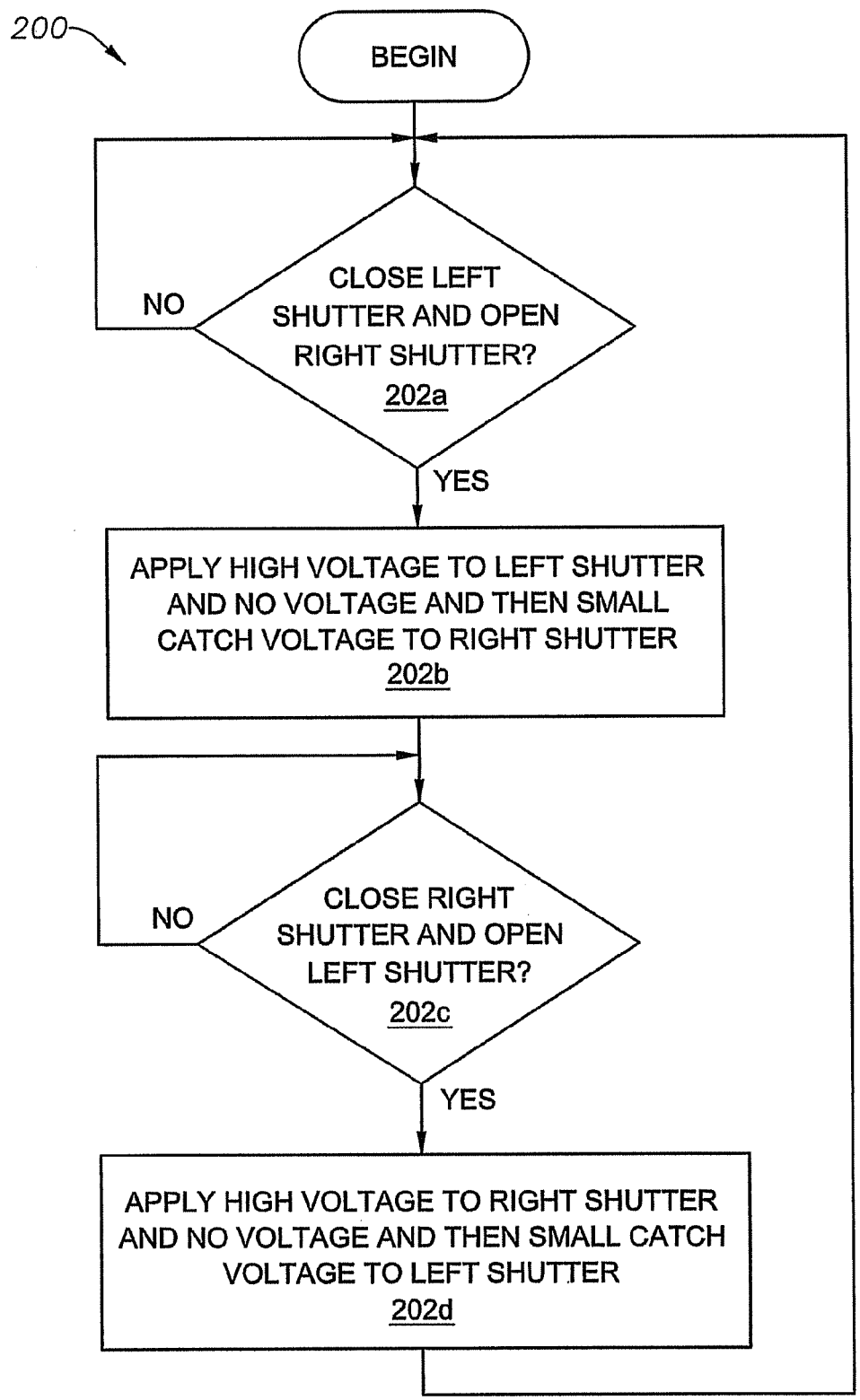
FIG. 2 is a flow chart of an exemplary embodiment of a method for operating the system of FIG. 1.
Figure 3:
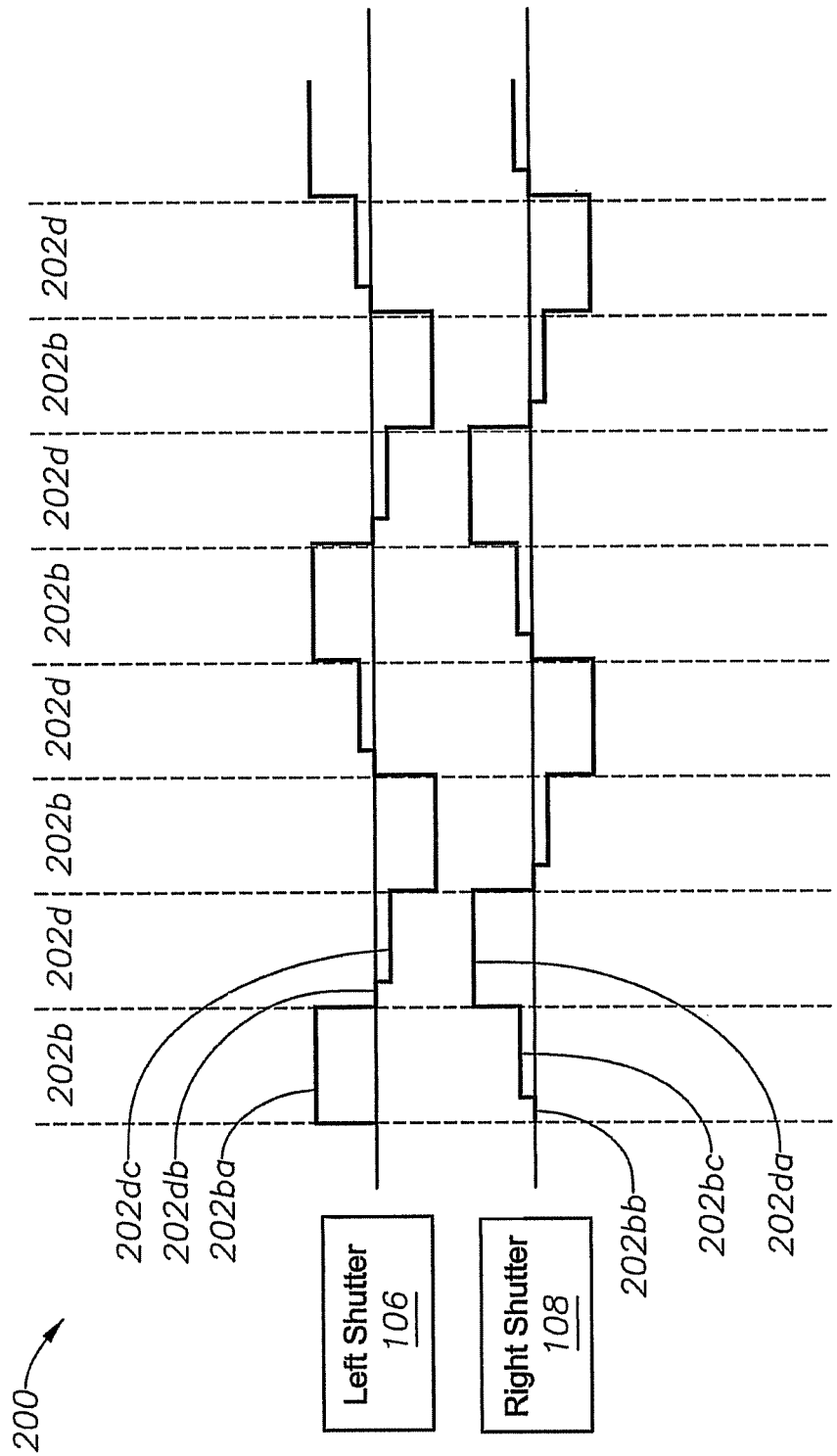
FIG. 3 is a graphical illustration of the operation of the method of FIG. 2.

In an exemplary embodiment, during operation of the system 100, as illustrated in FIGS. 2 and 3, the system may implement a left-right shutter method 200 in which, if in 202a, the left shutter 106 will be closed and the right shutter 108 will be opened, then in 202b, a high voltage 202ba is applied to the left shutter 106 and no voltage 202bb followed by a small catch voltage 202bc are applied to the right shutter 108 by the shutter controllers, 116 and 118, respectively. In an exemplary embodiment, applying the high voltage 202ba to the left shutter 106 closes the left shutter, and applying no voltage to the right shutter 108 starts opening the right shutter. In an exemplary embodiment, the subsequent application of the small catch voltage 202bc to the right shutter 108 prevents the liquid crystals in the right shutter from rotating too far during the opening of the right shutter 108. As a result, in 202b, the left shutter 106 is closed and the right shutter 108 is opened.

If in 202c, the left shutter 106 will be opened and the right shutter 108 will be closed, then in 202d, a high voltage 202da is applied to the right shutter 108 and no voltage 202db followed by a small catch voltage 202dc are applied to the left shutter 106 by the shutter controllers, 118 and 116, respectively. In an exemplary embodiment, applying the high voltage 202da to the right shutter 108 closes the right shutter, and applying no voltage to the left shutter 106 starts opening the left shutter. In an exemplary embodiment, the subsequent application of the small catch voltage 202dc to the left shutter 106 prevents the liquid crystals in the left shutter from rotating too far during the opening of the left shutter 106. As a result, in 202d, the left shutter 106 is opened and the right shutter 108 is closed.

In an exemplary embodiment, the magnitude of the catch voltage used in 202b and 202d ranges from about 10 to 20% of the magnitude of the high voltage used in 202b and 202d.

In an exemplary embodiment, during the operation of the system 100, during the method 200, during the time that the left shutter 106 is closed and the right shutter 108 is open in 202b, a video image is presented for the right eye, and during the time that the left shutter 106 is opened and the right shutter 108 is closed in 202d, a video image is presented for the left eye. In an exemplary embodiment, the video image may be displayed on one or more of the movie theater screen 102, an LCD television screen, a digital light processing ("DLP") television, a DLP projector, a plasma screen, and the like.

In an exemplary embodiment, during the operation of the system 100, the CPU 114 will direct each shutter, 106 and 108, to open at the same time the image intended for that shutter, and viewer eye, is presented. In an exemplary embodiment, a synchronization signal may be used to cause the shutters, 106 and 108, to open at the correct time.

In an exemplary embodiment, a synchronization signal is transmitted by the signal transmitter 110 and the synchronization signal could, for example, include an infrared light. In an exemplary embodiment, the signal transmitter 110 transmits the synchronization signal toward a reflective surface and the surface reflects the signal to the signal sensor 112 positioned and mounted within the frame of the 3D glasses 104. The reflective surface could, for example, be the movie theater screen 102 or another reflective device located on or near the movie screen such that the user of the 3D glasses 104 is generally facing the reflector while watching the movie. In an exemplary embodiment, the signal transmitter 110 may send the synchronization signal directly to the sensor 112. In an exemplary embodiment, the signal sensor 112 may include a photo diode mounted and supported on the frame of the 3D glasses 104.

The synchronization signal may provide a pulse at the beginning of each left-right lens shutter sequence 200. The synchronization signal could be more frequent, for example providing a pulse to direct the opening of each shutter, 106 or 108. The synchronization signal could be less frequent, for example providing a pulse once per shutter sequence 200, once per five shutter sequences, or once per 100 shutter sequences. The CPU 114 may have an internal timer to maintain proper shutter sequencing in the absence of a synchronization signal.

In an exemplary embodiment, the combination of viscous liquid crystal material and narrow cell gap in the shutters, 106 and 108, may result in a cell that is optically too thick. The liquid crystal in the shutters, 106 and 108, blocks light transmission when voltage is applied. Upon removing the applied voltage, the molecules in the liquid crystals in the shutters, 106 and 108, rotate back to the orientation of the alignment layer. The alignment layer orients the molecules in the liquid crystal cells to allow light transmission. In a liquid crystal cell that is optically too thick, the liquid crystal molecules rotate rapidly upon removal of power and thus rapidly increase light transmission but then the molecules rotate too far and light transmission decreases. The time from when the rotation of the liquid crystal cell molecules starts until the light transmission stabilizes, i.e. liquid crystal molecules rotation stops, is the true switching time.

In an exemplary embodiment, when the shutter controllers, 116 and 118, apply the small catch voltage to the shutters, 106 and 108, this catch voltage stops the rotation of the liquid crystal cells in the shutters before they rotate too far. By stopping the rotation of the molecules in the liquid crystal cells in the shutters, 106 and 108, before they rotate too far, the light transmission through the molecules in the liquid crystal cells in the shutters is held at or near its peak value. Thus, the effective switching time is from when the liquid crystal cells in the shutters, 106 and 108, start their rotation until the rotation of the molecules in the liquid crystal cells is stopped at or near the point of peak light transmission.

Figure 4:
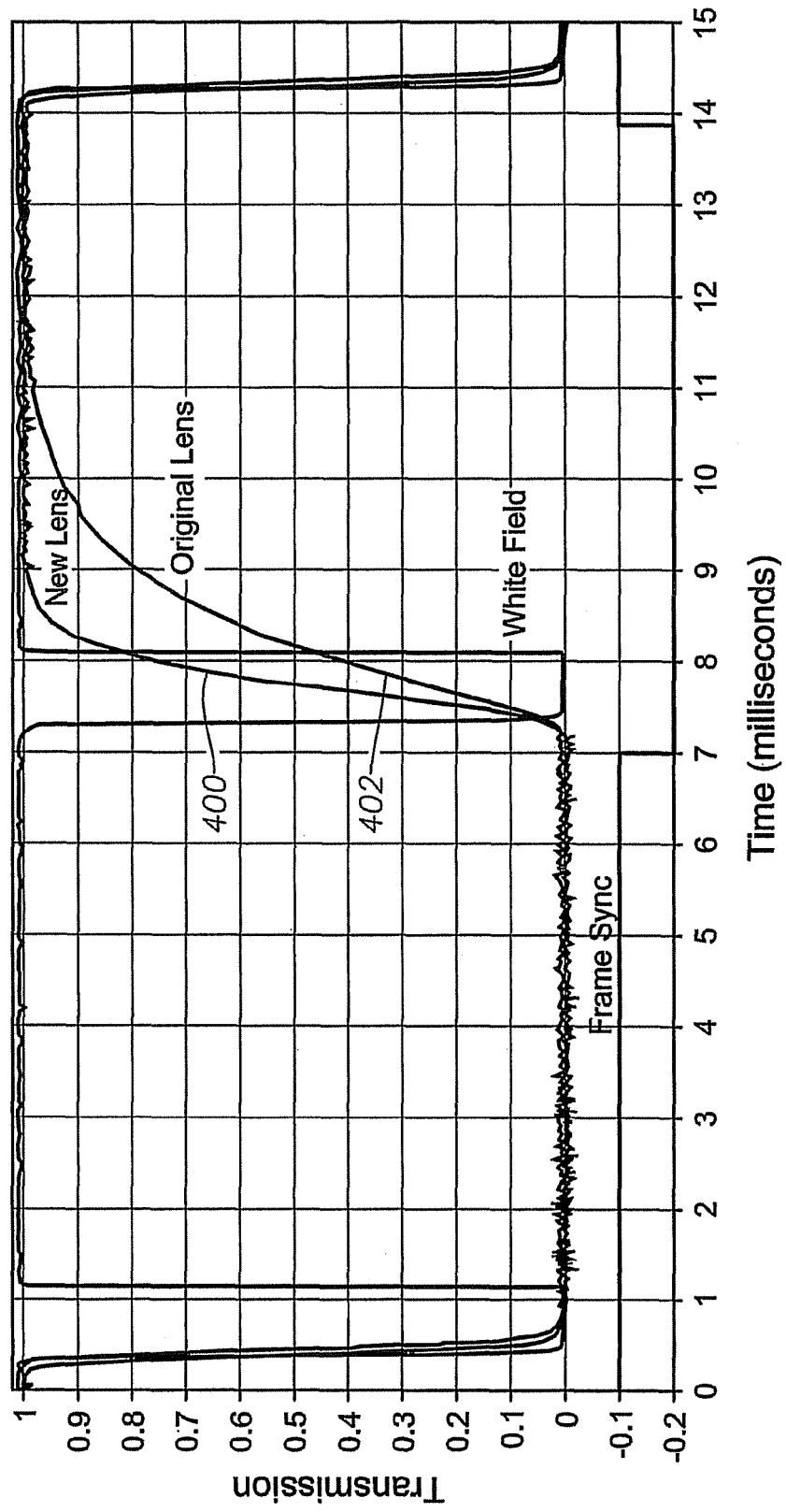
FIG. 4 is a graphical illustration of an exemplary experimental embodiment of the operation of the method of FIG. 2.

Referring now to FIG. 4, the transmission refers to the amount of light transmitted through a shutter, 106 or 108, wherein a transmission value of 1 refers to the point of maximum, or a point near the maximum, light transmission through the liquid crystal cell of the shutter, 106 or 108. Thus, for a shutter, 106 or 108, to be able to transmit its maximum of 37% of light, a transmission level of 1 indicates that the shutter, 106 or 108, is transmitting its maximum, i.e., 37%, of available light. Of course, depending upon the particular liquid crystal cell used, the maximum amount of light transmitted by a shutter, 106 or 108, could be any amount, including, for example, 33%, 30%, or significantly more or less.

As illustrated in FIG. 4, in an exemplary experimental embodiment, a shutter, 106 or 108, was operated and the light transmission 400 was measured during operation of the method 200. In the exemplary experimental embodiment of the shutter, 106 or 108, the shutter closed in approximately 0.5 milliseconds, then remained closed through the first half of the shutter cycle for about 7 milliseconds, then the shutter was opened to about 90% of the maximum light transmission in about one millisecond, and then the shutter remained open for about 7 milliseconds and then was closed. As a comparison, a commercially available shutter was also operated during the operation of the method 200 and exhibited the light transmission 402. The light transmission of the shutter, 106 and 108, of the present exemplary embodiments, during the operation of the method 200, reached about 25-30 percent transmissive, i.e., about 90% of the maximum light transmission, as shown in FIG. 4, in about one millisecond whereas the other shutter only reached about 25-30 percent transmissive, i.e., about 90% of the maximum light transmission, as shown in FIG. 4, after about 2.5 milliseconds. Thus, the shutters, 106 and 108, of the present exemplary embodiments, provided a significantly more responsive operation than commercially available shutters. This was an unexpected result.

Figure 5:
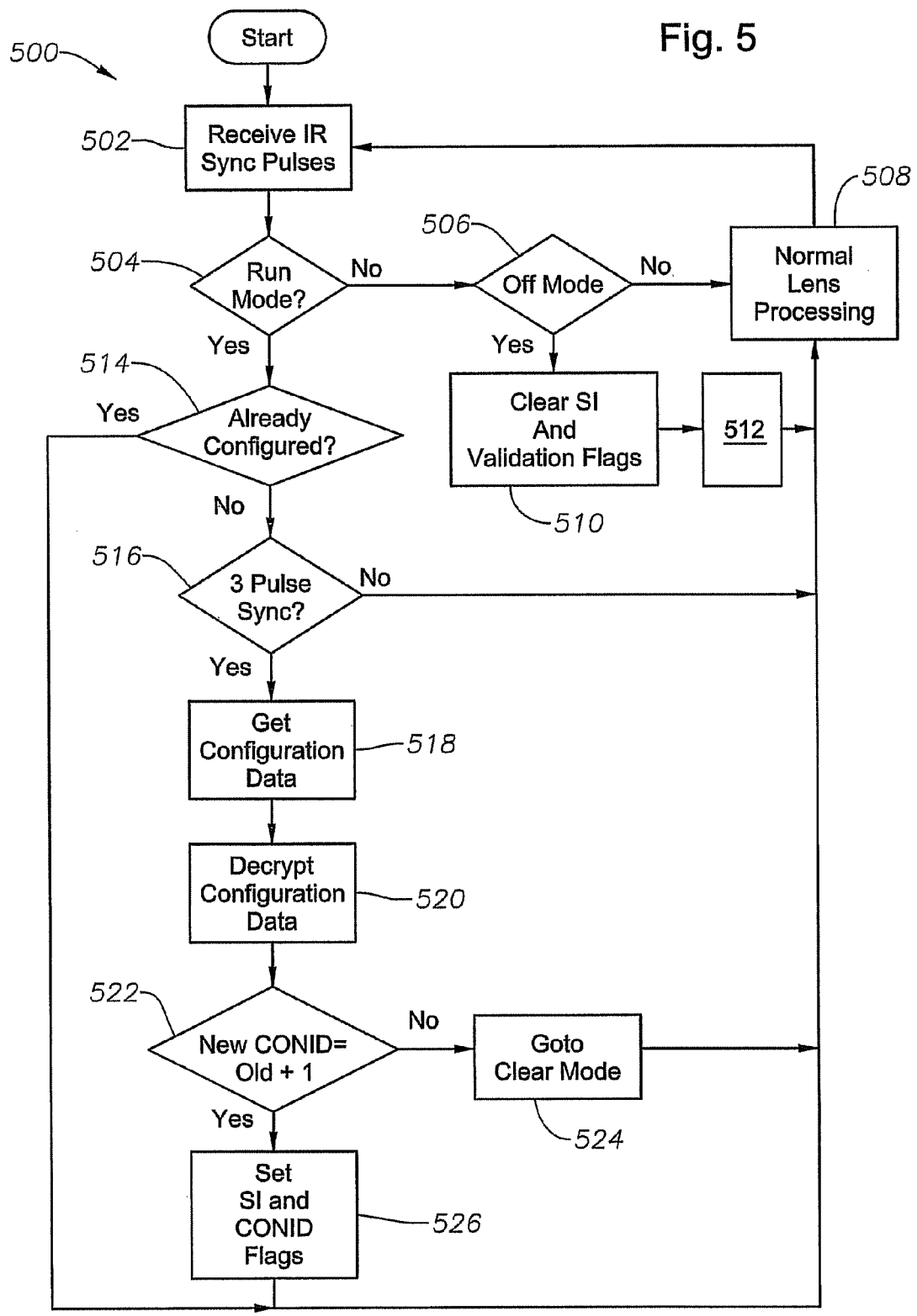
FIG. 5 is a flow chart of an exemplary embodiment of a method for operating the system of FIG. 1.

Referring now to FIG. 5, in an exemplary embodiment, the system 100 implements a method 500 of operation in which, in 502, the signal sensor 114 receives an infrared synchronization ("sync") pulse from the signal transmitter 110. If the 3D glasses 104 are not in the RUN MODE in 504, then the CPU 114 determines if the 3D glasses 104 are in the OFF MODE in 506. If the CPU 114 determines that the 3D glasses 104 are not in the OFF MODE in 506, then the CPU 114 continues normal processing in 508 and then returns to 502. If the CPU 114 determines that the 3D glasses 104 are in the OFF MODE in 506, then the CPU 114 clears the sync inverter ("SI") and validation flags in 510 to prepare the CPU 114 for the next encrypted signals, initiates a warm up sequence for the shutters, 106 and 108, in 512, and then proceeds with normal operations 508 and returns to 502.

If the 3D glasses 104 are in the RUN MODE in 504, then the CPU 114 determines whether the 3D glasses 104 are already configured for encryption in 514. If the 3D glasses 104 are already configured for encryption in 514, then the CPU 114 continues normal operations in 508 and proceeds to 502. If the 3D glasses 104 are not already configured for encryption in 514, then the CPU 114 checks to determine if the incoming signal is a three pulse sync signal in 516. If the incoming signal is not a three pulse sync signal in 516, then the CPU 114 continues normal operations in 508 and proceeds to 502. If the incoming signal is a three pulse sync signal in 516, then the CPU 114 receives configuration data from the signal transmitter 110 in 518 using the signal sensor 112. The CPU 114 then decrypts the received configuration data to determine if it is valid in 520. If the received configuration data is valid in 520, then the CPU 114 checks to see if the new configuration ID ("CONID") matches the previous CONID in 522. In an exemplary embodiment, the previous CONID may be stored in a memory device such as, for example, a nonvolatile memory device, operably coupled to the CPU 114 during the manufacture or field programming of the 3D glasses 104. If the new CONID does not match the previous CONID in 522, then the CPU 114 directs the shutters, 106 and 108, of the 3D glasses 104 to go into CLEAR MODE in 524. If the new CONID does match the previous CONID, in 522, then the CPU 114 sets the SI and CONID flags to trigger the NORMAL MODE shutter sequence for viewing three dimensional images in 526.

In an exemplary embodiment, in the RUN or NORMAL MODE, the 3D glasses 104 are fully operational. In an exemplary embodiment, in the OFF MODE, the 3D glasses are not operational. In an exemplary embodiment, in the NORMAL MODE, the 3D glasses are operational and may implement the method 200.

In an exemplary embodiment, the signal transmitter 110 may be located near the theater projector 130. In an exemplary embodiment, the signal transmitter 110, among other functions, sends a synchronization signal ("sync signal") to the signal sensor 112 of the 3D glasses 104. The signal transmitter 110 may instead, or in addition to, receive a synchronization signal from the theater projector 130 and/or any display and/or any emitter device. In an exemplary embodiment, an encryption signal may be used to prevent the 3D glasses 104 from operating with a signal transmitter 110 that does not contain the correct encryption signal. Furthermore, in an exemplary embodiment, the encrypted transmitter signal will not properly actuate 3D glasses 104 that are not equipped to receive and process the encrypted signal. In an exemplary embodiment, the signal transmitter 110 may also send encryption data to the 3D glasses 104.

Figure 6:
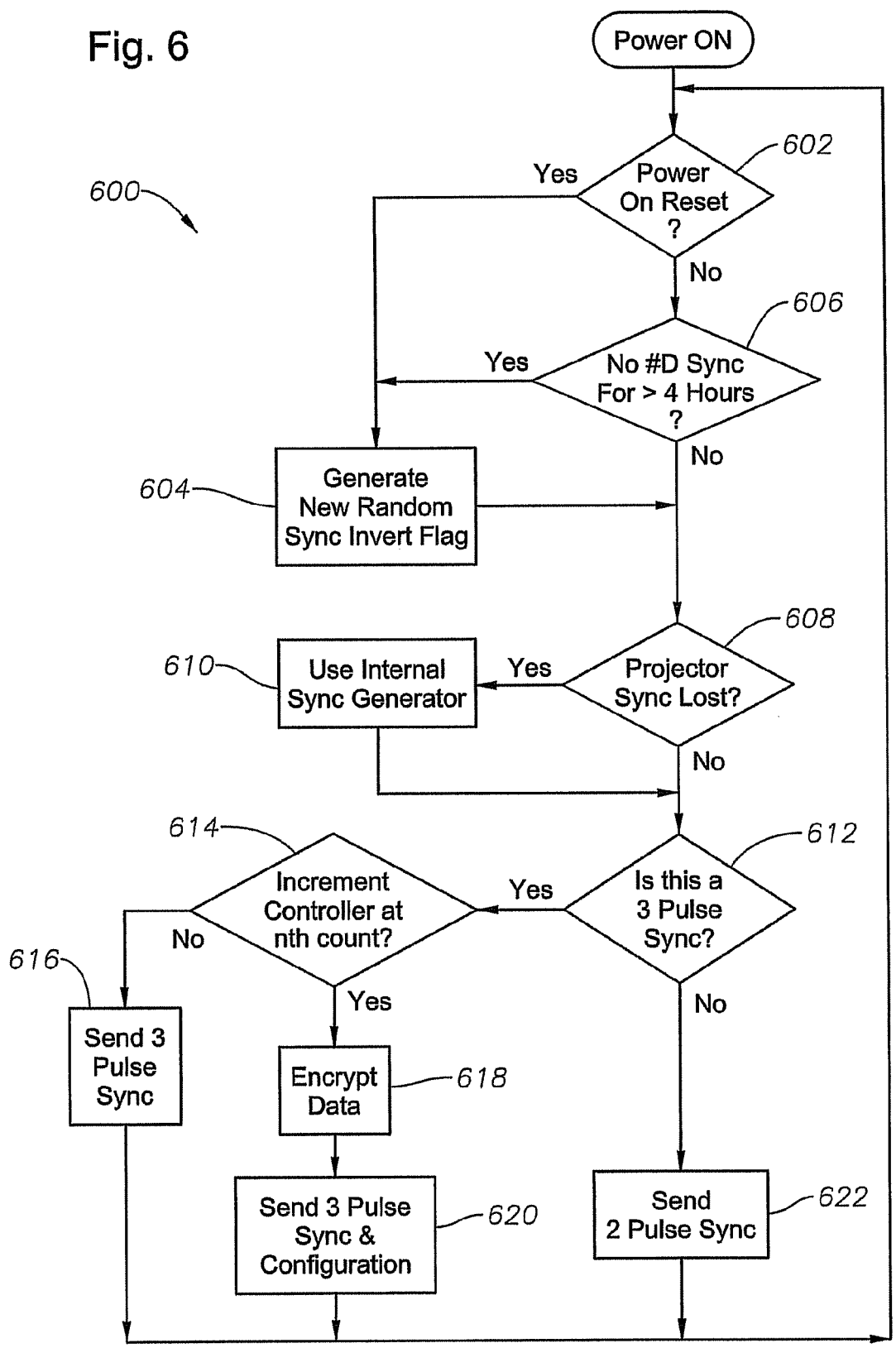
FIG. 6 is a flow chart of an exemplary embodiment of a method for operating the system of FIG. 1.

Referring now to FIG. 6, in an exemplary embodiment, during operation, the system 100 implements a method 600 of operation in which, in 602, the system determines if the signal transmitter 110 was reset because the power just came on in 602. If the signal transmitter 110 was reset because the power just came on in 602, then the signal transmitter generates a new random sync invert flag in 604. If the signal transmitter 110 did not have a power on reset condition in 602, then the CPU 110a of the signal transmitter 110 determines whether the same sync encoding has been used for more than a predetermined amount of time in 606. In an exemplary embodiment, the predetermined time in 606 could be four hours or the length of a typical movie or any other suitable time. If the same sync encoding has been used for more than four hours in 606, then the CPU 110a of the signal transmitter 110 generates a new sync invert flag in 604.

The CPU 110a of the signal transmitter 110 then determines if the signal transmitter is still receiving a signal from the projector 130 in 608. If the signal transmitter 110 is not still receiving a signal from the projector 130 in 608, then the signal transmitter 110 may use its own internal sync generator to continue sending sync signals to the signal sensor 112 at the proper time in 610.

During operation, the signal transmitter 110 may, for example, alternate between two-pulse sync signals and three-pulse sync signals. In an exemplary embodiment, a two-pulse sync signal directs the 3D glasses 104 to open the left shutter 108, and a three-pulse sync signal directs the 3D glasses 104 to open the right shutter 106. In an exemplary embodiment, the signal transmitter 110 may send an encryption signal after every $n^{th}$ signal.

If the signal transmitter 110 determines that it should send a three-pulse sync signal in 612, then the signal transmitter determines the signal count since the last encryption cycle in 614. In an exemplary embodiment, the signal transmitter 110 sends an encryption signal only once out of every ten signals. However, in an exemplary embodiment, there could be more or less signal cycles between encryption signals. If the CPU 110a of the signal transmitter 110 determines this is not the $n^{th}$ three-pulse sync in 614, then the CPU directs the signal transmitter to send a standard three pulse sync signal in 616. If the sync signal is the $n^{th}$ three-pulse signal, then the CPU 110a of the signal transmitter 110 encrypts the data in 618 and sends a three pulse sync signal with embedded configuration data in 620. If the signal transmitter 110 determines that it should not send a three-pulse sync signal in 612, then the signal transmitter sends a two-pulse sync signal in 622.

Figure 7:
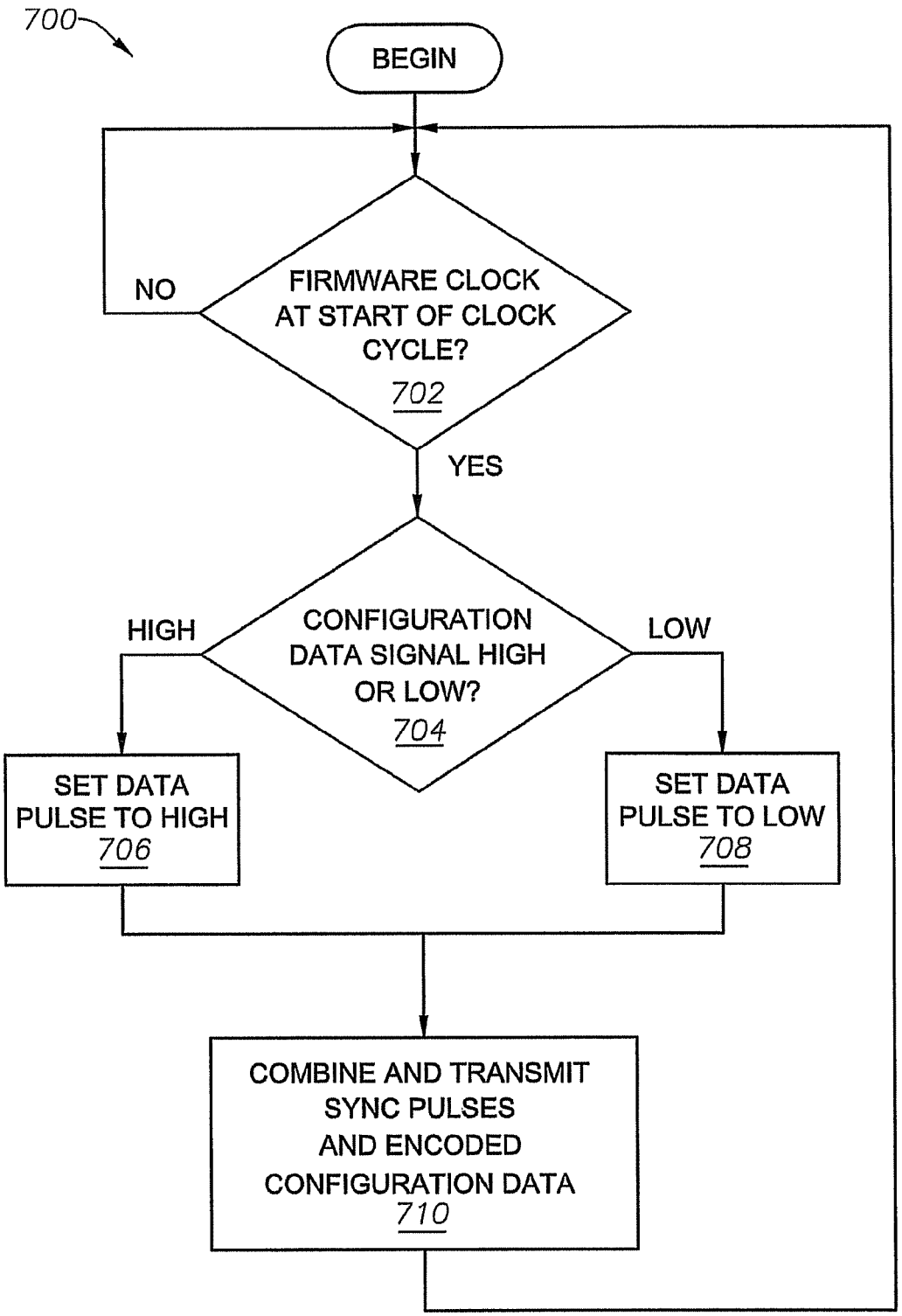
FIG. 7 is a flow chart of an exemplary embodiment of a method for operating the system of FIG. 1.
Figure 8:
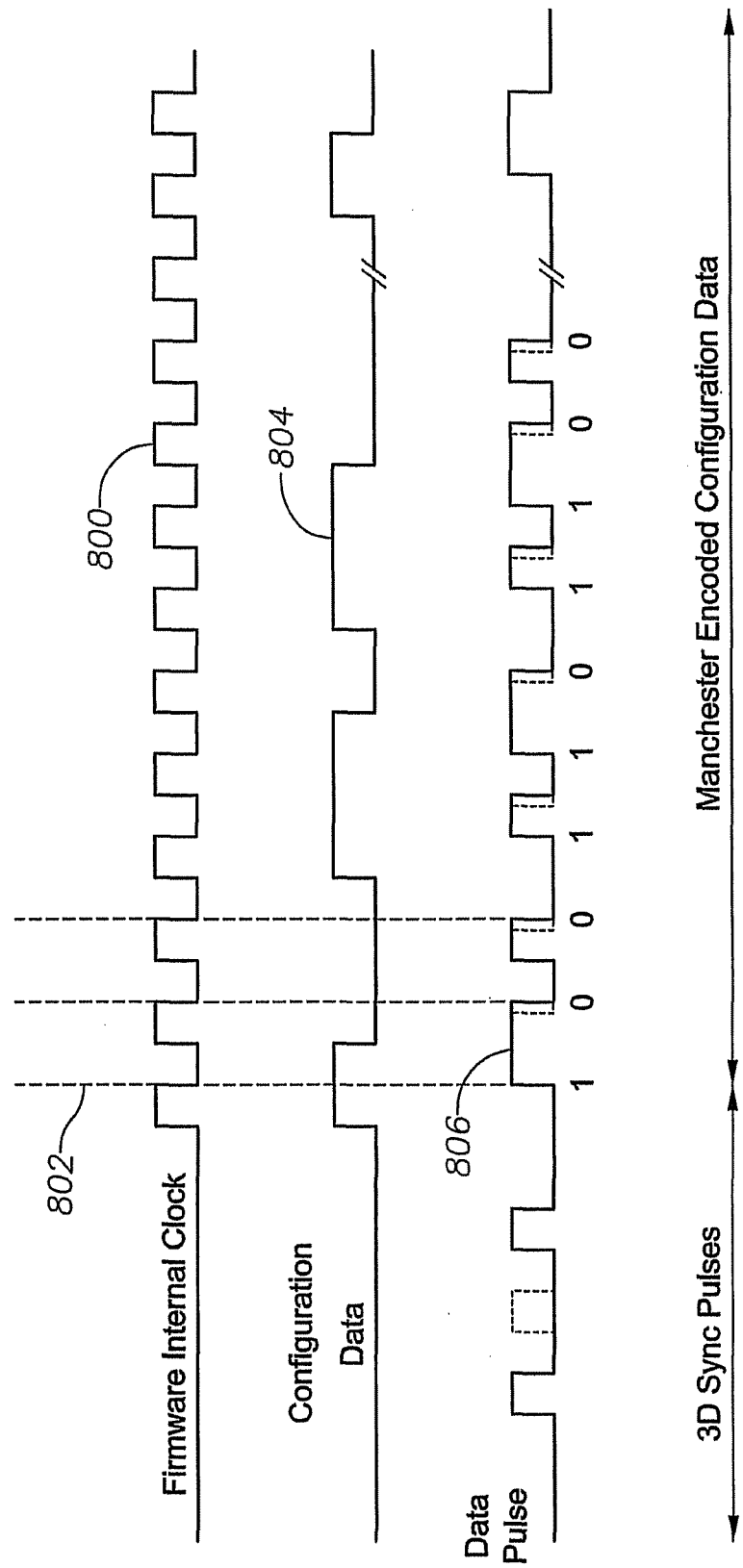
FIG. 8 is a graphical illustration of the operation of the method of FIG. 7.
Figure 9:
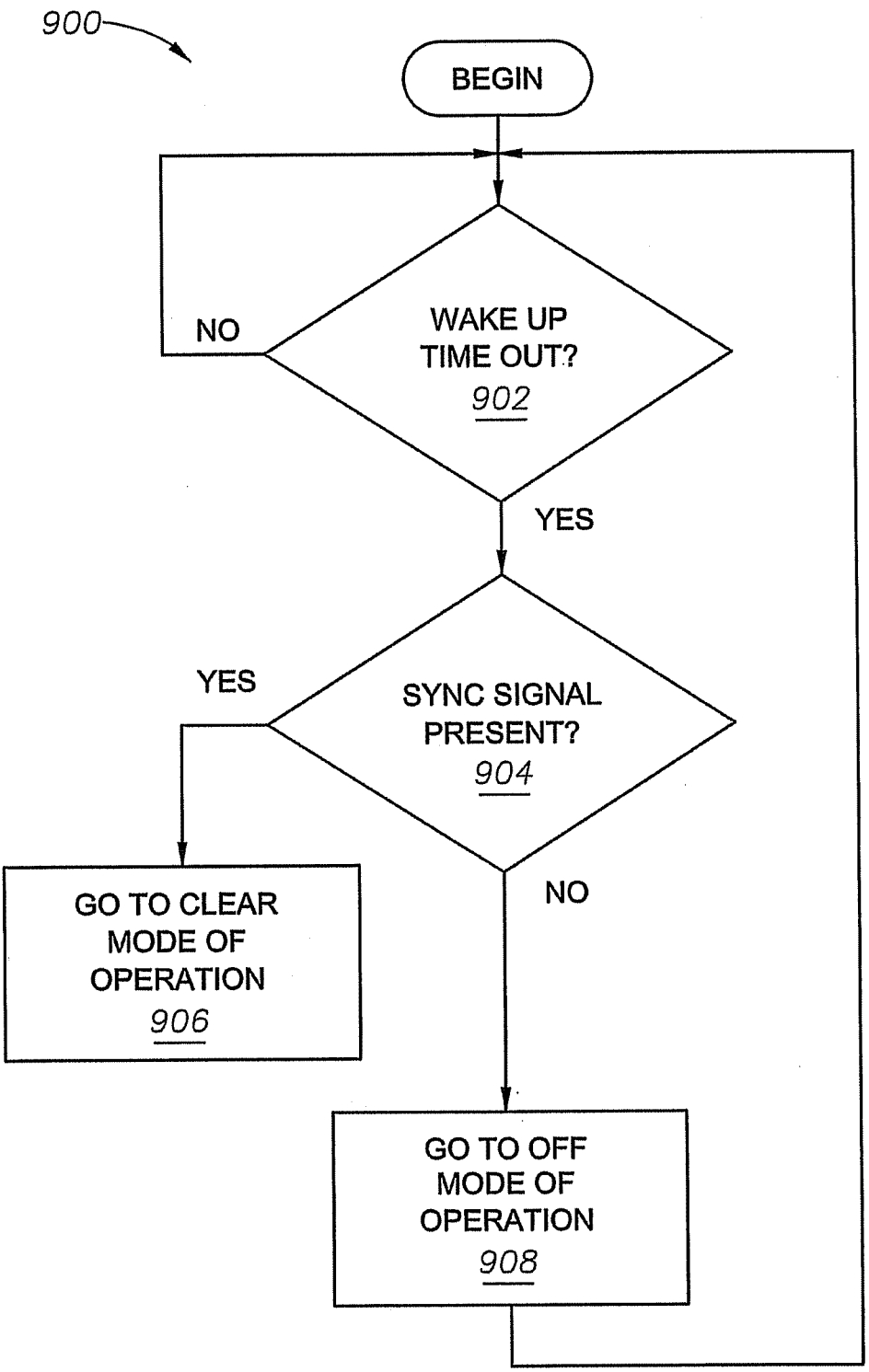
FIG. 9 is a flow chart of an exemplary embodiment of a method for operating the system of FIG. 1.
Figure 10:
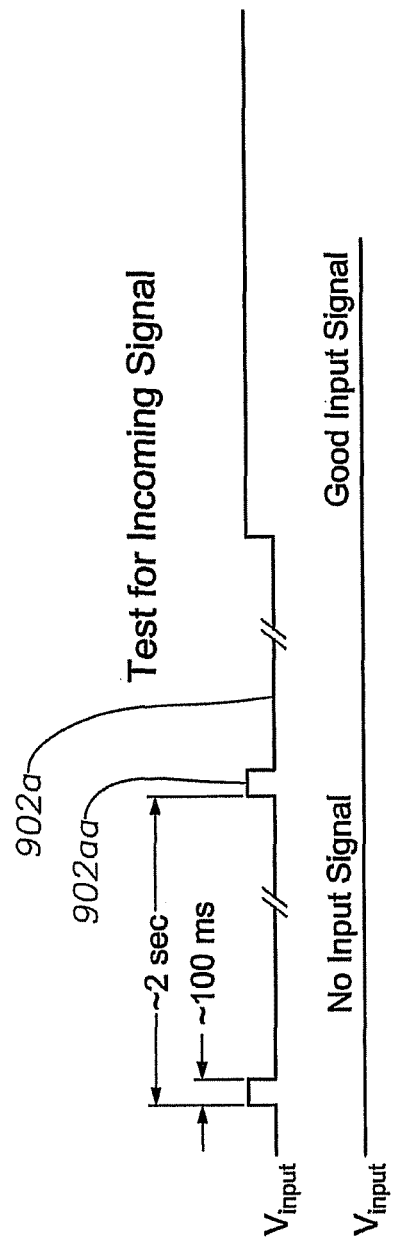
FIG. 10 is a graphical illustration of the operation of the method of FIG. 9.

Referring now to FIGS. 7 and 8, in an exemplary embodiment, during operation of the system 100, the signal transmitter 110 implements a method 700 of operation in which the sync pulses are combined with encoded configuration data and then transmitted by the signal transmitter 110. In particular, the signal transmitter 110 includes a firmware internal clock that generates a clock signal 800. In 702, the CPU 110a of the signal transmitter 110 determines if the clock signal 800 is at the beginning of the clock cycle 802. If the CPU 110a of the signal transmitter 110 determines that the clock signal 800 is at the beginning of the clock cycle in 702, then the CPU of the signal transmitter checks to see if a configuration data signal 804 is high or low in 704. If the configuration data signal 804 is high, then a data pulse signal 806 is set to a high value in 706. If the configuration data signal 804 is low, then the data pulse signal 806 is set to a low value in 708. In an exemplary embodiment, the data pulse signal 806 may already include the sync signal. Thus, the data pulse signal 806 is combined with the synch signal in 710 and transmitted by the signal transmitter 110 in 710.

In an exemplary embodiment, the encrypted form of the configuration data signal 804 may be sent during every sync signal sequence, after a predetermined number of sync signal sequences, embedded with the sync signal sequences, overlayed with the sync signal sequences, or combined with the sync signal sequences—before or after the encryption operation. Furthermore, the encrypted form of the configuration data signal 804 could be sent on either the two or three pulse sync signal, or both, or signals of any other number of pulses. In addition, the encrypted configuration data could be transmitted between the transmission of the sync signal sequence with or without encrypting the sync signals on either end of the transmission.

In an exemplary embodiment, encoding the configuration data signal 804, with or without the sync signal sequence, may be provided, for example, using Manchester encoding.

Referring now to FIGS. 2, 5, 8, 9 and 10, in an exemplary embodiment, during the operation of the system 100, the 3D glasses 104 implement a method 900 of operation in which, in 902, the CPU 114 of the 3D glasses 104 checks for a wake up mode time out. In an exemplary embodiment, the presence of a wake up mode time out in 902 is provided by a clock signal 902a having a high pulse 902aa with a duration of 100 milliseconds that may occur every 2 seconds, or other predetermined time period. In an exemplary embodiment, the presence of the high pulse 902aa indicates a wake up mode time out.

If the CPU 114 detects a wake up time out in 902, then the CPU checks for the presence or absence of a sync signal using the signal sensor 112 in 904. If the CPU 114 detects a sync signal in 904, then the CPU places the 3D glasses 104 in a CLEAR MODE of operation in 906. In an exemplary embodiment, in the CLEAR MODE of operation, the 3D glasses implement, at least portions of, one or more of the methods 200 and 500, receiving sync pulses, and/or processing configuration data 804. In an exemplary embodiment, in the CLEAR mode of operation, the 3D glasses may provide at least the operations of the method 1300, described below.

If the CPU 114 does not detect a sync signal in 904, then the CPU places the 3D glasses 104 in an OFF MODE of operation in 908 and then, in 902, the CPU checks for a wake up mode time out. In an exemplary embodiment, in the OFF MODE of operation, the 3D glasses do not provide the features of NORMAL or CLEAR mode of operations.

In an exemplary embodiment, the method 900 is implemented by the 3D glasses 104 when the 3D glasses are in either the OFF MODE or the CLEAR MODE.

Figure 11:
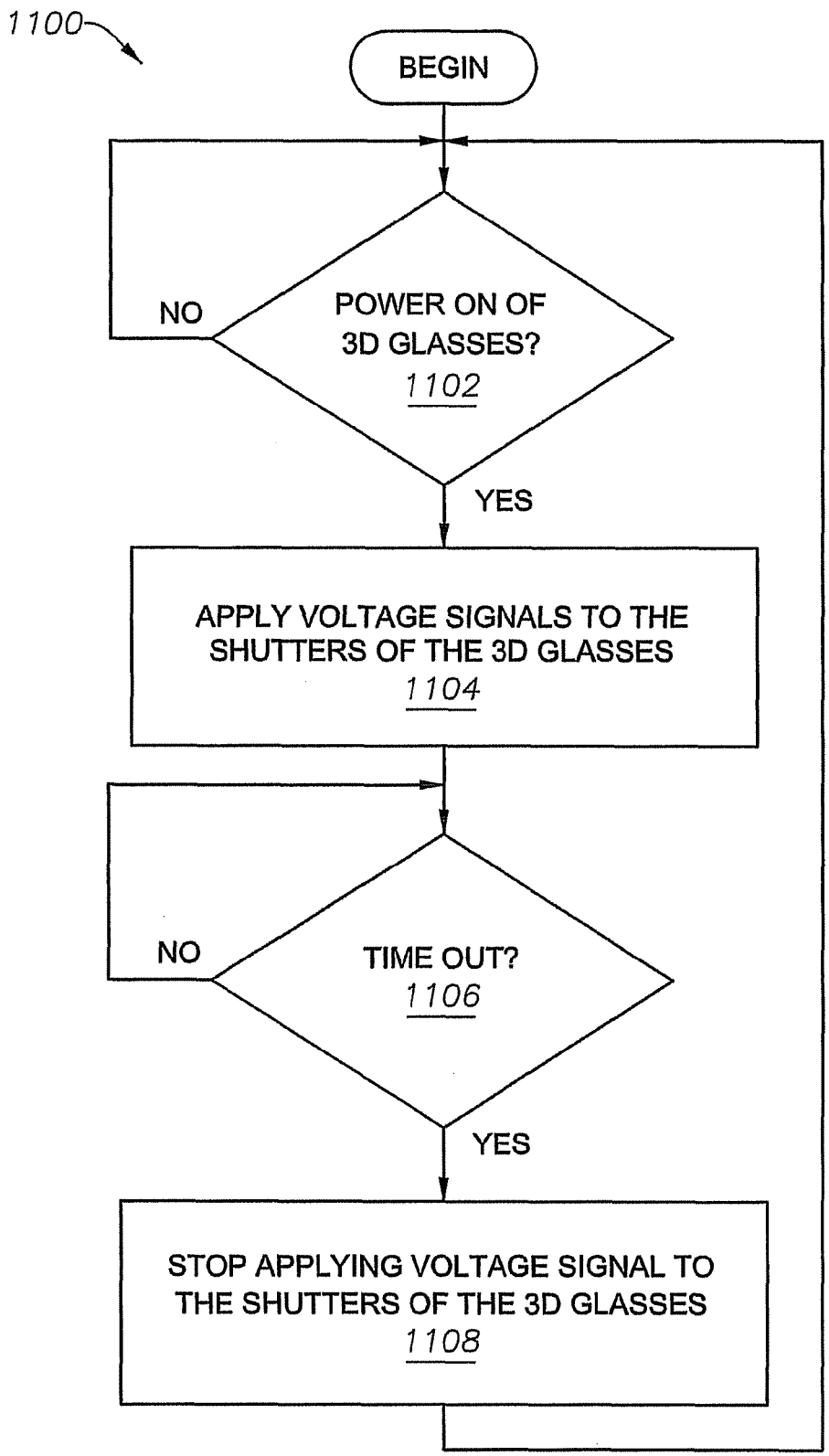
FIG. 11 is a flow chart of an exemplary embodiment of a method for operating the system of FIG. 1.
Figure 12:
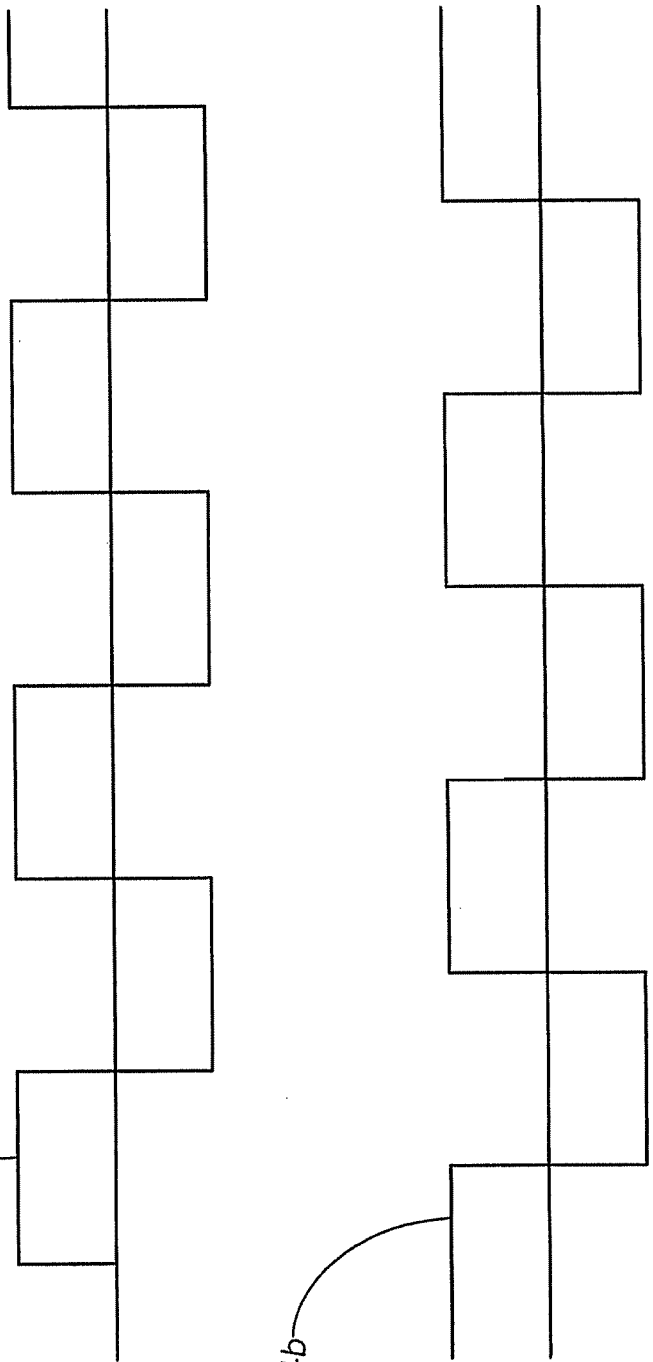
FIG. 12 is a graphical illustration of the operation of the method of FIG. 11.

Referring now to FIGS. 11 and 12, in an exemplary embodiment, during operation of the system 100, the 3D glasses 104 implement a warm up method 1100 of operation in which, in 1102, the CPU 114 of the 3D glasses checks for a power on of the 3D glasses. In an exemplary embodiment, the 3D glasses 104 may be powered on either by a user activating a power on switch or by an automatic wakeup sequence. In the event of a power on of the 3D glasses 104, the shutters, 106 and 108, of the 3D glasses may, for example, require a warm-up sequence. The molecules of the liquid crystal cells of the shutters, 106 and 108, that do not have power for a period of time may be in an indefinite state.

If the CPU 114 of the 3D glasses 104 detect a power on of the 3D glasses in 1102, then the CPU applies alternating voltage signals, 1104a and 1104b, to the shutters, 106 and 108, respectively, in 1104. In an exemplary embodiment, the voltage applied to the shutters, 106 and 108, is alternated between positive and negative peak values to avoid ionization problems in the liquid crystal cells of the shutter. In an exemplary embodiment, the voltage signals, 1104a and 1104b, are at least partly out of phase with one another. Alternatively, the voltage signals, 1104a and 1104b, may be in phase or completely out of phase. In an exemplary embodiment, one or both of the voltage signals, 1104a and 1104b, may be alternated between a zero voltage and a peak voltage. In an exemplary embodiment, other forms of voltage signals may be applied to the shutters, 106 and 108, such that the liquid crystal cells of the shutters are placed in a definite operational state. In an exemplary embodiment, the application of the voltage signals, 1104a and 1104b, to the shutters, 106 and 108, causes the shutters to open and close, either at the same time or at different times. Alternatively, the application of the voltage signals, 1104a and 1104b, causes the shutters, 106 and 108, to be closed all of the time.

During the application of the voltage signals, 1104a and 1104b, to the shutters, 106 and 108, the CPU 114 checks for a warm up time out in 1106. If the CPU 114 detects a warm up time out in 1106, then the CPU will stop the application of the voltage signals, 1104a and 1104b, to the shutters, 106 and 108, in 1108.

In an exemplary embodiment, in 1104 and 1106, the CPU 114 applies the voltage signals, 1104a and 1104b, to the shutters, 106 and 108, for a period of time sufficient to actuate the liquid crystal cells of the shutters. In an exemplary embodiment, the CPU 114 applies the voltage signals, 1104a and 1104b, to the shutters, 106 and 108, for a time out period of two seconds. In an exemplary embodiment, the maximum magnitude of the voltage signals, 1104a and 1104b, may be 14 volts. In an exemplary embodiment, the time out period in 1106 may be two seconds. In an exemplary embodiment, the maximum magnitude of the voltage signals, 1104a and 1104b, may be greater or lesser than 14 volts, and the time out period may be longer or shorter. In an exemplary embodiment, during the method 1100, the CPU 114 may open and close the shutters, 106 and 108, at a different rate than would be used for viewing a movie. In an exemplary embodiment, in 1104, the voltage signals, 1104a and 1104b, applied to the shutters, 106 and 108, alternate at a different rate than would be used for viewing a movie. In an exemplary embodiment, in 1104, the voltage signals applied to the shutters, 106 and 108, do not alternate and are applied constantly during the warm up time period and therefore the liquid crystal cells of the shutters may remain opaque for the entire warm up period. In an exemplary embodiment, the warm-up method 1100 may occur with or without the presence of a synchronization signal. Thus, the method 1100 provides a WARM UP mode of the operation for the 3D glasses 104. In an exemplary embodiment, after implementing the warm up method 1100, the 3D glasses are placed in a NORMAL RUN MODE of operation and may then implement the method 200. Alternatively, in an exemplary embodiment, after implementing the warm up method 1100, the 3D glasses are placed in a CLEAR MODE of operation and may then implement the method 1300, described below.

Figure 13:
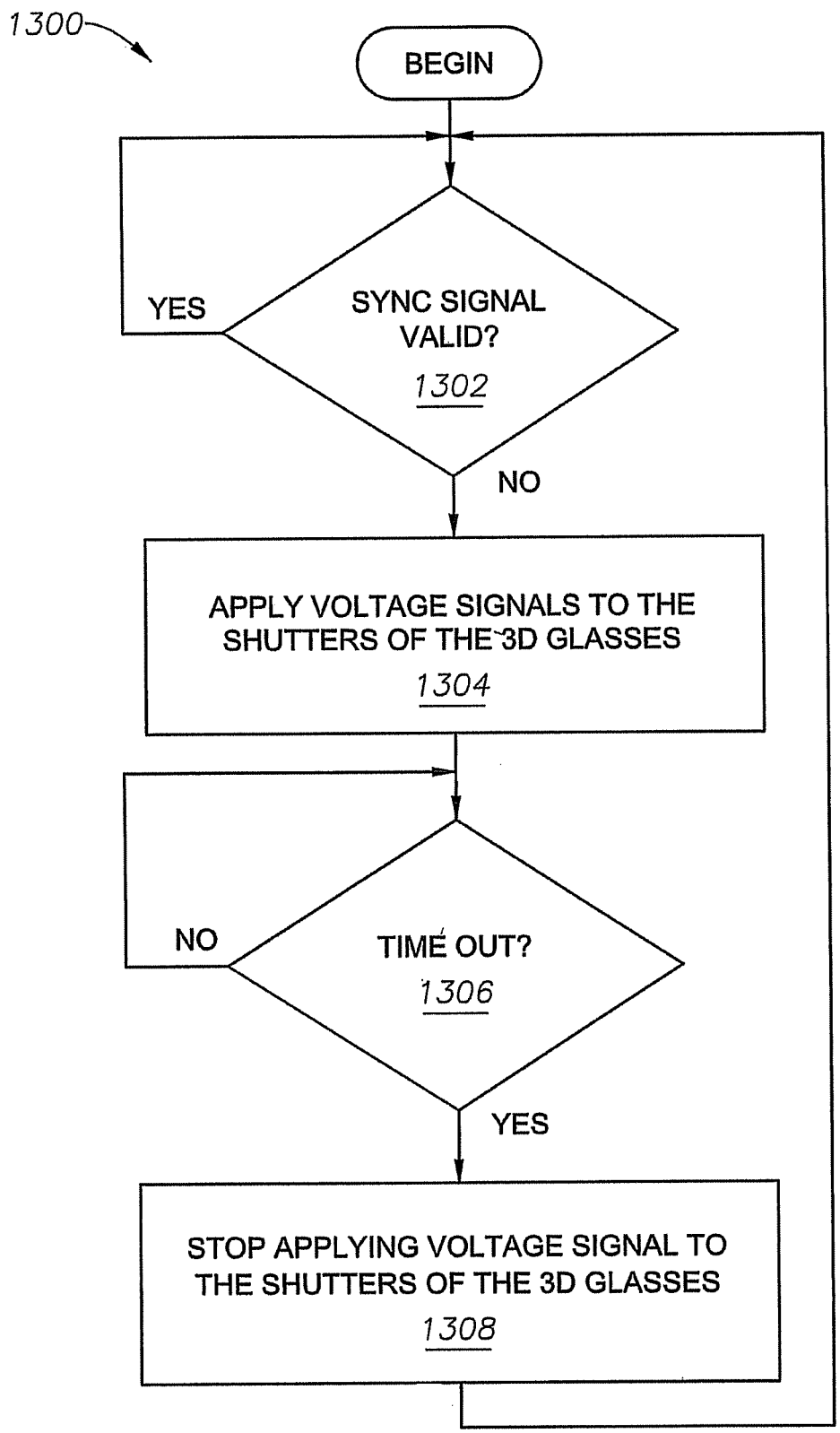
FIG. 13 is a flow chart of an exemplary embodiment of a method for operating the system of FIG. 1.
Figure 14:
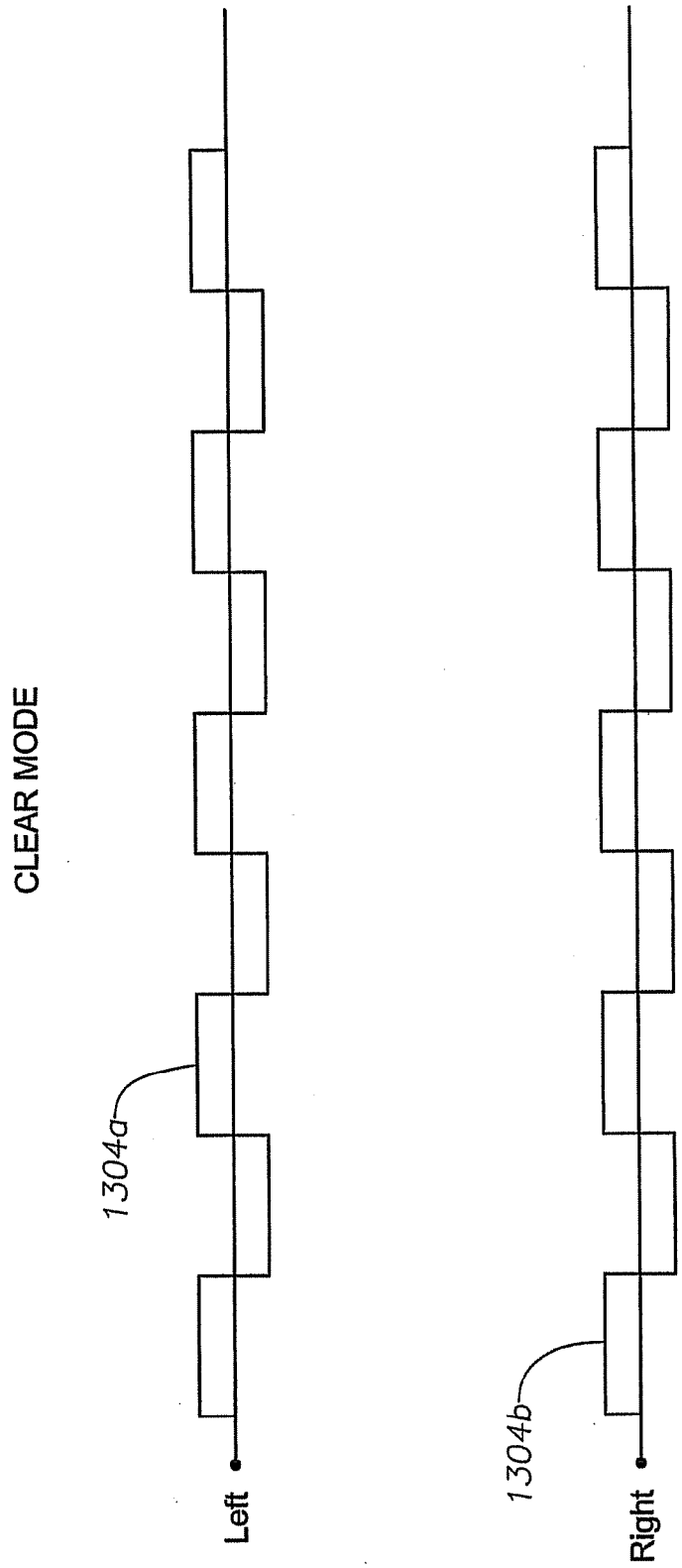
FIG. 14 is a graphical illustration of the operation of the method of FIG. 13.

Referring now to FIGS. 13 and 14, in an exemplary embodiment, during the operation of the system 100, the 3D glasses 104 implement a method 1300 of operation in which, in 1302, the CPU 114 checks to see if the sync signal detected by the signal sensor 112 is valid or invalid. If the CPU 114 determines that the sync signal is invalid in 1302, then the CPU applies voltage signals, 1304a and 1304b, to the shutters, 106 and 108, of the 3D glasses 104 in 1304. In an exemplary embodiment, the voltage applied to the shutters, 106 and 108, is alternated between positive and negative peak values to avoid ionization problems in the liquid crystal cells of the shutter. In an exemplary embodiment, one or both of the voltage signals, 1104a and 1104b, may be alternated between a zero voltage and a peak voltage. In an exemplary embodiment, other forms of voltage signals may be applied to the shutters, 106 and 108, such that the liquid crystal cells of the shutters remain open so that the user of the 3D glasses 104 can see normally through the shutters. In an exemplary embodiment, the application of the voltage signals, 1104a and 1104b, to the shutters, 106 and 108, causes the shutters to open.

During the application of the voltage signals, 1304a and 1304b, to the shutters, 106 and 108, the CPU 114 checks for a clearing time out in 1306. If the CPU 114 detects a clearing time out in 1306, then the CPU will stop the application of the voltage signals, 1304a and 1304b, to the shutters, 106 and 108, in 1308.

Thus, in an exemplary embodiment, if the 3D glasses 104 do not detect a valid synchronization signal, they may go to a clear mode of operation and implement the method 1300. In the clear mode of operation, in an exemplary embodiment, both shutters, 106 and 108, of the 3D glasses 104 remain open so that the viewer can see normally through the shutters of the 3D glasses. In an exemplary embodiment, a constant voltage is applied, alternating positive and negative, to maintain the liquid crystal cells of the shutters, 106 and 108, of the 3D glasses in a clear state. The constant voltage could, for example, be in the range of 2-3 volts, but the constant voltage could be any other voltage suitable to maintain reasonably clear shutters. In an exemplary embodiment, the shutters, 106 and 108, of the 3D glasses 104 may remain clear until the 3D glasses are able to validate an encryption signal. In an exemplary embodiment, the shutters, 106 and 108, of the 3D glasses may alternately open and close at a rate that allows the user of the 3D glasses to see normally.

Thus, the method 1300 provides a method of clearing the operation of the 3D glasses 104 and thereby provide a CLEAR MODE of operation.

Figure 15:
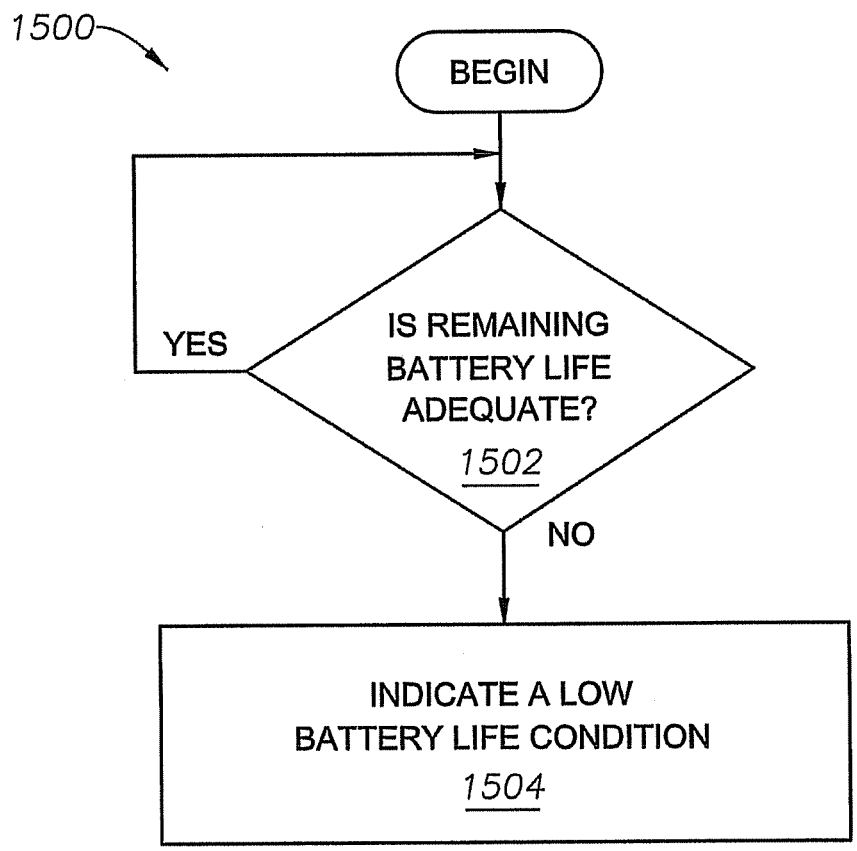
FIG. 15 is a flow chart of an exemplary embodiment of a method for operating the system of FIG. 1.

Referring now to FIG. 15, in an exemplary embodiment, during the operation of the system 100, the 3D glasses 104 implement a method 1500 of monitoring the battery 120 in which, in 1502, the CPU 114 of the 3D glasses uses the battery sensor 122 to determine the remaining useful life of the battery. If the CPU 114 of the 3D glasses determines that the remaining useful life of the battery 120 is not adequate in 1502, then the CPU provides an indication of a low battery life condition in 1504.

In an exemplary embodiment, an inadequate remaining battery life may, for example, be any period less than 3 hours. In an exemplary embodiment, an adequate remaining battery life may be preset by the manufacturer of the 3D glasses and/or programmed by the user of the 3D glasses.

In an exemplary embodiment, in 1504, the CPU 114 of the 3D glasses 104 will indicate a low battery life condition by causing the shutters, 106 and 108, of the 3D glasses to blink slowly, by causing the shutters to simultaneously blink at a moderate rate that is visible to the user of the 3D glasses, by flashing an indicator light, by generating an audible sound, and the like.

In an exemplary embodiment, if the CPU 114 of the 3D glasses 104 detects that the remaining battery life is insufficient to last for a specified period of time, then the CPU of the 3D glasses will indicate a low battery condition in 1504 and then prevent the user from turning on the 3D glasses.

In an exemplary embodiment, the CPU 114 of the 3D glasses 104 determines whether or not the remaining battery life is adequate every time the 3D glasses transition to the CLEAR MODE of operation.

In an exemplary embodiment, if the CPU 114 of the 3D glasses determines that the battery will last for at least the predetermined adequate amount of time, then the 3D glasses will continue to operate normally. Operating normally may include staying in the CLEAR MODE of operation for five minutes while checking for a valid signal from the signal transmitter 110 and then going to an OFF MODE wherein the 3D glasses 104 periodically wake up to check for a signal from the signal transmitter.

In an exemplary embodiment, the CPU 114 of the 3D glasses 104 checks for a low battery condition just before shutting off the 3D glasses. In an exemplary embodiment, if the battery 120 will not last for the predetermined adequate remaining life time, then the shutters, 106 and 108, will begin blinking slowly.

In an exemplary embodiment, if the battery 120 will not last for the predetermined adequate remaining life time, the shutters, 106 and/or 108, are placed into an opaque condition, i.e., the liquid crystal cells are closed, for two seconds and then placed into a clear condition, i.e., the liquid crystal cells are opened, for $\frac{1}{10}^{th}$ of a second. The time period that the shutters, 106 and/or 108, are closed and opened may be any time period.

In an exemplary embodiment, the 3D glasses 104 may check for a low battery condition at any time including during warm up, during normal operation, during clear mode, during power off mode, or at the transition between any conditions. In an exemplary embodiment, if a low battery life condition is detected at a time when the viewer is likely to be in the middle of a movie, the 3D glasses 104 may not immediately indicate the low battery condition.

In some embodiments, if the CPU 114 of the 3D glasses 104 detects a low battery level, the user will not be able to power the 3D glasses on.

Figure 16:
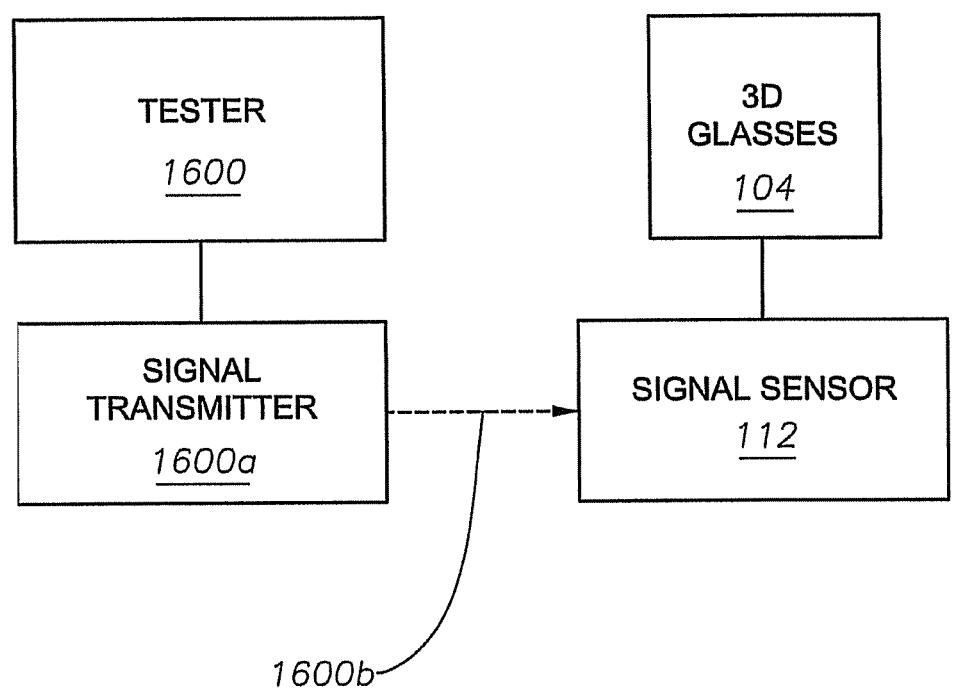
FIG. 16 is an illustration of an exemplary embodiment of a method for operating the system of FIG. 1.

Referring now to FIG. 16, in an exemplary embodiment, a tester 1600 may be positioned proximate the 3D glasses 104 in order to verify that the 3D glasses are working properly. In an exemplary embodiment, the tester 1600 includes a signal transmitter 1600a for transmitting test signals 1600b to the signal sensor 112 of the 3D glasses. In an exemplary embodiment, the test signal 1600b may include a sync signal having a low frequency rate to cause the shutters, 106 and 108, of the 3D glasses 104 to blink at a low rate that is visible to the user of the 3D glasses. In an exemplary embodiment, a failure of the shutters, 106 and 108, to blink in response to the test signal 1600b may indicate a failure on the part of the 3D glasses 104 to properly operate.

Figure 17:
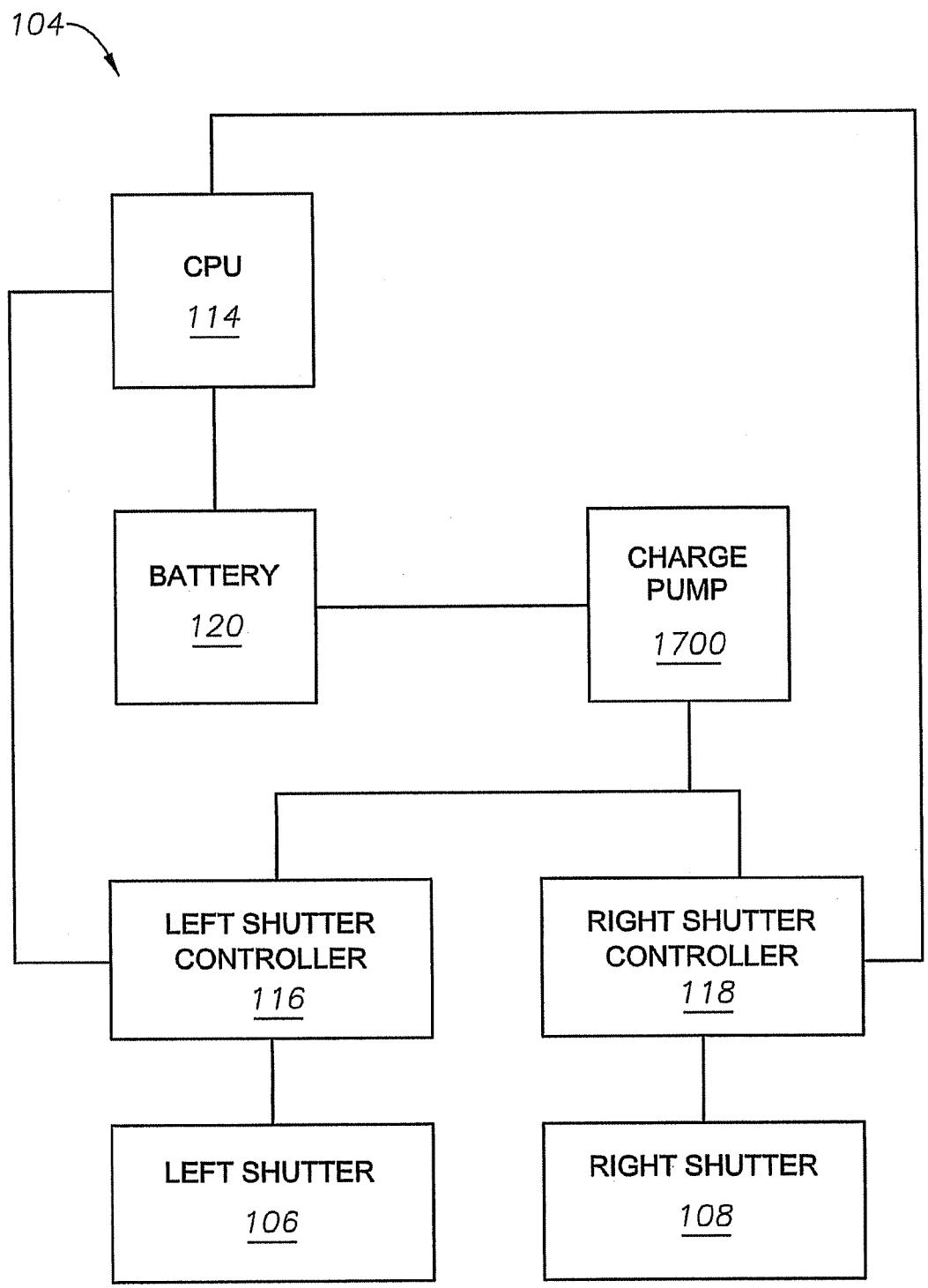
FIG. 17 is an illustration of an exemplary embodiment of the 3D glasses of the system of FIG. 1.
Figure 18:
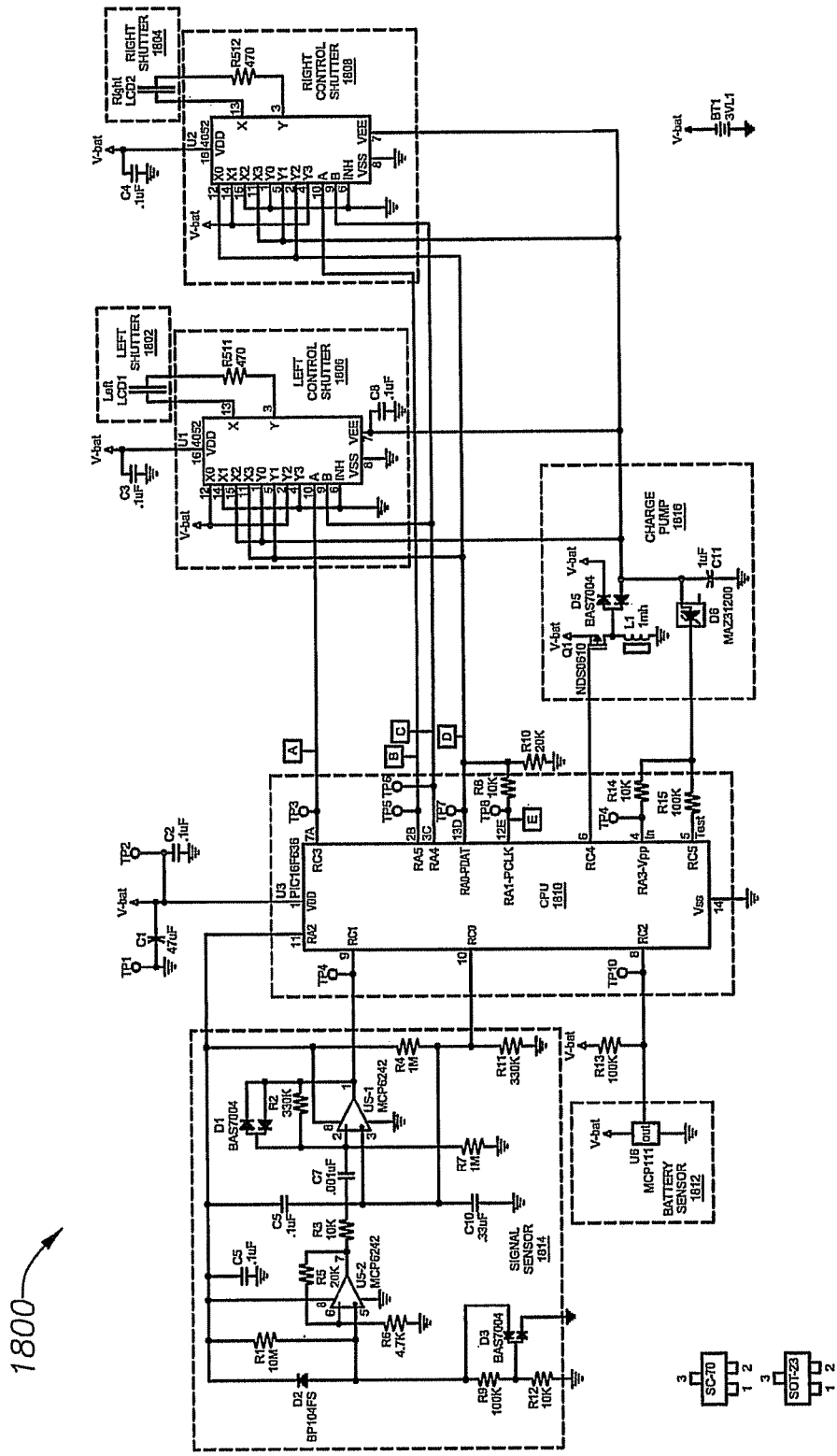
Figure 18A:
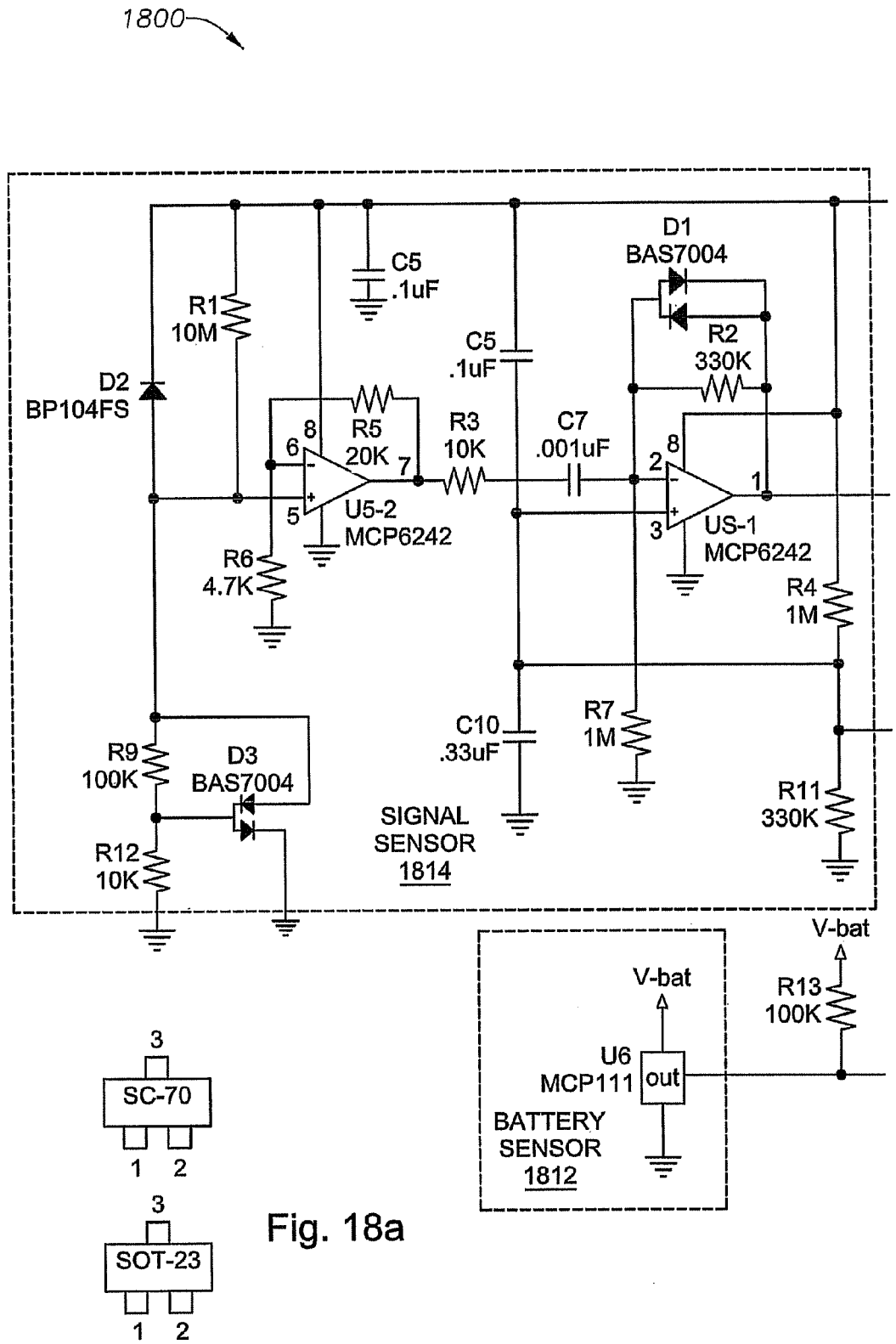
Figure 18B:
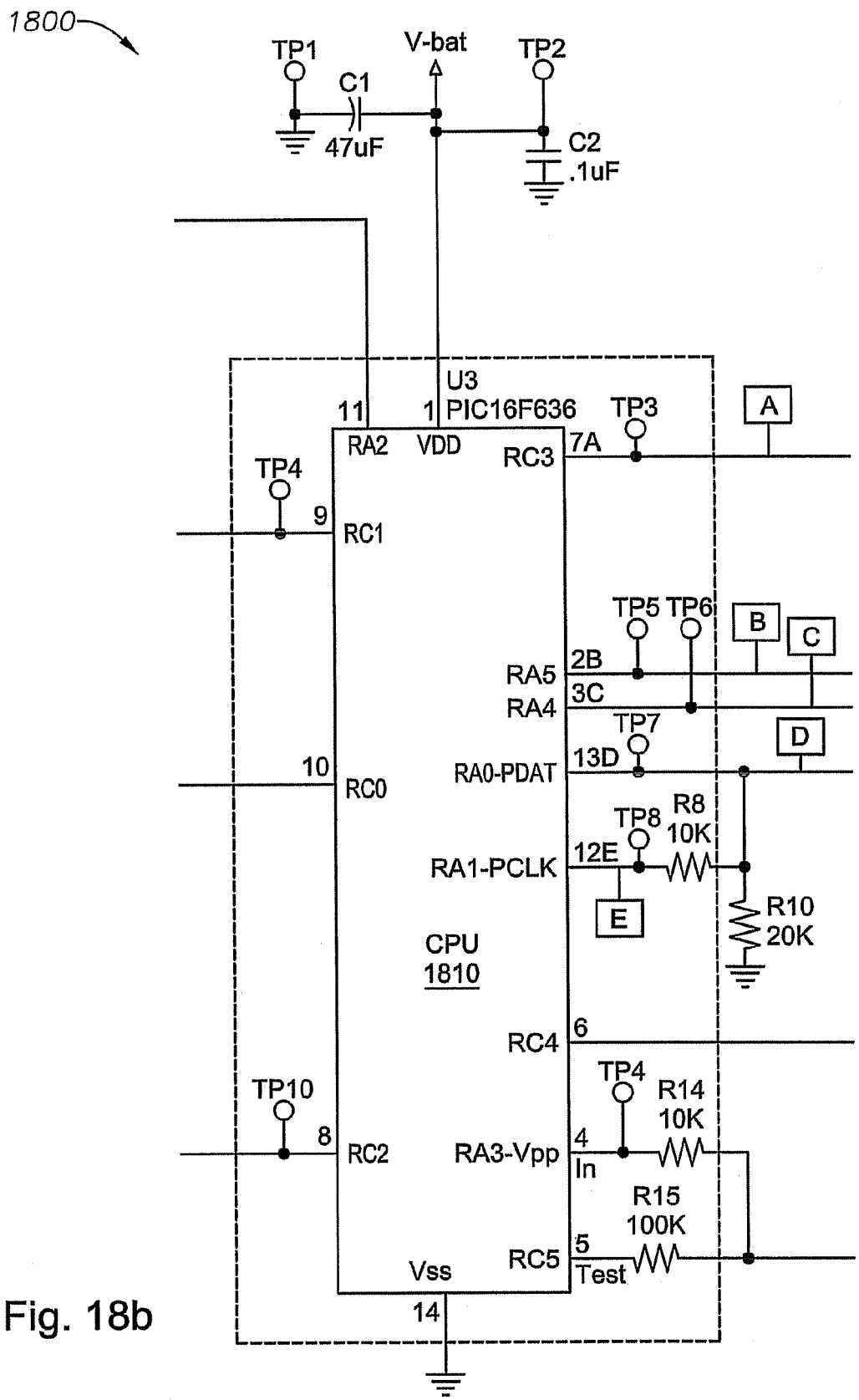
Figure 18C:
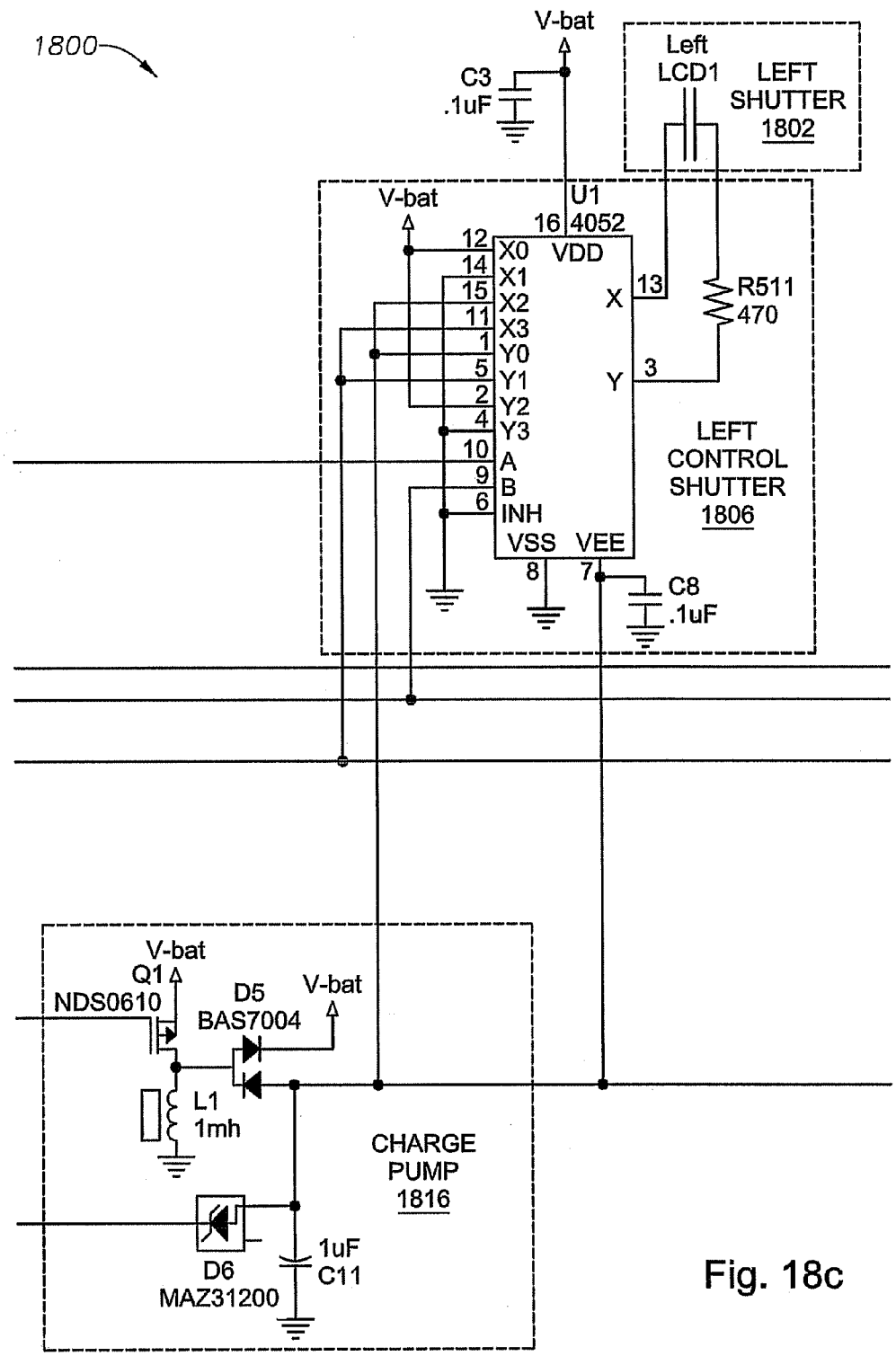

Referring now to FIG. 17, in an exemplary embodiment, the 3D glasses 104 further include a charge pump 1700 operably coupled to the CPU 114, the shutter controllers, 116 and 118, the battery 120 for converting the output voltage of the battery to a higher output voltage for use in operating the shutter controllers.

Referring to FIGS. 18, 18a, 18b, 18c and 18d, an exemplary embodiment of 3D glasses 1800 is provided that is substantially identical in design and operation as the 3D glasses 104 illustrated and described above except as noted below. The 3D glasses 1800 include a left shutter 1802, a right shutter 1804, a left shutter controller 1806, a right shutter controller 1808, a CPU 1810, a battery sensor 1812, a signal sensor 1814 and a charge pump 1816. In an exemplary embodiment, the design and operation of the left shutter 1802, the right shutter 1804, the left shutter controller 1806, the right shutter controller 1808, the CPU 1810, the battery sensor 1812, the signal sensor 1814, and the charge pump 1816 of the 3D glasses 1800 are substantially identical to the left shutter 106, the right shutter 108, the left shutter controller 116, the right shutter controller 118, the CPU 114, the battery sensor 122, the signal sensor 112, and the charge pump 1700 of the 3D glasses 104 described and illustrated above.

In an exemplary embodiment, the 3D glasses 1800 include the following components:

| NAME | VALUE/ID |
|---|---|
| R12 | 10K |
| R9 | 100K |
| D3 | BAS7004 |
| R6 | 4.7K |
| D2 | BP104FS |
| R1 | 10M |
| C5 | .1 uF |
| R5 | 20K |
| U5-2 | MCP6242 |
| R3 | 10K |
| C6 | .1 uF |
| C7 | .001 uF |
| C10 | .33 uF |
| R7 | 1M |
| D1 | BAS7004 |
| R2 | 330K |
| U5-1 | MCP6242 |
| R4 | 1M |
| R11 | 330K |
| U6 | MCP111 |
| R13 | 100K |
| U3 | PIC16F636 |
| C1 | 47 uF |
| C2 | .1 uF |
| R8 | 10K |
| R10 | 20K |
| R14 | 10K |
| R15 | 100K |
| Q1 | NDS0610 |
| D6 | MAZ31200 |
| D5 | BAS7004 |
| L1 | 1 mh |

-continued

| NAME | VALUE/ID |
|---|---|
| C11 | 1 uF |
| C3 | .1 uF |
| U1 | 4052 |
| R511 | 470 |
| C8 | .1 uF |
| C4 | .1 uF |
| U2 | 4052 |
| R512 | 470 |
| C1 | 47 uF |
| C11 | 1 uF |
| Left Lens | LCD 1 |
| Right Lens | LCD 2 |
| BT1 | 3 V Li |

In an exemplary embodiment, the left shutter controller 1806 includes a digitally controlled analog switch U1 that, under the control of the CPU 1810, depending upon the mode of operation, applies a voltage across the left shutter 1802 for controlling the operation of the left shutter. In similar fashion, the right shutter controller 1808 includes a digitally controller analog switch U2 that, under the control of the CPU 1810, depending upon the mode of operation, applies a voltage across the right shutter 1804 for controlling the operation of the right shutter. In an exemplary embodiment, U1 and U2 are conventional commercially available digitally controlled analog switches available from Unisonic Technologies or Texas Instruments as part numbers, UTC 4052 and TI 4052, respectively.

As will be recognized by persons having ordinary skill in the art, the 4052 digitally controlled analog switch includes control input signals A, B and INHIBIT ("INH"), switch I/O signals X0, X1, X2, X3, Y0, Y1, Y2 and Y3, and output signals X and Y and further provides the following truth table:

| TRUTH TABLE ||||||
|---|---|---|---|---|---|
| Control Inputs |||||||
|  | Select ||||||
| Inhibit | B | A | ON Switches ||
| 0 | 0 | 0 | Y0 | X0 |
| 0 | 0 | 1 | Y1 | X1 |
| 0 | 1 | 0 | Y2 | X2 |
| 0 | 1 | 1 | Y3 | X3 |
| 1 | X | X | None ||

* X = Don't Care

Figure 19:
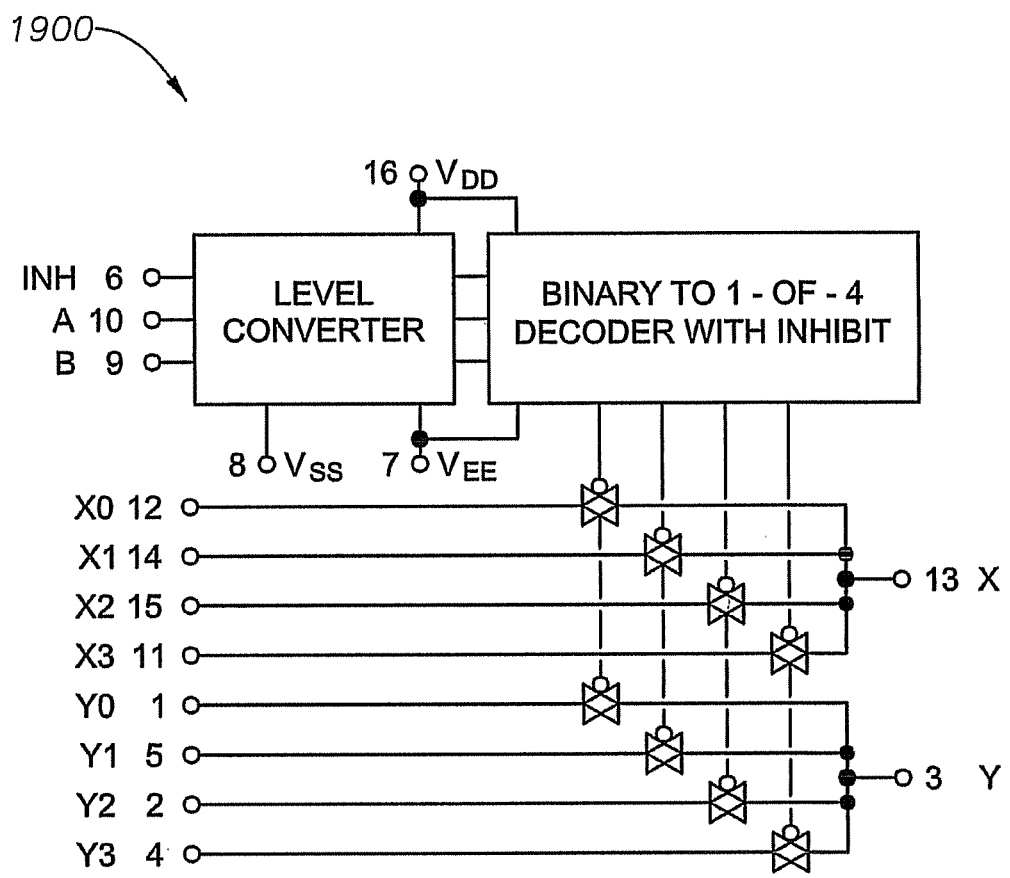
FIG. 19 is a schematic illustration of the digitally controlled analog switches of the shutter controllers of the 3D glasses of FIGS. 18, 18a, 18b, 18c and 18d.

And, as illustrated in FIG. 19, the 4052 digitally controlled analog switch also provides a functional diagram 1900. Thus, the 4052 digitally controlled analog switch provides a digitally controlled analog switch, each having two independent switches, that permits the left and right shutter controllers, 1806 and 1808, to selectively apply a controlled voltage across the left and right shutters, 1802 and 1804, to control the operation of the shutters.

In an exemplary embodiment, the CPU 1810 includes a microcontroller U3 for generating output signals A, B, C, D and E for controlling the operation of the digitally controlled analog switches, U1 and U2, of the left and right shutter controllers, 1806 and 1808. The output control signals A, B and C of the microcontroller U3 provide the following input control signals A and B to each of the digitally controlled analog switches, U1 and U2:

| U3 - Output Control Signals | U1 - Input Control Signals | U2 - Input Control Signals |
|---|---|---|
| A | A |  |
| B |  | A |
| C | B | B |

In an exemplary embodiment, the output control signals D and E of the microcontroller U3 provide, or otherwise affect, the switch I/O signals X0, X1, X2, X3, Y0, Y1, Y2 and Y3 of the digitally controlled analog switches, U1 and U2:

| U3 - Output Control Signals | U1 - Switch I/O Signals | U2 - Switch I/O Signals |
|---|---|---|
| D | X3, Y1 | X0, Y2 |
| E | X3, Y1 | X0, Y2 |

In an exemplary embodiment, the microcontroller U3 of the CPU 1810 is a model number PIC16F636 programmable microcontroller, commercially available from Microchip.

In an exemplary embodiment, the battery sensor 1812 includes a power detector U6 for sensing the voltage of the battery 120. In an exemplary embodiment, the power detector U6 is a model MCP111 micropower voltage detector, commercially available from Microchip.

In an exemplary embodiment, the signal sensor 1814 includes a photodiode D2 for sensing the transmission of the signals, including the sync signal and/or configuration data, by the signal transmitter 110. In an exemplary embodiment, the photodiode D2 is a model BP104FS photodiode, commercially available from Osram. In an exemplary embodiment, the signal sensor 1814 further includes operational amplifiers, U5-1 and U5-2, and related signal conditioning components, resistors R1, R2, R3, R4, R5, R6, R7, R9, R11, and R12, capacitors C5, C6, C7, and C10, and schottky diodes, D1 and D3.

In an exemplary embodiment, the charge pump 1816 amplifies the magnitude of the output voltage of the battery 120, using a charge pump, from 3V to −12V. In an exemplary embodiment, the charge pump 1816 includes a MOSFET Q1, a schottky diode D5, an inductor L1, and a zener diode D6. In an exemplary embodiment, the output signal of the charge pump 1816 is provided as input signals to switch I/O signals X2 and Y0 of the digitally controlled analog switch U1 of the left shutter controller 1806 and as input signals to switch I/O signals X3 and Y1 of the digitally controlled analog switch U2 of the right shutter controller 1808.

Figure 20:
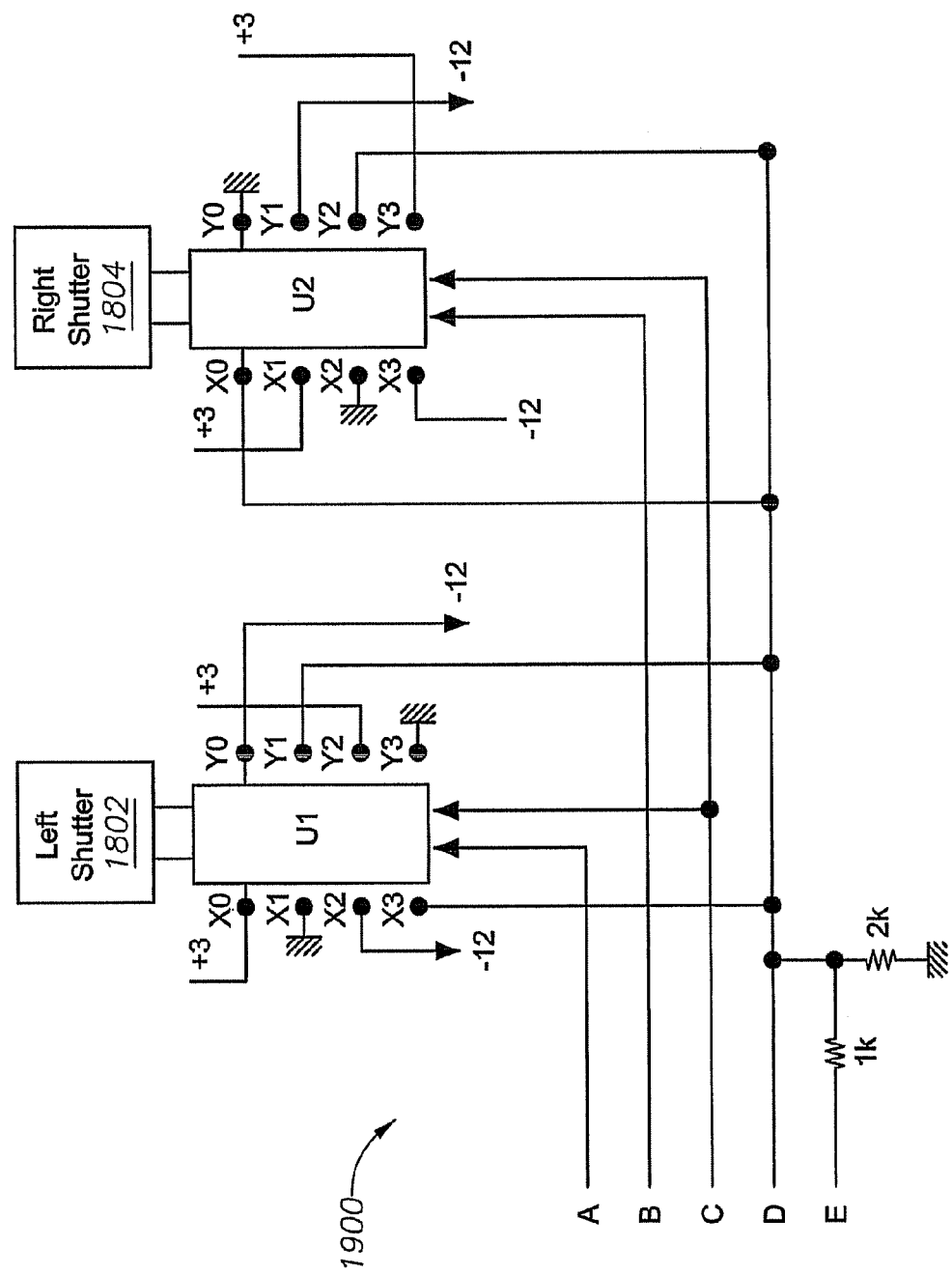
FIG. 20 is a schematic illustration of the digitally controlled analog switches of the shutter controllers, the shutters, and the control signals of the CPU of the 3D glasses of FIGS. 18, 18a, 18b, 18c and 18d.

As illustrated in FIG. 20, in an exemplary embodiment, during operation of the 3D glasses 1800, the digitally controlled analog switches, U1 and U2, under the control of the control signals A, B, C, D, and E of the CPU 1810, may provide various voltages across one or both of the left and right shutters, 1802 and 1804. In particular, the digitally controlled analog switches, U1 and U2, under the control of the control signals A, B, C, D, and E of the CPU 1810, may provide: 1) a positive or negative 15 volts across one or both of the left and right shutters, 1802 and 1804, 2) a positive or negative voltage, in the range of 2-3 volts, across one or both of the left and right shutters, or 3) provide 0 volts, i.e., a neutral state, across one or both of the left and right shutters. In an exemplary, embodiment, the digitally controlled analog switches, U1 and U2, under the control of the control signals A, B, C, D, and E of the CPU 1810, may provide 15 volts by, for example, combining +3 volts with −12 volts to achieve a differential of 15 volts across the one or both of the left and right shutters, 1802 and 1804. In an exemplary embodiment, the digitally controlled analog switches, U1 and U2, under the control of the control signals A, B, C, D, and E of the CPU 1810, may provide a 2 volt catch voltage, for example, by reducing the 3 volt output voltage of the battery 120 to 2 volts with a voltage divider, including components R8 and R10.

Alternatively, the digitally controlled analog switches, U1 and U2, under the control of the control signals A, B, C, D, and E of the CPU 1810, may provide: 1) a positive or negative 15 volts across one or both of the left and right shutters, 1802 and 1804, 2) a positive or negative voltage, of about 2 volts, across one or both of the left and right shutters, 3) a positive or negative voltage, of about 3 volts, across one or both of the left and right shutters, or 4) provide 0 volts, i.e., a neutral state, across one or both of the left and right shutters. In an exemplary embodiment, the digitally controlled analog switches, U1 and U2, under the control of the control signals A, B, C, D, and E of the CPU 1810, may provide 15 volts by, for example, combining +3 volts with −12 volts to achieve a differential of 15 volts across the one or both of the left and right shutters, 1802 and 1804. In an exemplary embodiment, the digitally controlled analog switches, U1 and U2, under the control of the control signals A, B, C, D, and E of the CPU 1810, may provide a 2 volt catch voltage, for example, by reducing the 3 volt output voltage of the battery 120 to 2 volts with a voltage divider, including components R8 and R10.

Figure 21:
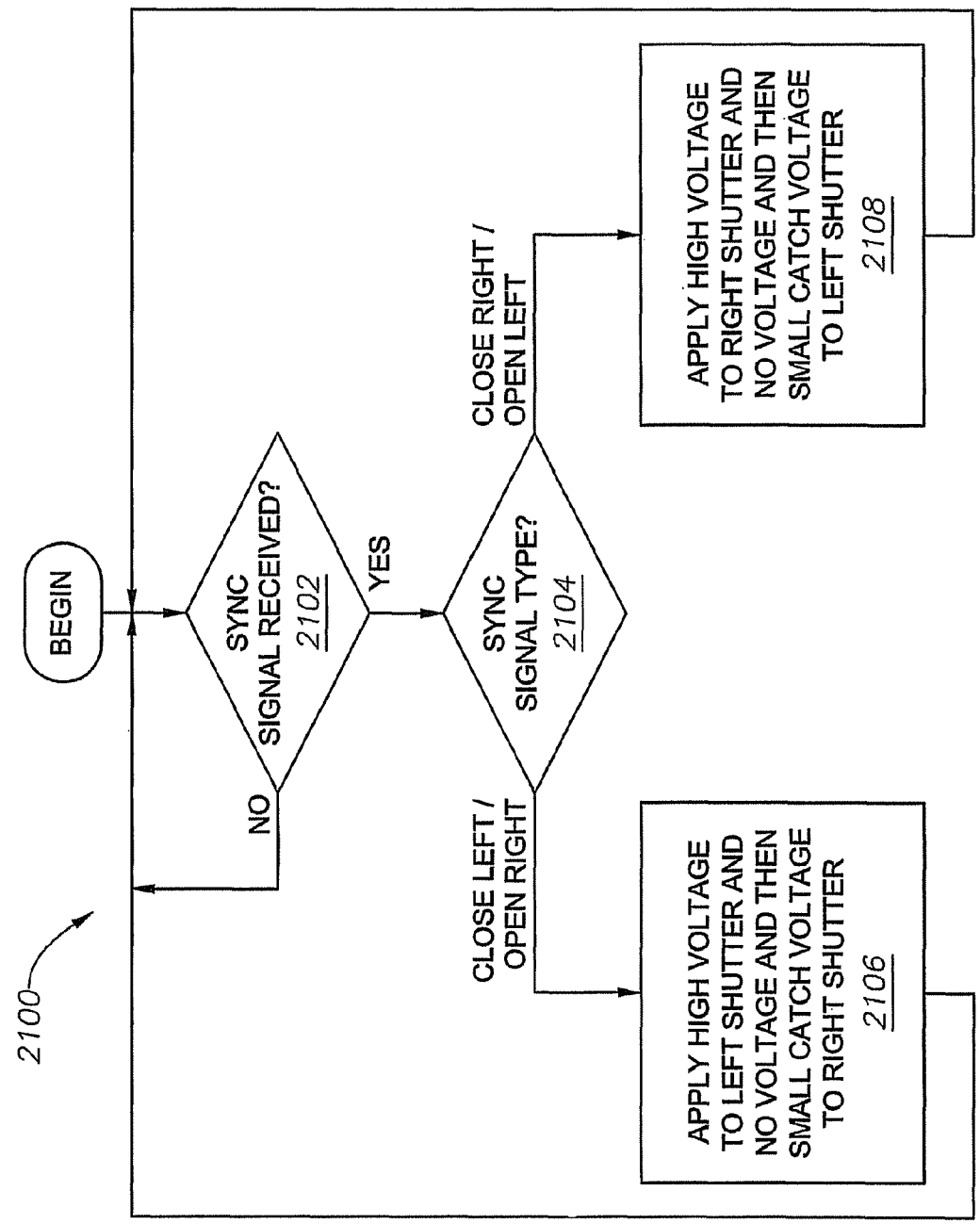
FIG. 21 is a flow chart illustration of an exemplary embodiment of the operation of the 3D glasses of FIGS. 18, 18a, 18b, 18c and 18d.
Figure 22:
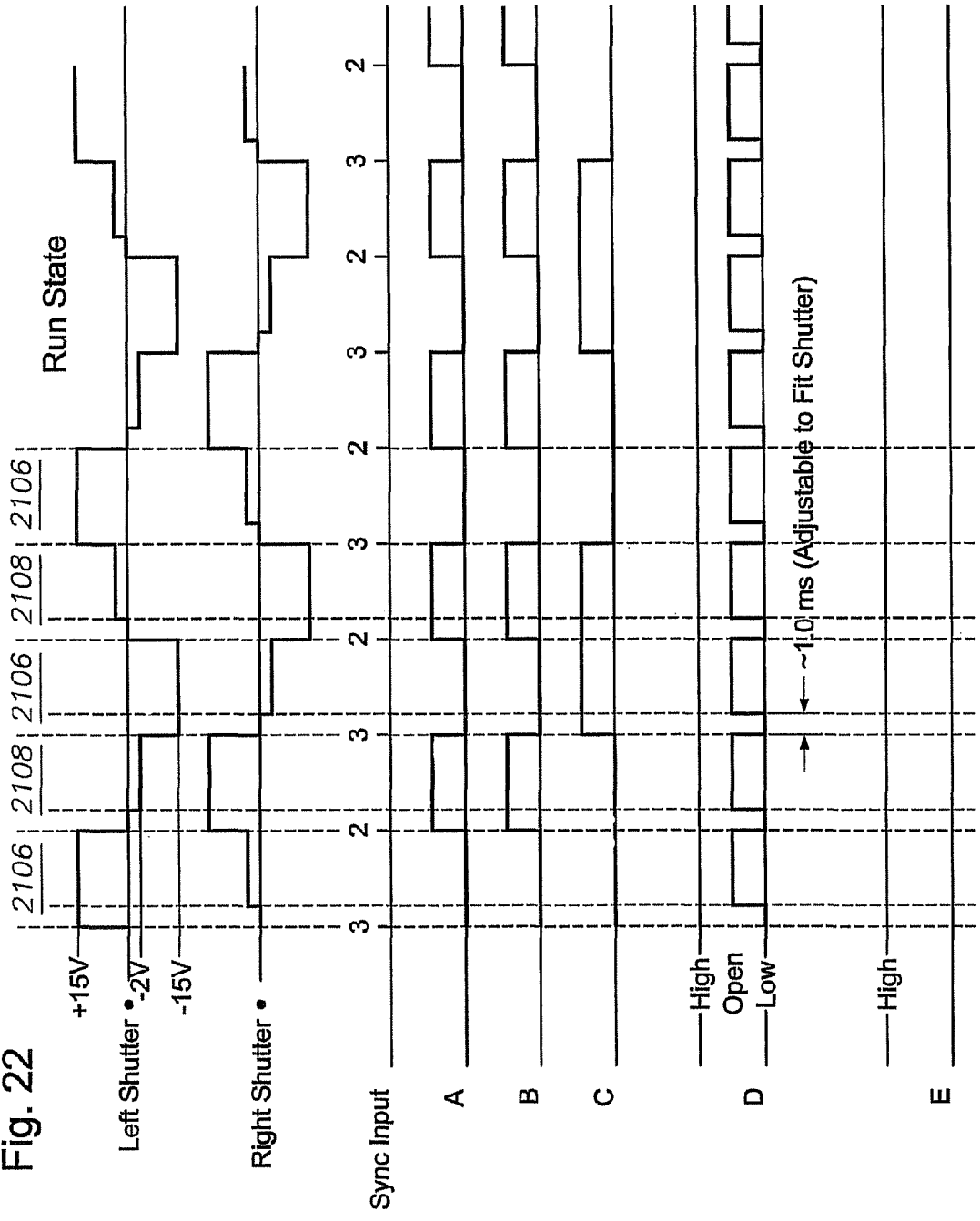
FIG. 22 is a graphical illustration of an exemplary embodiment of the operation of the 3D glasses of FIGS. 18, 18a, 18b, 18c and 18d.

Referring now to FIGS. 21 and 22, in an exemplary embodiment, during the operation of the 3D glasses 1800, the 3D glasses execute a normal run mode of operation 2100 in which the control signals A, B, C, D and E generated by the CPU 1810 are used to control the operation of the left and right shutter controllers, 1806 and 1808, to in turn control the operation of the left and right shutters, 1802 and 1804, as a function of the type of sync signal detected by the signal sensor 1814.

In particular, in 2102, if the CPU 1810 determines that the signal sensor 1814 has received a sync signal, then, in 2104, the CPU determines the type of sync signal received. In an exemplary embodiment, a sync signal that includes 3 pulses indicates that the left shutter 1802 should be closed and the right shutter 1804 should be opened while a sync signal that includes 2 pulses indicates that the left shutter should be opened and the right shutter should be closed. More generally, any number of different pulses may used to control the opening and closing of the left and right shutters, 1802 and 1804.

If, in 2104, the CPU 1810 determines that sync signal received indicates that the left shutter 1802 should be closed and the right shutter 1804 should be opened, then the CPU transmits control signals A, B, C, D and E to the left and right shutter controllers, 1806 and 1808, in 2106, to apply a high voltage to the left shutter 1802 and no voltage followed by a small catch voltage to the right shutter 1804. In an exemplary embodiment, the magnitude of the high voltage applied to the left shutter 1802 in 2106 is 15 volts. In an exemplary embodiment, the magnitude of the catch voltage applied to the right shutter 1804 in 2106 is 2 volts. In an exemplary embodiment, the catch voltage is applied to the right shutter 1804 in 2106 by controlling the operational state of the control signal D, which can be either low, high or open, to be open thereby enabling the operation of the voltage divider components R8 and R10, and maintaining the control signal E at a high state. In an exemplary embodiment, the application of the catch voltage in 2106 to the right shutter 1804 is delayed by a predetermined time period to allow faster rotation of the molecules within the liquid crystals of the right shutter during the predetermined time period. The subsequent application of the catch voltage, after the expiration of the predetermined time period, then prevents the molecules within the liquid crystals in the right shutter 1804 from rotating too far during the opening of the right shutter.

Alternatively, if, in 2104, the CPU 1820 determines that sync signal received indicates that the left shutter 1802 should be opened and the right shutter 1804 should be closed, then the CPU transmits control signals A, B, C, D and E to the left and right shutter controllers, 1806 and 1808, in 2108, to apply a high voltage to the right shutter 1804 and no voltage followed by a small catch voltage to the left shutter 1802. In an exemplary embodiment, the magnitude of the high voltage applied to the right shutter 1804 in 2108 is 15 volts. In an exemplary embodiment, the magnitude of the catch voltage applied to the left shutter 1802 in 2108 is 2 volts. In an exemplary embodiment, the catch voltage is applied to the left shutter 1802 in 2108 by controlling the control signal D to be open thereby enabling the operation of the voltage divider components R8 and R10, and maintaining the control signal E at a high level. In an exemplary embodiment, the application of the catch voltage in 2108 to the left shutter 1802 is delayed by a predetermined time period to allow faster rotation of the molecules within the liquid crystals of the left shutter during the predetermined time period. The subsequent application of the catch voltage, after the expiration of the predetermined time period, then prevents the molecules within the liquid crystals in the left shutter 1802 from rotating too far during the opening of the left shutter.

In an exemplary embodiment, during the method 2100, the voltages applied to the left and right shutters, 1802 and 1804, are alternately positive and negative in subsequent repetitions of the steps 2106 and 2108 in order to prevent damage to the liquid crystal cells of the left and right shutters.

Thus, the method 2100 provides a NORMAL or RUN MODE of operation for the 3D glasses 1800.

Figure 23:
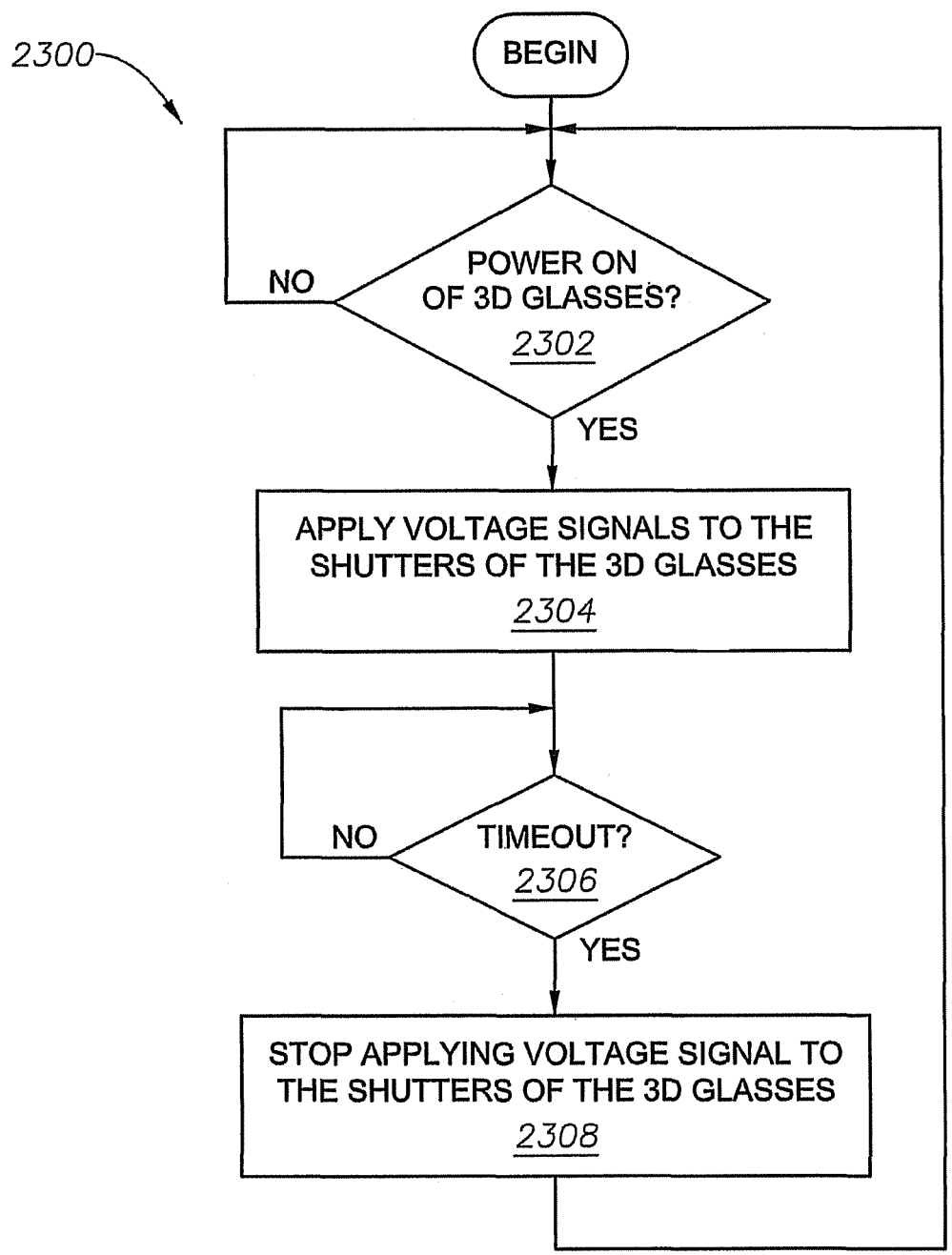
FIG. 23 is a flow chart illustration of an exemplary embodiment of the operation of the 3D glasses of FIGS. 18, 18a, 18b, 18c and 18d.
Figure 24:
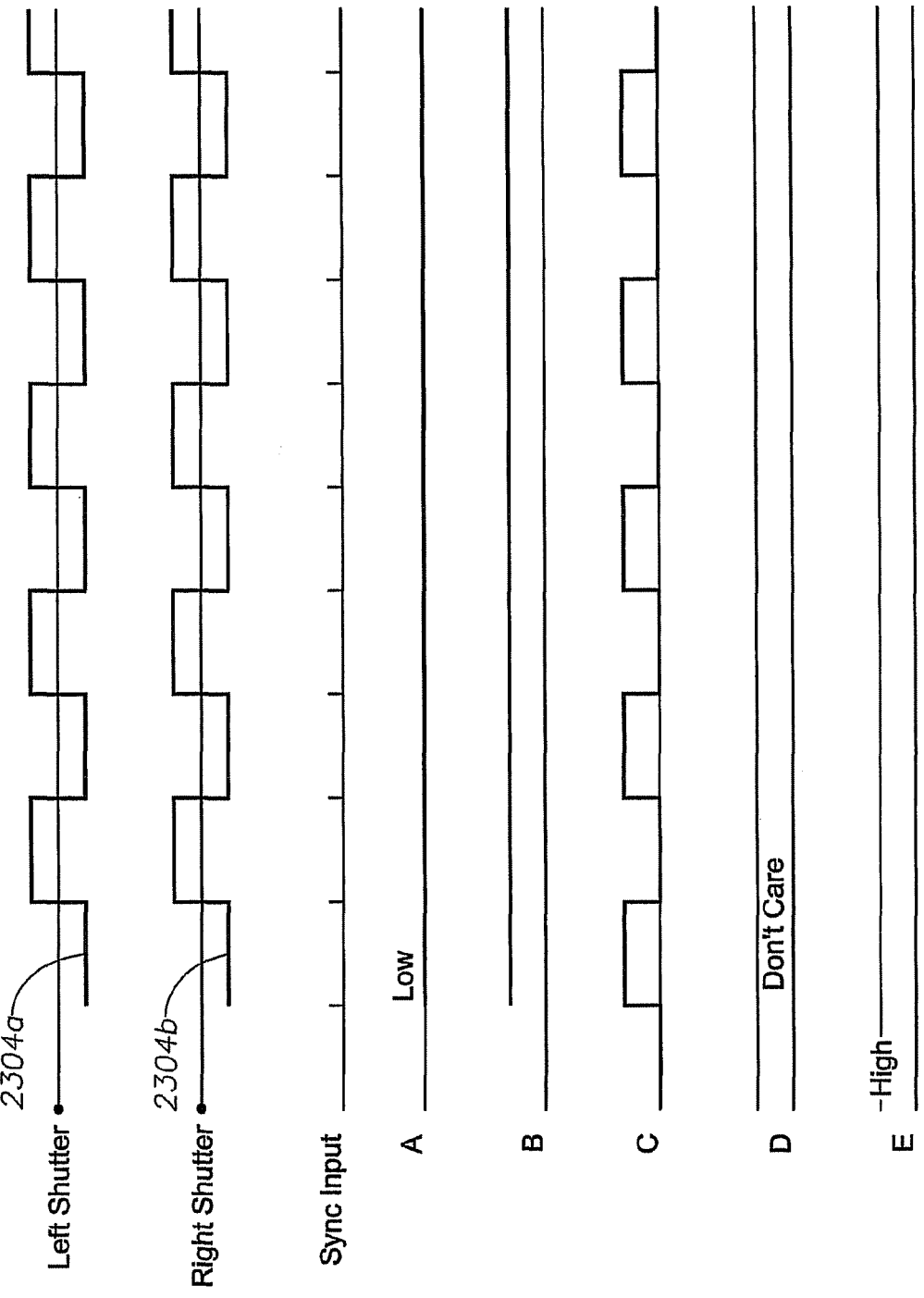
FIG. 24 is a graphical illustration of an exemplary embodiment of the operation of the 3D glasses of FIGS. 18, 18a, 18b, 18c and 18d.

Referring now to FIGS. 23 and 24, in an exemplary embodiment, during operation of the 3D glasses 1800, the 3D glasses implement a warm up method 2300 of operation in which the control signals A, B, C, D and E generated by the CPU 1810 are used to control the operation of the left and right shutter controllers, 1806 and 1808, to in turn control the operation of the left and right shutters, 1802 and 1804.

In 2302, the CPU 1810 of the 3D glasses checks for a power on of the 3D glasses. In an exemplary embodiment, the 3D glasses 1810 may be powered on either by a user activating a power on switch or by an automatic wakeup sequence. In the event of a power on of the 3D glasses 1810, the shutters, 1802 and 1804, of the 3D glasses may, for example, require a warm-up sequence. The liquid crystal cells of the shutters, 1802 and 1804, that do not have power for a period of time may be in an indefinite state.

If the CPU 1810 of the 3D glasses 1800 detects a power on of the 3D glasses in 2302, then the CPU applies alternating voltage signals, 2304a and 2304b, to the left and right shutters, 1802 and 1804, respectively, in 2304. In an exemplary embodiment, the voltage applied to the left and right shutters, 1802 and 1804, is alternated between positive and negative peak values to avoid ionization problems in the liquid crystal cells of the shutter. In an exemplary embodiment, the voltage signals, 2304a and 2304b, may be at least partially out of phase with one another. In an exemplary embodiment, one or both of the voltage signals, 2304a and 2304b, may be alternated between a zero voltage and a peak voltage. In an exemplary embodiment, other forms of voltage signals may be applied to the left and right shutters, 1802 and 1804, such that the liquid crystal cells of the shutters are placed in a definite operational state. In an exemplary embodiment, the application of the voltage signals, 2304a and 2304b, to the left and right shutters, 1802 and 1804, causes the shutters to open and close, either at the same time or at different times. Alternatively, the application of the voltage signals, 2304a and 2304b, to the left and right shutters, 1802 and 1804, may causes the shutters to remain closed.

During the application of the voltage signals, 2304a and 2304b, to the left and right shutters, 1802 and 1804, the CPU 1810 checks for a warm up time out in 2306. If the CPU 1810 detects a warm up time out in 2306, then the CPU will stop the application of the voltage signals, 2304a and 2304b, to the left and right shutters, 1802 and 1804, in 2308.

In an exemplary embodiment, in 2304 and 2306, the CPU 1810 applies the voltage signals, 2304a and 2304b, to the left and right shutters, 1802 and 1804, for a period of time sufficient to actuate the liquid crystal cells of the shutters. In an exemplary embodiment, the CPU 1810 applies the voltage signals, 2304a and 2304b, to the left and right shutters, 1802 and 1804, for a period of two seconds. In an exemplary embodiment, the maximum magnitude of the voltage signals, 2304a and 2304b, may be 15 volts. In an exemplary embodiment, the time out period in 2306 may be two seconds. In an exemplary embodiment, the maximum magnitude of the voltage signals, 2304a and 2304b, may be greater or lesser than 15 volts, and the time out period may be longer or shorter. In an exemplary embodiment, during the method 2300, the CPU 1810 may open and close the left and right shutters, 1802 and 1804, at a different rate than would be used for viewing a movie. In an exemplary embodiment, in 2304, the voltage signals applied to the left and right shutters, 1802 and 1804, do not alternate and are applied constantly during the warm up time period and therefore the liquid crystal cells of the shutters may remain opaque for the entire warm up period. In an exemplary embodiment, the warm-up method 2300 may occur with or without the presence of a synchronization signal. Thus, the method 2300 provides a WARM UP mode of the operation for the 3D glasses 1800. In an exemplary embodiment, after implementing the warm up method 2300, the 3D glasses 1800 are placed in a NORMAL or RUN MODE of operation and may then implement the method 2100. Alternatively, in an exemplary embodiment, after implementing the warm up method 2300, the 3D glasses 1800 are placed in a CLEAR MODE of operation and may then implement the method 2500 described below.

Figure 25:
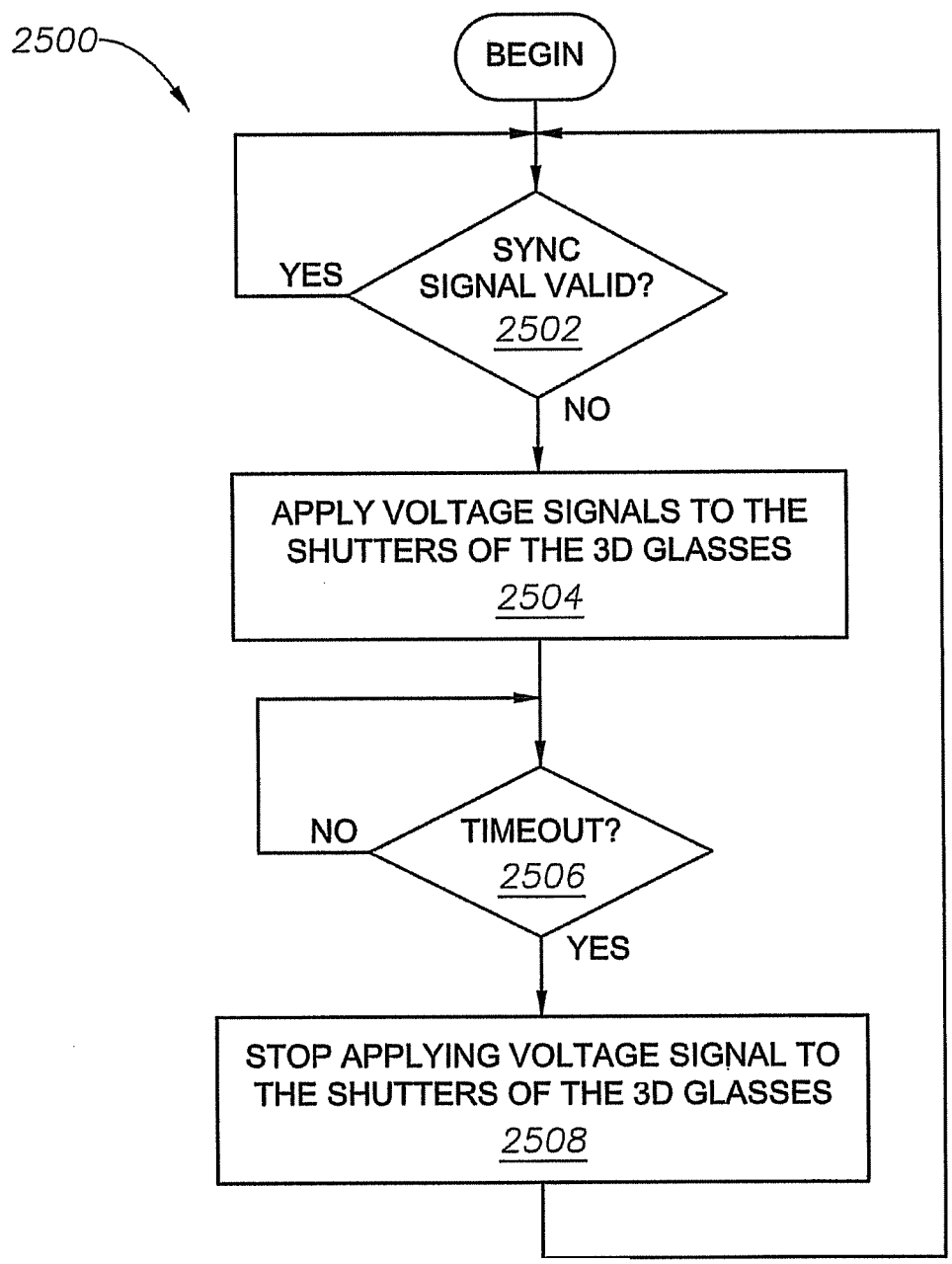
FIG. 25 is a flow chart illustration of an exemplary embodiment of the operation of the 3D glasses of FIGS. 18, 18a, 18b, 18c and 18d.
Figure 26:
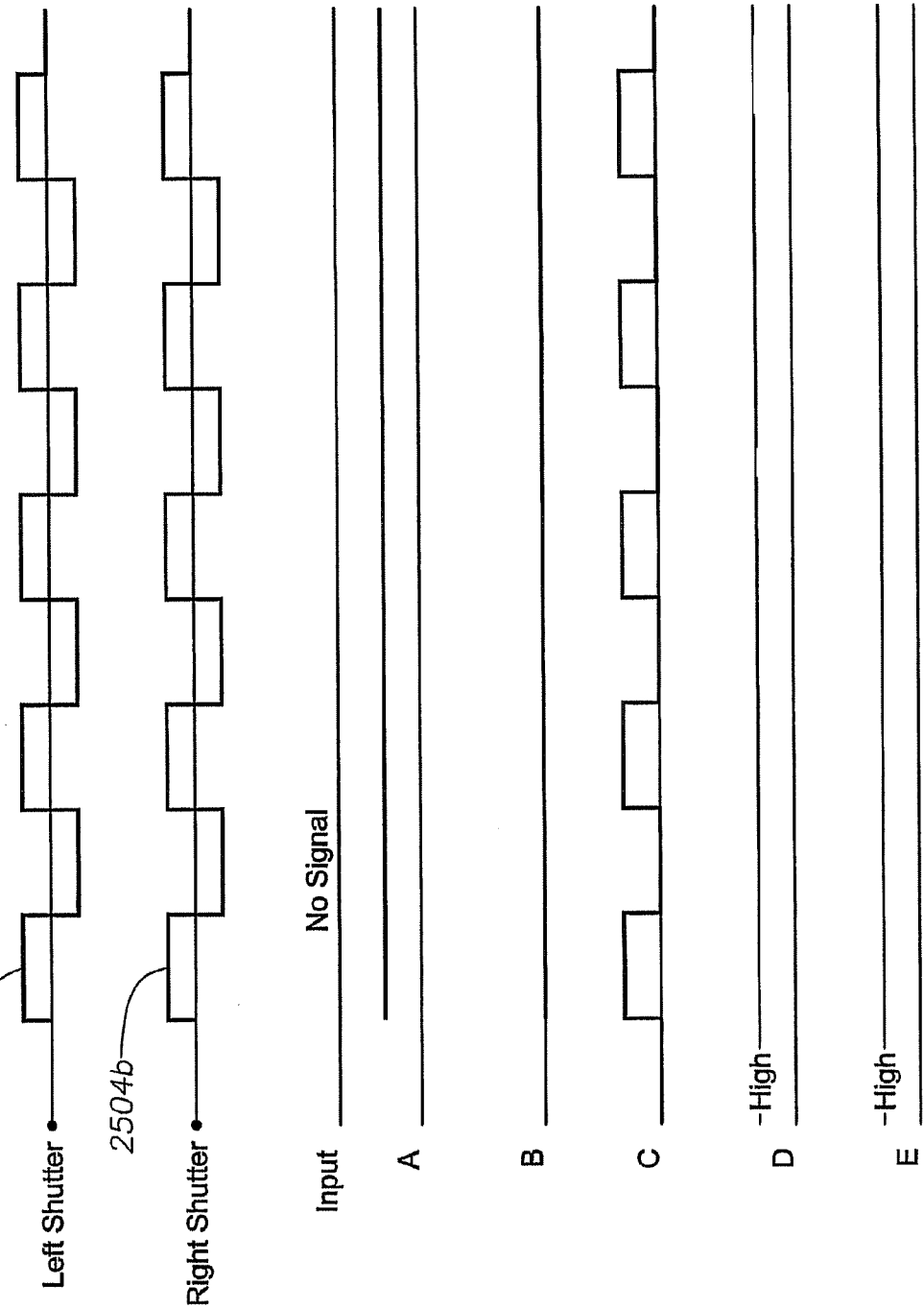
FIG. 26 is a graphical illustration of an exemplary embodiment of the operation of the 3D glasses of FIGS. 18, 18a, 18b, 18c and 18d.

Referring now to FIGS. 25 and 26, in an exemplary embodiment, during the operation of the 3D glasses 1800, the 3D glasses implement a method 2500 of operation in which the control signals A, B, C, D and E generated by the CPU 1810 are used to control the operation of the left and right shutter controllers, 1806 and 1808, to in turn control the operation of the left and right shutters, 1802 and 1804, as a function of the sync signal received by the signal sensor 1814.

In 2502, the CPU 1810 checks to see if the sync signal detected by the signal sensor 1814 is valid or invalid. If the CPU 1810 determines that the sync signal is invalid in 2502, then the CPU applies voltage signals, 2504a and 2504b, to the left and right shutters, 1802 and 1804, of the 3D glasses 1800 in 2504. In an exemplary embodiment, the voltage applied, 2504a and 2504b, to the left and right shutters, 1802 and 1804, is alternated between positive and negative peak values to avoid ionization problems in the liquid crystal cells of the shutter. In an exemplary embodiment, one or both of the voltage signals, 2504a and 2504b, may be alternated between a zero voltage and a peak voltage. In an exemplary embodiment, other forms of voltage signals may be applied to the left and right shutters, 1802 and 1804, such that the liquid crystal cells of the shutters remain open so that the user of the 3D glasses 1800 can see normally through the shutters. In an exemplary embodiment, the application of the voltage signals, 2504a and 2504b, to the left and right shutters, 1802 and 1804, causes the shutters to open.

During the application of the voltage signals, 2504a and 2504b, to the left and right shutters, 1802 and 1804, the CPU 1810 checks for a clearing time out in 2506. If the CPU 1810 detects a clearing time out in 2506, then the CPU 1810 will stop the application of the voltage signals, 2504a and 2504b, to the shutters, 1802 and 1804, in 2508.

Thus, in an exemplary embodiment, if the 3D glasses 1800 do not detect a valid synchronization signal, they may go to a clear mode of operation and implement the method 2500. In the clear mode of operation, in an exemplary embodiment, both shutters, 1802 and 1804, of the 3D glasses 1800 remain open so that the viewer can see normally through the shutters of the 3D glasses. In an exemplary embodiment, a constant voltage is applied, alternating positive and negative, to maintain the liquid crystal cells of the shutters, 1802 and 1804, of the 3D glasses 1800 in a clear state. The constant voltage could, for example, be in the range of 2-3 volts, but the constant voltage could be any other voltage suitable to maintain reasonably clear shutters. In an exemplary embodiment, the shutters, 1802 and 1804, of the 3D glasses 1800 may remain clear until the 3D glasses are able to validate an encryption signal and/or until a clearing mode time out. In an exemplary embodiment, the shutters, 1802 and 1804, of the 3D glasses 1800 may remain clear until the 3D glasses are able to validate an encryption signal and then may implement the method 2100 and/or if a time out occurs in 2506, then may implement the method 900. In an exemplary embodiment, the shutters, 1802 and 1804, of the 3D glasses 1800 may alternately open and close at a rate that allows the user of the 3D glasses to see normally.

Thus, the method 2500 provides a method of clearing the operation of the 3D glasses 1800 and thereby provide a CLEAR MODE of operation.

Figure 27:
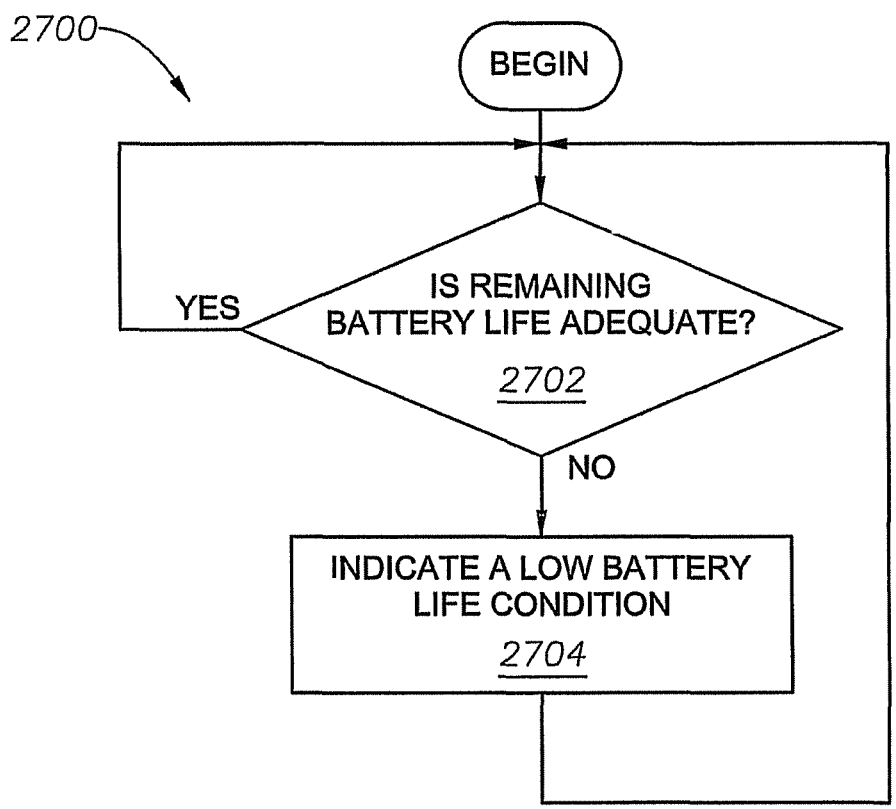
FIG. 27 is a flow chart illustration of an exemplary embodiment of the operation of the 3D glasses of FIGS. 18, 18a, 18b, 18c and 18d.
Figure 28:
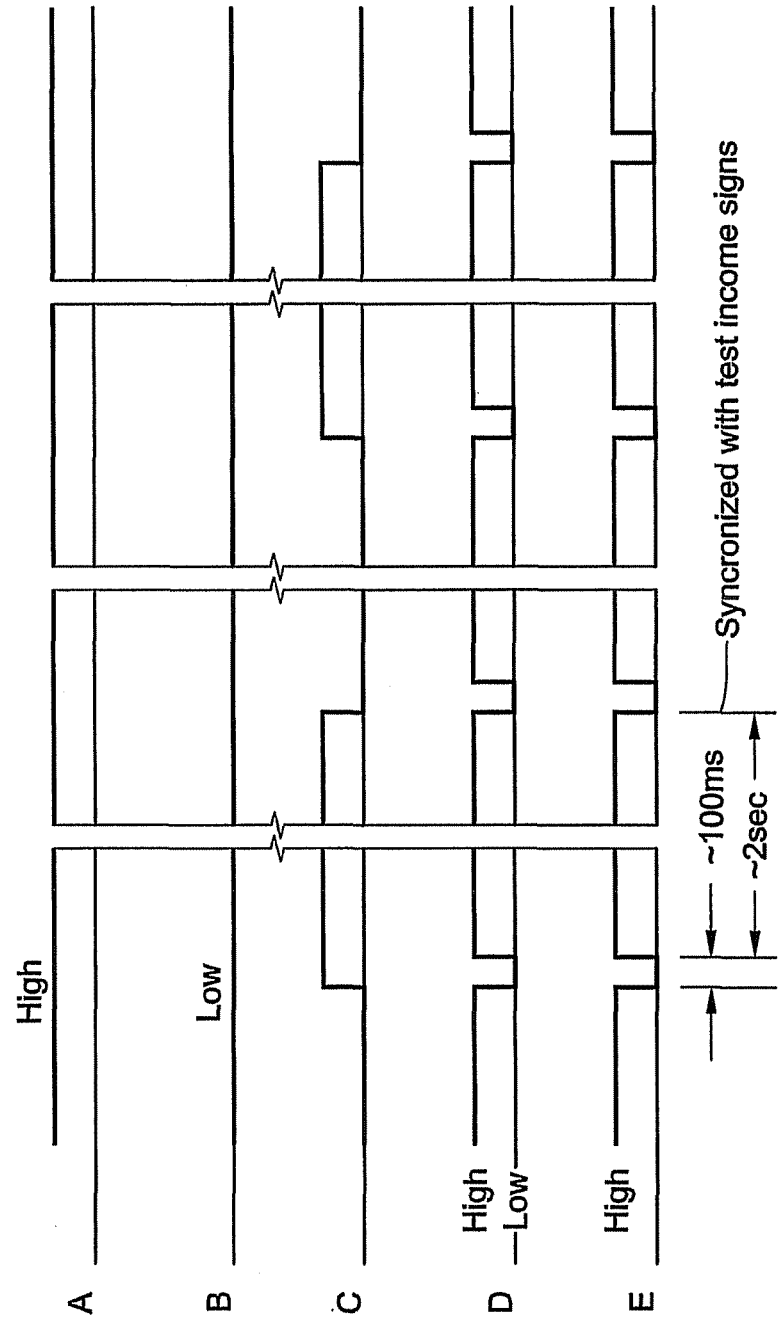
FIG. 28 is a graphical illustration of an exemplary embodiment of the operation of the 3D glasses of FIGS. 18, 18a, 18b, 18c and 18d.

Referring now to FIGS. 27 and 28, in an exemplary embodiment, during the operation of the 3D glasses 1800, the 3D glasses implement a method 2700 of monitoring the battery 120 in which the control signals A, B, C, D and E generated by the CPU 1810 are used to control the operation of the left and right shutter controllers, 1806 and 1808, to in turn control the operation of the left and right shutters, 1802 and 1804, as a function of the condition of the battery 120 as detected by battery sensor 1812.

In 2702, the CPU 1810 of the 3D glasses uses the battery sensor 1812 to determine the remaining useful life of the battery 120. If the CPU 1810 of the 3D glasses 1800 determines that the remaining useful life of the battery 120 is not adequate in 2702, then the CPU provides an indication of a low battery life condition in 2704.

In an exemplary embodiment, an inadequate remaining battery life may, for example, be any period less than 3 hours. In an exemplary embodiment, an adequate remaining battery life may be preset by the manufacturer of the 3D glasses 1800 and/or programmed by the user of the 3D glasses.

In an exemplary embodiment, in 2704, the CPU 1810 of the 3D glasses 1800 will indicate a low battery life condition by causing the left and right shutters, 1802 and 1804, of the 3D glasses to blink slowly, by causing the shutters to simultaneously blink at a moderate rate that is visible to the user of the 3D glasses, by flashing an indicator light, by generating an audible sound, and the like.

In an exemplary embodiment, if the CPU 1810 of the 3D glasses 1800 detects that the remaining battery life is insufficient to last for a specified period of time, then the CPU of the 3D glasses will indicate a low battery condition in 2704 and then prevent the user from turning on the 3D glasses.

In an exemplary embodiment, the CPU 1810 of the 3D glasses 1800 determines whether or not the remaining battery life is adequate every time the 3D glasses transition to the OFF MODE and/or to the CLEAR MODE of operation.

In an exemplary embodiment, if the CPU 1810 of the 3D glasses 1800 determines that the battery will last for at least the predetermined adequate amount of time, then the 3D glasses will continue to operate normally. Operating normally may, for example, include staying in the CLEAR MODE of operation for five minutes while checking for a signal from the signal transmitter 110 and then going to the OFF MODE or to a turn-on mode wherein the 3D glasses 1800 periodically wake up to check for a signal from the signal transmitter.

In an exemplary embodiment, the CPU 1810 of the 3D glasses 1800 checks for a low battery condition just before shutting off the 3D glasses. In an exemplary embodiment, if the battery 120 will not last for the predetermined adequate remaining life time, then the shutters, 1802 and 1804, will begin blinking slowly.

In an exemplary embodiment, if the battery 120 will not last for the predetermined adequate remaining life time, the shutters, 1802 and/or 1804, are placed into an opaque condition, i.e., the liquid crystal cells are closed, for two seconds and then placed into a clear condition, i.e., the liquid crystal cells are opened, for $1/10^{th}$ of a second. The time period that the shutters, 1802 and/or 1804, are closed and opened may be any time period. In an exemplary embodiment, the blinking of the shutters, 1802 and 1804, is synchronized with providing power to the signal sensor 1814 to permit the signal sensor to check for a signal from the signal transmitter 110.

In an exemplary embodiment, the 3D glasses 1800 may check for a low battery condition at any time including during warm up, during normal operation, during clear mode, during power off mode, or at the transition between any conditions. In an exemplary embodiment, if a low battery life condition is detected at a time when the viewer is likely to be in the middle of a movie, the 3D glasses 1800 may not immediately indicate the low battery condition.

In some embodiments, if the CPU 1810 of the 3D glasses 1800 detects a low battery level, the user will not be able to power the 3D glasses on.

Figure 29:
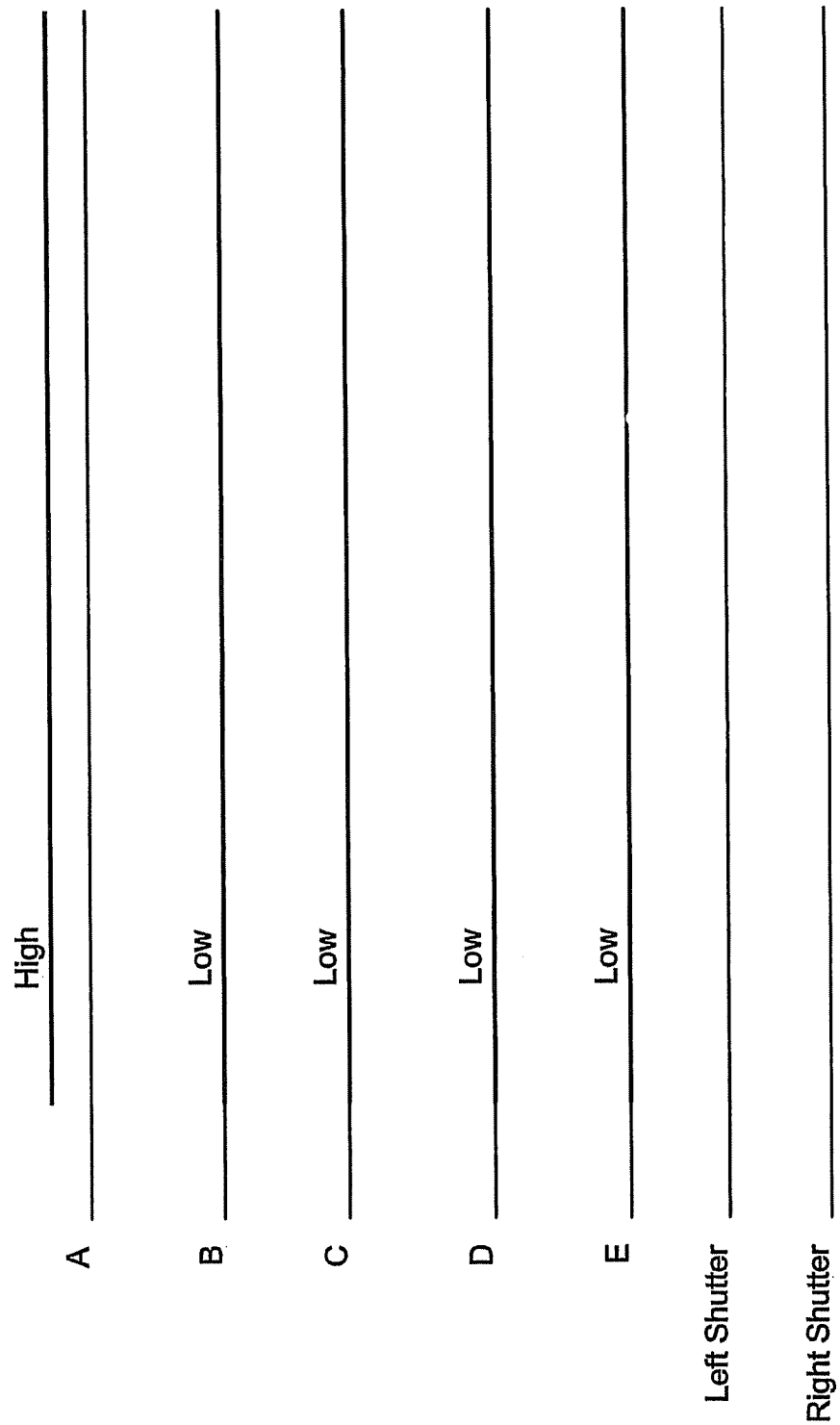
FIG. 29 is a graphical illustration of an exemplary embodiment of the operation of the 3D glasses of FIGS. 18, 18a, 18b, 18c and 18d.

Referring now to FIG. 29, in an exemplary embodiment, during the operation of the 3D glasses 1800, the 3D glasses implement a method for shutting down the 3D glasses in which the control signals A, B, C, D and E generated by the CPU 1810 are used to control the operation of the left and right shutter controllers, 1806 and 1808, to in turn control the operation of the left and right shutters, 1802 and 1804, as a function of the condition of the battery 120 as detected by the battery sensor 1812. In particular, if the user of 3D glasses 1800 selects shutting down the 3D glasses or the CPU 1810 selects shutting down the 3D glasses, then the voltage applied to the left and right shutters, 1802 and 1804, of the 3D glasses are both set to zero.

Referring to FIGS. 30, 30a, 30b and 30c, an exemplary embodiment of 3D glasses 3000 is provided that is substantially identical in design and operation as the 3D glasses 104 illustrated and described above except as noted below. The 3D glasses 3000 include a left shutter 3002, a right shutter 3004, a left shutter controller 3006, a right shutter controller 3008, common shutter controller 3010, a CPU 3012, a signal sensor 3014, a charge pump 3016, and a voltage supply 3018. In an exemplary embodiment, the design and operation of the left shutter 3002, the right shutter 3004, the left shutter controller 3006, the right shutter controller 3008, the CPU 3012, the signal sensor 3014, and the charge pump 3016 of the 3D glasses 3000 are substantially identical to the left shutter 106, the right shutter 108, the left shutter controller 116, the right shutter controller 118, the CPU 114, the signal sensor 112, and the charge pump 1700 of the 3D glasses 104 described and illustrated above, except as described below and illustrated herein.

In an exemplary embodiment, the 3D glasses 3000 include the following components:

| NAME | VALUE/ID |
| --- | --- |
| R13 | 10K |
| D5 | BAS7004 |
| R12 | 100K |
| D3 | BP104F |
| R10 | 2.2M |
| U5-1 | MIC863 |
| R3 | 10K |
| R7 | 10K |
| R8 | 10K |
| R5 | 1M |
| C7 | .001 uF |
| R9 | 47K |
| R11 | 1M |
| C1 | .1 uF |
| C9 | .1 uF |
| D1 | BAS7004 |
| R2 | 330K |
| U5-2 | MIC863 |
| U3 | MIC7211 |
| U2 | PIC16F636 |
| C3 | .1 uF |
| C12 | 47 uF |
| C2 | .1 uF |
| LCD1 | LEFT SHUTTER |
| C14 | .1 uF |
| LCD2 | RIGHT SHUTTER |
| U1 | 4053 |
| U6 | 4053 |
| C4 | .1 uF |
| U4 | 4053 |
| R14 | 10K |
| R15 | 100K |
| Q1 | NDS0610 |
| L1 | 1 mh |
| D6 | BAS7004 |
| D7 | MAZ31200 |
| C13 | 1 uF |
| C5 | 1 uF |
| Q2 | |
| R16 | 1M |
| R1 | 1M |
| BT1 | 3 V Li |

In an exemplary embodiment, the left shutter controller 3006 includes a digitally controlled analog switch U1 that, under the control of the common controller 3010, that includes a digitally controlled analog switch U4, and the CPU 3012, depending upon the mode of operation, applies a voltage across the left shutter 3002 for controlling the operation of the left shutter. In similar fashion, the right shutter controller 3008 includes a digitally controller analog switch U6 that, under the control of the common controller 3010 and the CPU 3012, depending upon the mode of operation, applies a voltage across the right shutter 3004 for controlling the operation of the right shutter 3004. In an exemplary embodiment, U1, U4 and U6 are conventional commercially available digitally controlled analog switches available from Unisonic Technologies as part number UTC 4053.

As will be recognized by persons having ordinary skill in the art, the UTC 4053 digitally controlled analog switch includes control input signals A, B, C and INHIBIT ("INH"), switch I/O signals X0, X1, Y0, Y1, Z0 and Z1, and output signals X, Y and Z, and further provides the following truth table:

TRUTH TABLE

| Control inputs | | | |
|---|---|---|---|
| Inhibit | Select C B A | | ON Switches UTC 4053 |
| 0 | 0 0 0 | | Z0 Y0 X0 |
| 0 | 0 0 1 | | Z0 Y0 X1 |
| 0 | 0 1 0 | | Z0 Y1 X0 |
| 0 | 0 1 1 | | Z0 Y1 X1 |
| 0 | 1 0 0 | | Z1 Y0 X0 |
| 0 | 1 0 1 | | Z1 Y0 X1 |
| 0 | 1 1 0 | | Z1 Y1 X0 |
| 0 | 1 1 1 | | Z1 Y1 X1 |
| 1 | x x x | | None | x = Don't Care

Figure 31:
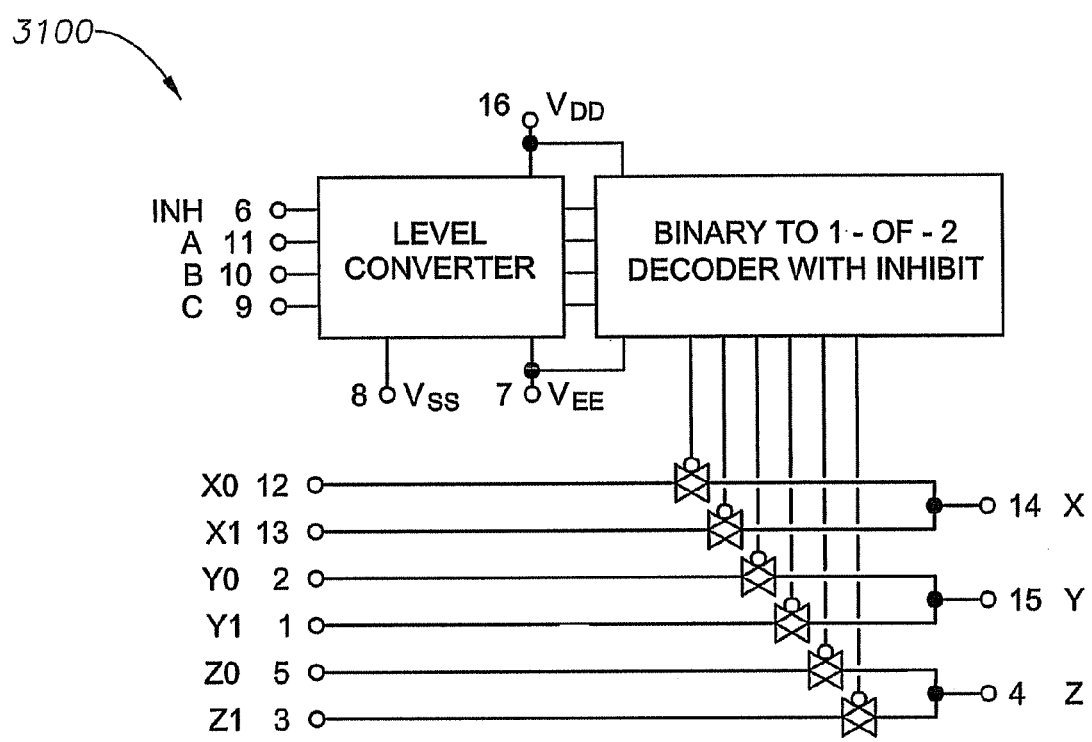
FIG. 31 is a schematic illustration of the digitally controlled analog switches of the shutter controllers of the 3D glasses of FIGS. 30, 30a, 30b and 30c.

And, as illustrated in FIG. 31, the UTC 4053 digitally controlled analog switch also provides a functional diagram 3100. Thus, the UTC 4053 provides a digitally controlled analog switch, each having three independent switches, that permits the left and right shutter controllers, 3006 and 3008, and the common shutter controller 3010, under the control of the CPU 3012, to selectively apply a controlled voltage across the left and right shutters, 3002 and 3004, to control the operation of the shutters.

In an exemplary embodiment, the CPU 3012 includes a microcontroller U2 for generating output signals A, B, C, D, E, F and G for controlling the operation of the digitally controlled analog switches, U1, U6 and U4, of the left and right shutter controllers, 3006 and 3008, and the common shutter controller 3010.

The output control signals A, B, C, D, E, F and G of the microcontroller U2 provide the following input control signals A, B, C and INH to each of the digitally controlled analog switches, U1, U6 and U4:

| U2 - Output Control Signals | U1 - Input Control Signals | U6 - Input Control Signals | U4 - Input Control Signals |
|---|---|---|---|
| A | A, B | | |
| B | | A, B | |
| C | C | | INH |
| D | | | A |
| E | | | |
| F | | | C |
| G | | | B |

In an exemplary embodiment, input control signal INH of U1 is connected to ground and input control signals C and INH of U6 are connected ground.

In an exemplary embodiment, the switch I/O signals X0, X1, Y0, Y1, Z0 and Z1 of the digitally controlled analog switches, U1, U6 and U4, are provided with the following inputs:

| U1 - Switch I/O Signals | INPUT For U1 | U6 - Switch I/O Signals | INPUT For U6 | U4 - Switch I/O Signals | INPUT For U4 |
|---|---|---|---|---|---|
| X0 | X of U4 | X0 | Z of U1 Y of U4 | X0 | Z of U4 |

| U1 - Switch I/O Signals | INPUT For U1 | U6 - Switch I/O Signals | INPUT For U6 | U4 - Switch I/O Signals | INPUT For U4 |
|---|---|---|---|---|---|
| X1 | V-bat | X1 | V-bat | X1 | output of charge pump 3016 |
| Y0 | V-bat | Y0 | V-bat | Y0 | Z of U4 |
| Y1 | X of U4 | Y1 | Z of U1 Y of U4 | Y1 | output of charge pump 3016 |
| Z0 | GND | Z0 | GND | Z0 | E of U2 |
| Z1 | X of U4 | Z1 | GND | Z1 | output of voltage supply 3018 |

In an exemplary embodiment, the microcontroller U2 of the CPU 3012 is a model number PIC16F636 programmable microcontroller, commercially available from Microchip.

In an exemplary embodiment, the signal sensor 3014 includes a photodiode D3 for sensing the transmission of the signals, including the sync signal and/or configuration data, by the signal transmitter 110. In an exemplary embodiment, the photodiode D3 is a model BP104FS photodiode, commercially available from Osram. In an exemplary embodiment, the signal sensor 3014 further includes operational amplifiers, U5-1, U5-2, and U3, and related signal conditioning components, resistors R2, R3, R5, R7, R8, R9, R10, R11, R12 and R13, capacitors C1, C7, and C9, and schottky diodes, D1 and D5, that may, for example, condition the signal by preventing clipping of the sensed signal by controlling the gain.

In an exemplary embodiment, the charge pump 3016 amplifies the magnitude of the output voltage of the battery 120, using a charge pump, from 3V to −12V. In an exemplary embodiment, the charge pump 3016 includes a MOSFET Q1, a schottky diode D6, an inductor L1, and a zener diode D7. In an exemplary embodiment, the output signal of the charge pump 3016 is provided as input signals to switch I/O signals X1 and Y1 of the digitally controlled analog switch U4 of the common shutter controller 3010 and as input voltage VEE to the digitally controlled analog switches U1, U6, and U4 of the left shutter controller 3006, the right shutter controller 3008, and the common shutter controller 3010.

In an exemplary embodiment, the voltage supply 3018 includes a transistor Q2, a capacitor C5, and resistors R1 and R16. In an exemplary embodiment, the voltage supply 3018 provides 1V signal as an input signal to switch I/O signal Z1 of the digitally controlled analog switch U4 of the common shutter controller 3010. In an exemplary embodiment, the voltage supply 3018 provides a ground lift.

Figure 32:
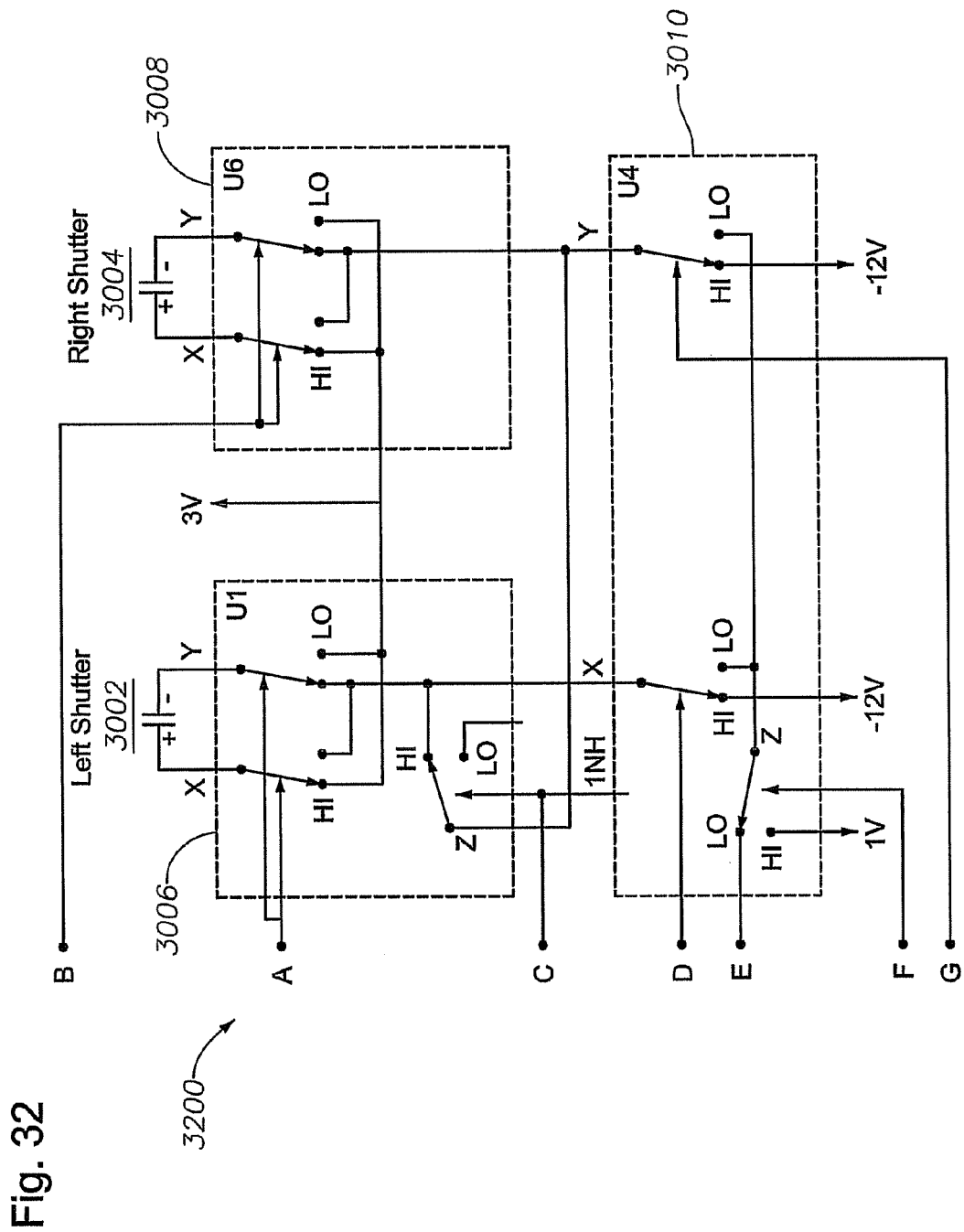
FIG. 32 is a schematic illustration of the operation of the digitally controlled analog switches of the shutter controllers of the 3D glasses of FIGS. 30, 30a, 30b and 30c.

As illustrated in FIG. 32, in an exemplary embodiment, during operation of the 3D glasses 3000, the digitally controlled analog switches, U1, U6 and U4, under the control of the control signals A, B, C, D, E, F and G of the CPU 3012, may provide various voltages across one or both of the left and right shutters, 3002 and 3004. In particular, the digitally controlled analog switches, U1, U6 and U4, under the control of the control signals A, B, C, D, E, F and G of the CPU 3012, may provide: 1) a positive or negative 15 volts across one or both of the left and right shutters, 3002 and 3004, 2) a positive or negative 2 volts across one or both of the left and right shutters, 3) a positive or negative 3 volts across one or both of the left and right shutters, and 4) provide 0 volts, i.e., a neutral state, across one or both of the left and right shutters.

In an exemplary embodiment, as illustrated in FIG. 32, the control signal A controls the operation of left shutter 3002 and the control signal B controls the operation of the right shutter 3004 by controlling the operation of the switches within the digitally controlled analog switches, U1 and U6, respectively, that generate output signals X and Y that are applied across the left and right shutters. In an exemplary embodiment, the control inputs A and B of each of the digitally controlled analog switches U1 and U6 are connected together so that switching between two pairs of input signals occurs simultaneously and the selected inputs are forwarded to terminals of the left and right shutters, 3002 and 3004. In an exemplary embodiment, control signal A from the CPU 3012 controls the first two switches in the digitally controlled analog switch U1 and control signal B from the CPU controls first two switches in the digitally controlled analog switch U6.

In an exemplary embodiment, as illustrated in FIG. 32, one of the terminals of each of the left and right shutters, 3002 and 3004, are always connected to 3V. Thus, in an exemplary embodiment, the digitally controlled analog switches U1, U6 and U4, under the control of the control signals A, B, C, D, E, F and G of the CPU 3012, are operated to bring either −12V, 3V, 1V or 0V to the other terminals of the left and right shutters, 3002 and 3004. As a result, in an exemplary embodiment, the digitally controlled analog switches U1, U6 and U4, under the control of the control signals A, B, C, D, E, F and G of the CPU 3012, are operated to generate a potential difference of 15V, 0V, 2V or 3V across the terminals of the left and right shutters, 3002 and 3004.

In an exemplary embodiment, the third switch of the digitally controlled analog switch U6 is not used and all of the terminals for the third switch are grounded. In an exemplary embodiment, the third switch of the digitally controlled analog switch U1 is used for power saving.

In particular, in an exemplary embodiment, as illustrated in FIG. 32, the control signal C controls the operation of the switch within the digitally controlled analog switch U1 that generates the output signal Z. As a result, when the control signal C is a digital high value, the input signal INH for the digitally controlled analog switch U4 is also a digital high value thereby causing all of the output channels of the digitally controlled analog switch U4 to be off. As a result, when the control signal C is a digital high value, the left and right shutters, 3002 and 3004, are short circuited thereby permitting half of the charge to be transferred between the shutters thereby saving power and prolonging the life of the battery 120.

In an exemplary embodiment, by using the control signal C to short circuit the left and right shutters, 3002 and 3004, the high amount of charge collected on one shutter that is in the closed state can be used to partially charge the other shutter just before it goes to the closed state, therefore saving the amount of charge that would otherwise have to be fully provided by the battery 120.

In an exemplary embodiment, when the control signal C generated by the CPU 3012 is a digital high value, for example, the negatively charged plate, −12V, of the left shutter 3002, then in the closed state and having a 15V potential difference there across, is connected to the more negatively charged plate of the right shutter 3004, then in the open state and still charged to +1V and having a 2V potential difference there across. In an exemplary embodiment, the positively charged plates on both shutters, 3002 and 3004, will be charged to +3V. In an exemplary embodiment, the control signal C generated by the CPU 3012 goes to a digital high value for a short period of time near the end of the closed state of the left shutter 3002 and just before the closed state of the right shutter 3004. When the control signal C generated by the CPU 3012 is a digital high value, the inhibit terminal INH on the digitally controlled analog switch U4 is also a digital high value. As a result, in an exemplary embodiment, all of the output channels, X, Y and Z, from U4 are in the off state. This allows the charge stored across the plates of the left and right shutters, 3002 and 3004, to be distributed between the shutters so that the potential difference across both of the shutter is approximately 17/2V or 8.5V. Since one terminal of the shutters, 3002 and 3004, is always connected to 3V, the negative terminals of the shutters, 3002 and 3004, are then at −5.5V. In an exemplary embodiment, the control signal C generated by the CPU 3012 then changes to a digital low value and thereby disconnects the negative terminals of the shutters, 3002 and 3004, from one another. Then, in an exemplary embodiment, the closed state for the right shutter 3004 begins and the battery 120 further charges the negative terminal of the right shutter, by operating the digitally controlled analog switch U4, to −12V. As a result, in an exemplary experimental embodiment, a power savings of approximately 40% was achieved during a normal run mode of operation, as described below with reference to the method 3300, of the 3D glasses 3000.

In an exemplary embodiment, the control signal C generated by the CPU 3012 is provided as a short duration pulse that transitions from high to low when the control signals A or B, generated by the CPU, transition from high to low or low to high, to thereby start the next left shutter open/right shutter closed or right shutter open/left shutter closed.

Figure 33:
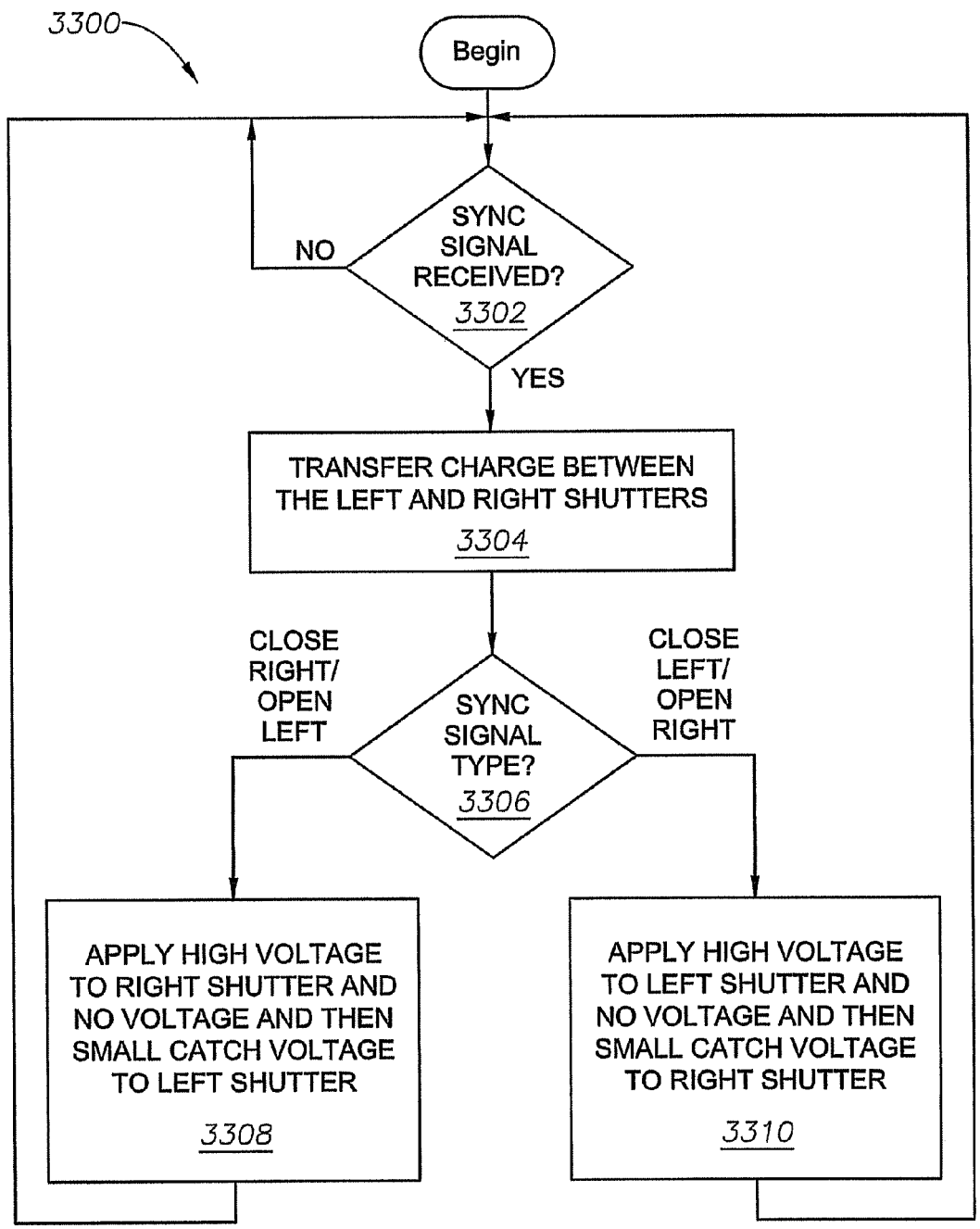
FIG. 33 is a flow chart illustration of an exemplary embodiment of the operation of the 3D glasses of FIGS. 30, 30a, 30b and 30c.
Figure 34:
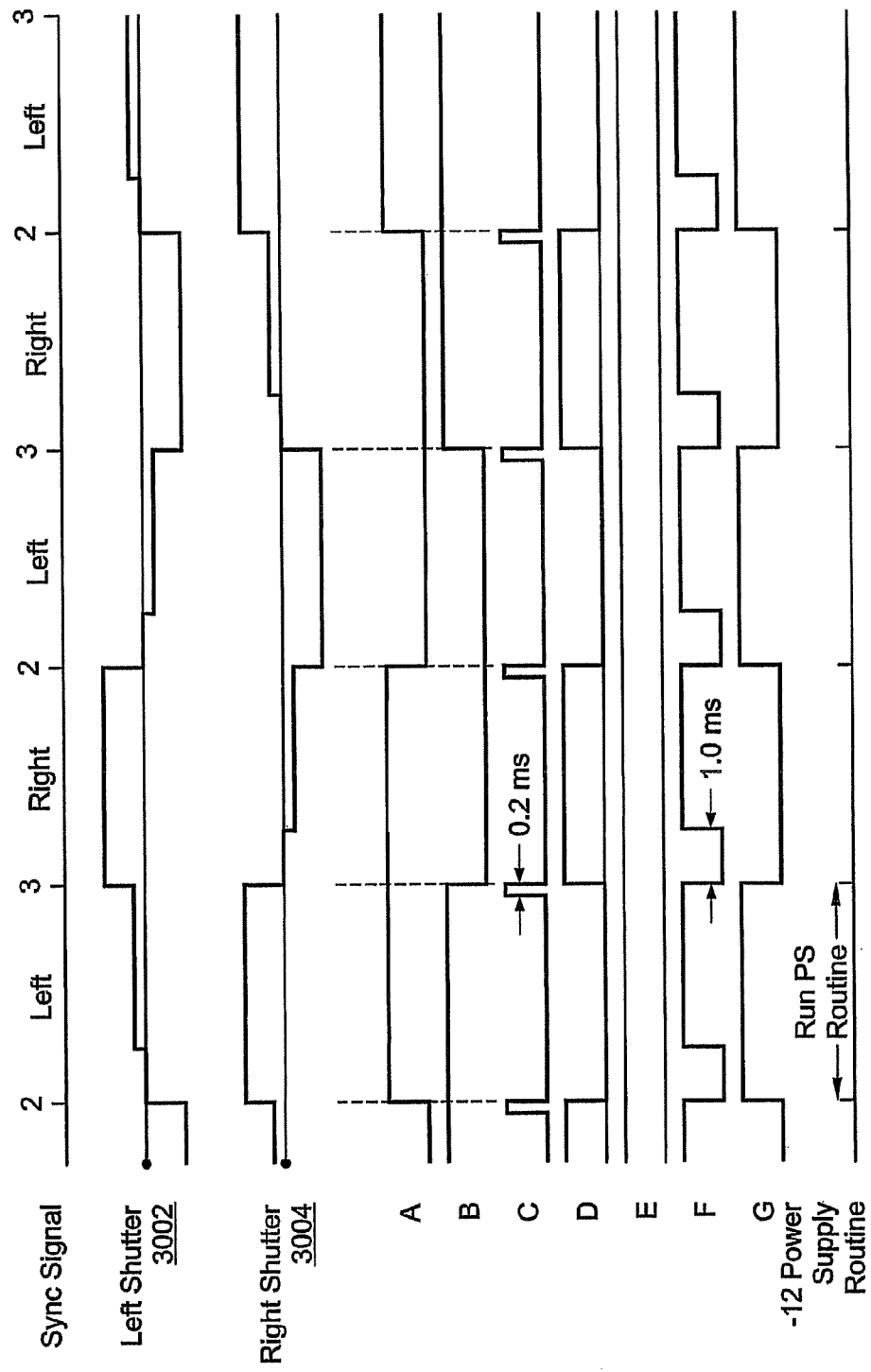
FIG. 34 is a graphical illustration of an exemplary embodiment of the operation of the 3D glasses of FIGS. 30, 30a, 30b and 30c.

Referring now to FIGS. 33 and 34, in an exemplary embodiment, during the operation of the 3D glasses 3000, the 3D glasses execute a normal run mode of operation 3300 in which the control signals A, B, C, D, E, F and G generated by the CPU 3012 are used to control the operation of the left and right shutter controllers, 3006 and 3008, and central shutter controller 3010, to in turn control the operation of the left and right shutters, 3002 and 3004, as a function of the type of sync signal detected by the signal sensor 3014.

In particular, in 3302, if the CPU 3012 determines that the signal sensor 3014 has received a sync signal, then, in 3304, control signals A, B, C, D, E, F and G generated by the CPU 3012 are used to control the operation of the left and right shutter controllers, 3006 and 3008, and central shutter controller 3010, to transfer charge between the left and right shutters, 3002 and 3004, as described above with reference to FIG. 32.

In an exemplary embodiment, in 3304, the control signal C generated by the CPU 3012 is set to a high digital value for approximately 0.2 milliseconds to thereby short circuit the terminals of the left and right shutters, 3002 and 3004, and thus transfer charge between the left and right shutters. In an exemplary embodiment, in 3304, the control signal C generated by the CPU 3012 is set to a high digital value for approximately 0.2 milliseconds to thereby short circuit the more negatively charged terminals of the left and right shutters, 3002 and 3004, and thus transfer charge between the left and right shutters. Thus, the control signal C is provided as a short duration pulse that transitions from high to low when, or before, the control signals A or B transition from high to low or from low to high. As a result, power savings is provided during the operation of the 3D glasses 3000 during the cycle of alternating between open left/closed right and closed left/opened right shutters.

The CPU 3012 then determines the type of sync signal received in 3306. In an exemplary embodiment, a sync signal that includes 2 pulses indicates that the left shutter 3002 should be opened and the right shutter 3004 should be closed while a sync signal that includes 3 pulses indicates that the right shutter should be opened and the left shutter should be closed. In an exemplary embodiment, other different numbers and formats of sync signals may be used to control the alternating opening and closing of the left and right shutters, 3002 and 3004.

If, in 3306, the CPU 3012 determines that sync signal received indicates that the left shutter 3002 should be opened and the right shutter 3004 should be closed, then the CPU transmits control signals A, B, C, D, E, F and G to the left and right shutter controllers, 3006 and 3008, and the common shutter controller 3010, in 3308, to apply a high voltage across the right shutter 3004 and no voltage followed by a small catch voltage to the left shutter 3002. In an exemplary embodiment, the magnitude of the high voltage applied across the right shutter 3004 in 3308 is 15 volts. In an exemplary embodiment, the magnitude of the catch voltage applied to the left shutter 3002 in 3308 is 2 volts. In an exemplary embodiment, the catch voltage is applied to the left shutter 3002 in 3308 by controlling the operational state of the control signal D to be low and the operational state of the control signal F, which may be either be low or high, to be high. In an exemplary embodiment, the application of the catch voltage in 3308 to the left shutter 3002 is delayed by a predetermined time period to allow faster rotation of the molecules within the liquid crystal of the left shutter. The subsequent application of the catch voltage, after the expiration of the predetermined time period, prevents the molecules within the liquid crystals in the left shutter 3002 from rotating too far during the opening of the left shutter. In an exemplary embodiment, the application of the catch voltage in 3308 to the left shutter 3002 is delayed by about 1 millisecond.

Alternatively, if, in 3306, the CPU 3012 determines that sync signal received indicates that the left shutter 3002 should be closed and the right shutter 3004 should be opened, then the CPU transmits control signals A, B, C, D, E, F and G to the left and right shutter controllers, 3006 and 3008, and the common shutter controller 3010, in 3310, to apply a high voltage across the left shutter 3002 and no voltage followed by a small catch voltage to the right shutter 3004. In an exemplary embodiment, the magnitude of the high voltage applied across the left shutter 3002 in 3310 is 15 volts. In an exemplary embodiment, the magnitude of the catch voltage applied to the right shutter 3004 in 3310 is 2 volts. In an exemplary embodiment, the catch voltage is applied to the right shutter 3004 in 3310 by controlling the control signal F to be high and the control signal G to be low. In an exemplary embodiment, the application of the catch voltage in 3310 to the right shutter 3004 is delayed by a predetermined time period to allow faster rotation of the molecules within the liquid crystal of the right shutter. The subsequent application of the catch voltage, after the expiration of the predetermined time period, prevents the molecules within the liquid crystals in the right shutter 3004 from rotating too far during the opening of the right shutter. In an exemplary embodiment, the application of the catch voltage in 3310 to the right shutter 3004 is delayed by about 1 millisecond.

In an exemplary embodiment, during the method 3300, the voltages applied to the left and right shutters, 3002 and 3004, are alternately positive and negative in subsequent repetitions of the steps 3308 and 3310 in order to prevent damage to the liquid crystal cells of the left and right shutters.

Thus, the method 3300 provides a NORMAL or RUN MODE of operation for the 3D glasses 3000.

Figure 35:
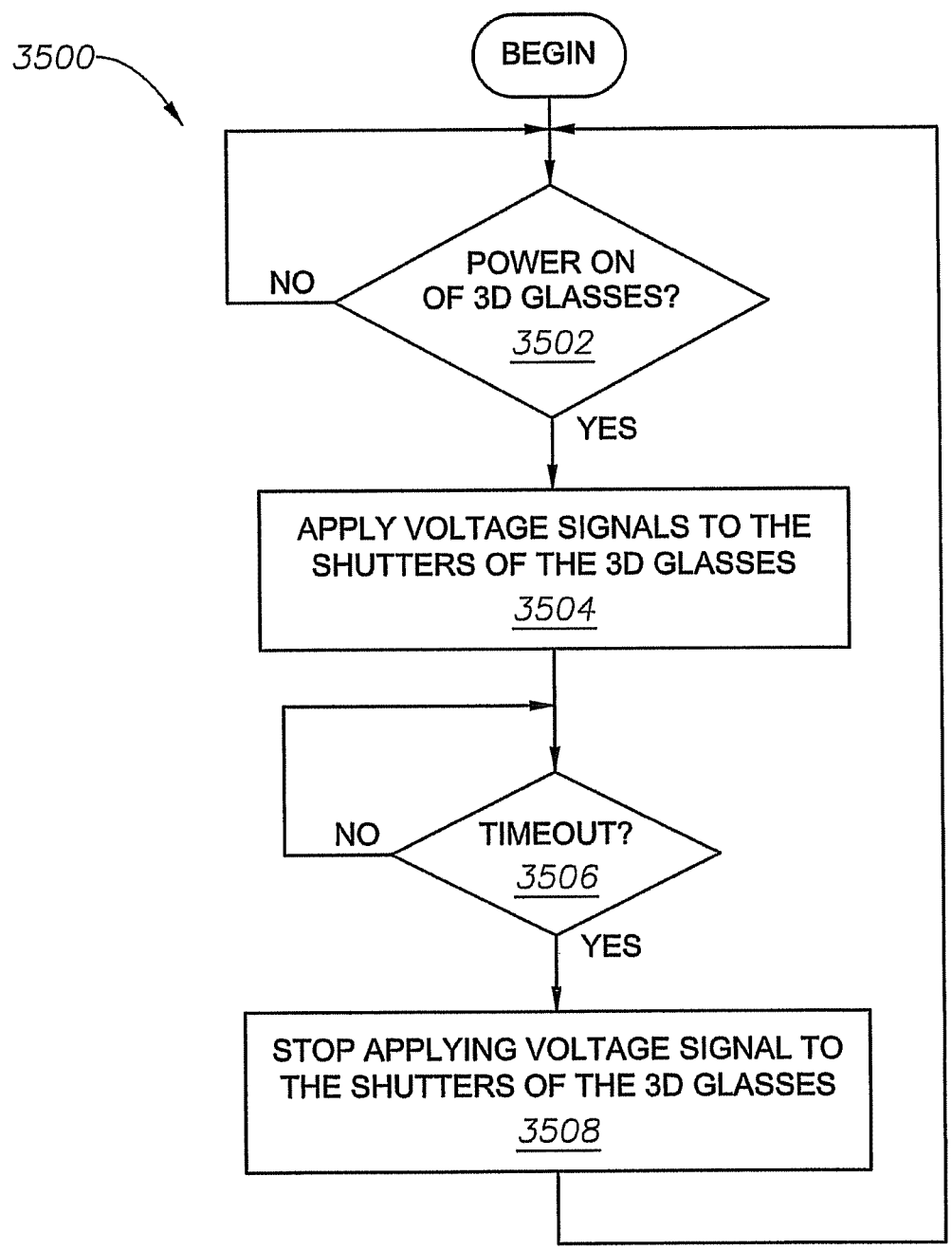
FIG. 35 is a flow chart illustration of an exemplary embodiment of the operation of the 3D glasses of FIGS. 30, 30a, 30b and 30c.
Figure 36:
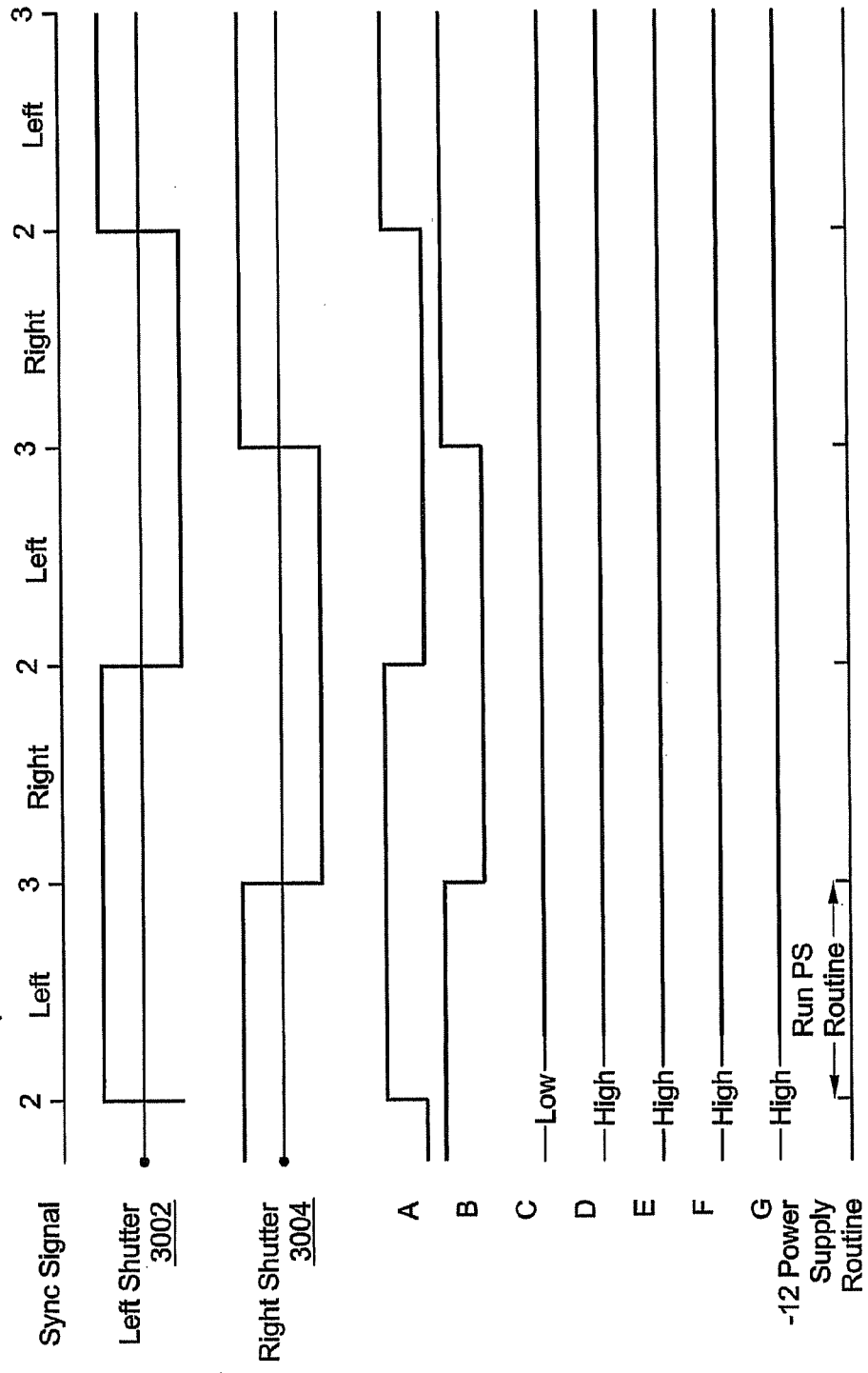
FIG. 36 is a graphical illustration of an exemplary embodiment of the operation of the 3D glasses of FIGS. 30, 30a, 30b and 30c.

Referring now to FIGS. 35 and 36, in an exemplary embodiment, during operation of the 3D glasses 3000, the 3D glasses implement a warm up method 3500 of operation in which the control signals A, B, C, D, E, F and G generated by the CPU 3012 are used to control the operation of the left and right shutter controllers, 3006 and 3008, and central shutter controller 3010, to in turn control the operation of the left and right shutters, 3002 and 3004.

In 3502, the CPU 3012 of the 3D glasses checks for a power on of the 3D glasses. In an exemplary embodiment, the 3D glasses 3000 may be powered on either by a user activating a power on switch, by an automatic wakeup sequence, and/or by the signal sensor 3014 sensing a valid sync signal. In the event of a power on of the 3D glasses 3000, the shutters, 3002 and 3004, of the 3D glasses may, for example, require a warm-up sequence. The liquid crystal cells of the shutters, 3002 and 3004, that do not have power for a period of time may be in an indefinite state.

If the CPU 3012 of the 3D glasses 3000 detects a power on of the 3D glasses in 3502, then the CPU applies alternating voltage signals to the left and right shutters, 3002 and 3004, respectively, in 3504. In an exemplary embodiment, the voltage applied to the left and right shutters, 3002 and 3004, is alternated between positive and negative peak values to avoid ionization problems in the liquid crystal cells of the shutter. In an exemplary embodiment, the voltage signals applied to the left and right shutters, 3002 and 3004, may be at least partially out of phase with one another. In an exemplary embodiment, one or both of the voltage signals applied to the left and right shutters, 3002 and 3004, may be alternated between a zero voltage and a peak voltage. In an exemplary embodiment, other forms of voltage signals may be applied to the left and right shutters, 3002 and 3004, such that the liquid crystal cells of the shutters are placed in a definite operational state. In an exemplary embodiment, the application of the voltage signals to the left and right shutters, 3002 and 3004, causes the shutters to open and close, either at the same time or at different times.

During the application of the voltage signals to the left and right shutters, 3002 and 3004, the CPU 3012 checks for a warm up time out in 3506. If the CPU 3012 detects a warm up time out in 3506, then the CPU will stop the application of the voltage signals to the left and right shutters, 3002 and 3004, in 3508.

In an exemplary embodiment, in 3504 and 3506, the CPU 3012 applies the voltage signals to the left and right shutters, 3002 and 3004, for a period of time sufficient to actuate the liquid crystal cells of the shutters. In an exemplary embodiment, the CPU 3012 applies the voltage signals to the left and right shutters, 3002 and 3004, for a period of two seconds. In an exemplary embodiment, the maximum magnitude of the voltage signals applied to the left and right shutters, 3002 and 3004, may be 15 volts. In an exemplary embodiment, the time out period in 3506 may be two seconds. In an exemplary embodiment, the maximum magnitude of the voltage signals applied to the left and right shutters, 3002 and 3004, may be greater or lesser than 15 volts, and the time out period may be longer or shorter. In an exemplary embodiment, during the method 3500, the CPU 3012 may open and close the left and right shutters, 3002 and 3004, at a different rate than would be used for viewing a movie. In an exemplary embodiment, in 3504, the voltage signals applied to the left and right shutters, 3002 and 3004, do not alternate and are applied constantly during the warm up time period and therefore the liquid crystal cells of the shutters may remain opaque for the entire warm up period. In an exemplary embodiment, the warm-up method 3500 may occur with or without the presence of a synchronization signal. Thus, the method 3500 provides a WARM UP mode of the operation for the 3D glasses 3000. In an exemplary embodiment, after implementing the warm up method 3500, the 3D glasses 3000 are placed in a NORMAL MODE, RUN MODE or CLEAR MODE of operation and may then implement the method 3300.

Figure 37:
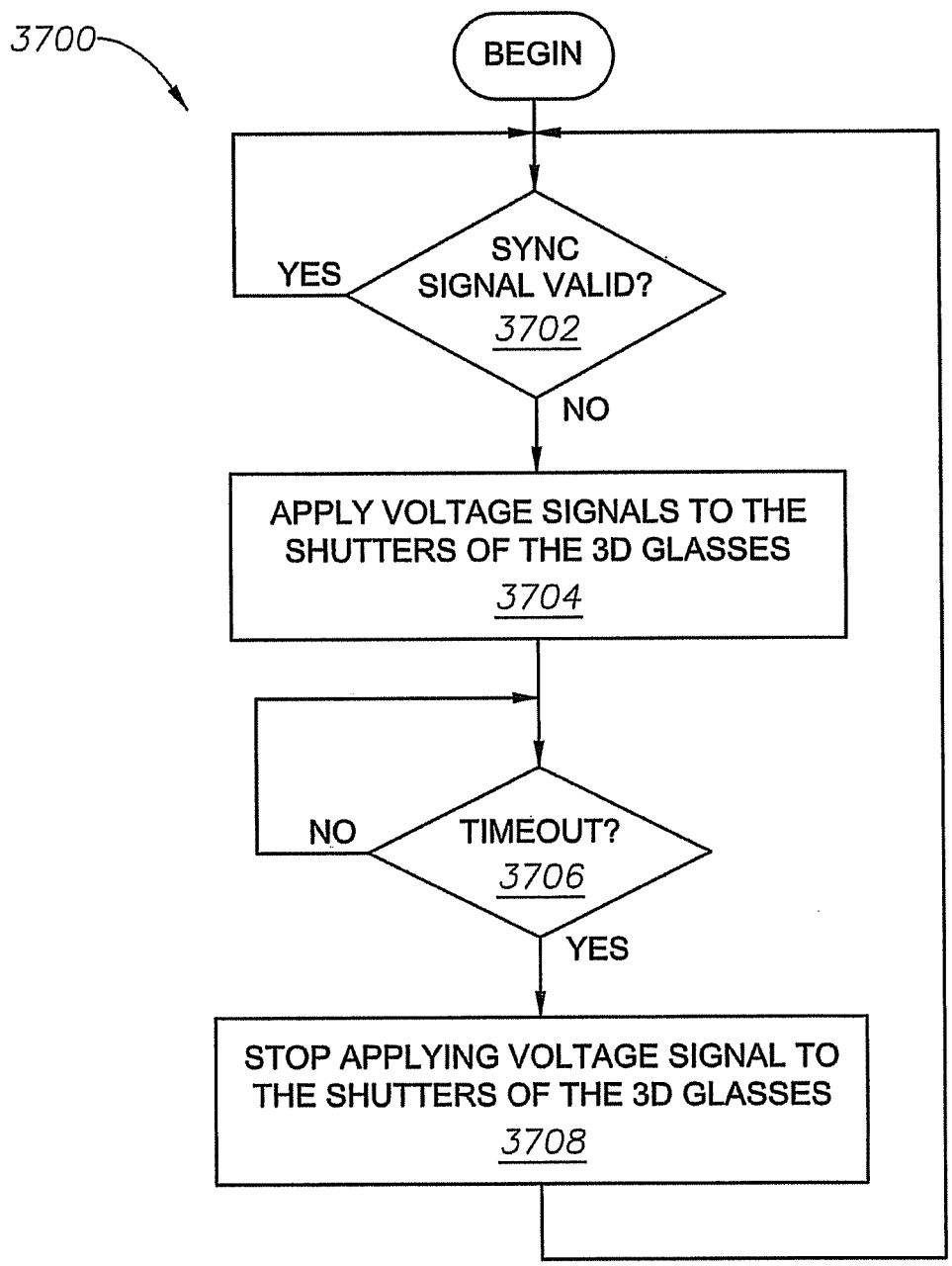
FIG. 37 is a flow chart illustration of an exemplary embodiment of the operation of the 3D glasses of FIGS. 30, 30a, 30b and 30c.
Figure 38:
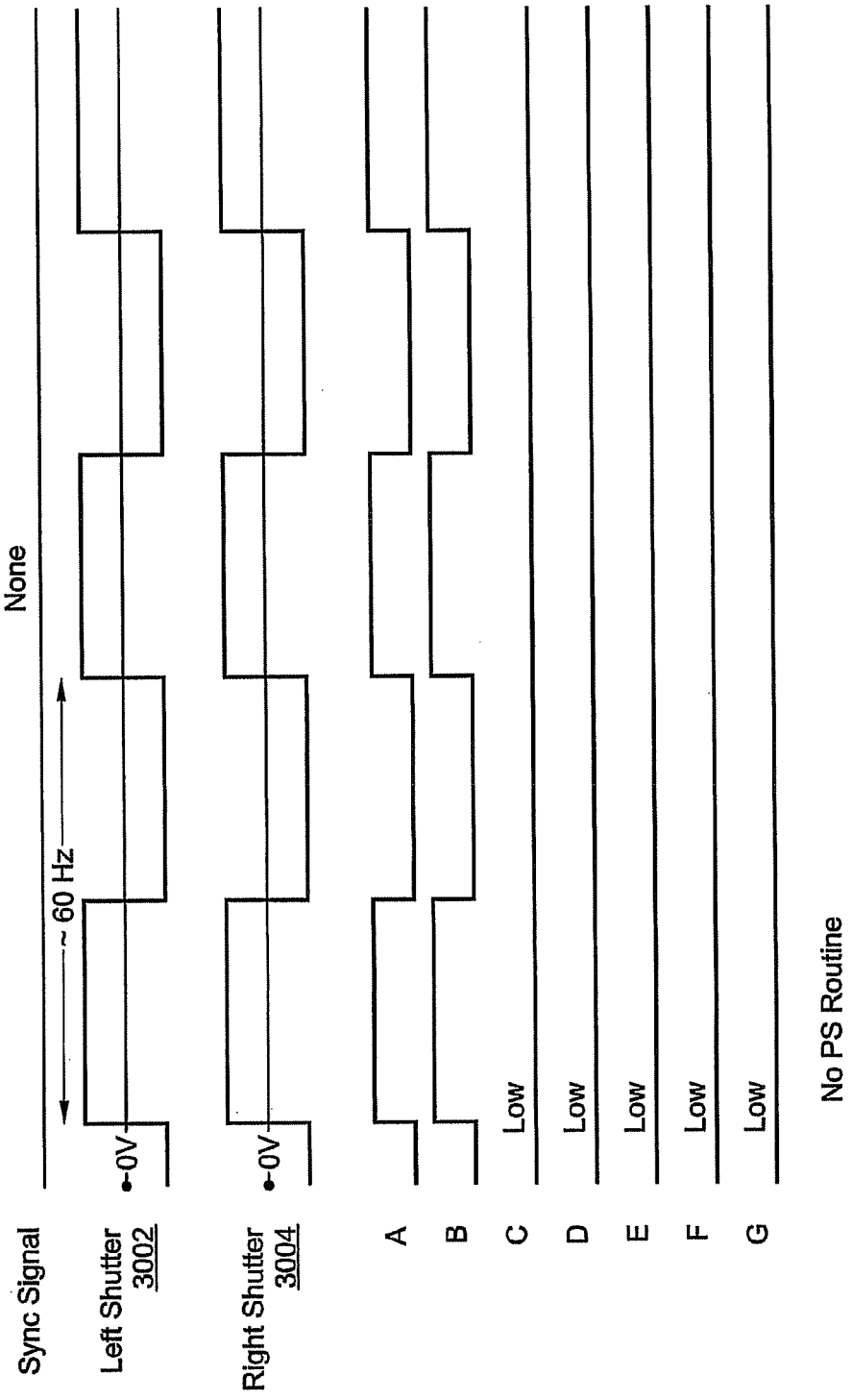
FIG. 38 is a graphical illustration of an exemplary embodiment of the operation of the 3D glasses of FIGS. 30, 30a, 30b and 30c.

Referring now to FIGS. 37 and 38, in an exemplary embodiment, during the operation of the 3D glasses 3000, the 3D glasses implement a method 3700 of operation in which the control signals A, B, C, D, E, F and G generated by the CPU 3012 are used to control the operation of the left and right shutter controllers, 3006 and 3008, and the common shutter controller 3010, to in turn control the operation of the left and right shutters, 3002 and 3004, as a function of the sync signal received by the signal sensor 3014.

In 3702, the CPU 3012 checks to see if the sync signal detected by the signal sensor 3014 is valid or invalid. If the CPU 3012 determines that the sync signal is invalid in 3702, then the CPU applies voltage signals to the left and right shutters, 3002 and 3004, of the 3D glasses 3000 in 3704. In an exemplary embodiment, the voltage applied to the left and right shutters, 3002 and 3004, in 3704, is alternated between positive and negative peak values to avoid ionization problems in the liquid crystal cells of the shutter. In an exemplary embodiment, the voltage applied to the left and right shutters, 3002 and 3004, in 3704, is alternated between positive and negative peak values to provide a square wave signal having a frequency of 60 Hz. In an exemplary embodiment, the square wave signal alternates between +3V and −3V. In an exemplary embodiment, one or both of the voltage signals applied to the left and right shutters, 3002 and 3004, in 3704, may be alternated between a zero voltage and a peak voltage. In an exemplary embodiment, other forms, including other frequencies, of voltage signals may be applied to the left and right shutters, 3002 and 3004, in 3704, such that the liquid crystal cells of the shutters remain open so that the user of the 3D glasses 3000 can see normally through the shutters. In an exemplary embodiment, the application of the voltage signals to the left and right shutters, 3002 and 3004, in 3704, causes the shutters to open.

During the application of the voltage signals to the left and right shutters, 3002 and 3004, in 3704, the CPU 3012 checks for a clearing time out in 3706. If the CPU 3012 detects a clearing time out in 3706, then the CPU 3012 will stop the application of the voltage signals to the shutters, 3002 and 3004, in 3708, which may then place the 3D glasses 3000 into an OFF MODE of operation. In an exemplary embodiment, the duration of the clearing time out may, for example, be up to about 4 hours in length.

Thus, in an exemplary embodiment, if the 3D glasses 3000 do not detect a valid synchronization signal, they may go to a clear mode of operation and implement the method 3700. In the clear mode of operation, in an exemplary embodiment, both shutters, 3002 and 3004, of the 3D glasses 3000 remain open so that the viewer can see normally through the shutters of the 3D glasses. In an exemplary embodiment, a constant voltage is applied, alternating positive and negative, to maintain the liquid crystal cells of the shutters, 3002 and 3004, of the 3D glasses 3000 in a clear state. The constant voltage could, for example, be 2 volts, but the constant voltage could be any other voltage suitable to maintain reasonably clear shutters. In an exemplary embodiment, the shutters, 3002 and 3004, of the 3D glasses 3000 may remain clear until the 3D glasses are able to validate an encryption signal. In an exemplary embodiment, the shutters, 3002 and 3004, of the 3D glasses 3000 may alternately open and close at a rate that allows the user of the 3D glasses to see normally.

Thus, the method 3700 provides a method of clearing the operation of the 3D glasses 3000 and thereby provide a CLEAR MODE of operation.

Figure 39:
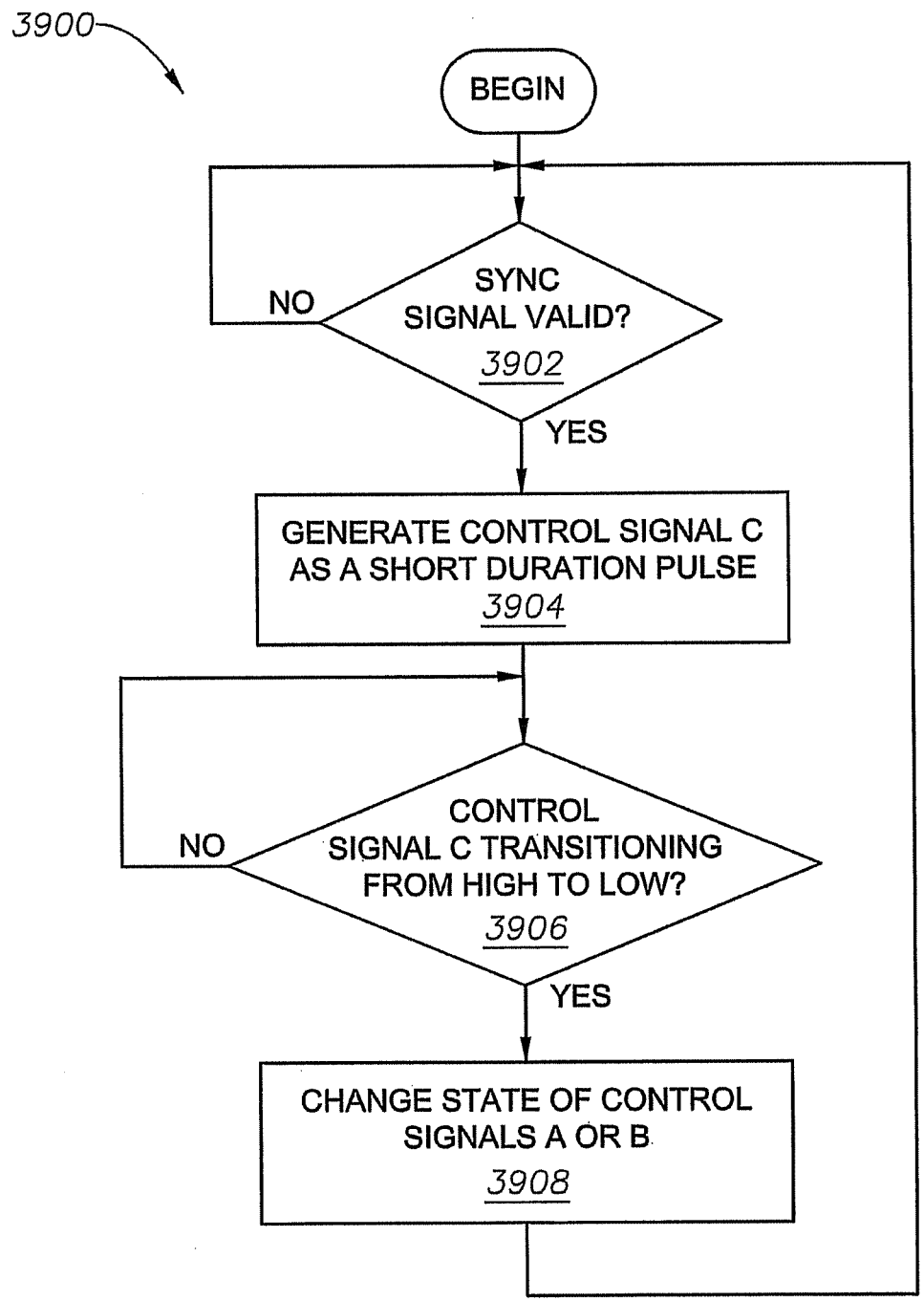
FIG. 39 is a flow chart illustration of an exemplary embodiment of the operation of the 3D glasses of FIGS. 30, 30a, 30b and 30c.
Figure 41:
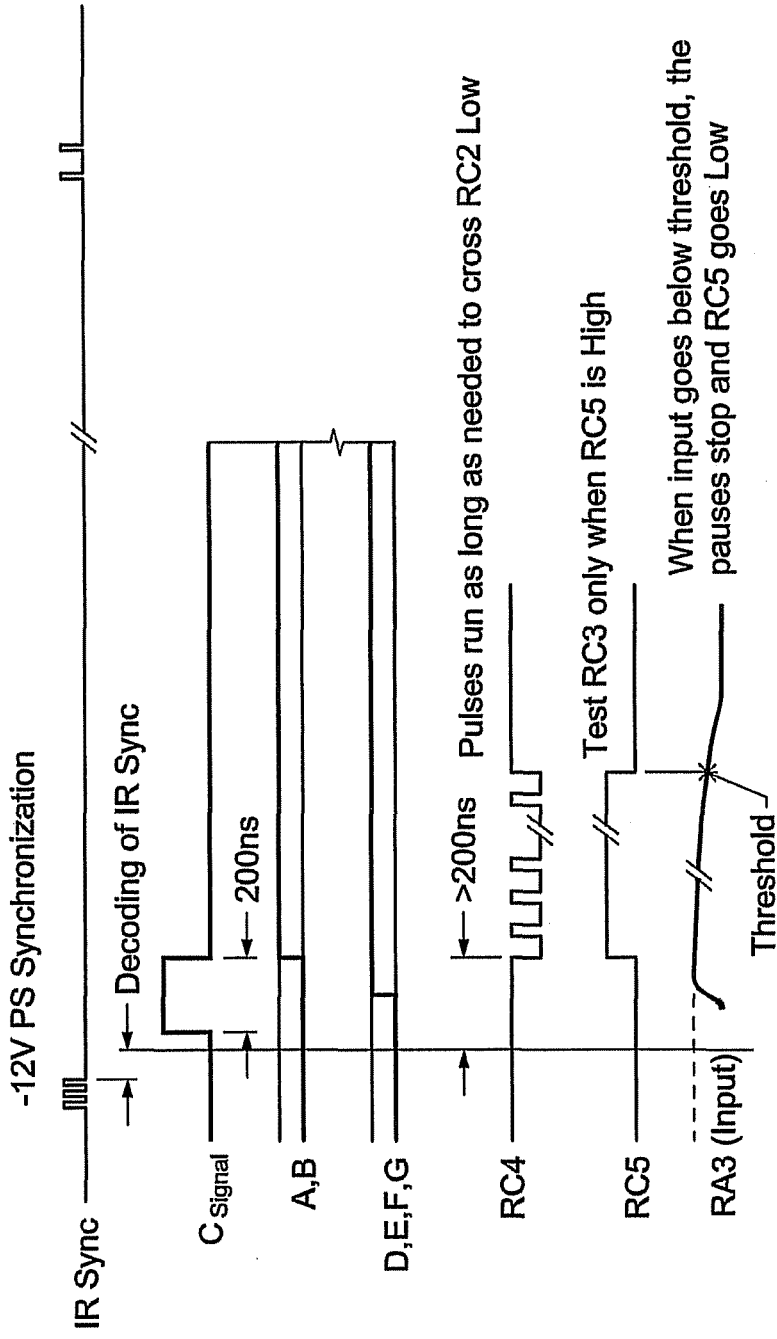
FIG. 41 is a graphical illustration of an exemplary embodiment of the operation of the 3D glasses of FIGS. 30, 30a, 30b and 30c.

Referring now to FIGS. 39 and 41, in an exemplary embodiment, during the operation of the 3D glasses 3000, the 3D glasses implement a method 3900 of operation in which the control signals A, B, C, D, E, F and G generated by the CPU 3012 are used to transfer charge between the shutters, 3002 and 3004. In 3902, the CPU 3012 determines if a valid synchronization signal has been detected by the signal sensor 3014. If the CPU 3012 determines that a valid synchronization signal has been detected by the signal sensor 3014, then the CPU generates the control signal C in 3904 in the form of a short duration pulse lasting, in an exemplary embodiment, about 200 μs. In an exemplary embodiment, during the method 3900, the transfer of charge between the shutters, 3002 and 3004, occurs during the short duration pulse of the control signal C, substantially as described above with reference to FIGS. 33 and 34.

In 3906, the CPU 3012 determines if the control signal C has transitioned from high to low. If the CPU 3012 determines that the control signal C has transitioned from high to low, then the CPU changes the state of the control signals A or B in 3908 and then the 3D glasses 3000 may continue with normal operation of the 3D glasses, for example, as described and illustrated above with reference to FIGS. 33 and 34.

Figure 30:
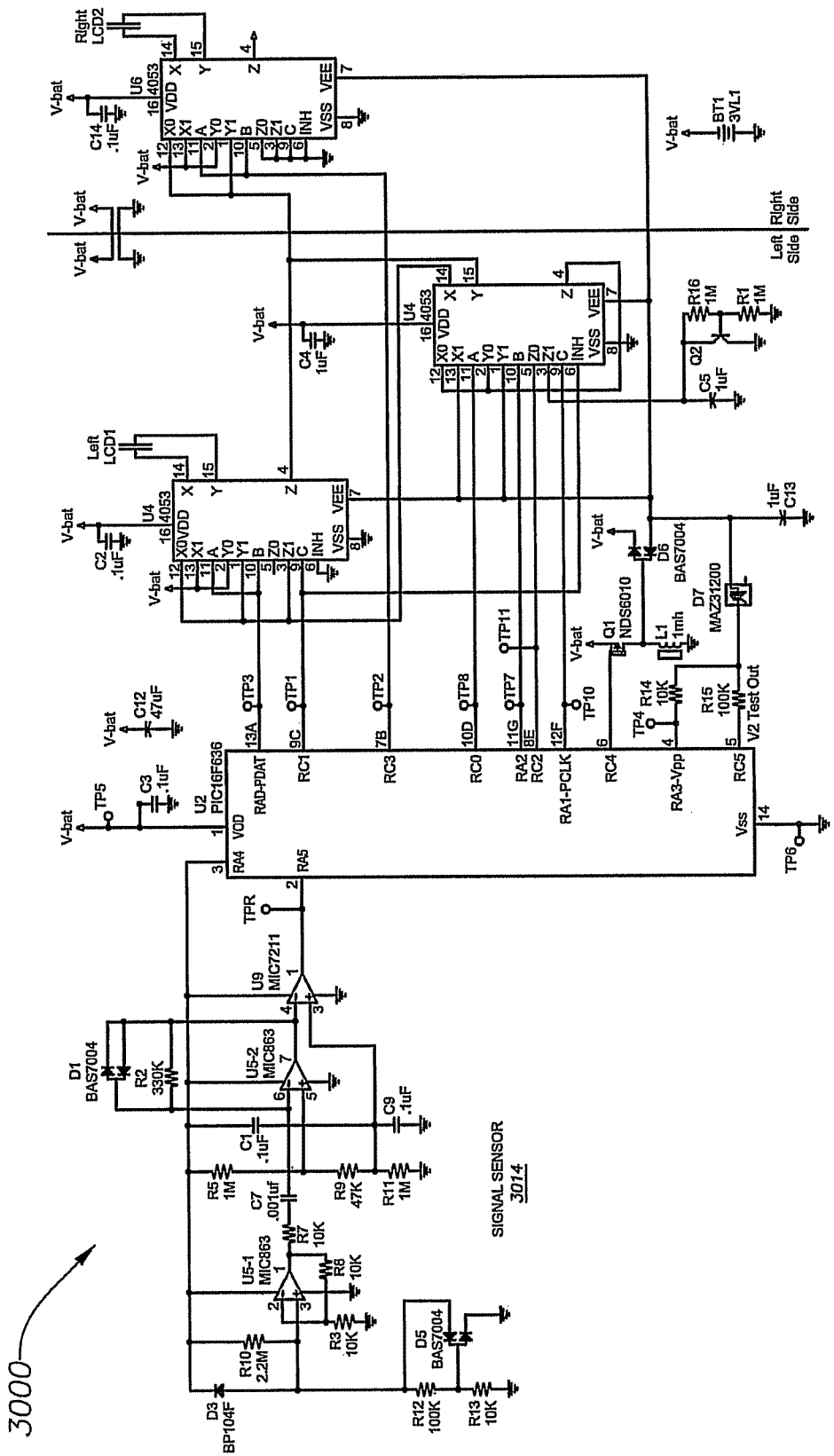
FIGS. 30, 30a, 30b and 30c is a schematic illustration of an exemplary embodiment of 3D glasses.
Figure 30A:
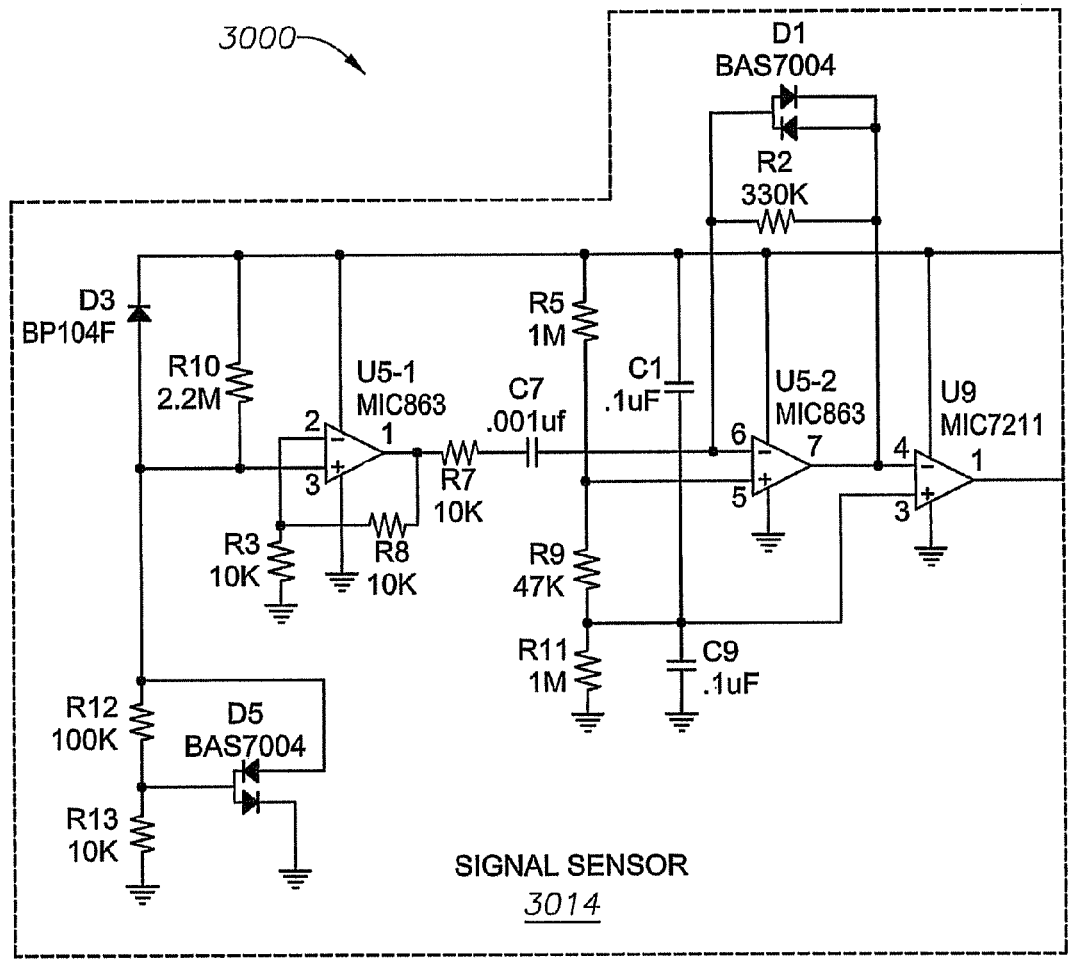
Figure 30B:
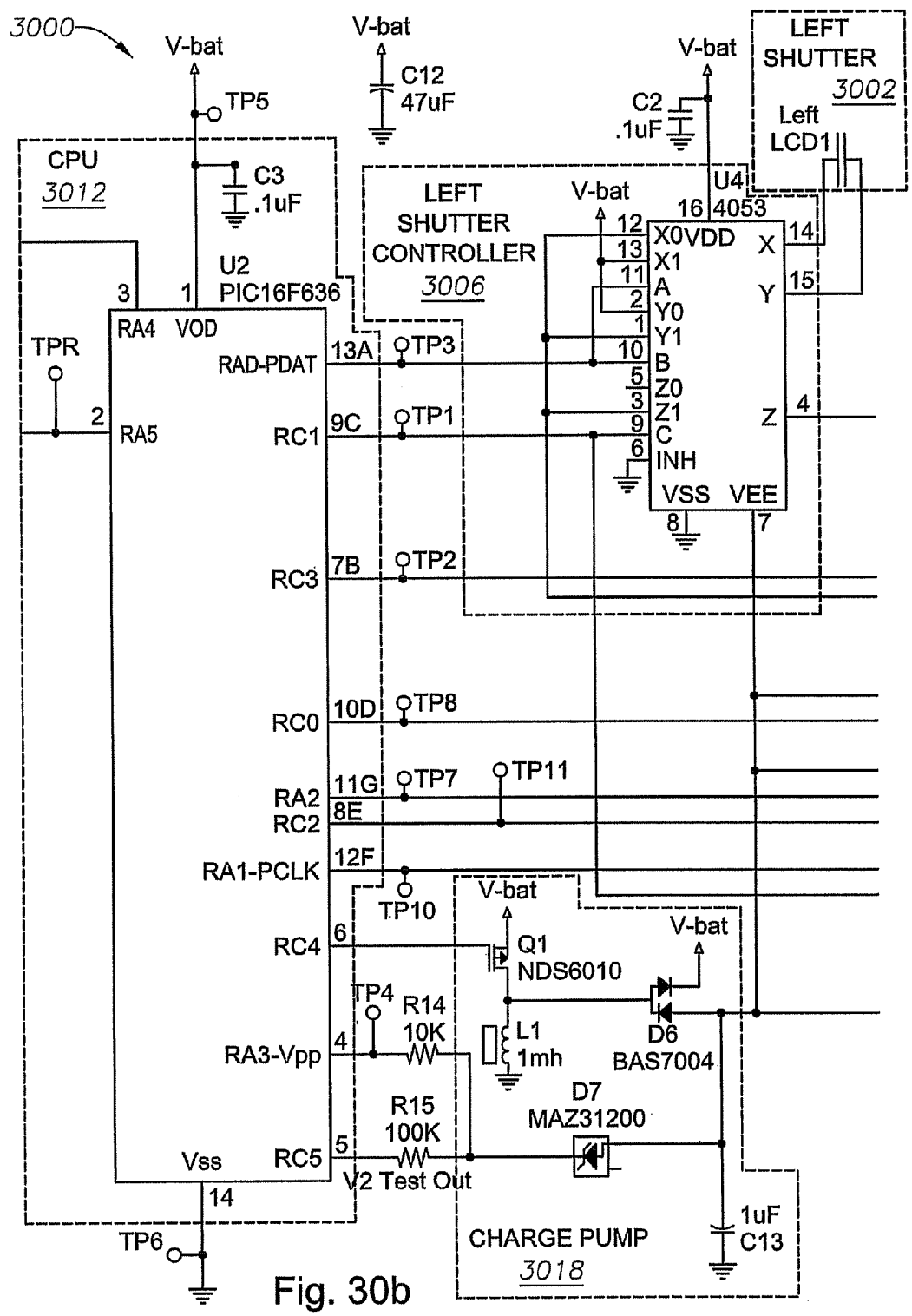
Figure 30C:
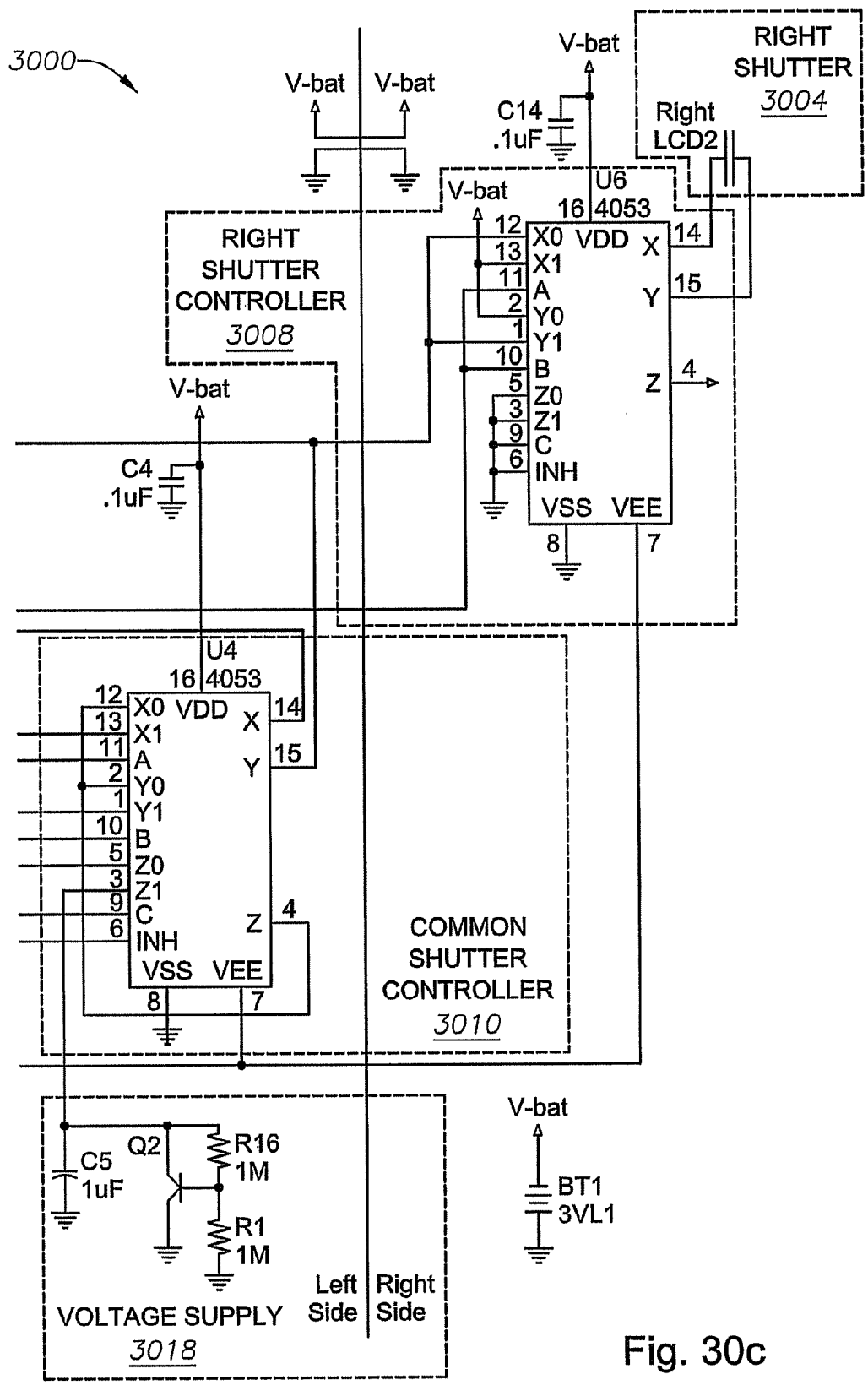
Figure 40:
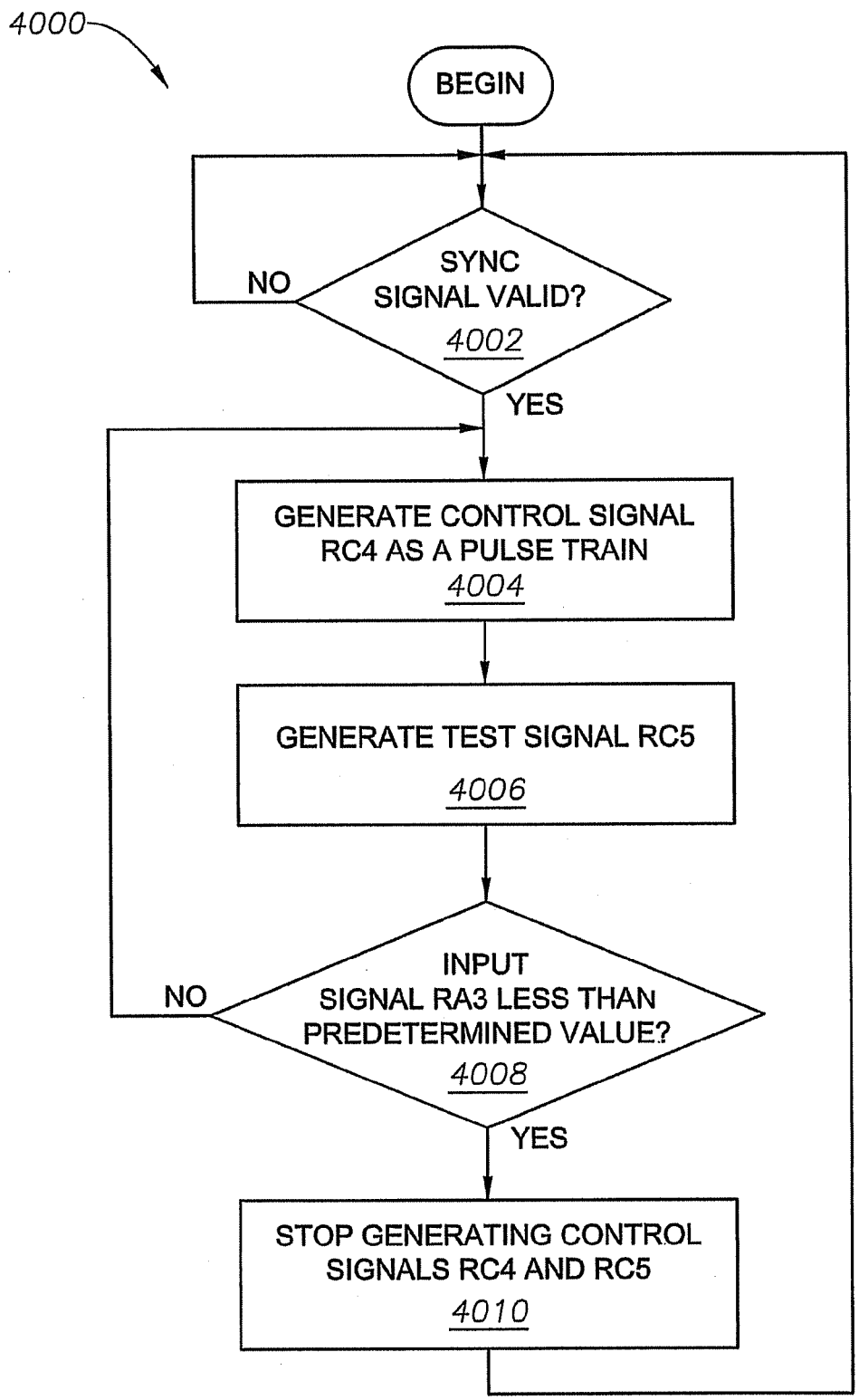
FIG. 40 is a flow chart illustration of an exemplary embodiment of the operation of the 3D glasses of FIGS. 30, 30a, 30b and 30c.

Referring now to FIGS. 30a, 40 and 41, in an exemplary embodiment, during the operation of the 3D glasses 3000, the 3D glasses implement a method 4000 of operation in which the control signals RC4 and RC5 generated by the CPU 3012 are used to operate the charge pump 3016 during the normal or warm up modes of operation of the 3D glasses 3000, as described and illustrated above with reference to FIGS. 32, 33, 34, 35 and 36. In 4002, the CPU 3012 determines if a valid synchronization signal has been detected by the signal sensor 3014. If the CPU 3012 determines that a valid synchronization signal has been detected by the signal sensor 3014, then the CPU generates the control signal RC4 in 4004 in the form of a series of short duration pulses.

In an exemplary embodiment, the pulses of the control signal RC4 control the operation of the transistor Q1 to thereby transfer charge to the capacitor C13 until the potential across the capacitor reaches a predetermined level. In particular, when the control signal RC4 switches to a low value, the transistor Q1 connects the inductor L1 to the battery 120. As a result, the inductor L1 stores energy from the battery 120. Then, when the control signal RC4 switches to a high value, the energy that was stored in the inductor L1 is transferred to the capacitor C13. Thus, the pulses of the control signal RC4 continually transfer charge to the capacitor C13 until the potential across the capacitor C13 reaches a predetermined level. In an exemplary embodiment, the control signal RC4 continues until the potential across the capacitor C13 reaches −12V.

In an exemplary embodiment, in 4006, the CPU 3012 generates a control signal RC5. As a result, an input signal RA3 is provided having a magnitude that decreases as the potential across the capacitor C13 increases. In particular, when the potential across the capacitor C13 approaches the predetermined value, the zener diode D7 starts to conduct current thereby reducing the magnitude of the input control signal RA3. In 4008, the CPU 3012 determines if the magnitude of the input control signal RA3 is less than a predetermined value. If the CPU 3012 determines that the magnitude of the input control signal RA3 is less than the predetermined value, then, in 4010, the CPU stops generating the control signals RC4 and RC5. As a result, the transfer of charge to the capacitor C13 stops.

In an exemplary embodiment, the method 4000 may be implemented after the method 3900 during operation of the 3D glasses 3000.

Figure 42:
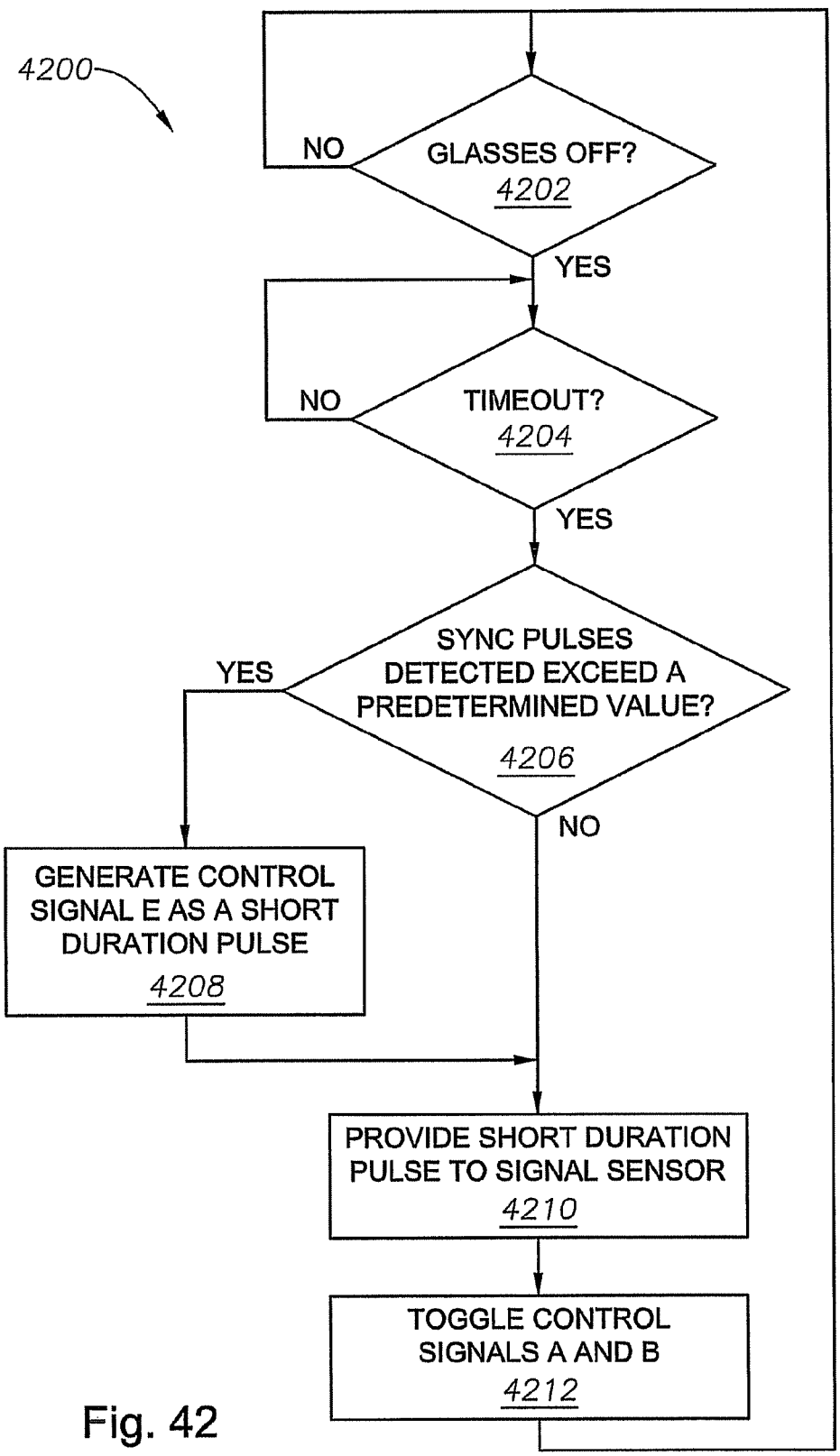
FIG. 42 is a flow chart illustration of an exemplary embodiment of the operation of the 3D glasses of FIGS. 30, 30a, 30b and 30c.
Figure 43:
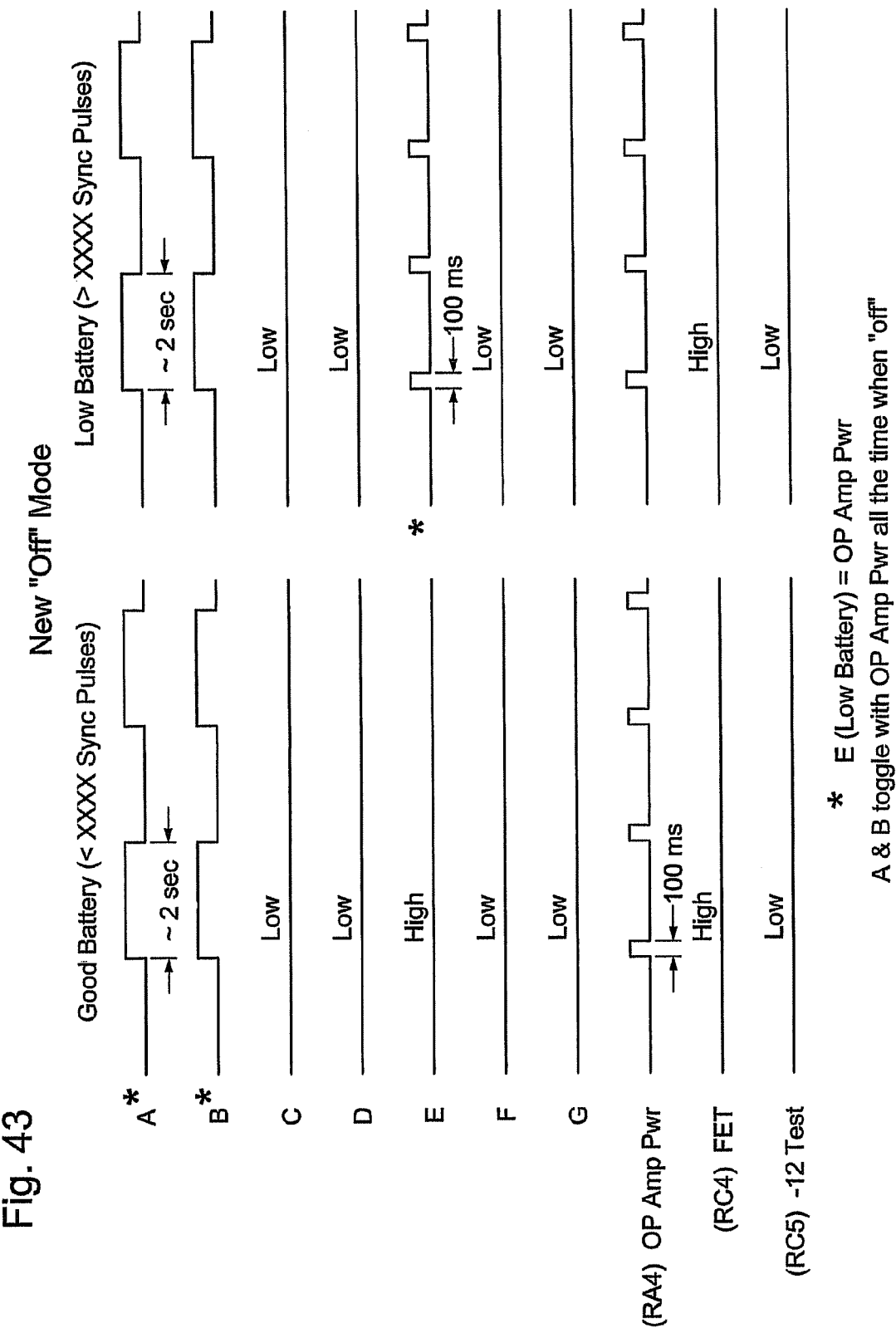
FIG. 43 is a graphical illustration of an exemplary embodiment of the operation of the 3D glasses of FIGS. 30, 30a, 30b and 30c.
Figure 44:
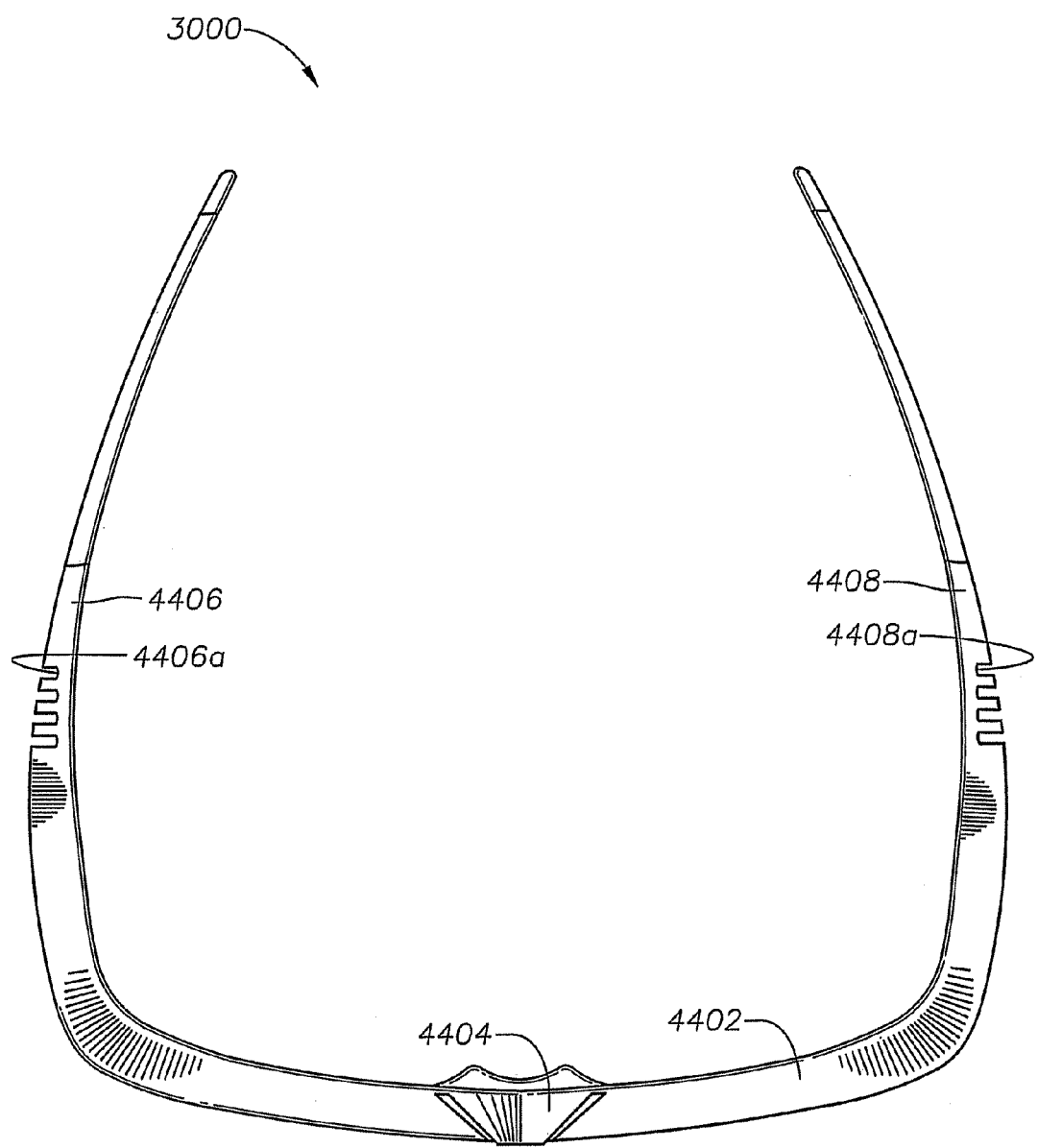
FIG. 44 is a top view of an exemplary embodiment of 3D glasses.
Figure 45:
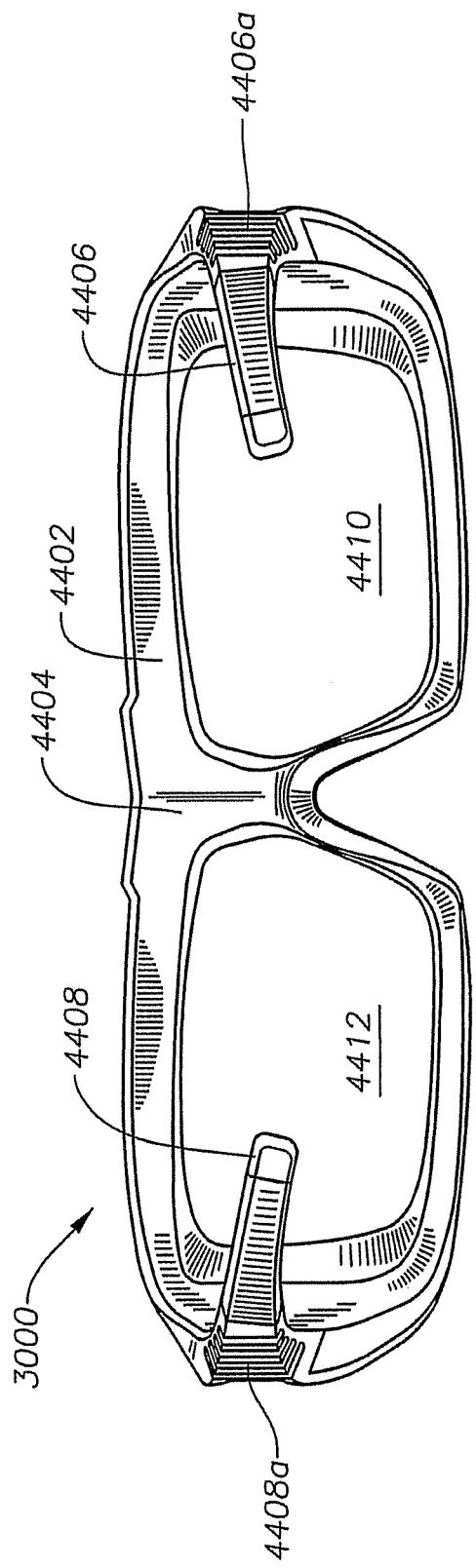
FIG. 45 is a rear view of the 3D glasses of FIG. 44.
Figure 46:
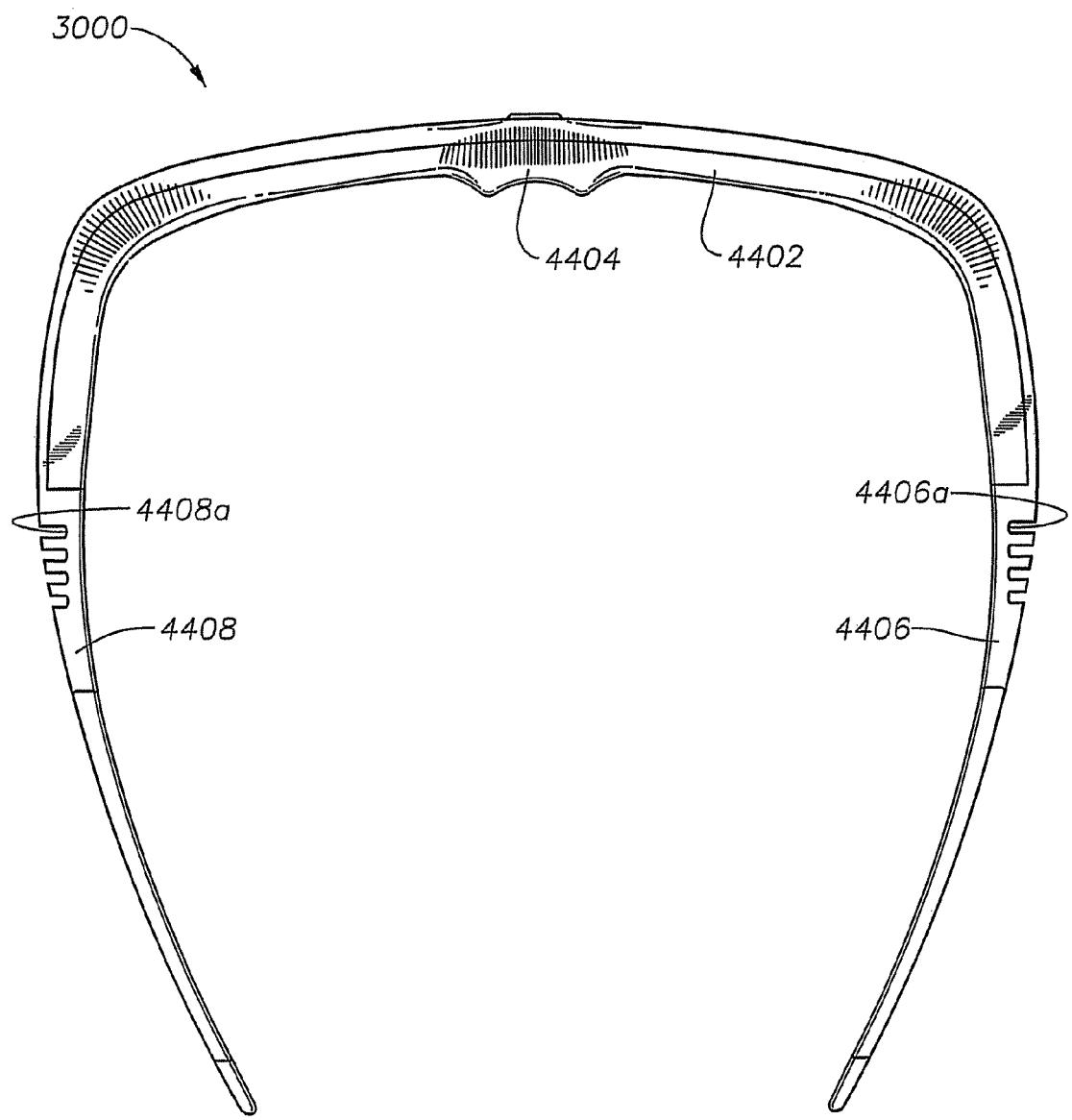
FIG. 46 is a bottom view of the 3D glasses of FIG. 44.
Figure 47:
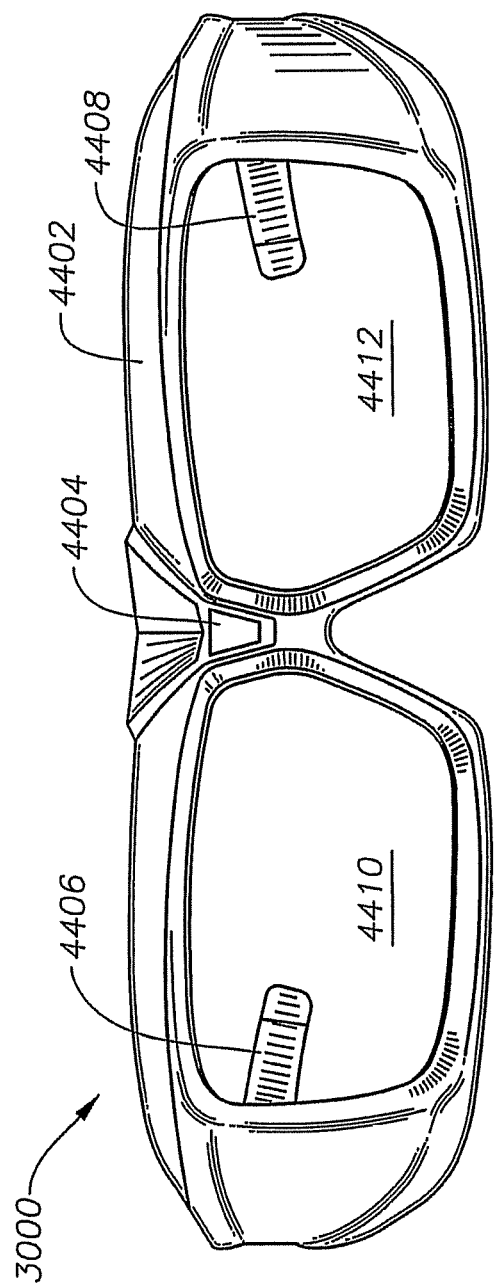
FIG. 47 is a front view of the 3D glasses of FIG. 44.
Figure 48:
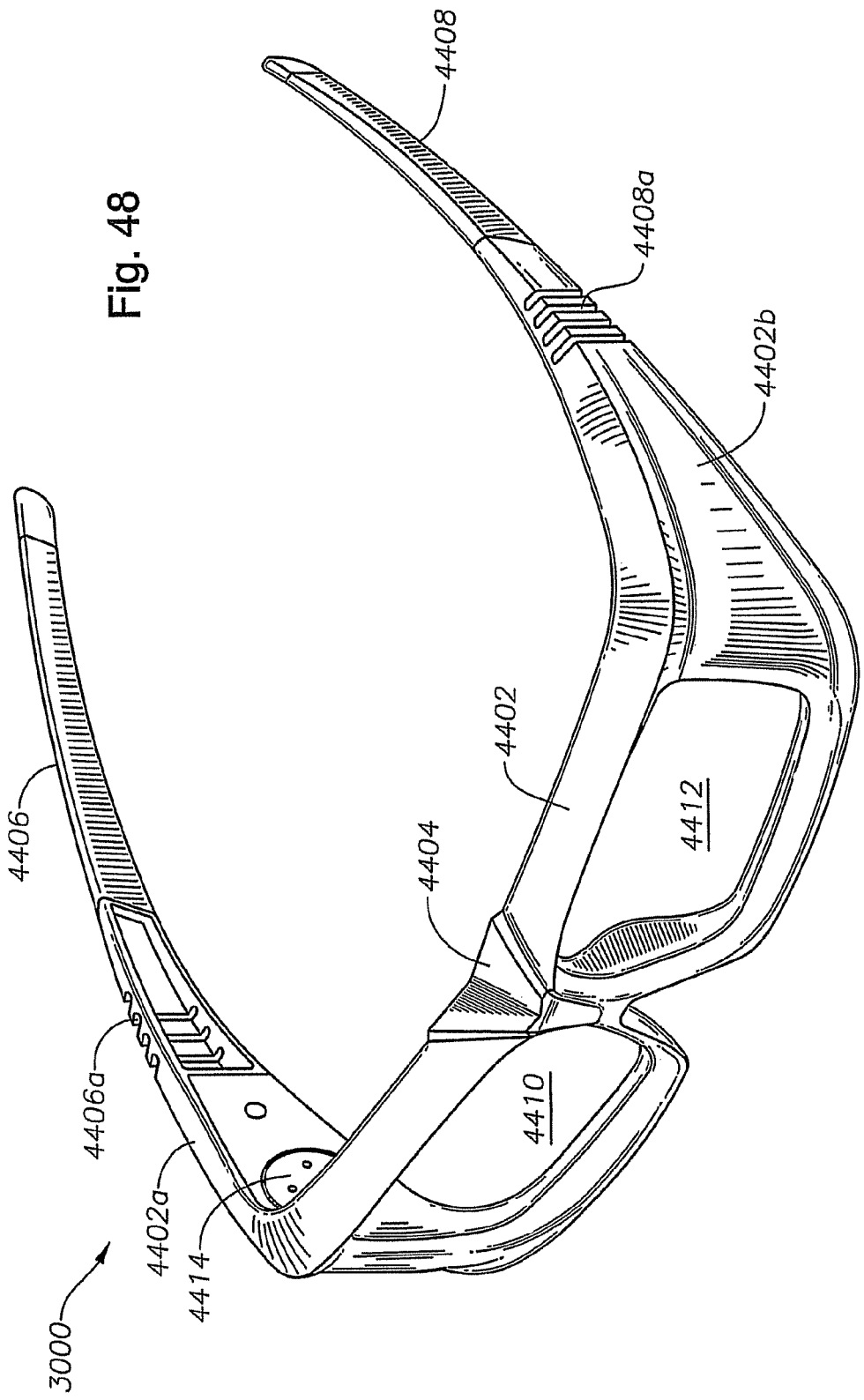
FIG. 48 is a perspective view of the 3D glasses of FIG. 44

Referring now to FIGS. 30*a*, 42 and 43, in an exemplary embodiment, during the operation of the 3D glasses 3000, the 3D glasses implement a method 4200 of operation in which the control signals A, B, C, D, E, F, G, RA4, RC4 and RC5 generated by the CPU 3012 are used to determine the operating status of the battery 120 when the 3D glasses 3000 have been switched to an off condition. In 4202, the CPU 3012 determines if the 3D glasses 3000 are off or on. If the CPU 3012 determines that the 3D glasses 3000 are off, then the CPU determines, in 4204, if a predetermined timeout period has elapsed in 4204. In an exemplary embodiment, the timeout period is 2 seconds in length.

If the CPU 3012 determines that the predetermined timeout period has elapsed, then the CPU determines, in 4206, if the number of synchronization pulses detected by the signal sensor 3014 within a predetermined prior time period exceeds a predetermined value. In an exemplary embodiment, in 4206, predetermined prior time period is a time period that has elapsed since the most recent replacement of the battery 120.

If the CPU 3012 determines that the number of synchronization pulses detected by the signal sensor 3014 within a predetermined prior time period does exceed a predetermined value, then the CPU, in 4208, generates control signal E as a short duration pulse, in 4210, provides the control signal RA4 as a short duration pulse to the signal sensor 3014, and, in 4212, toggles the operational state of the control signals A and B, respectively. In an exemplary embodiment, if the number of synchronization pulses detected by the signal sensor 3014 within a predetermined prior time period does exceed a predetermined value, then this may indicate that the remaining power in the battery 120 is low.

Alternatively, if the CPU 3012 determines that the number of synchronization pulses detected by the signal sensor 3014 within a predetermined prior time period does not exceed a predetermined value, then the CPU, in 4210, provides the control signal RA4 as a short duration pulse to the signal sensor 3014, and, in 4212, toggles the operational state of the control signals A and B, respectively. In an exemplary embodiment, if the number of synchronization pulses detected by the signal sensor 3014 within a predetermined prior time period does not exceed a predetermined value, then this may indicate that the remaining power in the battery 120 is not low.

In an exemplary embodiment, the combination of the control signals A and B toggling and the short duration pulse of the control signal E, in 4208 and 4212, causes the shutters, 3002 and 3004, of the 3D glasses 3000 to be closed, except during the short duration pulse of the control signal E. As a result, in an exemplary embodiment, the shutters, 3002 and 3004, provide a visual indication to the user of the 3D glasses 3000 that the power remaining within the battery 120 is low by flashing the shutters of the 3D glasses open for a short period of time. In an exemplary embodiment, providing the control signal RA4 as a short duration pulse to the signal sensor 3014, in 4210, permits the signal sensor to search for and detect synchronization signals during the duration of the pulse provided.

In an exemplary embodiment, the toggling of the control signals A and B, without also providing the short duration pulse of the control signal E, causes the shutters, 3002 and 3004, of the 3D glasses 3000 to remain closed. As a result, in an exemplary embodiment, the shutters, 3002 and 3004, provide a visual indication to the user of the 3D glasses 3000 that the power remaining within the battery 120 is not low by not flashing the shutters of the 3D glasses open for a short period of time.

In embodiments that lack a chronological clock, time may be measured in terms of sync pulses. The CPU 3012 may determine time remaining in the battery 120 as a factor of the number of sync pulses for which the battery may continue to operate and then provide a visual indication to the user of the 3D glasses 3000 by flashing the shutters, 3002 and 3004, open and closed.

Referring now to FIGS. 44-55, in an exemplary embodiment, one or more of the 3D glasses 104, 1800 and 3000 include a frame front 4402, a bridge 4404, right temple 4406, and a left temple 4408. In an exemplary embodiment, the frame front 4402 houses the control circuitry and power supply for one or more of the 3D glasses 104, 1800 and 3000, as described above, and further defines right and left lens openings, 4410 and 4412, for holding the right and left ISS shutters described above. In some embodiments, the frame front 4402 wraps around to form a right wing 4402*a* and a left wing 4402*b*. In some embodiments, at least part of the control circuitry for the 3D glasses 104, 1800 and 3000 are housed in either or both wings 4402*a* and 4402*b*.

Figure 55:
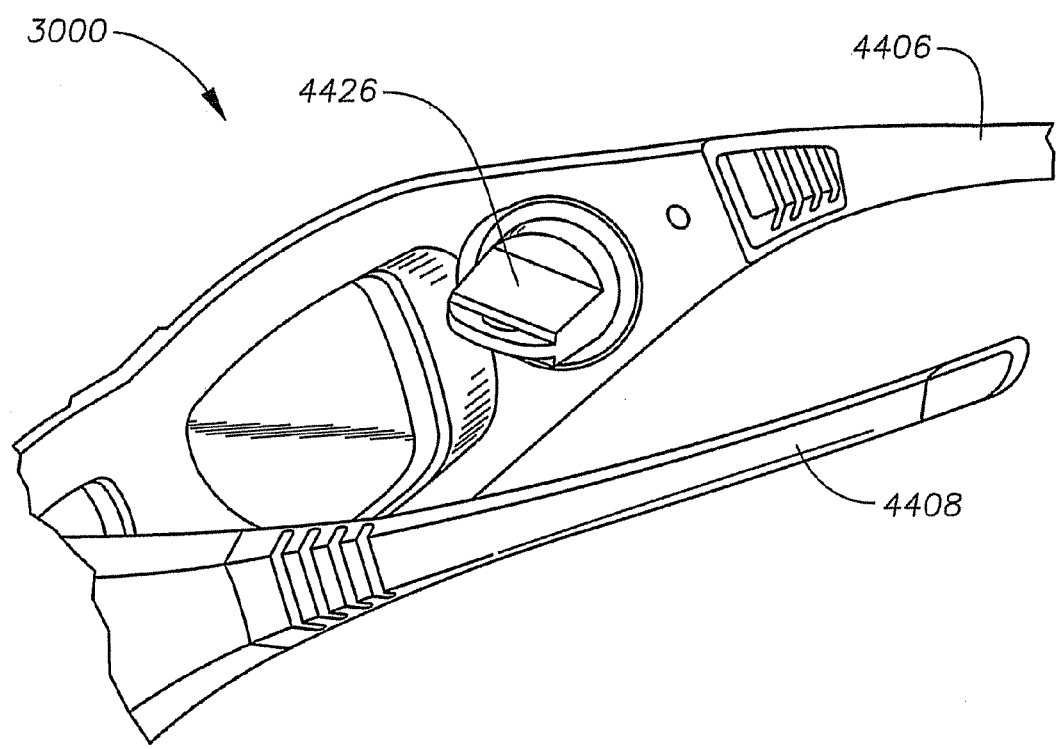
FIG. 55 is a perspective view of an alternative embodiment of the glasses of FIG. 44 and an alternative embodiment of the key used to manipulate housing cover of FIG. 50.

In an exemplary embodiment, the right and left temples, 4406 and 4408, extend from the frame front 4402 and include ridges, 4406*a* and 4408*a*, and each have a serpentine shape with the far ends of the temples being spaced closer together than at their respective connections to the frame front. In this manner, when a user wears the 3D glasses 104, 1800 and 3000, the ends of the temples, 4406 and 4408, hug and are held in place on the user's head. In some embodiments, the spring rate of the temples, 4406 and 4408, is enhanced by the double bend while the spacing and depth of the ridges, 4406*a* and 4408*a*, control the spring rate. As shown in FIG. 55, some embodiments do not use a double bended shape but, rather, use a simple curved temple 4406 and 4408.

Referring now to FIGS. 48-55, in an exemplary embodiment, the control circuitry for one or more of the 3D glasses 104, 1800 and 3000 is housed in the frame front, which includes the right wing 4402*a*, and the battery is housed in the right wing 4402*a*. Furthermore, in an exemplary embodiment, access to the battery 120 of the 3D glasses 3000 is provided through an opening, on the interior side of the right wing 4402*a*, that is sealed off by a cover 4414 that includes an o-ring seal 4416 for mating with and sealingly engaging the right wing 4402*a*.

Referring to FIGS. 49-55, in some embodiments, the battery is located within a battery cover assembly formed by cover 4414 and cover interior 4415. Battery cover 4414 may be attached to battery cover interior 4415 by, for example, ultra-sonic welding. Contacts 4417 may stick out from cover interior 4415 to conduct electricity from the battery 120 to contacts located, for example, inside the right wing 4402*a*.

Cover interior 4415 may have circumferentially spaced apart radial keying elements 4418 on an interior portion of the cover. Cover 4414 may have circumferentially spaced apart dimples 4420 positioned on an exterior surface of the cover.

Figure 49:
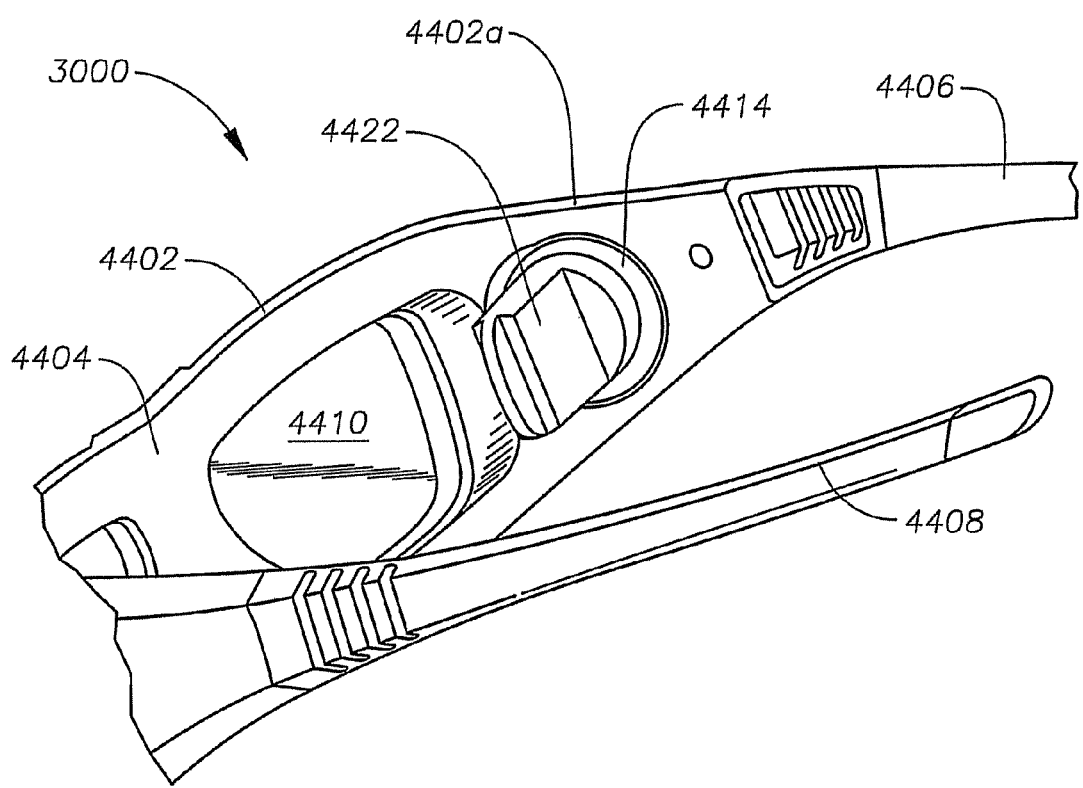
FIG. 49 is a perspective view of the use of a key to manipulate a housing cover for a battery for the 3D glasses of FIG. 44.
Figure 50:
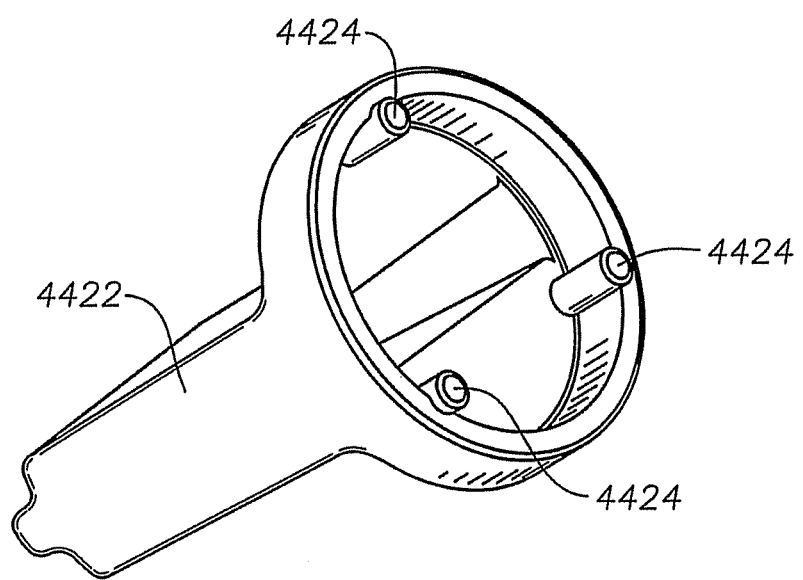
FIG. 50 is a perspective view of the key used to manipulate the housing cover for the battery for the 3D glasses of FIG. 44.
Figure 51:
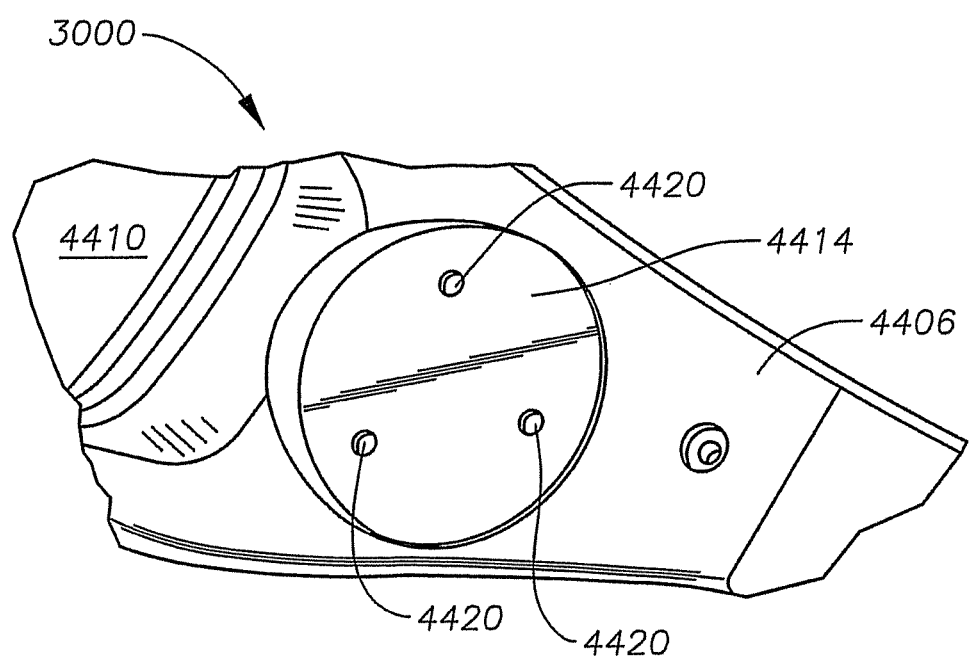
FIG. 51 is a perspective view of the housing cover for the battery for the 3D glasses of FIG. 44.
Figure 52:
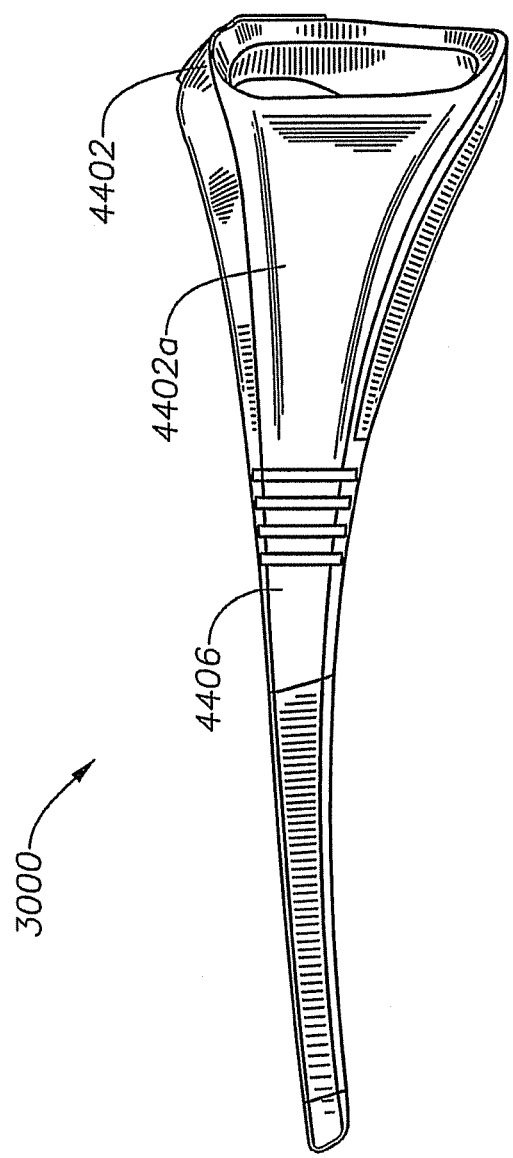
FIG. 52 is a side view of the 3D glasses of FIG. 44.
Figure 53:
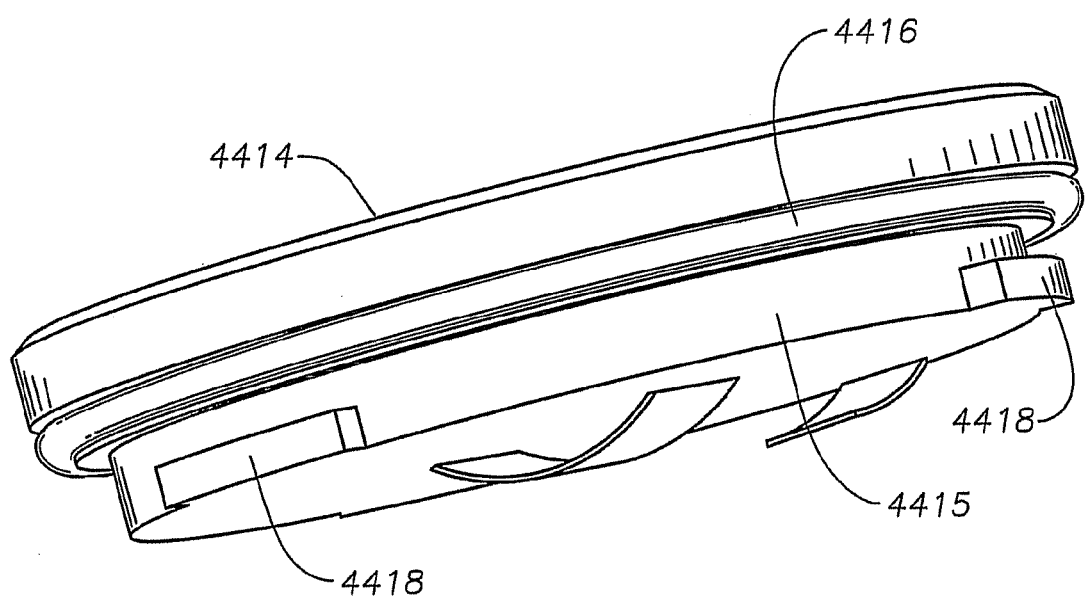
FIG. 53 is a perspective side view of the housing cover, battery and an O-ring seal for the 3D glasses of FIG. 44.
Figure 54:
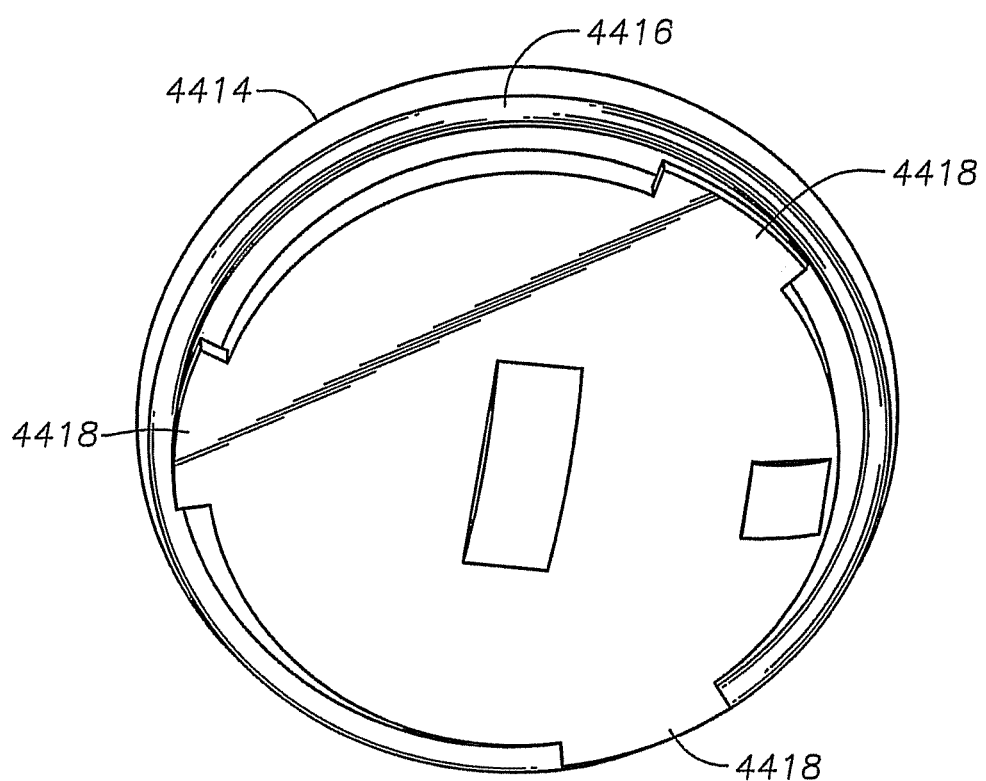
FIG. 54 a perspective bottom view of the housing cover, battery and the O-ring seal for the 3D glasses of FIG. 44.

In an exemplary embodiment, as illustrated in FIGS. 49-51, the cover 4414 may be manipulated using a key 4422 that includes a plurality of projections 4424 for mating within and engaging the dimples 4420 of the cover. In this manner, the cover 4414 may be rotated relative to the right wing 4402*a* of the 3D glasses 104, 1800 and 3000 from a closed (or locked) position to an open (or unlocked) position. Thus, the control circuitry and battery of the 3D glasses 104, 1800 and 3000 may be sealed off from the environment by the engagement of the cover 4414 with the right wing 4402*a* of the 3D glasses 3000 using the key 4422. Referring to FIG. 55, in another embodiment, key 4426 may be used.

Figure 56:
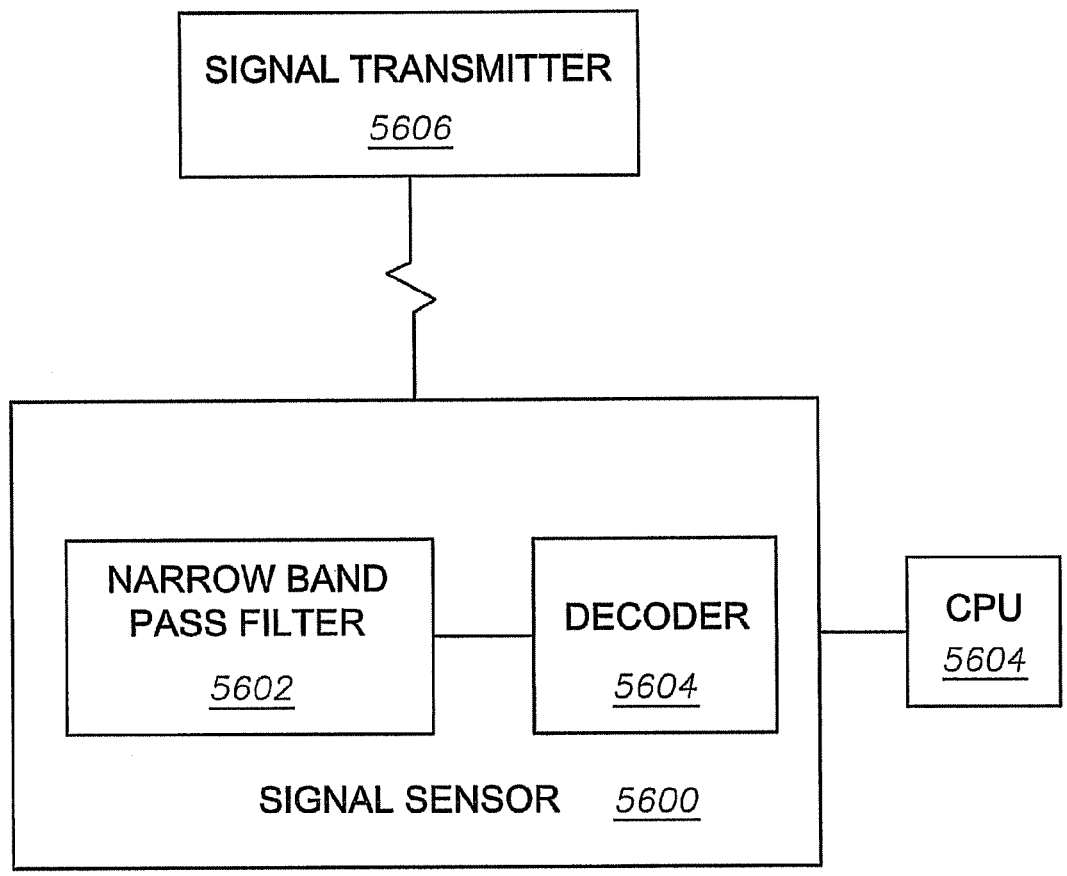
FIG. 56 is a schematic illustration of an exemplary embodiment of a signal sensor for use in one or more of the exemplary embodiments.
Figure 57:
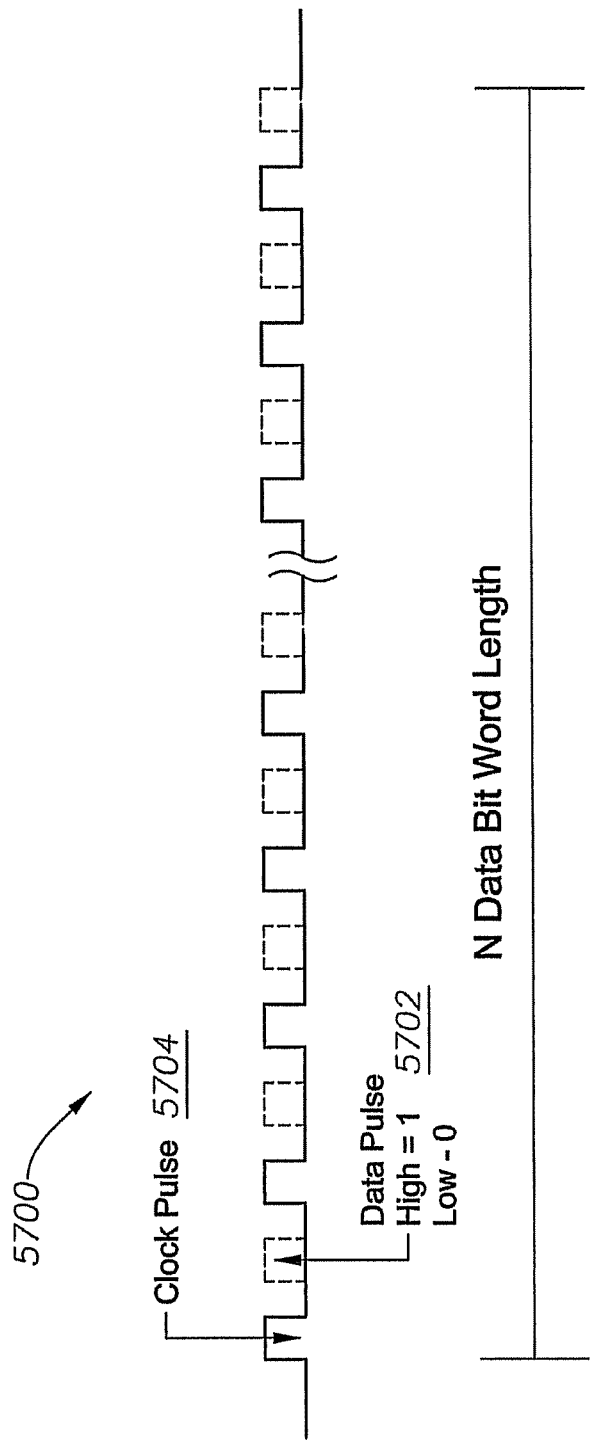
FIG. 57 is a graphical illustration of an exemplary data signal suitable for use with the signal sensor of FIG. 56.

Referring now to FIG. 56, an exemplary embodiment of a signal sensor 5600 includes a narrow band pass filter 5602 that is operably coupled to a decoder 5604. The signal sensor 5600 in turn is operably coupled to a CPU 5604. The narrow band pass filter 5602 may be an analog and/or digital band pass filter that may have a pass band suitable for permitting a synchronous serial data signal to pass therethrough while filtering out and removing out of band noise.

In an exemplary embodiment, the CPU 5604 may, for example, be the CPU 114, the CPU 1810, or the CPU 3012, of the 3D glasses, 104, 1800, or 3000.

In an exemplary embodiment, during operation, the signal sensor 5600 receives a signal from a signal transmitter 5606. In an exemplary embodiment, the signal transmitter 5606 may, for example, be the signal transmitter 110.

In an exemplary embodiment, the signal 5700 transmitted by the signal transmitter 5606 to the signal sensor 5600 includes one or more data bits 5702 that are each preceded by a clock pulse 5704. In an exemplary embodiment, during operation of the signal sensor 5600, because each bit 5702 of data is preceded by a clock pulse 5704, the decoder 5604 of the signal sensor can readily decode long data bit words. Thus, the signal sensor 5600 is able to readily receive and decode synchronous serial data transmissions from the signal transmitter 5606. By contrast, long data bit words, that are asynchronous data transmissions, are typically difficult to transmit and decode in an efficient and/or error free fashion. Therefore, the signal sensor 5600 provides an improved system for receiving data transmissions. Further, the use of synchronous serial data transmission in the operation of the signal sensor 5600 ensures that long data bit words may be readily decoded.

Figure 58:
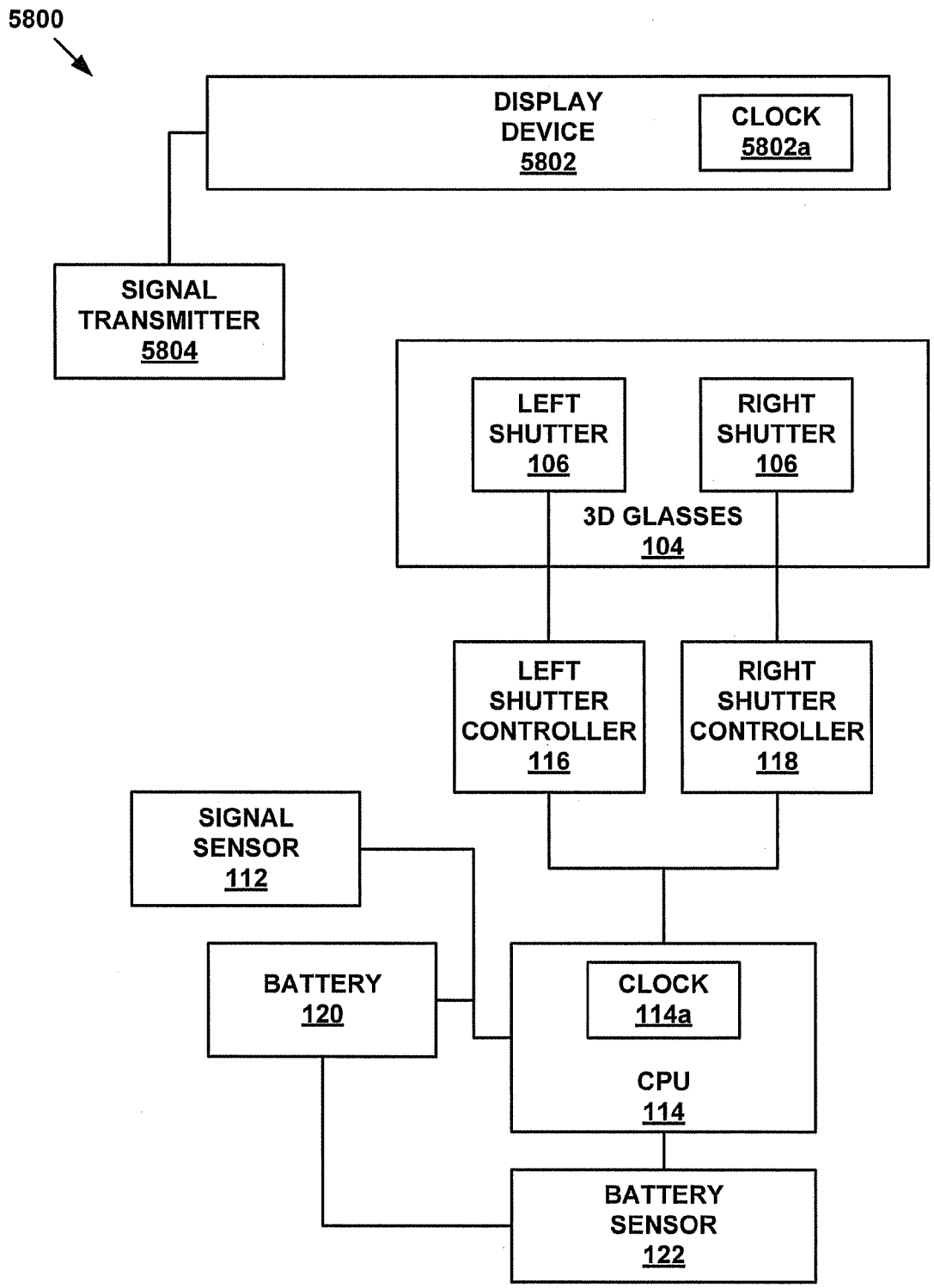
FIG. 58 is a schematic illustration of an exemplary system for viewing 3D images.

Referring to FIG. 58, an exemplary embodiment of a system 5800 for viewing 3D images is substantially identical to the system 100, except as noted below. In an exemplary embodiment, the system 5800 includes a display device 5802, having an internal clock 5802*a*, that is operably coupled to a signal transmitter 5804.

In an exemplary embodiment, the display device 5802 may, for example, be a television, movie screen, liquid crystal display, computer monitor, or other display device, adapted to display, for example, left and right images intended for viewing by the left and right eyes, respectively, of a user of the system 5800. In an exemplary embodiment, a signal transmitter 5804 is operably coupled to the display device 5802 that transmits signals to the signal sensor 112 of the 3D glasses 104 for controlling the operation of the 3D glasses. In an exemplary embodiment, the signal transmitter 5804 is adapted to transmit signals such as, for example, electromagnetic, infrared, acoustic, and/or radio frequency signals that may or may not be transmitted through an insulated conductor and/or through free space.

Figure 59:
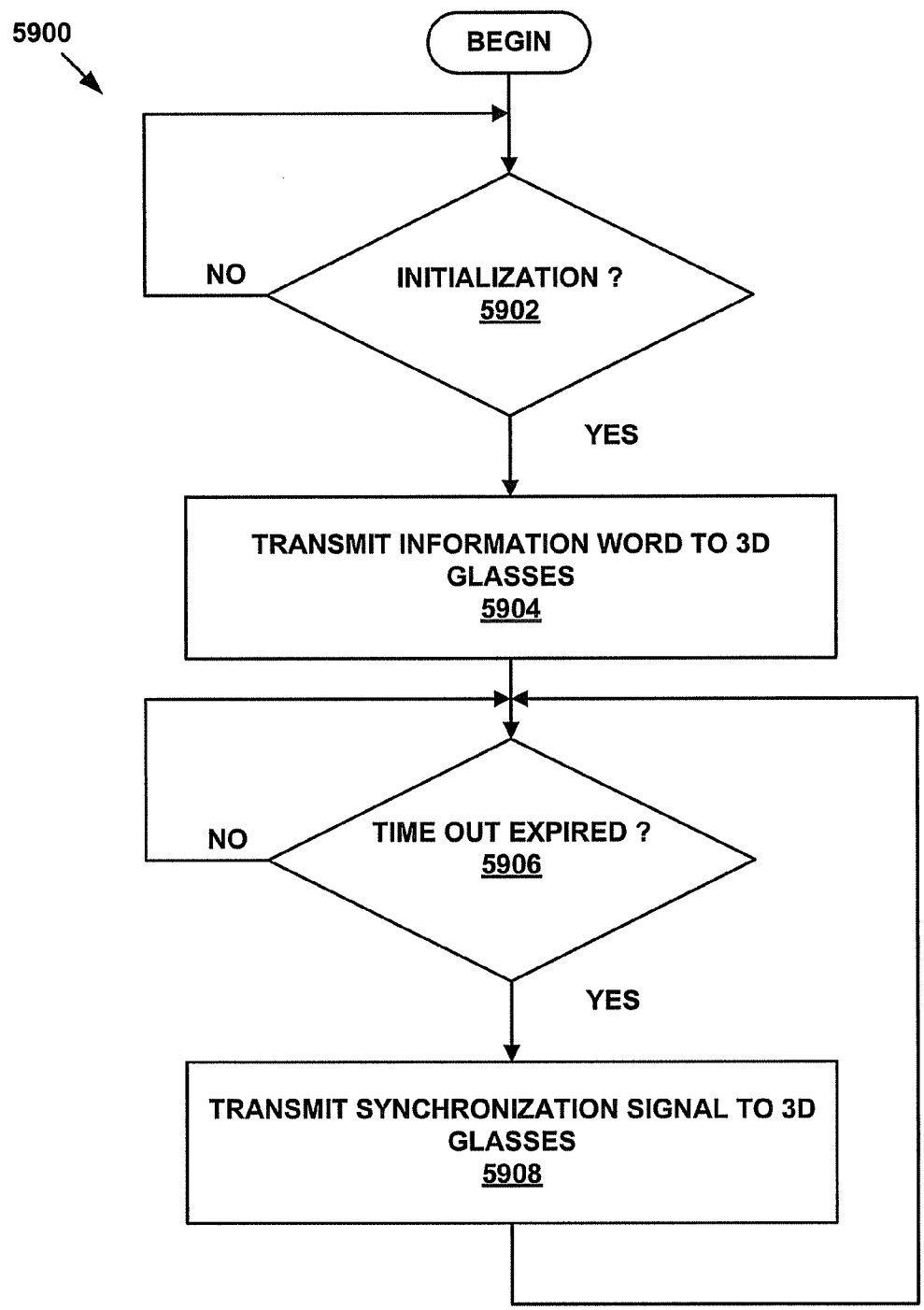
FIG. 59 is a flow chart illustration of an exemplary method of operating the system of FIG. 58.

Referring to FIG. 59, in an exemplary embodiment, the system 5800 implements a method 5900 of operation in which, in 5902, the system determines if the operation of the 3D glasses 104 with the display device 5802 should be initialized. In an exemplary embodiment, the system 5800 may determine that the operation of the 3D glasses 104 with the display device 5802 should be initialized if, for example, the power supply for either device is cycled from off to on or if the user of the system selects an initialization of operation of the 3D glasses with the display device 5802.

If the system determines that the operation of the 3D glasses 104 with the display device 5802 should be initialized in 5902, then, in 5904, an information word is transmitted from the display device 5802 using the signal transmitter 5804 and received by the signal sensor 112. In an exemplary embodiment, the information word may include one or more of the following: 1) the type of display device, 2) the operating frequency of the display device, 3) the opening and closing sequence of the left and right shutters, 106 and 108, and 4) the 3D display format that will be used by the display device 5802. In an exemplary embodiment, the information word is then used by the 3D glasses 104 to control the operation of the left and right shutters, 106 and 108, to permit the wearer of the 3D glasses to view 3D images by viewing the display device 5802. In an exemplary embodiment, the information word is also used initially to synchronize the clock 5802*a* of the display device 5802 with the clock 114*a* of the CPU 114 of the 3D glasses. In this manner, the opening and closing of the left and right shutters, 106 and 108, may be initially synchronized with the corresponding images intended for viewing through the respective shutters.

In an exemplary embodiment, the system 5800 then determines if a time out period has expired in 5906. If the time out period has expired, then, in 5908, the transmitter 5804 then transmits a synchronization signal to the signal sensor 112. In an exemplary embodiment, the synchronization signal includes a synchronization pulse, a time of transmission of the synchronization signal and a time delay of the transmission of the synchronization signal. In this manner, the synchronization signal is used to resynchronize the clock 5802*a* of the display device 5802 with the clock 114*a* of the CPU 114 of the 3D glasses. In this manner, the opening and closing of the left and right shutters, 106 and 108, may be resynchronized with the corresponding images intended for viewing through the respective shutters.

In an exemplary embodiment, if the time delay of the transmission of the synchronization signal is anything other than a zero value, the non-zero value of the time delay of the transmission of the synchronization signal may then be used by the CPU 114 of the 3D glasses 104 to correctly synchronize the clock 114*a* of the CPU with the clock 5802*a* of the display device 5802. In an exemplary embodiment, the time delay of the transmission of the synchronization signal may be a non-zero value if, for example, there was a time delay within the signal transmitter 5804 that affected the time of transmission of the synchronization signal to the signal sensor 112. In this manner, the method 5800 may permit effective synchronization of the clock 114*a* of the CPU with the clock 5802*a* of the display device 5802 in a radio frequency communication protocol such as Bluetooth.

In an exemplary embodiment, the system 5800 and/or method 5900 may include, or omit, one or more aspects of one or more of the exemplary embodiments.

Referring now to FIG. 60, a system 6000 for viewing 3D images includes a display device 6002 having a conventional liquid crystal display ("LCD") 6002*a* and a conventional back light 6002*b* for the LCD. The general design and operation of display device 6002 is considered well known in the art, except as noted below. A pair of 3D shutter glasses 6004 may be used to view images displayed on the LCD 6002*a* that may include images intended for viewing by the left or the right eye of the wearer of the 3D shutter glasses. In an exemplary embodiment, the 3D shutter glasses 6004 may be conventional in design and operation, or may include one or more aspects of the 3D shutter glasses, 104, 1800, and 3000, and may be operated using one or more of the exemplary methods of the present disclosure.

One of the problems with using an LCD display to view 3D images is that an entire left or right image is not displayed on the LCD display at any given time. Instead, the left or right image is written to the LCD display one line at a time starting at the top of the LCD display such that, at any given moment in time, a new image is displayed at the top of the LCD display while the old image is displayed at the bottom of the LCD display. The line of demarcation between the two images on the LCD display moves from the top to the bottom over time until it reaches the bottom and then the process repeats. Normally the update process is stretched across the entire image display time interval so that the only time that just a single left or right image is displayed on the LCD display at one time is just as one update is completed and before the next one begins. This is the only time that a viewer can look at the LCD display using 3D shutter glasses and not see just a single image—a necessity if crosstalk between adjacent images is to be avoided. As will be recognized by persons having ordinary skill in the art crosstalk between adjacent images results in a composite image, i.e., one including parts of both adjacent displayed images, being viewed by the user of the 3D shutter glasses.

Figure 61:
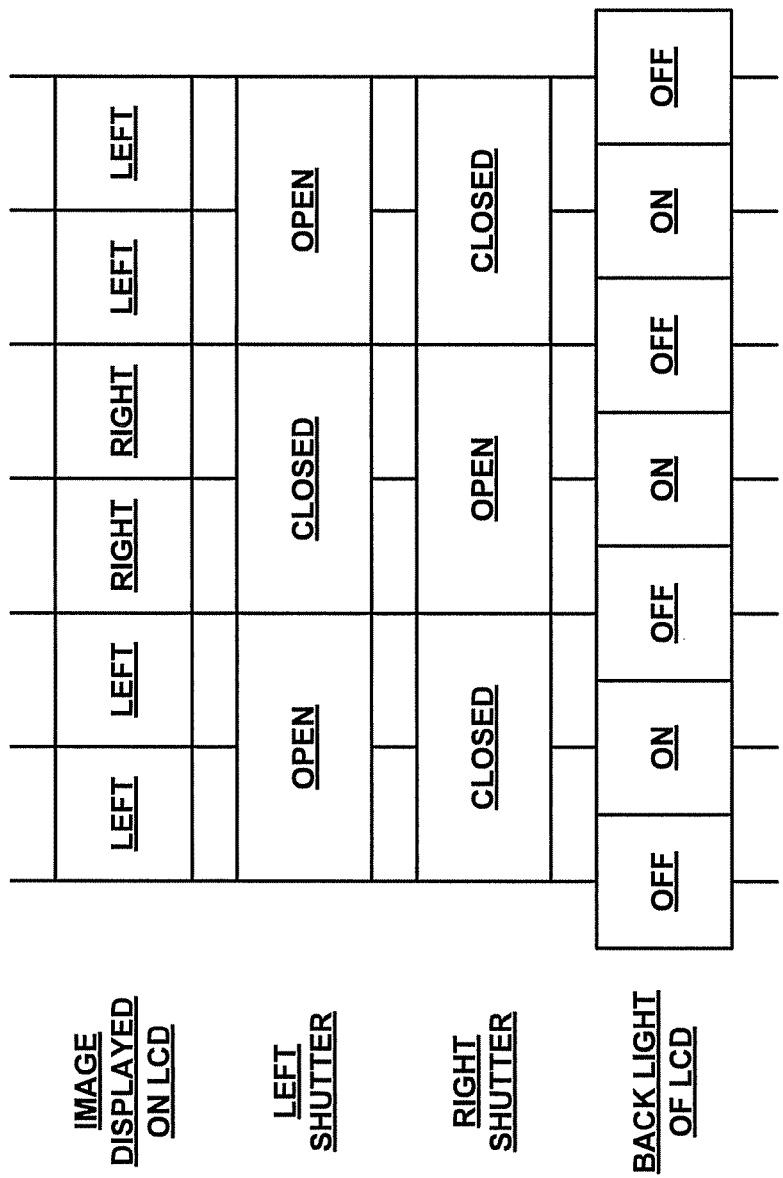
FIG. 61 is a schematic illustration of an exemplary embodiment of a method of operating the system of FIG. 60.

Referring to FIG. 61, in an exemplary embodiment, during the operation of the system 6000, the system implements a method of operation in which left and right images are displayed on the LCD 6002*a* in the following sequence: LEFT, LEFT, RIGHT, RIGHT. In an exemplary embodiment, the two displayed LEFT images may be identical and the two displayed RIGHT images may be identical. During the display of the LEFT and RIGHT images on the LCD 6002*a*, the 3D shutter glasses 6004 are operated such that the left shutter is open and the right shutter is closed during the display of the LEFT images on the LCD 6002*a*, and the left shutter is closed and the right shutter is open during the display of the RIGHT images on the LCD. In an exemplary embodiment, the backlight 6002*b* is turned off around the transitions of the displayed images from a LEFT image to a RIGHT image, and vice versa. As a result, cross talk between LEFT and RIGHT images does not occur when viewed by the user of the 3D shutter glasses 6004.

More generally, the teachings of the method illustrated and described with reference to FIG. 61 may be extended such that whenever cross talk between images displayed on the LCD 6002*a*, the backlight 6002*b* may be turned off around such corresponding transitions between adjacent images to thereby prevent cross talk between LEFT and RIGHT images does not occur when viewed by the user of the 3D shutter glasses 6004.

One of the other problems with LCD displays is that they are typically polarized. Thus, in an exemplary embodiment, the polarization of the left and right shutters of the 3D shutter glasses 6004 are substantially the same as the polarization of the LCD 6002*a*.

In an exemplary embodiment, during the operation of the system 6000, the images displayed on the LCD 6002*a* are updated 240 times a second. Furthermore, in an exemplary embodiment, during the operation of the system 6000, two LEFT images are displayed in a row on the LCD 6002*a* and then two RIGHT images are displayed in a row on the LCD. As a result, this is equivalent to having a 120 Hz update rate. In an exemplary embodiment, this operation provides 50% of the time to look at a single LEFT or RIGHT image. In an exemplary embodiment, turning off the back light 6002*b* can done essentially instantaneously so there is no concern with regard to the switching time of the left and right shutters of the 3D glasses 6004. As a result, it may be possible to overdrive the backlight 6002*b* to get some of the lost light back.

Furthermore, if in the alternative, you attempted to eliminate cross talk between displayed images by closing both of shutters of the 3D glasses 6004 during the corresponding transition, not only would you not be able to see the LCD 6002*a*, but you could not see anything else either. As a result, in such an alternative embodiment, the room lighting is attenuated by about 95%. By contrast, using the method illustrated and described above with reference to FIG. 61, the room lighting is attenuated by only about 75%.

In an exemplary embodiment, the system 6000 and/or method 6100 may include, or omit, one or more aspects of one or more of the exemplary embodiments.

A liquid crystal shutter has a liquid crystal that rotates by applying an electrical voltage to the liquid crystal and then the liquid crystal achieves a light transmission rate of at least twenty-five percent in less than one millisecond. When the liquid crystal rotates to a point having maximum light transmission, a device stops the rotation of the liquid crystal at the point of maximum light transmission and then holds the liquid crystal at the point of maximum light transmission for a period of time. A computer program installed on a machine readable medium may be used to facilitate any of these embodiments.

A system presents a three dimensional video image by using a pair of liquid crystal shutter glasses that have a first and a second liquid crystal shutter, and a control circuit adapted to open the first liquid crystal shutter. The first liquid crystal shutter can open to a point of maximum light transmission in less than one millisecond, at which time the control circuit may apply a catch voltage to hold the first liquid crystal shutter at the point of maximum light transmission for a first period of time and then close the first liquid crystal shutter. Next, the control circuit opens the second liquid crystal shutter, wherein the second liquid crystal shutter opens to a point of maximum light transmission in less than one millisecond, and then applies a catch voltage to hold the second liquid crystal shutter at the point of maximum light transmission for a second period of time, and then close the second liquid crystal shutter. The first period of time corresponds to the presentation of an image for a first eye of a viewer and the second period of time corresponds to the presentation of an image for a second eye of a viewer. A computer program installed on a machine readable medium may be used to facilitate any of the embodiments described herein.

In an exemplary embodiment, the control circuit is adapted to use a synchronization signal to determine the first and second period of time. In an exemplary embodiment, the catch voltage is two volts.

In an exemplary embodiment, the point of maximum light transmission transmits more than thirty two percent of light.

In an exemplary embodiment, an emitter provides a synchronization signal and the synchronization signal causes the control circuit to open one of the liquid crystal shutters. In an exemplary embodiment, the synchronization signal comprises an encrypted signal. In an exemplary embodiment, the control circuit of the three dimensional glasses will only operate after validating an encrypted signal.

In an exemplary embodiment, the control circuit has a battery sensor and may be adapted to provide an indication of a low battery condition. The indication of a low battery condition may be a liquid crystal shutter that is closed for a period of time and then open for a period of time.

In an exemplary embodiment, the control circuit is adapted to detect a synchronization signal and begin operating the liquid crystal shutters after detecting the synchronization signal.

In an exemplary embodiment, the encrypted signal will only operate a pair of liquid crystal glasses having a control circuit adapted to receive the encrypted signal.

In an exemplary embodiment, a test signal operates the liquid crystal shutters at a rate that is visible to a person wearing the pair of liquid crystal shutter glasses.

In an exemplary embodiment, a pair of glasses has a first lens that has a first liquid crystal shutter and a second lens that has a second liquid crystal shutter. Both liquid crystal shutters have a liquid crystal that can open in less than one millisecond and a control circuit that alternately opens the first and second liquid crystal shutters. When the liquid crystal shutter opens, the liquid crystal orientation is held at a point of maximum light transmission until the control circuit closes the shutter.

In an exemplary embodiment, a catch voltage holds the liquid crystal at the point of maximum light transmission. The point of maximum light transmission may transmit more than thirty two percent of light.

In an exemplary embodiment, an emitter that provides a synchronization signal and the synchronization signal causes the control circuit to open one of the liquid crystal shutters. In some embodiments, the synchronization signal includes an encrypted signal. In an exemplary embodiment, the control circuit will only operate after validating the encrypted signal. In an exemplary embodiment, the control circuit includes a battery sensor and may be adapted to provide an indication of a low battery condition. The indication of a low battery condition could be a liquid crystal shutter that is closed for a period of time and then open for a period of time. In an exemplary embodiment, the control circuit is adapted to detect a synchronization signal and begin operating the liquid crystal shutters after it detects the synchronization signal.

The encrypted signal may only operate a pair of liquid crystal glasses that has a control circuit adapted to receive the encrypted signal.

In an exemplary embodiment, a test signal operates the liquid crystal shutters at a rate that is visible to a person wearing the pair of liquid crystal shutter glasses.

In an exemplary embodiment, a three dimensional video image is presented to a viewer by using liquid crystal shutter eyeglasses, opening the first liquid crystal shutter in less than one millisecond, holding the first liquid crystal shutter at a point of maximum light transmission for a first period of time, closing the first liquid crystal shutter, then opening the second liquid crystal shutter in less than one millisecond, and then holding the second liquid crystal shutter at a point of maximum light transmission for a second period of time. The first period of time corresponds to the presentation of an image for a first eye of a viewer and the second period of time corresponds to the presentation of an image for a second eye of a viewer.

In an exemplary embodiment, the liquid crystal shutter is held at the point of maximum light transmission by a catch voltage. The catch voltage could be two volts. In an exemplary embodiment, the point of maximum light transmission transmits more than thirty two percent of light.

In an exemplary embodiment, an emitter provides a synchronization signal that causes the control circuit to open one of the liquid crystal shutters. In some embodiments, the synchronization signal comprises an encrypted signal.

In an exemplary embodiment, the control circuit will only operate after validating the encrypted signal.

In an exemplary embodiment, a battery sensor monitors the amount of power in the battery. In an exemplary embodiment, the control circuit is adapted to provide an indication of a low battery condition. The indication of a low battery condition may be a liquid crystal shutter that is closed for a period of time and then open for a period of time.

In an exemplary embodiment, the control circuit is adapted to detect a synchronization signal and begin operating the liquid crystal shutters after detecting the synchronization signal. In an exemplary embodiment, the encrypted signal will only operate a pair of liquid crystal glasses that has a control circuit adapted to receive the encrypted signal.

In an exemplary embodiment, a test signal operates the liquid crystal shutters at a rate that is visible to a person wearing the pair of liquid crystal shutter glasses.

In an exemplary embodiment, a system for providing three dimensional video images may include a pair of glasses that has a first lens having a first liquid crystal shutter and a second lens having a second liquid crystal shutter. The liquid crystal shutters may have a liquid crystal and an may be opened in less than one millisecond. A control circuit may alternately open the first and second liquid crystal shutters, and hold the liquid crystal orientation at a point of maximum light transmission until the control circuit closes the shutter. Furthermore, the system may have a low battery indicator that includes a battery, a sensor capable of determining an amount of power remaining in the battery, a controller adapted to determine whether the amount of power remaining in the battery is sufficient for the pair of glasses to operate longer than a predetermined time, and an indicator to signal a viewer if the glasses will not operate longer than the predetermined time. In an exemplary embodiment, the low battery indicator is opening and closing the left and right liquid crystal shutters at a predetermined rate. In an exemplary embodiment, the predetermined amount of time is longer than three hours. In an exemplary embodiment, the low battery indicator may operate for at least three days after determining that the amount of power remaining in the battery is not sufficient for the pair of glasses to operate longer than the predetermined amount of time. In an exemplary embodiment, the controller may determine the amount of power remaining in the battery by measuring time by the number of synchronization pulses remaining in the battery.

In an exemplary embodiment for providing a three dimensional video image, the image is provided by having a pair of three dimensional viewing glasses that includes a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time. The first period of time corresponds to the presentation of an image for a first eye of the viewer and the second period of time corresponds to the presentation of an image for the second eye of the viewer. In this exemplary embodiment, the three dimensional viewing glasses sense the amount of power remaining in the battery, determine whether the amount of power remaining in the battery is sufficient for the pair of glasses to operate longer than a predetermined time, and then indicate a low-battery signal to a viewer if the glasses will not operate longer than the predetermined time. The indicator may be opening and closing the lenses at a predetermined rate. The predetermined amount of time for the battery to last could be more than three hours. In an exemplary embodiment, the low battery indicator operates for at least three days after determining the amount of power remaining in the battery is not sufficient for the pair of glasses to operate longer than the predetermined amount of time. In an exemplary embodiment, the controller determines the amount of power remaining in the battery by measuring time by the number of synchronization pulses that the battery can last for.

In an exemplary embodiment, for providing three dimensional video images, the system includes a pair of glasses comprising a first lens having a first liquid crystal shutter and a second lens having a second liquid crystal shutter, the liquid crystal shutters having a liquid crystal and an opening time of less than one millisecond. A control circuit may alternately open the first and second liquid crystal shutters, and the liquid crystal orientation is held at a point of maximum light transmission until the control circuit closes the shutter. Furthermore, a synchronization device that includes a signal transmitter that sends a signal corresponding to an image presented for a first eye, a signal receiver sensing the signal, and a control circuit adapted to open the first shutter during a period of time in which the image is presented for the first eye. In an exemplary embodiment, the signal is an infrared light.

In an exemplary embodiment, the signal transmitter projects the signal toward a reflector, the signal is reflected by the reflector, and the signal receiver detects the reflected signal. In some embodiments, the reflector is a movie theater screen. In an exemplary embodiment, the signal transmitter receives a timing signal from an image projector such as the movie projector. In an exemplary embodiment, the signal is a radio frequency signal. In an exemplary embodiment, the signal is a series of pulses at a predetermined interval. In an exemplary embodiment, where the signal is a series of pulses at a predetermined interval, the first predetermined number of pulses opens the first liquid crystal shutter and a second predetermined number of pulses opens the second liquid crystal shutter.

In an exemplary embodiment for providing a three dimensional video image, the method of providing the image includes: having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time. The first period of time corresponds to the presentation of an image for the left eye of a viewer and the second period of time corresponds to the presentation of an image for the right eye of a viewer. The signal transmitter can transmit a signal corresponding to the image presented for a left eye, and, sensing the signal the three dimensional view glasses can use the signal to determine when to open the first liquid crystal shutter. In an exemplary embodiment, the signal is an infrared light. In an exemplary embodiment, the signal transmitter projects the signal toward a reflector which reflects the signal toward the three dimensional viewing glasses, and the signal receiver in the glasses detects the reflected signal. In an exemplary embodiment, the reflector is a movie theater screen.

In an exemplary embodiment, the signal transmitter receives a timing signal from an image projector. In an exemplary embodiment, the signal is a radio frequency signal. In an exemplary embodiment, the signal could be a series of pulses at a predetermined interval. A first predetermined number of pulses could open the first liquid crystal shutter and a second predetermined number of pulses could open the second liquid crystal shutter.

In an exemplary embodiment of a system for providing three dimensional video images, a pair of glasses has a first lens having a first liquid crystal shutter and a second lens having a second liquid crystal shutter, the liquid crystal shutters having a liquid crystal and an opening time of less than one millisecond. A control circuit alternately opens the first and second liquid crystal shutters, and the liquid crystal orientation is held at a point of maximum light transmission until the control circuit closes the shutter. In an exemplary embodiment, a synchronization system comprising a reflection device located in front of the pair of glasses, and a signal transmitter sending a signal towards the reflection device. The signal corresponds to an image presented for a first eye of a viewer. A signal receiver senses the signal reflected from the reflection device, and then a control circuit opens the first shutter during a period of time in which the image is presented for the first eye.

In an exemplary embodiment, the signal is an infrared light. In an exemplary embodiment, the reflector is a movie theater screen. In an exemplary embodiment, the signal transmitter receives a timing signal from an image projector. The signal may a series of pulses at a predetermined interval. In an exemplary embodiment, the signal is a series of pulses at a predetermined interval and the first predetermined number of pulses opens the first liquid crystal shutter and the second predetermined number of pulses opens the second liquid crystal shutter.

In an exemplary embodiment for providing a three dimensional video image, the image can be provided by having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, and then holding the second liquid crystal shutter at a point of maximum light transmission for a second period of time. The first period of time corresponds to the presentation of an image for a first eye of a viewer and the second period of time corresponds to the presentation of an image for a second eye of a viewer. In an exemplary embodiment, the transmitter transmits an infrared signal corresponding to the image presented for a first eye. The three dimensional viewing glasses sense the infrared signal, and then use the infrared signal to trigger the opening of the first liquid crystal shutter. In an exemplary embodiment, the signal is an infrared light. In an exemplary embodiment, the reflector is a movie theater screen. In an exemplary embodiment, the signal transmitter receives a timing signal from an image projector. The timing signal could be a series of pulses at a predetermined interval. In some embodiments, a first predetermined number of pulses opens the first liquid crystal shutter and a second predetermined number of pulses opens the second liquid crystal shutter.

In an exemplary embodiment, a system for providing three dimensional video images includes a pair of glasses that have a first lens having a first liquid crystal shutter and a second lens having a second liquid crystal shutter, the liquid crystal shutters having a liquid crystal and an opening time of less than one millisecond. The system could also have a control circuit that alternately opens the first and second liquid crystal shutters, and hold the liquid crystal orientation at a point of maximum light transmission until the control circuit closes the shutter. The system may also have a test system comprising a signal transmitter, a signal receiver, and a test system control circuit adapted to open and close the first and second shutters at a rate that is visible to a viewer. In an exemplary embodiment, the signal transmitter does not receive a timing signal from a projector. In an exemplary embodiment, the signal transmitter emits an infrared signal. The infrared signal could be a series of pulses. In another exemplary embodiment, the signal transmitter emits an radio frequency signal. The radio frequency signal could be a series of pulses.

In an exemplary embodiment of a method for providing a three dimensional video image, the method could include having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, and holding the second liquid crystal shutter at a point of maximum light transmission for a second period of time. In an exemplary embodiment, the first period of time corresponds to the presentation of an image for a first eye of a viewer and the second period of time corresponds to the presentation of an image for a second eye of a viewer. In an exemplary embodiment, a transmitter could transmit a test signal towards the three dimensional viewing glasses, which then receive the test signal with a sensor on the three dimensional glasses, and then use a control circuit to open and close the first and second liquid crystal shutters as a result of the test signal, wherein the liquid crystal shutters open and close at a rate that is observable to a viewer wearing the glasses.

In an exemplary embodiment the signal transmitter does not receive a timing signal from a projector. In an exemplary embodiment, the signal transmitter emits an infrared signal, which could be a series of pulses. In an exemplary embodiment, the signal transmitter emits an radio frequency signal. In an exemplary embodiment, the radio frequency signal is a series of pulses.

An exemplary embodiment of a system for providing three dimensional video images could include a pair of glasses comprising a first lens that has a first liquid crystal shutter and a second lens that has a second liquid crystal shutter, the liquid crystal shutters having a liquid crystal and an opening time of less than one millisecond. The system could also have a control circuit that alternately opens the first and second liquid crystal shutters, holds the liquid crystal orientation at a point of maximum light transmission and then close the shutter. In an exemplary embodiment, an auto-on system comprising a signal transmitter, a signal receiver, and wherein the control circuit is adapted to activate the signal receiver at a first predetermined time interval, determine if the signal receiver is receiving a signal from the signal transmitter, deactivate the signal receiver if the signal receiver does not receive the signal from the signal transmitter within a second period of time, and alternately open the first and second shutters at an interval corresponding to the signal if the signal receiver does receive the signal from the signal transmitter.

In an exemplary embodiment, the first period of time is at least two seconds and the second period of time could be no more than 100 milliseconds. In an exemplary embodiment, the liquid crystal shutters remain open until the signal receiver receives a signal from the signal transmitter.

In an exemplary embodiment, a method for providing a three dimensional video image could include having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, and holding the second liquid crystal shutter at a point of maximum light transmission for a second period of time. In an exemplary embodiment, the first period of time corresponds to the presentation of an image for a first eye of a viewer and the second period of time corresponds to the presentation of an image for a second eye of a viewer. In an exemplary embodiment, the method could include activating a signal receiver at a first predetermined time interval, determining if the signal receiver is receiving a signal from the signal transmitter, deactivating the signal receiver if the signal receiver does not receive the signal from the signal transmitter within a second period of time, and opening and closing the first and second shutters at an interval corresponding to the signal if the signal receiver does receive the signal from the signal transmitter. In an exemplary embodiment, the first period of time is at least two seconds. In an exemplary embodiment, the second period of time is no more than 100 milliseconds. In an exemplary embodiment, the liquid crystal shutters remain open until the signal receiver receives a signal from the signal transmitter.

In an exemplary embodiment, a system for providing three dimensional video images could include a pair of glasses comprising a first lens having a first liquid crystal shutter and a second lens having a second liquid crystal shutter, the liquid crystal shutters having a liquid crystal and an opening time of less than one millisecond. It could also have a control circuit that can alternately open the first and second liquid crystal shutters, and hold the liquid crystal orientation at a point of maximum light transmission until the control circuit closes the shutter. In an exemplary embodiment, the control circuit is adapted to hold the first liquid crystal shutter and the second liquid crystal shutter open. In an exemplary embodiment, the control circuit holds the lenses open until the control circuit detects a synchronization signal. In an exemplary embodiment, the voltage applied to the liquid crystal shutters alternates between positive and negative.

In one embodiment of a device for providing a three dimensional video image, a pair of three dimensional viewing glasses comprising a first liquid crystal shutter and a second liquid crystal shutter, wherein the first liquid crystal shutter can open in less than one millisecond, wherein the second liquid crystal shutter can open in less than one millisecond, open and close the first and second liquid crystal shutters at a rate that makes the liquid crystal shutters appear to be clear lenses. In one embodiment, the control circuit holds the lenses open until the control circuit detects a synchronization signal. In one embodiment, the liquid crystal shutters alternates between positive and negative.

In an exemplary embodiment, a system for providing three dimensional video images could include a pair of glasses comprising a first lens having a first liquid crystal shutter and a second lens having a second liquid crystal shutter, the liquid crystal shutters having a liquid crystal and an opening time of less than one millisecond. It could also include a control circuit that alternately opens the first and second liquid crystal shutters and hold the liquid crystal at a point of maximum light transmission until the control circuit closes the shutter. In an exemplary embodiment, an emitter could provide a synchronization signal where a portion of the synchronization signal is encrypted. A sensor operably connected to the control circuit could be adapted to receive the synchronization signal, and the first and second liquid crystal shutters could open and close in a pattern corresponding to the synchronization signal only after receiving an encrypted signal.

In an exemplary embodiment, the synchronization signal is a series of pulses at a predetermined interval. In an exemplary embodiment, the synchronization signal is a series of pulses at a predetermined interval and a first predetermined number of pulses opens the first liquid crystal shutter and a second predetermined number of pulses opens the second liquid crystal shutter. In an exemplary embodiment, a portion of the series of pulses is encrypted. In an exemplary embodiment, the series of pulses includes a predetermined number of pulses that are not encrypted followed by a predetermined number of pulses that are encrypted. In an exemplary embodiment, the first and second liquid crystal shutters open and close in a pattern corresponding to the synchronization signal only after receiving two consecutive encrypted signals.

In an exemplary embodiment of a method for providing a three dimensional video image, the method could include having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, and holding the second liquid crystal shutter at a point of maximum light transmission for a second period of time. In an exemplary embodiment, the first period of time corresponds to the presentation of an image for a first eye of a viewer and the second period of time corresponds to the presentation of an image for a second eye of a viewer. In an exemplary embodiment, an emitter provides a synchronization signal wherein a portion of the synchronization signal is encrypted. In an exemplary embodiment, a sensor is operably connected to the control circuit and adapted to receive the synchronization signal, and the first and second liquid crystal shutters open and close in a pattern corresponding to the synchronization signal only after receiving an encrypted signal.

In an exemplary embodiment, the synchronization signal is a series of pulses at a predetermined interval. In an exemplary embodiment, the synchronization signal is a series of pulses at a predetermined interval and wherein a first predetermined number of pulses opens the first liquid crystal shutter and wherein a second predetermined number of pulses opens the second liquid crystal shutter. In an exemplary embodiment, a portion of the series of pulses is encrypted. In an exemplary embodiment, the series of pulses includes a predetermined number of pulses that are not encrypted followed by a predetermined number of pulses that are encrypted. In an exemplary embodiment, the first and second liquid crystal shutters open and close in a pattern corresponding to the synchronization signal only after receiving two consecutive encrypted signals.

A method for rapidly opening a liquid crystal shutter for use in 3D glasses has been described that includes causing the liquid crystal to rotate to an open position, the liquid crystal achieving a light transmission rate of at least twenty-five percent in less than one millisecond, waiting until the liquid crystal rotates to a point having maximum light transmission; stopping the rotation of the liquid crystal at the point of maximum light transmission; and holding the liquid crystal at the point of maximum light transmission for a period of time. In an exemplary embodiment, the system includes a pair of liquid crystal shutters having corresponding first and a second liquid crystal shutters, and a control circuit adapted to open the first liquid crystal shutter, wherein the first liquid crystal shutter opens to a point of maximum light transmission in less than one millisecond, apply a catch voltage to hold the first liquid crystal shutter at the point of maximum light transmission for a first period of time, then close the first liquid crystal shutter, open the second liquid crystal shutter, wherein the second liquid crystal shutter opens to a point of maximum light transmission in less than one millisecond, apply a catch voltage to hold the second liquid crystal shutter at the point of maximum light transmission for a first period of time, and then close the second liquid crystal shutter; wherein the first period of time corresponds to the presentation of an image for a first eye of the user and the second period of time corresponds to the presentation of an image for a second eye of the user. In an exemplary embodiment, the control circuit is adapted to use a synchronization signal to determine the first and second period of time. In an exemplary embodiment, the catch voltage is two volts. In an exemplary embodiment, the point of maximum light transmission transmits more than thirty two percent of light. In an exemplary embodiment, the system further includes an emitter that provides a synchronization signal and wherein the synchronization signal causes the control circuit to open one of the liquid crystal shutters. In an exemplary embodiment, the synchronization signal includes an encrypted signal. In an exemplary embodiment, the control circuit will only operate after validating the encrypted signal. In an exemplary embodiment, the system further includes a battery sensor. In an exemplary embodiment, the control circuit is adapted to provide an indication of a low battery condition. In an exemplary embodiment, the indication of a low battery condition comprises a liquid crystal shutter that is closed for a period of time and then open for a period of time. In an exemplary embodiment, the control circuit is adapted to detect a synchronization signal and begin operating the liquid crystal shutters after detecting the synchronization signal. In an exemplary embodiment, the encrypted signal will only operate a pair of liquid crystal glasses having a control circuit adapted to receive the encrypted signal. In an exemplary embodiment, the system further includes a test signal wherein the test signal operates the liquid crystal shutters at a rate that is visible to the user wearing the pair of liquid crystal shutter glasses.

A system for providing three dimensional video images has been described that includes a pair of glasses including a first lens having a first liquid crystal shutter and a second lens having a second liquid crystal shutter, the liquid crystal shutters each having a liquid crystal and an opening time of less than one millisecond, and a control circuit that alternately opens the first and second liquid crystal shutters, wherein the liquid crystal orientation is held at a point of maximum light transmission until the control circuit closes the shutter. In an exemplary embodiment, a catch voltage holds the liquid crystal at the point of maximum light transmission. In an exemplary embodiment, the point of maximum light transmission transmits more than thirty two percent of light. In an exemplary embodiment, the system further includes an emitter that provides a synchronization signal and wherein the synchronization signal causes the control circuit to open one of the liquid crystal shutters. In an exemplary embodiment, the synchronization signal includes an encrypted signal. In an exemplary embodiment, the control circuit will only operate after validating the encrypted signal. In an exemplary embodiment, the system further includes a battery sensor. In an exemplary embodiment, the control circuit is adapted to provide an indication of a low battery condition. In an exemplary embodiment, the indication of a low battery condition includes a liquid crystal shutter that is closed for a period of time and then open for a period of time. In an exemplary embodiment, the control circuit is adapted to detect a synchronization signal and begin operating the liquid crystal shutters after detecting the synchronization signal. In an exemplary embodiment, the encrypted signal will only operate a pair of liquid crystal glasses having a control circuit adapted to receive the encrypted signal. In an exemplary embodiment, the system further includes a test signal wherein the test signal operates the liquid crystal shutters at a rate that is visible to a person wearing the pair of liquid crystal shutter glasses.

A method for providing a three dimensional video image has been described that includes opening a first liquid crystal shutter in less than one millisecond, holding the first liquid crystal shutter at a point of maximum light transmission for a first period of time, closing the first liquid crystal shutter and then opening a second liquid crystal shutter in less than one millisecond, and holding the second liquid crystal shutter at a point of maximum light transmission for a second period of time, wherein the first period of time corresponds to the presentation of an image for a first eye of a viewer and the second period of time corresponds to the presentation of an image for a second eye of the viewer. In an exemplary embodiment, the method further includes holding the liquid crystal shutter at the point of maximum light transmission by a catch voltage. In an exemplary embodiment, the catch voltage is two volts. In an exemplary embodiment, the point of maximum light transmission transmits more than thirty two percent of light. In an exemplary embodiment, the method further includes emitting a synchronization signal for controlling an operation of the liquid crystal shutters. In an exemplary embodiment, the synchronization signal includes an encrypted signal. In an exemplary embodiment, the synchronization signal will only control the operation of the liquid crystal shutters control circuit after being validating the encrypted signal. In an exemplary embodiment, the method further includes sensing a power level of a battery. In an exemplary embodiment, the method further includes providing an indication of the power level of the battery. In an exemplary embodiment, the indication of a low battery power level includes a liquid crystal shutter that is closed for a period of time and then open for a period of time. In an exemplary embodiment, the method further includes detecting a synchronization signal and then operating the liquid crystal shutters after detecting the synchronization signal. In an exemplary embodiment, the method further includes only operating the liquid crystal shutters after receiving an encrypted signal specially designated for the liquid crystal shutters. In an exemplary embodiment, the method further includes providing a test signal that operates the liquid crystal shutters at a rate that is visible to the viewer.

A computer program installed on a machine readable medium in a housing for 3D glasses for providing a three dimensional video image to a user of the 3D glasses has been described that includes causing a liquid crystal to rotate by applying an electrical voltage to the liquid crystal, the liquid crystal achieving a light transmission rate of at least twenty-five percent in less than one millisecond; waiting until the liquid crystal rotates to a point having maximum light transmission; stopping the rotation of the liquid crystal at the point of maximum light transmission; and holding the liquid crystal at the point of maximum light transmission for a period of time.

A computer program installed on a machine readable medium for providing a three dimensional video image to a user of the 3D glasses has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, and holding the second liquid crystal shutter at a point of maximum light transmission for a second period of time, wherein the first period of time corresponds to the presentation of an image for a first eye of the user and the second period of time corresponds to the presentation of an image for a second eye of the user. In an exemplary embodiment, the liquid crystal shutter is held at the point of maximum light transmission by a catch voltage. In an exemplary embodiment, the catch voltage is two volts. In an exemplary embodiment, the point of maximum light transmission transmits more than thirty two percent of light. In an exemplary embodiment, the computer program further includes providing a synchronization signal that controls an operation of the liquid crystal shutters. In an exemplary embodiment, the synchronization signal comprises an encrypted signal. In an exemplary embodiment, the computer program further includes operating the liquid crystal shutters only after validating the encrypted signal. In an exemplary embodiment, the computer program further includes sensing a power level of a battery. In an exemplary embodiment, the computer program includes providing an indication of a low battery condition. In an exemplary embodiment, the computer program further includes providing an indication of a low battery condition by closing a liquid crystal shutter for a period of time and then opening the liquid crystal shutter for a period of time. In an exemplary embodiment, the computer program further includes detecting a synchronization signal and then operating the liquid crystal shutters after detecting the synchronization signal. In an exemplary embodiment, the computer program further includes only operating the liquid crystal shutters after receiving an encrypted signal specifically designated from controlling the liquid crystal shutters. In an exemplary embodiment, the computer program further includes providing a test signal that opens and closes the liquid crystal shutters at a rate that is visible to the user.

A system for rapidly opening a liquid crystal shutter has been described that includes means for causing a liquid crystal to rotate by applying an electrical voltage to the liquid crystal, the liquid crystal achieving a light transmission rate of at least twenty-five percent in less than one millisecond; means for waiting until the liquid crystal rotates to a point having maximum light transmission; means for stopping the rotation of the liquid crystal at the point of maximum light transmission; and means for holding the liquid crystal at the point of maximum light transmission for a period of time.

A system for providing a three dimensional video image has been described that includes means for opening the first liquid crystal shutter in less than one millisecond, means for holding the first liquid crystal shutter at a point of maximum light transmission for a first period of time, means for closing the first liquid crystal shutter and then opening the second liquid crystal shutter in less than one millisecond, and means for holding the second liquid crystal shutter at a point of maximum light transmission for a second period of time, and wherein the first period of time corresponds to the presentation of an image for a first eye of a viewer and the second period of time corresponds to the presentation of an image for a second eye of the viewer. In an exemplary embodiment, at least one of the first and second liquid crystal shutter is held at the point of maximum light transmission by a catch voltage. In an exemplary embodiment, the catch voltage is two volts. In an exemplary embodiment, the point of maximum light transmission transmits more than thirty two percent of light. In an exemplary embodiment, the system further includes means for providing a synchronization signal and wherein the synchronization signal causes one of the liquid crystal shutters to open. In an exemplary embodiment, the synchronization signal comprises an encrypted signal. In an exemplary embodiment, the system further includes means for only operating the liquid crystal shutters after validating the encrypted signal. In an exemplary embodiment, the system further includes means for sensing an operating condition of a battery. In an exemplary embodiment, the system further includes means for providing an indication of a low battery condition. In an exemplary embodiment, the means for providing an indication of a low battery condition includes means for closing a liquid crystal shutter for a period of time and then opening the liquid crystal shutter for a period of time. In an exemplary embodiment, the system further includes means for detecting a synchronization signal and means for operating the liquid crystal shutters after detecting the synchronization signal. In an exemplary embodiment, the system further includes means for only operating the liquid crystal shutters after receiving an encrypted signal specially designated for operating the liquid crystal shutters. In an exemplary embodiment, the system further includes means for operating the liquid crystal shutters at a rate that is visible to the viewer.

A method for rapidly opening a liquid crystal shutter for use in 3D glasses has been described that includes causing the liquid crystal to rotate to an open position, waiting until the liquid crystal rotates to a point having maximum light transmission; stopping the rotation of the liquid crystal at the point of maximum light transmission; and holding the liquid crystal at the point of maximum light transmission for a period of time; wherein the liquid crystal comprises an optically thick liquid crystal.

A method for providing a three dimensional video image has been described that includes transmitting an encrypted synchronization signal, receiving the encrypted synchronization signal at a remote location, after validating the received encrypted synchronization signal, opening a first liquid crystal shutter in less than one millisecond, holding the first liquid crystal shutter at a point of maximum light transmission for a first period of time, closing the first liquid crystal shutter and then opening a second liquid crystal shutter in less than one millisecond, holding the second liquid crystal shutter at a point of maximum light transmission for a second period of time, providing battery power for opening and closing the liquid crystal shutters; sensing a power level of the battery power, and providing an indication of the sensed power level of the battery power by opening and closing the liquid crystal shutters at a rate that is visible to a viewer, wherein the first period of time corresponds to the presentation of an image for a first eye of the viewer and the second period of time corresponds to the presentation of an image for a second eye of the viewer, and wherein the liquid crystal shutters are held at the point of maximum light transmission by a catch voltage.

A system for providing three dimensional video images has been described that includes a pair of glasses comprising a first lens having a first liquid crystal shutter and a second lens having a second liquid crystal shutter, the liquid crystal shutters having a liquid crystal and an opening time of less than one millisecond, a control circuit that alternately opens the first and second liquid crystal shutters, wherein the liquid crystal orientation is held at a point of maximum light transmission until the control circuit closes the shutter, and a low battery indicator that includes a battery operably coupled to the control circuit, a sensor capable of determining an amount of power remaining in the battery, a controller adapted to determine whether the amount of power remaining in the battery is sufficient for the pair of glasses to operate longer than a predetermined time, and an indicator to signal a viewer if the glasses will not operate longer than the predetermined time. In an exemplary embodiment, the indicator includes opening and closing the left and right liquid crystal shutters at a predetermined rate. In an exemplary embodiment, the predetermined amount of time is longer than three hours. In an exemplary embodiment, the low battery indicator operates for at least three days after determining the amount of power remaining in the battery is not sufficient for the pair of glasses to operate longer than the predetermined amount of time. In an exemplary embodiment, the controller adapted to determine the amount of power remaining in the battery measures time by a number of synchronization pulses.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, sensing an amount of power remaining in a battery, determining whether the amount of power remaining in the battery is sufficient for the pair of three dimensional viewing glasses to operate longer than a predetermined time, and indicating a low-battery signal to a viewer if the three dimensional viewing glasses will not operate longer than the predetermined time. In an exemplary embodiment, indicating a low-battery signal to a viewer if the three dimensional viewing glasses will not operate longer than the predetermined time includes opening and closing the first and second liquid crystal shutters at a predetermined rate. In an exemplary embodiment, the predetermined amount of time is longer than three hours. In an exemplary embodiment, indicating a low-battery signal to a viewer if the three dimensional viewing glasses will not operate longer than the predetermined time includes indicating a low-battery signal to a viewer if the three dimensional viewing glasses for at least three days after determining the amount of power remaining in the battery is not sufficient for the pair of three dimensional viewing glasses to operate longer than the predetermined amount of time. In an exemplary embodiment, the method further includes determining the amount of power remaining in the battery comprises measuring a number of synchronization pulses transmitted to the three dimensional viewing glasses.

A computer program installed on a machine readable medium for providing a three dimensional video image using a pair of three dimensional viewing glasses including a first liquid crystal shutter and a second liquid crystal shutter has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, sensing an amount of power remaining in a battery, determining whether the amount of power remaining in the battery is sufficient for the pair of three dimensional viewing glasses to operate longer than a predetermined time, and indicating a low-battery signal to a viewer if the three dimensional viewing glasses will not operate longer than the predetermined time. In an exemplary embodiment, the computer program includes indicating a low-battery signal to a viewer if the three dimensional viewing glasses will not operate longer than the predetermined time comprises opening and closing the first and second liquid crystal shutters at a predetermined rate. In an exemplary embodiment, the predetermined amount of time is longer than three hours. In an exemplary embodiment, the computer program includes indicating a low-battery signal to a viewer if the three dimensional viewing glasses will not operate longer than the predetermined time comprises indicating a low-battery signal to a viewer if the three dimensional viewing glasses will not operate longer than the predetermined time for at least three days after determining the amount of power remaining in the battery is not sufficient for the pair of three dimensional viewing glasses to operate longer than the predetermined amount of time. In an exemplary embodiment, the computer program further includes determining the amount of power remaining in the battery by measuring a number of synchronization pulses transmitted to the three dimensional viewing glasses.

A system for providing a three dimensional video image has been described that includes means for having a pair of three dimensional viewing glasses comprising a first liquid crystal shutter and a second liquid crystal shutter, means for opening the first liquid crystal shutter in less than one millisecond, means for holding the first liquid crystal shutter at a point of maximum light transmission for a first period of time, means for closing the first liquid crystal shutter and then opening the second liquid crystal shutter in less than one millisecond, means for holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, means for sensing an amount of power remaining in a battery, means for determining whether the amount of power remaining in the battery is sufficient for the pair of three dimensional viewing glasses to operate longer than a predetermined time, and means for indicating a low-battery signal to a viewer if the three dimensional viewing glasses will not operate longer than the predetermined time. In an exemplary embodiment, the low-battery signal comprises means for opening and closing the first and second liquid crystal shutters at a predetermined rate. In an exemplary embodiment, the predetermined amount of time is longer than three hours. In an exemplary embodiment, the system further includes means for indicating a low battery power for at least three days after determining the amount of power remaining in the battery is not sufficient for the pair of three dimensional viewing glasses to operate longer than the predetermined amount of time. In an exemplary embodiment, the system further includes means for determining the amount of power remaining in the battery by measuring time by a number of synchronization pulses.

A system for providing three dimensional video images has been described that includes a pair of three dimensional viewing glasses comprising a first lens having a first liquid crystal shutter and a second lens having a second liquid crystal shutter, a control circuit for controlling the operation of the first and second liquid crystal shutters, a battery operably coupled to the control circuit, and a signal sensor operably coupled to the control circuit, wherein the control circuit is adapted to determine whether the amount of power remaining in the battery is sufficient for the pair of three dimensional viewing glasses to operate longer than a predetermined time as a function of a number of external signals detected by the signal sensor and operate the first and second liquid crystal shutters to provide a visual indication of the amount of power remaining in the battery. In an exemplary embodiment, the visual indication comprises opening and closing the first and second liquid crystal shutters at a predetermined rate.

A method for providing a three dimensional video image has been described that includes having a pair of three dimensional viewing glasses comprising a first liquid crystal shutter and a second liquid crystal shutter, sensing an amount of power remaining in a battery by determining a number of external signals transmitted to the three dimensional viewing glasses, determining whether the amount of power remaining in the battery is sufficient for the pair of three dimensional viewing glasses to operate longer than a predetermined time, and indicating a low-battery signal to a viewer if the three dimensional viewing glasses will not operate longer than the predetermined time. In an exemplary embodiment, the low-battery signal includes opening and closing the first and second liquid crystal shutters at a predetermined rate.

A computer program stored in a memory device for use in operating a pair of three dimensional viewing glasses comprising a first liquid crystal shutter and a second liquid crystal shutter providing a three dimensional video image has been described that includes sensing an amount of power remaining in a battery of the three dimensional viewing glasses by determining a number of external signals transmitted to the three dimensional viewing glasses, determining whether the amount of power remaining in the battery is sufficient for the pair of three dimensional viewing glasses to operate longer than a predetermined time, and indicating a low-battery signal to a viewer if the three dimensional viewing glasses will not operate longer than the predetermined time. In an exemplary embodiment, the low-battery signal comprises opening and closing the first and second liquid crystal shutters at a predetermined rate.

A method for providing a three dimensional video image has been described that includes having a pair of three dimensional viewing glasses including a first liquid crystal shutter and a second liquid crystal shutter has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, sensing an amount of power remaining in a battery, determining whether the amount of power remaining in the battery is sufficient for the pair of three dimensional viewing glasses to operate longer than a predetermined time, and indicating a low-battery signal to a viewer if the three dimensional viewing glasses will not operate longer than the predetermined time; wherein indicating a low-battery signal to a viewer if the three dimensional viewing glasses will not operate longer than the predetermined time includes opening and closing the first and second liquid crystal shutters at a predetermined rate, and wherein determining the amount of power remaining in the battery comprises measuring a number of synchronization pulses transmitted to the three dimensional viewing glasses.

A system for providing three dimensional video images has been described that includes a pair of glasses comprising a first lens having a first liquid crystal shutter and a second lens having a second liquid crystal shutter, the liquid crystal shutters each having a liquid crystal and an opening time of less than one millisecond, a control circuit that alternately opens the first and second liquid crystal shutters, wherein the liquid crystal orientation is held at a point of maximum light transmission until the control circuit closes the shutter, and a synchronization device operably coupled to the control circuit, including a signal receiver for sensing a synchronization signal corresponding to an image presented to a user of the glasses, and a control circuit adapted to open the first liquid crystal shutter or the second liquid crystal shutter during a period of time in which the image is presented as a function of the synchronization signal transmitted. In an exemplary embodiment, the synchronization signal includes an infrared light. In an exemplary embodiment, the system further includes a signal transmitter, wherein the signal transmitter projects the synchronization signal toward a reflector, wherein the synchronization signal is reflected by the reflector, and wherein the signal receiver detects the reflected synchronization signal. In an exemplary embodiment, the reflector comprises a movie theater screen. In an exemplary embodiment, the signal transmitter receives a timing signal from an image projector. In an exemplary embodiment, the synchronization signal includes a radio frequency signal. In an exemplary embodiment, the synchronization signal includes a series of pulses at a predetermined interval. In an exemplary embodiment, the synchronization signal includes a series of pulses at a predetermined interval, wherein a first predetermined number of pulses opens the first liquid crystal shutter, and wherein a second predetermined number of pulses opens the second liquid crystal shutter. In an exemplary embodiment, the synchronization signal is encrypted. In an exemplary embodiment, the synchronization signal comprises a series of pulses and configuration data for the control circuit. In an exemplary embodiment, at least one of the series of pulses and the configuration data are encrypted. In an exemplary embodiment, the synchronization signal includes at least one data bit preceded by at least one clock pulse. In an exemplary embodiment, the synchronization signal includes a synchronous serial data signal. In an exemplary embodiment, the synchronization signal is sensed between the presentation of images for the first and second liquid crystal shutters.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, transmitting a synchronization signal corresponding to the image presented to the viewer, sensing the synchronization signal, and using the synchronization signal to determine when to open the first liquid crystal shutter or the second liquid crystal shutter. In an exemplary embodiment, the synchronization signal includes an infrared light. In an exemplary embodiment, the method further includes projecting the synchronization signal toward a reflector, reflecting the synchronization signal off of the reflector, and detecting the reflected synchronization signal.

In an exemplary embodiment, the method further includes reflecting the synchronization signal off of a movie theater screen. In an exemplary embodiment, the method further includes receiving a timing signal from an image projector. In an exemplary embodiment, the synchronization signal includes a radio frequency signal. In an exemplary embodiment, the synchronization signal includes a series of pulses at a predetermined interval. In an exemplary embodiment, the synchronization signal includes a series of pulses at a predetermined interval, wherein a first predetermined number of pulses opens the first liquid crystal shutter, and wherein a second predetermined number of pulses opens the second liquid crystal shutter. In an exemplary embodiment, the method further includes encrypting the synchronization signal. In an exemplary embodiment, the synchronization signal includes a series of pulses and configuration data for the control circuit. In an exemplary embodiment, the method further includes encrypting at least one of the series of pulses and the configuration data. In an exemplary embodiment, the synchronization signal includes at least one data bit preceded by at least one clock pulse. In an exemplary embodiment, the synchronization signal includes a synchronous serial data signal. In an exemplary embodiment, the synchronization signal is sensed between the presentation of images for the first and second liquid crystal shutters.

A system for providing three dimensional video images has been described that includes a pair of glasses comprising a first lens having a first liquid crystal shutter and a second lens having a second liquid crystal shutter, the liquid crystal shutters having a liquid crystal and an opening time of less than one millisecond, a control circuit that alternately opens the first and second liquid crystal shutters, wherein the liquid crystal orientation is held at a point of maximum light transmission until the control circuit closes the shutter, and a synchronization system including: a reflection device located in front of the pair of glasses, a signal transmitter sending a synchronization signal towards the reflection device, the synchronization signal corresponding to an image presented to a user of the glasses, a signal receiver sensing the synchronization signal reflected from the reflection device, and a control circuit adapted to open the first shutter or the second shutter during a period of time in which the image is presented. In an exemplary embodiment, the synchronization signal includes an infrared light. In an exemplary embodiment, the reflector includes a movie theater screen. In an exemplary embodiment, the signal transmitter receives a timing signal from an image projector. In an exemplary embodiment, the synchronization signal includes a series of pulses at a predetermined interval. In an exemplary embodiment, the synchronization signal includes a series of pulses at a predetermined interval, wherein a first predetermined number of pulses opens the first liquid crystal shutter, and wherein a second predetermined number of pulses opens the second liquid crystal shutter. In an exemplary embodiment, the synchronization signal is encrypted. In an exemplary embodiment, the synchronization signal includes a series of pulses and configuration data for the control circuit. In an exemplary embodiment, at least one of the series of pulses and the configuration data are encrypted. In an exemplary embodiment, the synchronization signal includes at least one data bit preceded by at least one clock pulse. In an exemplary embodiment, the synchronization signal includes a synchronous serial data signal. In an exemplary embodiment, the synchronization signal is sensed between the presentation of images for the first and second liquid crystal shutters.

A computer program installed on a machine readable medium for providing a three dimensional video image, using a pair of three dimensional viewing glasses comprising a first liquid crystal shutter and a second liquid crystal shutter, has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, sensing a synchronization signal corresponding to an image presented to the viewer, and using the sensed synchronization signal to determine when to open the first or the second liquid crystal shutter. In an exemplary embodiment, the synchronization signal includes an infrared light. In an exemplary embodiment, the computer program further includes projecting the synchronization signal toward a reflector, reflecting the synchronization signal off of the reflector, and detecting the reflected synchronization signal. In an exemplary embodiment, the reflector includes a movie theater screen. In an exemplary embodiment, the computer program further includes receiving a timing signal from an image projector. In an exemplary embodiment, the synchronization signal includes a radio frequency signal. In an exemplary embodiment, the synchronization signal includes a series of pulses at a predetermined interval. In an exemplary embodiment, the synchronization signal includes a series of pulses at a predetermined interval, wherein a first predetermined number of pulses opens the first liquid crystal shutter, and wherein a second predetermined number of pulses opens the second liquid crystal shutter. In an exemplary embodiment, the computer program further includes encrypting the synchronization signal. In an exemplary embodiment, the synchronization signal includes a series of pulses and configuration data for the control circuit. In an exemplary embodiment, the computer program further includes encrypting at least one of the series of pulses and the configuration data. In an exemplary embodiment, the synchronization signal includes at least one data bit preceded by at least one clock pulse. In an exemplary embodiment, the synchronization signal includes a synchronous serial data signal. In an exemplary embodiment, the computer program further includes sensing the synchronization signal between the presentation of images for the first and second liquid crystal shutters.

A system for providing a three dimensional video image has been described that includes means for having a pair of three dimensional viewing glasses comprising a first liquid crystal shutter and a second liquid crystal shutter, means for opening the first liquid crystal shutter in less than one millisecond, means for holding the first liquid crystal shutter at a point of maximum light transmission for a first period of time, means for closing the first liquid crystal shutter and then opening the second liquid crystal shutter in less than one millisecond, means for holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, means for sensing a synchronization signal corresponding to the image presented to the viewer, and means for using the sensed synchronization signal to determine when to open the first or the second liquid crystal shutter. In an exemplary embodiment, the synchronization signal includes an infrared light. In an exemplary embodiment, the system further includes means for transmitting the synchronization signal toward a reflector. In an exemplary embodiment, the reflector includes a movie theater screen. In an exemplary embodiment, the means for transmitting includes means for receiving a timing signal from an image projector. In an exemplary embodiment, the synchronization signal includes a radio frequency signal. In an exemplary embodiment, the synchronization signal includes a series of pulses at a predetermined interval. In an exemplary embodiment, the synchronization signal includes a series of pulses at a predetermined interval and wherein a first predetermined number of pulses opens the first liquid crystal shutter and wherein a second predetermined number of pulses opens the second liquid crystal shutter. In an exemplary embodiment, the system further includes means for encrypting the synchronization signal. In an exemplary embodiment, the synchronization signal includes a series of pulses and configuration data for the control circuit. In an exemplary embodiment, the system further includes means for encrypting at least one of the series of pulses and the configuration data. In an exemplary embodiment, the synchronization signal includes at least one data bit preceded by at least one clock pulse. In an exemplary embodiment, the synchronization signal includes a synchronous serial data signal. In an exemplary embodiment, the system further includes means for sensing the synchronization signal between the presentation of images for the first and second liquid crystal shutters.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of the viewer, projecting an encrypted synchronization signal toward a reflector, reflecting the encrypted synchronization signal off of the reflector, detecting the reflected encrypted synchronization signal, decrypting the detected encrypted synchronization signal, and using the detected synchronization signal to determine when to open the first liquid crystal shutter or the second liquid crystal shutter, wherein the synchronization signal comprises an infrared light, wherein the synchronization signal comprises a series of pulses and configuration data, wherein a first predetermined series of pulses opens the first liquid crystal shutter, wherein a second predetermined series of pulses opens the second liquid crystal shutter, wherein the synchronization signal comprises at least one data bit preceded by at least one clock pulse, wherein the synchronization signal comprise a synchronous serial data signal, and wherein the synchronization signal is detected between the presentation of images for the first and second liquid crystal shutters.

A system for providing three dimensional video images has been described that includes a pair of glasses comprising a first lens having a first liquid crystal shutter and a second lens having a second liquid crystal shutter, the liquid crystal shutters having a liquid crystal and an opening time of less than one millisecond, a control circuit that alternately opens the first and second liquid crystal shutters, and wherein an orientation of at least one of the liquid crystal shutters is held at a point of maximum light transmission until the control circuit closes the liquid crystal shutter, and a test system comprising a signal transmitter, a signal receiver, and a test system control circuit adapted to open and close the first and second liquid crystal shutters at a rate that is visible to a viewer. In an exemplary embodiment, the signal transmitter does not receive a timing signal from a projector. In an exemplary embodiment, the signal transmitter emits an infrared signal. In an exemplary embodiment, the infrared signal comprises a series of pulses. In an exemplary embodiment, the signal transmitter emits an radio frequency signal. In an exemplary embodiment, the radio frequency signal comprises a series of pulses.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, transmitting a test signal towards the three dimensional viewing glasses, receiving the test signal with a sensor on the three dimensional glasses, and using a control circuit to open and close the first and second liquid crystal shutters as a result of the received test signal, wherein the liquid crystal shutters open and close at a rate that is observable to a viewer wearing the glasses. In an exemplary embodiment, the signal transmitter does not receive a timing signal from a projector. In an exemplary embodiment, the signal transmitter emits an infrared signal. In an exemplary embodiment, the infrared signal comprises a series of pulses. In an exemplary embodiment, the signal transmitter emits an radio frequency signal. In an exemplary embodiment, the radio frequency signal includes a series of pulses.

A computer program installed on a machine readable medium for providing a three dimensional video image using a pair of three dimensional viewing glasses including a first liquid crystal shutter and a second liquid crystal shutter, the computer program has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, transmitting a test signal towards the three dimensional viewing glasses, receiving the test signal with a sensor on the three dimensional glasses, and using a control circuit to open and close the first and second liquid crystal shutters as a result of the received test signal, wherein the liquid crystal shutters open and close at a rate that is observable to a viewer wearing the glasses. In an exemplary embodiment, the signal transmitter does not receive a timing signal from a projector. In an exemplary embodiment, the signal transmitter emits an infrared signal. In an exemplary embodiment, the infrared signal includes a series of pulses. In an exemplary embodiment, the signal transmitter emits an radio frequency signal. In an exemplary embodiment, the radio frequency signal comprises a series of pulses.

A system for providing a three dimensional video image has been described that includes a means for having a pair of three dimensional viewing glasses comprising a first liquid crystal shutter and a second liquid crystal shutter, means for opening the first liquid crystal shutter in less than one millisecond, means for holding the first liquid crystal shutter at a point of maximum light transmission for a first period of time, means for closing the first liquid crystal shutter and then opening the second liquid crystal shutter in less than one millisecond, means for holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, means for transmitting a test signal towards the three dimensional viewing glasses, means for receiving the test signal with a sensor on the three dimensional glasses, and means for using a control circuit to open and close the first and second liquid crystal shutters as a result of the test signal, wherein the liquid crystal shutters open and close at a rate that is observable to a viewer wearing the glasses. In an exemplary embodiment, the means for transmitting does not receive a timing signal from a projector. In an exemplary embodiment, the means for transmitting emits an infrared signal. In an exemplary embodiment, the infrared signal includes a series of pulses. In an exemplary embodiment, the means for transmitting emits an radio frequency signal. In an exemplary embodiment, the radio frequency signal includes a series of pulses.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, transmitting an infrared test signal towards the three dimensional viewing glasses, receiving the infrared test signal with a sensor on the three dimensional glasses, and using a control circuit to open and close the first and second liquid crystal shutters as a result of the received infrared test signal, wherein the liquid crystal shutters open and close at a rate that is observable to a viewer wearing the glasses, wherein the signal transmitter does not receive a timing signal from a projector, wherein the infrared signal comprises a series of pulses, wherein the infrared signal comprises one or more data bits that are each preceded by at least one clock pulse, and wherein the infrared signal comprises a synchronous serial data signal.

A system for providing three dimensional video images has been described that includes a pair of glasses comprising a first lens having a first liquid crystal shutter and a second lens having a second liquid crystal shutter, the liquid crystal shutters each having a liquid crystal and an opening time of less than one millisecond, a control circuit that alternately opens the first and second liquid crystal shutters, wherein the liquid crystal orientation is held at a point of maximum light transmission until the control circuit closes the shutter, and signal receiver operably coupled to the control circuit, wherein the control circuit is adapted to activate the signal receiver at a first predetermined time interval, determine if the signal receiver is receiving a valid signal, deactivate the signal receiver if the signal receiver does not receive the valid signal within a second predetermined time interval, and alternately open and close the first and second shutters at an interval corresponding to the valid signal if the signal receiver does receive the valid signal. In an exemplary embodiment, the first period of time includes at least two seconds. In an exemplary embodiment, the second period of time includes no more than 100 milliseconds. In an exemplary embodiment, both of the liquid crystal shutters remain either open or closed until the signal receiver receives the valid signal.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, activating a signal receiver at a first predetermined time interval, determining if the signal receiver is receiving a valid signal from a signal transmitter, deactivating the signal receiver if the signal receiver does not receive the valid signal from the signal transmitter within a second period of time, and opening and closing the first and second shutters at an interval corresponding to the valid signal if the signal receiver does receive the valid signal from the signal transmitter. In an exemplary embodiment, the first period of time includes at least two seconds. In an exemplary embodiment, the second period of time includes no more than 100 milliseconds. In an exemplary embodiment, both of the liquid crystal shutters remain either open or closed until the signal receiver receives a valid signal from the signal transmitter.

A system for providing three dimensional video images has been described that includes a pair of glasses comprising a first lens having a first liquid crystal shutter and a second lens having a second liquid crystal shutter, the liquid crystal shutters having a liquid crystal and an opening time of less than one millisecond, a control circuit that can alternately open the first and second liquid crystal shutters, wherein the liquid crystal orientation is held at a point of maximum light transmission until the control circuit closes the shutter, and wherein the control circuit is adapted to hold both the first liquid crystal shutter and the second liquid crystal shutter open. In an exemplary embodiment, the control circuit holds the first liquid crystal shutter and the second liquid crystal shutter open until the control circuit detects a synchronization signal. In an exemplary embodiment, a voltage applied to the first and second liquid crystal shutters alternates between positive and negative.

A method for providing a three dimensional video image has been described that includes having a pair of three dimensional viewing glasses comprising a first liquid crystal shutter and a second liquid crystal shutter, wherein the first liquid crystal shutter can open in less than one millisecond, wherein the second liquid crystal shutter can open in less than one millisecond, and opening and closing the first and second liquid crystal shutters at a rate that makes the first and, second liquid crystal shutters appear to be clear lenses to a user. In an exemplary embodiment, the method further includes opening and closing the first and second liquid crystal shutters at a rate that makes the liquid crystal shutters appear to be clear lenses to the user until detecting a valid synchronization signal. In an exemplary embodiment, the method further includes applying a voltage to the first and second liquid crystal shutters that alternates between positive and negative until detecting a valid synchronization signal.

A computer program installed on a machine readable medium for providing a three dimensional video image, for use in a pair of three dimensional viewing glasses comprising a first liquid crystal shutter and a second liquid crystal shutter, has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, activating a signal receiver at a first predetermined time interval, determining if the signal receiver is receiving a valid signal from the signal transmitter, deactivating the signal receiver if the signal receiver does not receive the valid signal from the signal transmitter within a second period of time, and opening and closing the first and second shutters at an interval corresponding to the valid signal if the signal receiver does receive the valid signal from the signal transmitter. In an exemplary embodiment, the first period of time comprises at least two seconds. In an exemplary embodiment, the second period of time comprises no more than 100 milliseconds. In an exemplary embodiment, the first and second liquid crystal shutters remain open until the signal receiver receives the valid signal from the signal transmitter.

A computer program installed on a machine readable medium for providing a three dimensional video image, for use in a pair of three dimensional viewing glasses comprising a first liquid crystal shutter and a second liquid crystal shutter, wherein the first liquid crystal shutter can open in less than one millisecond, and wherein the second liquid crystal shutter can open in less than one millisecond, and has been described that includes opening and closing the first and second liquid crystal shutters at a rate that makes the liquid crystal shutters appear to be clear lenses. In an exemplary embodiment, the computer program further includes holding the first and second liquid crystal shutters open until detecting a valid synchronization signal. In an exemplary embodiment, the computer program further includes applying a voltage to the first and second liquid crystal shutters that alternates between positive and negative until detecting a valid synchronization signal.

A system for providing a three dimensional video image has been described that includes means for providing a pair of three dimensional viewing glasses comprising a first liquid crystal shutter and a second liquid crystal shutter, means for opening the first liquid crystal shutter in less than one millisecond, means for holding the first liquid crystal shutter at a point of maximum light transmission for a first period of time, means for closing the first liquid crystal shutter and then opening the second liquid crystal shutter in less than one millisecond, means for holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, means for activating a signal receiver at a first predetermined time interval, means for determining if the signal receiver is receiving a valid signal from the signal transmitter, means for deactivating the signal receiver if the signal receiver does not receive the valid signal from the signal transmitter within a second period of time, and means for opening and closing the first and second shutters at an interval corresponding to the valid signal if the signal receiver does receive the valid signal from the signal transmitter. In an exemplary embodiment, the first period of time includes at least two seconds. In an exemplary embodiment, the second period of time includes no more than 100 milliseconds. In an exemplary embodiment, the first and second liquid crystal shutters remain open until the signal receiver receives a valid signal from the signal transmitter.

A system for providing three dimensional video images has been described that includes a pair of glasses including a first lens having a first liquid crystal shutter and a second lens having a second liquid crystal shutter, the liquid crystal shutters having a liquid crystal and an opening time of less than one millisecond, and a control circuit that alternately opens the first and second liquid crystal shutters, wherein the liquid crystal orientation is held at a point of maximum light transmission until the control circuit closes the shutter, wherein the control circuit opens and closes the first and second liquid crystal shutters after the glasses are powered on for a predetermined time period. In an exemplary embodiment, the control circuit alternatively opens and closes the first and second liquid crystal shutters after the glasses are powered on for a predetermined time period. In an exemplary embodiment, the control circuit, after the predetermined time period, then opens and closes the first and second liquid crystal shutters as a function of a synchronization signal received by the control circuit. In an exemplary embodiment, the synchronization signal comprises a series of pulses at a predetermined interval. In an exemplary embodiment, the synchronization signal includes a series of pulses at a predetermined interval and wherein a first predetermined number of pulses opens the first liquid crystal shutter and wherein a second predetermined number of pulses opens the second liquid crystal shutter. In an exemplary embodiment, a portion of the series of pulses is encrypted. In an exemplary embodiment, the series of pulses includes a predetermined number of pulses that are not encrypted followed by encrypted data. In an exemplary embodiment, the synchronization signal comprises one or more data bits that are each preceded by one or more clock pulses. In an exemplary embodiment, the synchronization signal includes a synchronous serial data signal.

A method for providing a three dimensional video image has been described that includes having a pair of three dimensional viewing glasses comprising a first liquid crystal shutter and a second liquid crystal shutter, opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, powering on the glasses; and opening and closing the first and second liquid crystal shutters for a predetermined time period after powering on the glasses. In an exemplary embodiment, the method further includes providing a synchronization signal, wherein a portion of the synchronization signal is encrypted, sensing the synchronization signal, and wherein the first and second liquid crystal shutters open and close in a pattern corresponding to the sensed synchronization signal only after receiving an encrypted signal after the predetermined time period. In an exemplary embodiment, the synchronization signal includes a series of pulses at a predetermined interval and wherein a first predetermined number of pulses opens the first liquid crystal shutter and wherein a second predetermined number of pulses opens the second liquid crystal shutter. In an exemplary embodiment, a portion of the series of pulses is encrypted. In an exemplary embodiment, the series of pulses includes a predetermined number of pulses that are not encrypted followed by a predetermined number of pulses that are encrypted. In an exemplary embodiment, the first and second liquid crystal shutters open and close in a pattern corresponding to the synchronization signal only after receiving two consecutive encrypted signals. In an exemplary embodiment, the synchronization signal includes one or more data bits that are each preceded by one or more clock pulses. In an exemplary embodiment, the synchronization signal comprises a synchronous serial data signal.

A computer program installed on a machine readable medium for providing a three dimensional video image, using a pair of three dimensional viewing glasses comprising a first liquid crystal shutter and a second liquid crystal shutter, has been described that includes opening the first liquid crystal shutter in less than one millisecond, holding the first liquid crystal shutter at a point of maximum light transmission for a first period of time, closing the first liquid crystal shutter and then opening the second liquid crystal shutter in less than one millisecond, holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, powering on the glasses; and opening and closing the first and second liquid crystal shutters for a predetermined time period after powering on the glasses. In an exemplary embodiment, the computer program further includes providing a synchronization signal, wherein a portion of the synchronization signal is encrypted, sensing the synchronization signal, and wherein the first and second liquid crystal shutters open and close in a pattern corresponding to the synchronization signal only after receiving an encrypted signal after the predetermined time period. In an exemplary embodiment, the synchronization signal includes a series of pulses at a predetermined interval, and wherein a first predetermined number of pulses opens the first liquid crystal shutter and wherein a second predetermined number of pulses opens the second liquid crystal shutter. In an exemplary embodiment, a portion of the series of pulses is encrypted. In an exemplary embodiment, the series of pulses includes a predetermined number of pulses that are not encrypted followed by a predetermined number of pulses that are encrypted. In an exemplary embodiment, the first and second liquid crystal shutters open and close in a pattern corresponding to the synchronization signal only after receiving two consecutive encrypted signals. In an exemplary embodiment, the synchronization signal includes one or more data bits that are each preceded by one or more clock pulses. In an exemplary embodiment, the synchronization signal comprises a synchronous serial data signal.

A system for providing a three dimensional video image has been described that includes means for providing a pair of three dimensional viewing glasses comprising a first liquid crystal shutter and a second liquid crystal shutter, wherein the first liquid crystal shutter can open in less than one millisecond, wherein the second liquid crystal shutter can open in less than one millisecond, and means for opening and closing the first and second liquid crystal shutters after powering up the glasses for a predetermined period of time. In an exemplary embodiment, the system further includes means for opening and closing the first and second liquid crystal shutters upon receiving a synchronization signal after the predetermined period of time. In an exemplary embodiment, the synchronization signal includes one or more data bits that are each preceded by one or more clock pulses. In an exemplary embodiment, the synchronization signal includes a synchronous serial data signal.

A system for providing a three dimensional video image has been described that includes means for providing a pair of three dimensional viewing glasses comprising a first liquid crystal shutter and a second liquid crystal shutter, means for opening the first liquid crystal shutter in less than one millisecond, means for holding the first liquid crystal shutter at a point of maximum light transmission for a first period of time, means for closing the first liquid crystal shutter and then opening the second liquid crystal shutter in less than one millisecond, means for holding the second liquid crystal shutter at a point of maximum light transmission for a second period of time, wherein the first period of time corresponds to the presentation of an image for a first eye of a viewer and the second period of time corresponds to the presentation of an image for a second eye of a viewer, and means for opening and closing the first and second liquid crystal shutters after powering up the glasses for a predetermined period of time. In an exemplary embodiment, the system further includes means for transmitting a synchronization signal, wherein a portion of the synchronization signal is encrypted, means for sensing the synchronization signal, and means for opening and closing the first and second liquid crystal shutters in a pattern corresponding to the synchronization signal only after receiving an encrypted signal after the predetermined time period. In an exemplary embodiment, the synchronization signal includes a series of pulses at a predetermined interval and wherein a first predetermined number of pulses opens the first liquid crystal shutter and wherein a second predetermined number of pulses opens the second liquid crystal shutter. In an exemplary embodiment, a portion of the series of pulses is encrypted. In an exemplary embodiment, the series of pulses includes a predetermined number of pulses that are not encrypted followed by a predetermined number of pulses that are encrypted. In an exemplary embodiment, the first and second liquid crystal shutters open and close in a pattern corresponding to the synchronization signal only after receiving two consecutive encrypted signals. In an exemplary embodiment, the synchronization signal includes one or more data bits that are each preceded by one or more clock pulses. In an exemplary embodiment, the synchronization signal comprises a synchronous serial data signal.

A frame for 3-D glasses having right and left viewing shutters has been described that includes a frame front that defines right and left lens openings for receiving the right and left viewing shutters; and right and left temples coupled to and extending from the frame front for mounting on a head of a user of the 3-D glasses; wherein each of the right and left temples comprise a serpentine shape. In an exemplary embodiment, each of the right and left temples include one or more ridges. In an exemplary embodiment, the frame further includes a left shutter controller mounted within the frame for controlling the operation of the left viewing shutter; a right shutter controller mounted within the frame for controlling the operation of the right viewing shutter; a central controller mounted within the frame for controlling the operation of the left and right shutter controllers; a signal sensor operably coupled to the central controller for sensing a signal from an external source; and a battery mounted within the frame operably coupled to the left and right shutter controllers, the central controller, and the signal sensor for supplying power to the left and right shutter controllers, the central controller, and the signal sensor. In an exemplary embodiment, the viewing shutters each include a liquid crystal having an opening time of less than one millisecond. In an exemplary embodiment, the frame further includes a battery sensor operably coupled to the battery and the central controller for monitoring the operating status of the battery and providing a signal to the central controller representative of the operating status of the battery. In an exemplary embodiment, the frame further includes a charge pump operably coupled to the battery and the central controller for providing an increased voltage supply to the left and right shutter controllers. In an exemplary embodiment, the frame further includes a common shutter controller operably coupled to the central controller for controlling the operation of the left and right shutter controllers. In an exemplary embodiment, the signal sensor includes a narrow band pass filter; and a decoder.

3-D glasses having right and left viewing shutters have been described that include a frame defining left and right lens openings for receiving the right and left viewing shutters; a central controller for controlling the operation of the right and left viewing shutters; a housing coupled to the frame for housing the central controller defining an opening for accessing at least a portion of the controller; and a cover received within and sealingly engaging the opening in the housing. In an exemplary embodiment, the cover comprises an o-ring seal for sealingly engaging the opening in the housing. In an exemplary embodiment, the cover comprises one or more keying members for engaging complimentary recesses formed in the opening in the housing. In an exemplary embodiment, the 3-D glasses further include a left shutter controller operably coupled to the central controller mounted within the housing for controlling the operation of the left viewing shutter; a right shutter controller operably coupled to the central controller mounted within the housing for controlling the operation of the right viewing shutter; a signal sensor operably coupled to the central controller for sensing a signal from an external source; and a battery mounted within the housing operably coupled to the left and right shutter controllers, the central controller, and the signal sensor for supplying power to the left and right shutter controllers, the central controller, and the signal sensor. In an exemplary embodiment, the viewing shutters each include a liquid crystal having an opening time of less than one millisecond. In an exemplary embodiment, the 3-D glasses further include a battery sensor operably coupled to the battery and the central controller for monitoring the operating status of the battery and providing a signal to the central controller representative of the operating status of the battery. In an exemplary embodiment, the 3-D glasses further include a charge pump operably coupled to the battery and the central controller for providing an increased voltage supply to the left and right shutter controllers. In an exemplary embodiment, the 3-D glasses further include a common shutter controller operably coupled to the central controller for controlling the operation of the left and right shutter controllers. In an exemplary embodiment, the signal sensor includes a narrow band pass filter; and a decoder.

A method of housing a controller for 3-D glasses having right and left viewing elements has been described that includes providing a frame for supporting the right and left viewing elements for wearing by a user; providing a housing within the frame for housing a controller for the 3-D glasses; and sealing the housing within the frame using a removable cover having a sealing element for sealingly engaging the housing. In an exemplary embodiment, the cover includes one or more dimples. In an exemplary embodiment, sealing the housing comprises operating a key to engage the dimples in the cover of the housing. In an exemplary embodiment, the housing further houses a removable battery for providing power to the controller for the 3-D glasses.

A system for providing a three dimensional video image to a user of 3D glasses has been described that includes a power supply, first and a second liquid crystal shutters operably coupled to the power supply, and a control circuit operably coupled to the power supply and the liquid crystal shutters adapted to open the first liquid crystal shutter for a first period of time, close the first liquid crystal shutter for a second period of time, open the second liquid crystal shutter for the second period of time, close the second liquid crystal shutter for the first period of time, and transfer charge between the first and second liquid crystal shutters during portions of at least one of the first and second periods of time, wherein the first period of time corresponds to the presentation of an image for a first eye of the user and the second period of time corresponds to the presentation of an image for a second eye of the user. In an exemplary embodiment, the control circuit is adapted to use a synchronization signal to determine the first and second periods of time. In an exemplary embodiment, the system further includes an emitter that provides a synchronization signal and wherein the synchronization signal causes the control circuit to open one of the liquid crystal shutters. In an exemplary embodiment, the synchronization signal includes an encrypted signal. In an exemplary embodiment, the control circuit will only operate after validating the encrypted signal. In an exemplary embodiment, the control circuit is adapted to detect a synchronization signal and begin operating the liquid crystal shutters after detecting the synchronization signal. In an exemplary embodiment, the encrypted signal will only operate a pair of liquid crystal glasses having a control circuit adapted to receive the encrypted signal. In an exemplary embodiment, the synchronization signal includes one or more data bits that are each preceded by one or more clock pulses. In an exemplary embodiment, the synchronization signal comprises a synchronous serial data signal.

A system for providing three dimensional video images has been described that includes a pair of glasses comprising a first lens having a first liquid crystal shutter and a second lens having a second liquid crystal shutter, the liquid crystal shutters each having a liquid crystal, and a control circuit that alternately opens the first and second liquid crystal shutters and transfers charge between the liquid crystal shutters. In an exemplary embodiment, the system further includes an emitter that provides a synchronization signal and wherein the synchronization signal causes the control circuit to open one of the liquid crystal shutters. In an exemplary embodiment, the synchronization signal includes an encrypted signal. In an exemplary embodiment, the control circuit will only operate after validating the encrypted signal. In an exemplary embodiment, the control circuit is adapted to detect a synchronization signal and begin operating the liquid crystal shutters after detecting the synchronization signal. In an exemplary embodiment, the encrypted signal will only operate a pair of liquid crystal glasses having a control circuit adapted to receive the encrypted signal. In an exemplary embodiment, the synchronization signal includes one or more data bits that are each preceded by one or more clock pulses. In an exemplary embodiment, the synchronization signal includes a synchronous serial data signal.

A method for providing a three dimensional video image using first and second liquid crystal shutters has been described that includes closing the first liquid crystal shutter and opening the second liquid crystal shutter, then closing the second liquid crystal shutter and opening the first liquid crystal shutter, and transferring charge between the first and second liquid crystal shutters. In an exemplary embodiment, the method further includes providing a synchronization signal, and opening one of the liquid crystal shutters in response to the synchronization signal. In an exemplary embodiment, the synchronization signal includes an encrypted signal. In an exemplary embodiment, the method further includes operating only after validating the encrypted signal. In an exemplary embodiment, the method further includes detecting a synchronization signal, and begin operating the liquid crystal shutters after detecting the synchronization signal. In an exemplary embodiment, the synchronization signal comprises one or more data bits that are each preceded by one or more clock pulses. In an exemplary embodiment, the synchronization signal includes a synchronous serial data signal.

A computer program installed on a machine readable medium in a housing for 3D glasses having first and second liquid crystal shutters for providing a three dimensional video image to a user of the 3D glasses has been described that includes closing the first liquid crystal shutter and opening the second liquid crystal shutter, then closing the second liquid crystal shutter and opening the first liquid crystal shutter, and transferring charge between the first and second liquid crystal shutters. In an exemplary embodiment, the computer program further includes providing a synchronization signal, and opening one of the liquid crystal shutters in response to the synchronization signal. In an exemplary embodiment, the synchronization signal includes an encrypted signal. In an exemplary embodiment, the computer program further includes validating the encrypted signal. In an exemplary embodiment, the computer program further includes detecting a synchronization signal, and operating the liquid crystal shutters after detecting the synchronization signal. In an exemplary embodiment, the synchronization signal comprises one or more data bits that are each preceded by one or more clock pulses. In an exemplary embodiment, the synchronization signal includes a synchronous serial data signal.

A system for providing a three dimensional video image using first and second liquid crystal shutters has been described that includes means for closing the first liquid crystal shutter and opening the second liquid crystal shutter, means for then closing the second liquid crystal shutter and opening the first liquid crystal shutter, and means for transferring charge between the first and second liquid crystal shutters. In an exemplary embodiment, the system further includes means for providing a synchronization signal, and means for the synchronization signal causing opening one of the liquid crystal shutters. In an exemplary embodiment, the synchronization signal comprises an encrypted signal. In an exemplary embodiment, the system further includes means for only operating after validating the encrypted signal. In an exemplary embodiment, the synchronization signal includes one or more data bits that are each preceded by one or more clock pulses. In an exemplary embodiment, the synchronization signal includes a synchronous serial data signal. In an exemplary embodiment, the system further includes means for detecting a synchronization signal, and means for operating the liquid crystal shutters after detecting the synchronization signal.

A system for providing electrical power to 3D glasses including left and right liquid crystal shutters has been described that includes a controller operably coupled to the left and right liquid crystal shutters; a battery operably coupled to the controller; and a charge pump operably coupled to the controller; wherein the controller is adapted to transfer electrical charge between the left and right liquid crystal shutters when changing the operational state of either of the left or right liquid crystal shutter; and wherein the charge pump is adapted to accumulate electrical potential when the controller changes the operational state of either the left or right liquid crystal shutter. In an exemplary embodiment, the charge pump is adapted to stop accumulating electrical potential when the level of the electrical potential equals a predetermined level.

A method of providing electrical power to 3D glasses including left and right liquid crystal shutters has been described that includes transferring electrical charge between the left and right liquid crystal shutters when changing the operational state of either of the left or right liquid crystal shutters; and accumulating electrical potential when changing the operational state of either the left or right liquid crystal shutters. In an exemplary embodiment, the method further includes stopping the accumulation of electrical potential when the level of the electrical potential equals a predetermined level.

A computer program stored in a machine readable medium for providing electrical power to 3D glasses including left and right liquid crystal shutters has been described that includes transferring electrical charge between the left and right liquid crystal shutters when changing the operational state of either of the left or right liquid crystal shutters; and accumulating electrical potential when changing the operational state of either the left or right liquid crystal shutters. In an exemplary embodiment, the computer program further includes stopping the accumulation of electrical potential when the level of the electrical potential equals a predetermined level.

A system for providing electrical power to 3D glasses including left and right liquid crystal shutters has been described that includes means for transferring electrical charge between the left and right liquid crystal shutters when changing the operational state of either of the left or right liquid crystal shutters; and means for accumulating electrical potential when changing the operational state of either the left or right liquid crystal shutters. In an exemplary embodiment, the system further includes means for stopping the accumulation of electrical potential when the level of the electrical potential equals a predetermined level.

A signal sensor for use in 3D glasses for receiving a signal from a signal transmitter and sending a decoded signal to a controller for operating the 3D glasses has been described that includes a band pass filter for filtering the signal received from the signal transmitter; and a decoder operably coupled to the band pass filter for decoding the filtered signal and providing the decoded signal to the controller of the 3D glasses. In an exemplary embodiment, the signal received from the signal transmitter includes one or more data bits; and one or more clock pulses that precede a corresponding one of the data bits. In an exemplary embodiment, the signal received from the signal transmitter comprises a synchronous serial data transmission. In an exemplary embodiment, the signal received from the signal transmitter comprise a synchronization signal for controlling the operation of the 3D glasses.

3-D have been described that include a band pass filter for filtering the signal received from a signal transmitter; a decoder operably coupled to the band pass filter for decoding the filtered signal; a controller operably coupled to the decoder for receiving the decoded signal; and left and right optical shutters operably coupled to and controlled by the controller as a function of the decoded signal. In an exemplary embodiment, the signal received from the signal transmitter includes one or more data bits; and one or more clock pulses that proceed a corresponding one of the data bits. In an exemplary embodiment, the signal received from the signal transmitter comprises a synchronous serial data transmission.

A method of transmitting data signals to 3D glasses has been described that includes transmitting a synchronous serial data signal to the 3D glasses. In an exemplary embodiment, the data signal comprises one or more data bits that are each preceded by a corresponding clock pulse. In an exemplary embodiment, the method further includes filtering the data signal to remove out of band noise. In an exemplary embodiment, the synchronous serial data signal comprises a synchronization signal for controlling the operation of the 3D glasses.

A method of operating 3D glasses having left and right optical shutters has been described that includes transmitting a synchronous serial data signal to the 3D glasses; and controlling the operation of the left and right optical shutters as a function of data encoded in the data signal. In an exemplary embodiment, the data signal includes one or more data bits that are each preceded by a corresponding clock pulse. In an exemplary embodiment, the method further includes filtering the data signal to remove out of band noise.

A computer program for transmitting data signals to 3D glasses has been described that includes transmitting a synchronous serial data signal to the 3D glasses. In an exemplary embodiment, the data signal includes one or more data bits that are each preceded by a corresponding clock pulse. In an exemplary embodiment, the computer program further includes filtering the data signal to remove out of band noise. In an exemplary embodiment, the synchronous serial data signal includes a synchronization signal for controlling the operation of the 3D glasses.

A computer program for operating 3D glasses having left and right optical shutters has been described that includes transmitting a synchronous serial data signal to the 3D glasses; and controlling the operation of the left and right optical shutters as a function of data encoded in the data signal. In an exemplary embodiment, the data signal includes one or more data bits that are each preceded by a corresponding clock pulse. In an exemplary embodiment, the computer program further includes filtering the data signal to remove out of band noise.

A synchronization signal for operating one or more optical shutters within a pair of three dimensional viewing glasses, the synchronization signal stored within a machine readable medium, has been described that includes one or more data bits for controlling the operation of the one or more of the optical shutters within the pair of three dimensional viewing glasses; and one or more clock pulses that precede each of the data bits. In an exemplary embodiment, the signal is stored within a machine readable medium operably coupled to a transmitter. In an exemplary embodiment, the transmitter includes an infra red transmitter. In an exemplary embodiment, the transmitter includes a visible light transmitter. In an exemplary embodiment, the transmitter includes a radio frequency transmitter. In an exemplary embodiment, the signal is stored within a machine readable medium operably coupled to a receiver. In an exemplary embodiment, the transmitter includes an infra red transmitter. In an exemplary embodiment, the transmitter includes a visible light transmitter. In an exemplary embodiment, the transmitter includes a radio frequency transmitter.

A method of synchronizing the operation of 3D glasses having left and right shutters with a display device has been described that includes initially synchronizing the operation of the 3D glasses with the operation of the display device; and periodically resynchronizing the operation of the 3D glasses with the operation of the display device. In an exemplary embodiment, initially synchronizing the operation of the 3D glasses with the operation of the display device comprises transmitting a signal from the display device to the 3D glasses that comprises one or more synchronization pulses. In an exemplary embodiment, initially synchronizing the operation of the 3D glasses with the operation of the display device comprises transmitting a signal from the display device to the 3D glasses that comprises information representative of the type of the display device. In an exemplary embodiment, initially synchronizing the operation of the 3D glasses with the operation of the display device comprises transmitting a signal from the display device to the 3D glasses that comprises information representative of an opening and closing sequence of the left and right shutters. In an exemplary embodiment, initially synchronizing the operation of the 3D glasses with the operation of the display device comprises transmitting a signal from the display device to the 3D glasses that comprises information representative of an operating frequency of the images displayed on the display device. In an exemplary embodiment, initially synchronizing the operation of the 3D glasses with the operation of the display device comprises transmitting a signal from the display device to the 3D glasses that comprises one or more synchronization pulses; transmitting a signal from the display device to the 3D glasses that comprises information representative of the type of the display device; transmitting a signal from the display device to the 3D glasses that comprises information representative of an opening and closing sequence of the left and right shutters; and transmitting a signal from the display device to the 3D glasses that comprises information representative of an operating frequency of the images displayed on the display device. In an exemplary embodiment, periodically resynchronizing the operation of the 3D glasses with the operation of the display device comprises transmitting a signal from the display device to the 3D glasses that comprises one or more synchronization pulses. In an exemplary embodiment, periodically resynchronizing the operation of the 3D glasses with the operation of the display device comprises transmitting a signal from the display device to the 3D glasses that comprises information representative of a time of transmission of the signal. In an exemplary embodiment, periodically resynchronizing the operation of the 3D glasses with the operation of the display device comprises transmitting a signal from the display device to the 3D glasses that comprises information representative of a time delay of the transmission of the signal. In an exemplary embodiment, periodically resynchronizing the operation of the 3D glasses with the operation of the display device comprises transmitting a signal from the display device to the 3D glasses that comprises one or more synchronization pulses; transmitting a signal from the display device to the 3D glasses that comprises information representative of a time of transmission of the signal; and transmitting a signal from the display device to the 3D glasses that comprises information representative of a time delay of the transmission of the signal. In an exemplary embodiment, the method further includes the 3D glasses using the time delay of the transmission of the signal to resynchronize the operation of the 3D glasses with the operation of the display device.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more elements of the exemplary embodiments may be omitted, combined with, or substituted for, in whole or in part, one or more elements of one or more of the other exemplary embodiments. Accordingly, the scope of protection is not limited to the embodiments described, but is only limited by the claims that follow, the scope of which shall include all equivalents of the subject matter of the claims.

The invention claimed is:

1. A method of viewing 3D images using an LCD display having a backlight using 3D shutter glasses having left and right shutters, comprising:
    displaying left and right images on the LCD display;
    synchronizing the operation of the 3D glasses with the operation of the LCD display such that the left shutter is open and the right shutter is closed during the display of the left image on the LCD display and the left shutter is closed and the right shutter is open during the display of the right image on the LCD display; and
    turning off the backlight of the LCD display during a transition between the display of adjacent left and right images.

2. The method of claim 1, wherein displaying left and right images on the LCD display comprises displaying left and right images at a rate of 240 images per second.

3. The method of claim 2, wherein displaying left and right images on the LCD display comprises displaying two left images and then displaying two right images.

4. The method of claim 1, wherein displaying left and right images on the LCD display comprises displaying two left images and then displaying two right images.

5. The method of claim 4, wherein displaying left and right images on the LCD display comprises displaying left and right images at a rate of 240 images per second.

6. The method of claim 1, further comprising the polarization of the left and right shutters substantially matching the polarization of the LCD display.

7. A system for viewing 3D images using an LCD display having a backlight using 3D shutter glasses having left and right shutters, comprising:
    means for displaying left and right images on the LCD display;
    means for synchronizing the operation of the 3D glasses with the operation of the LCD display such that the left shutter is open and the right shutter is closed during the display of the left image on the LCD display and the left shutter is closed and the right shutter is open during the display of the right image on the LCD display; and
    means for turning off the backlight of the LCD display during a transition between the display of adjacent left and right images.

8. The system of claim 7, wherein means for displaying left and right images on the LCD display comprises means for displaying left and right images at a rate of 240 images per second.

9. The system of claim 8, wherein means for displaying left and right images on the LCD display comprises means for displaying two left images and then displaying two right images.

10. The system of claim 7, wherein means for displaying left and right images on the LCD display comprises means for displaying two left images and then displaying two right images.

11. The system of claim 10, wherein means for displaying left and right images on the LCD display comprises means for displaying left and right images at a rate of 240 images per second.

12. The system of claim 7, further comprising a means for the polarization of the left and right shutters substantially matching the polarization of the LCD display.

13. A method of viewing 3D images using an LCD display having a backlight using 3D shutter glasses having left and right shutters that are worn by a user, comprising:
- displaying left and right images on the LCD display;
- synchronizing the operation of the 3D glasses with the operation of the LCD display by transmitting signals from the LCD display to the 3D glassed such that the left shutter is open and the right shutter is closed during the display of the left image on the LCD display and the left shutter is closed and the right shutter is open during the display of the right image on the LCD display; and
- turning off the backlight of the LCD display during a transition between the display of adjacent left and right images.

14. A system for viewing 3D images using an LCD display having a backlight using 3D shutter glasses having left and right shutters that are worn by a user, comprising:
- means for displaying left and right images on the LCD display;
- means for synchronizing the operation of the 3D glasses with the operation of the LCD display by transmitting signals from the LCD display to the 3D glassed such that the left shutter is open and the right shutter is closed during the display of the left image on the LCD display and the left shutter is closed and the right shutter is open during the display of the right image on the LCD display; and
- means for turning off the backlight of the LCD display during a transition between the display of adjacent left and right images.

* * * * *